(12) United States Patent
Liu et al.

(10) Patent No.: US 11,655,340 B2
(45) Date of Patent: May 23, 2023

(54) DUAL CURE SEALANTS

(71) Applicant: PRC-DeSoto International, Inc., Sylmar, CA (US)

(72) Inventors: JianCheng Liu, Arcadia, CA (US); Srikant Pathak, Diamond Bar, CA (US); Bruce Virnelson, Valencia, CA (US)

(73) Assignee: PRC-DESOTO INTERNATIONAL, INC., Sylmar, CA (US)

( * ) Notice: Subject to any disclaimer, the term of this patent is extended or adjusted under 35 U.S.C. 154(b) by 628 days.

(21) Appl. No.: 16/620,759

(22) PCT Filed: Jun. 8, 2018

(86) PCT No.: PCT/US2018/036746
§ 371 (c)(1),
(2) Date: Dec. 9, 2019

(87) PCT Pub. No.: WO2018/227149
PCT Pub. Date: Dec. 13, 2018

(65) Prior Publication Data
US 2020/0199300 A1    Jun. 25, 2020

Related U.S. Application Data

(60) Provisional application No. 62/517,648, filed on Jun. 9, 2017.

(51) Int. Cl.
*C08G 75/02* (2016.01)
*C08G 65/00* (2006.01)
(Continued)

(52) U.S. Cl.
CPC ....... *C08G 75/0218* (2013.01); *C08G 65/002* (2013.01); *C08G 75/025* (2013.01);
(Continued)

(58) Field of Classification Search
None
See application file for complete search history.

(56) References Cited

U.S. PATENT DOCUMENTS 3,517,082 A    6/1970   Cockerham
4,366,307 A    12/1982  Singh et al.
(Continued)

FOREIGN PATENT DOCUMENTS

CN    102639579 A    8/2012
JP    S5665023 A     6/1981
(Continued)

OTHER PUBLICATIONS

Cole et al., "Redox initiation of bulk-thiol-ene polymerizations," Polymer Chemistry, 2013, vol. 4, p. 1167-1175.
(Continued)

*Primary Examiner* — Satya B Sastri
(74) *Attorney, Agent, or Firm* — William R. Lambert

(57) ABSTRACT

Compositions that are curable by free radical redox reactions are disclosed. Free radical curing reactions between polythiols and polyalkyenyls are initiated by the reaction of metal complexes and organic peroxides. The compositions are useful as sealants.

21 Claims, 14 Drawing Sheets

(51) Int. Cl.
  *C08G 75/0222* (2016.01)
  *C08G 75/0231* (2016.01)
  *C08G 75/025* (2016.01)
  *C08J 7/18* (2006.01)
  *C08K 5/00* (2006.01)
  *C08K 5/14* (2006.01)
  *C08K 5/17* (2006.01)

(52) U.S. Cl.
  CPC ..... *C08G 75/0222* (2013.01); *C08G 75/0231* (2013.01); *C08J 7/18* (2013.01); *C08K 5/0091* (2013.01); *C08K 5/14* (2013.01); *C08K 5/17* (2013.01); *C08G 2190/00* (2013.01)

(56) References Cited

U.S. PATENT DOCUMENTS

| | | | |
|---|---|---|---|
| 4,609,762 A | 9/1986 | Morris et al. | |
| 4,623,711 A | 11/1986 | Morris et al. | |
| 5,225,472 A | 7/1993 | Cameron et al. | |
| 5,236,967 A * | 8/1993 | Ohkawa | C08F 299/022 |
| | | | 522/42 |
| 5,959,071 A * | 9/1999 | DeMoss | C08G 75/12 |
| | | | 524/92 |
| 6,172,179 B1 * | 1/2001 | Zook | C08G 75/12 |
| | | | 525/212 |
| 6,232,401 B1 | 5/2001 | Zook et al. | |
| 6,509,418 B1 | 1/2003 | Zook et al. | |
| 7,009,032 B2 | 3/2006 | Bojkova et al. | |
| 7,169,825 B2 | 1/2007 | Narayan-Sarathy et al. | |
| 7,247,596 B2 | 7/2007 | Jialanella et al. | |
| 7,390,859 B2 | 6/2008 | Sawant et al. | |
| 7,438,974 B2 | 10/2008 | Obuhowich | |
| 7,858,703 B2 | 12/2010 | Zook et al. | |
| 7,875,666 B2 | 1/2011 | Gilmore et al. | |
| 7,879,955 B2 | 2/2011 | Rao et al. | |
| 8,138,273 B2 | 3/2012 | Rao et al. | |
| 8,349,951 B2 | 1/2013 | Sawant et al. | |
| 8,414,981 B2 | 4/2013 | Iezzi et al. | |
| 8,466,220 B2 | 6/2013 | Rao et al. | |
| 8,541,513 B2 | 9/2013 | Hobbs et al. | |
| 8,729,216 B2 | 5/2014 | Hobbs et al. | |
| 8,816,023 B2 | 8/2014 | Anderson et al. | |
| 8,932,685 B2 | 1/2015 | Keledjian et al. | |
| 8,952,124 B2 | 2/2015 | Rao et al. | |
| 8,993,691 B2 | 3/2015 | Anderson et al. | |
| 9,079,833 B2 | 7/2015 | Klobes et al. | |
| 9,382,642 B2 | 7/2016 | Yarlagadda et al. | |
| 9,422,451 B2 | 8/2016 | Rao et al. | |
| 9,533,798 B2 | 1/2017 | Virnelson | |
| 9,540,540 B2 | 1/2017 | Rao et al. | |
| 9,663,619 B2 | 5/2017 | Echigoya et al. | |
| 2005/0119366 A1 | 6/2005 | Moy et al. | |
| 2007/0141267 A1 | 6/2007 | Sonnenschein et al. | |
| 2009/0012244 A1 * | 1/2009 | Rao | C09D 181/02 |
| | | | 525/452 |
| 2010/0010133 A1 | 1/2010 | Zook et al. | |
| 2011/0319559 A1 | 12/2011 | Kania et al. | |
| 2012/0322928 A1 | 12/2012 | Jansen et al. | |
| 2014/0275474 A1 * | 9/2014 | Rao | C08G 75/045 |
| | | | 558/46 |
| 2014/0378649 A1 * | 12/2014 | Cai | C08G 75/02 |
| | | | 528/375 |
| 2014/0378650 A1 * | 12/2014 | Rao | C08G 75/045 |
| | | | 528/376 |
| 2015/0086755 A1 | 3/2015 | Mihara et al. | |
| 2016/0090507 A1 | 3/2016 | Keledjian et al. | |
| 2016/0152775 A1 | 6/2016 | Tobis et al. | |
| 2016/0257819 A1 | 9/2016 | Pathak et al. | |
| 2016/0319106 A1 * | 11/2016 | Ye | C07D 277/82 |
| 2017/0021593 A1 * | 1/2017 | Kitano | B32B 25/14 |
| 2017/0114208 A1 | 4/2017 | Rao et al. | |

FOREIGN PATENT DOCUMENTS

| | | | |
|---|---|---|---|
| JP | S60106834 A | 6/1985 | |
| JP | 2013251478 A | 12/2013 | |
| JP | 2016536398 A | 11/2016 | |
| RU | 2473399 C2 | 9/2011 | |
| WO | WO-8802879 A * | 4/1988 | ............... C08F 2/50 |
| WO | 2006/073695 A1 | 7/2006 | |
| WO | 2007/044735 A2 | 4/2007 | |
| WO | 2012021781 A1 | 2/2012 | |
| WO | 2015/066135 A2 | 5/2015 | |
| WO | 2016/106352 A1 | 6/2016 | |
| WO | WO-2016106352 A1 * | 6/2016 | ............... B05D 3/02 |
| WO | 2016/168048 A1 | 10/2016 | |
| WO | 2016168048 A1 | 10/2016 | |

OTHER PUBLICATIONS

Garra et al., "Photopolymerization process of thick films and in shadow areas: a review for the access to composites," Polymer Chemistry, 2017, vol. 8, p. 7088-7101.

Kim, Y.H. et al., "Organic Synthesis Utilizing Tetrabutylammonium Peroxydisulfate," Reviews on Heteroatom Chemistry, 1999, vol. 20, p. 69-96.

Yang, Seung Gak et al., "Highly efficient epoxidation of electron-deficient olefins with tetrabutylammonium peroxydisulfate," Tetrahedron, 2007, vol. 63, Issue 24, p. 5184-5188.

International Search Report and Written Opinion for Application No. PCT/US2018/036746, dated Aug. 7, 2018, 9 pages.

International Preliminary Report on Patentability for PCT Application No. PCT/US2018/036746, dated Dec. 10, 2019, 7 pages.

* cited by examiner ions. Incomplete,
DUAL CURE SEALANTS

This application is a national phase entry under 35 U.S.C. § 371 of PCT International Application No. PCT/US2018/036746 filed on Jun. 8, 2018, which claims the benefit under 35 U.S.C. § 119(e) of U.S. Provisional Application No. 62/517,648 filed on Jun. 9, 2017, each of which is incorporated by reference in its entirety.

FIELD

The disclosure relates to compositions that are curable by free radical redox reactions are disclosed. Free radical curing reactions between polythiols and polyalkenyls are initiated by the reaction of metal complexes and organic peroxides. The compositions are useful as sealants.

BACKGROUND

Sealants that are curable using ultraviolet (UV) radiation are useful in in a number of applications. UV-curable coatings and sealants can be stored as a single component and can have an extended application time. Although able to provide highly reliable seals in certain applications the thickness or geometry of a seal can prevent the ultraviolet light needed to initiate the free-radical curing reaction from reaching all portions of the applied sealant. Incomplete, insufficient, and/or inhomogeneous exposure to the ultraviolet light can result in a sealant that is not completely cured or that will only cure after an unacceptably long period of time. Furthermore, in some seals it is not possible to fully irradiate the uncured sealant.

Dual cure systems that combine a UV-initiated free radical curing reaction and a redox initiated free radical reaction can be combined to provide a sealant that will at least partially cure following exposure to UV radiation and subsequently continue to cure through a redox-initiated free radical reaction. Such combined dual-cure sealants are disclosed, for example, in PCT International Application No. WO 2016/106352, which discloses free radical reactions initiated by UV radiation and by a peroxide-amine redox reaction.

Alternative dual cure and dark cure sealants that at least partially cure upon exposure to UV radiation and continue to cure over an extended period of time are desired.

SUMMARY

According to the present invention, compositions comprise a polythiol, wherein the polythiol comprises a thiol-terminated prepolymer; a polyalkenyl, wherein the polyalkenyl comprises an alkenyl-terminated prepolymer, a polyalkenyl monomer, or a combination thereof, a metal complex; and an organic peroxide.

According to the present invention, cured sealants are prepared from a composition according to the present invention.

According to the present invention, parts are sealed with a cured sealant according to the present invention.

According to the present invention, vehicles comprise a cured sealant according to the present invention.

According to the present invention, aerospace vehicles comprise a cured sealant according to the present invention.

According to the present invention, methods of sealing a part comprise applying the composition according to the present invention to a part; and allowing the applied composition to cure, to seal the part.

According to the present invention, sealant systems comprise a first part, wherein the first part comprises a polyalkenyl; and a second part, wherein the second part comprises a polythiol; wherein the first part comprises a metal complex and the second part comprises an organic peroxide; or wherein the first part comprises an organic peroxide and the second part comprises a metal complex.

According to the present invention, sealants are prepared from a sealant system according to the present invention, wherein the first part and the second part are combined.

According to the present invention, parts are sealed with a sealant system according to the present invention.

According to the present invention, vehicles comprise a cured sealant according to the present invention.

According to the present invention, aerospace vehicles comprise a cured sealant according to the present invention.

According to the present invention, methods of sealing a part, comprise combining the first part and the second part of the sealant system according to the present invention to provide a sealant; applying the sealant to a part; and allowing the applied sealant to cure, to seal the part.

BRIEF DESCRIPTION OF THE DRAWINGS

The drawings described herein are for illustration purposes only. The drawings are not intended to limit the scope of the present disclosure.

DETAILED DESCRIPTION

Figure 1:
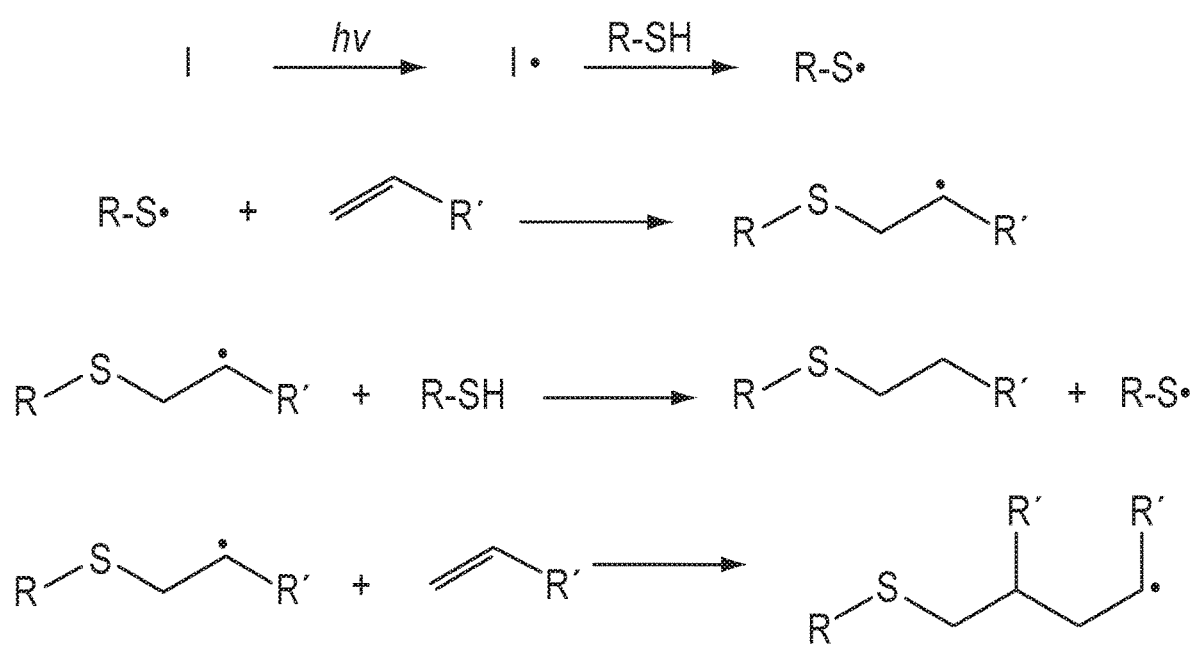
FIG. 1 shows a reaction scheme for a UV-initiated free radical reaction between a thiol and a alkenyl.

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

A dash ("-") that is not between two letters or symbols is used to indicate a point of bonding for a substituent or between two atoms. For example, —CONH$_2$ is attached through the carbon atom.

"Alkanediyl" refers to a diradical of a saturated or unsaturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—CH$_2$—), ethane-1,2-diyl (—CH$_2$CH$_2$—), propane-1,3-diyl and iso-propane-1,2-diyl (e.g., —CH$_2$CH$_2$CH$_2$— and —CH(CH$_3$)CH$_2$—), butane-1,4-diyl (—CH$_2$CH$_2$CH$_2$CH$_2$—), pentane-1,5-diyl (—CH$_2$CH$_2$CH$_2$CH$_2$CH$_2$—), hexane-1,6-diyl (—CH$_2$CH$_2$CH$_2$CH$_2$CH$_2$CH$_2$—), heptane-1,7-diyl, octane-1,8-diyl, nonane-1,9-diyl, decane-1,10-diyl, and dodecane-1,12-diyl. Alkanediyl groups can include single, double, and/or triple bonds between carbon atoms.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl. Each alkyl and/or alkanediyl group(s) can be $C_{1-6}$, $C_{1-4}$, $C_{1-3}$, methyl, methanediyl, ethyl, or ethane-1,2-diyl. An alkanecycloalkane group can be $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, or $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. Each aryl and/or arenediyl group(s) can be $C_{6-12}$, $C_{6-10}$, phenyl or benzenediyl. Each alkyl and/or alkanediyl group(s) can be $C_{1-6}$, $C_{1-4}$, $C_{1-3}$, methyl, methanediyl, ethyl, or ethane-1,2-diyl. An alkanearene group can be $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, or $C_{6-9}$ alkanearene. Examples of alkanearene groups include diphenyl methane.

"Alkanearenediyl" refers to a diradical of an alkanearene group. An alkanearenediyl group is $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, or $C_{6-9}$ alkanearenediyl. Examples of alkanearenediyl groups include diphenyl methane-4,4'-diyl.

"Alkenyl" group refers to the structure —CR=C(R)$_2$ where the alkenyl group is a terminal group and is bonded to a larger molecule. In such embodiments, each R may independently comprise, for example, hydrogen and $C_{1-3}$ alkyl. Each R can be hydrogen and an alkenyl group can have the structure —CH=CH$_2$.

"Alkoxy" refers to a —OR group where R is alkyl as defined herein. Examples of alkoxy groups include methoxy, ethoxy, n-propoxy, isopropoxy, and n-butoxy. An alkoxy group can be $C_{1-8}$ alkoxy, $C_{1-6}$ alkoxy, $C_{1-4}$ alkoxy, or $C_{1-3}$ alkoxy.

"Alkyl" refers to a monoradical of a saturated or unsaturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl. An alkyl group is $C_{1-6}$ alkyl, $C_{1-4}$ alkyl, and $C_{1-3}$ alkyl.

"Arenediyl" refers to diradical monocyclic or polycyclic aromatic group. Examples of arenediyl groups include benzene-diyl and naphthalene-diyl. An arenediyl group can be $C_{6-12}$ arenediyl, $C_{6-10}$ arenediyl, $C_{6-9}$ arenediyl, or benzene-diyl.

"Cycloalkanediyl" refers to a diradical saturated monocyclic or polycyclic hydrocarbon group. A cycloalkanediyl group can be $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl and cyclohexane-1,2-diyl.

"Cycloalkyl" refers to a saturated monocyclic or polycyclic hydrocarbon mono-radical group. A cycloalkyl group can be $C_{3-12}$ cycloalkyl, $C_{3-8}$ cycloalkyl, $C_{3-6}$ cycloalkyl, or $C_{5-6}$ cycloalkyl.

"Heteroalkanediyl" refers to an alkanediyl group in which one or more of the carbon atoms are replaced with a heteroatom, such as N, O, S, or P. In a heteroalkanediyl, the one or more heteroatoms can comprise N or O.

"Heterocycloalkanediyl" refers to a cycloalkanediyl group in which one or more of the carbon atoms are replaced with a heteroatom, such as N, O, S, or P. In a heterocycloalkanediyl, the one or more heteroatoms can comprise N or O.

"Heteroarenediyl" refers to an arenediyl group in which one or more of the carbon atoms are replaced with a heteroatom, such as N, O, S, or P. In a heteroarenediyl, the one or more heteroatoms can comprise N or O.

A "polyalkenyl" refers to a compound having at least two alkenyl groups. The at least two alkenyl groups can be terminal alkenyl groups and such polyalkenyls can be referred to as alkenyl-terminated compounds. Alkenyl groups can also be pendent alkenyl groups. A polyalkenyl can be a dialkenyl, having two alkenyl groups. A polyalkenyl can have more than two alkenyl groups such as from three to six alkenyl groups. A polyalkenyl can comprise a single type of polyalkenyl, can be a combination of polyalkenyls having the same alkenyl functionality, or can be a combination of polyalkenyls having different alkenyl functionalities.

A "polyalkenyl prepolymer" refers to a polyalkenyl having at least one repeat unit in the polyalkenyl backbone. A polyalkenyl prepolymer generally has a molecular weight in the range from 500 Daltons to 6,000 Daltons, such as from 500 Daltons to 4,000 Daltons or from 500 Daltons to 2,000 Daltons.

A "monomeric polyalkenyl" refers to a polyalkenyl that does not include repeat units in the polyalkenyl backbone. A monomeric polyalkenyl generally has a molecular weight that is less than that of a polyalkenyl prepolymer. Monomeric polyalkenyls can be difunctional or have an alkenyl functionality greater than two.

"Formed from" or "prepared from" denotes open, e.g., comprising, claim language. As such, it is intended that a composition "formed from" or "prepared from" a list of recited components be a composition comprising at least the recited components or the reaction product of at least the recited components, and can further comprise other, non-recited components used to form or prepare the composition.

"Reaction product of" means a chemical reaction product(s) of at least the recited reactants, and can include partial reaction products as well as fully reacted products and other reaction products that are present in a lesser amount. For example, a "prepolymer comprising the reaction product of reactants" refers to a prepolymer or combination of prepolymers that are the reaction product of at least the recited reactants. The reactants can further comprise additional reactants.

A compound having a thiol functionality or an alkenyl functionality refers to a compound which has reactive thiol or alkenyl groups, respectively. The reactive thiol or alkenyl groups may be terminal groups bonded to the ends of the molecule, may be bonded to the backbone of the molecule, or the compound may contain thiol or alkenyl groups that are terminal groups or are bonded to the backbone.

As used herein, the term "cure" or "cured" as used in connection with a composition, e.g., "composition when cured" or a "cured composition", means that any curable or crosslinkable components of the composition are at least partially reacted or crosslinked.

The term "equivalent" refers to the number of functional reactive groups of the substance. "Equivalent weight" is effectively equal to the molecular weight of a substance, divided by the valence or number of functional reactive groups of the substance.

A "backbone" of a prepolymer refers to the segment between the reactive terminal groups. A prepolymer backbone typically includes repeating subunits. For example, the backbone of a polythiol HS—[R]$_n$—SH is —[R]$_n$—.

A "core" of a polyfunctionalizing agent B(-V)$_z$ refers to the moiety B.

A "core" of a compound or a polymer refers to the segment between the reactive terminal groups. For example, the core of a polythiol HS—R—SH will be —R—. A core of a compound or prepolymer can also be referred to as a backbone of a compound or a backbone of a prepolymer. A core of a polyfunctionalizing agent can be an atom or a structure such as a cycloalkane, a substituted cycloalkane, heterocycloalkane, substituted heterocycloalkane, arene, substituted arene, heteroarene, or substituted heteroarene from which moieties having a reactive functional are bonded.

"Core of a diisocyanate" refers to the moiety forming the diisocyanate without the isocyanate groups. For example, the core of a diisocyanate having the structure O═C═N—R$^4$—N═C═O is represented by —R$^4$—. For example, a core of the aliphatic diisocyanate 4,4'-methylene dicyclohexyl diisocyanate has the structure:

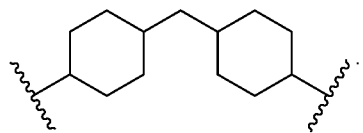 [SMILES: *C1CCC(CC2CCC(*)CC2)CC1]

"Prepolymer" refers to oligomers, homopolymers, and copolymers. For thiol-terminated prepolymers, molecular weights are number average molecular weights "Mn" as determined by end group analysis using iodine titration. For prepolymers that are not thiol-terminated, the number average molecular weights are determined by gel permeation chromatography using polystyrene standards. A prepolymer comprises reactive groups capable of reacting with another compound such as a curing agent or crosslinker to form a cured polymer. A prepolymer such as a chain-extended polythioether prepolymer provided by the present disclosure can be combined with a curing agent to provide a curable composition, which can cure to provide a cured polymer network. Prepolymers are liquid at room temperature (21° C. to 25° C.) and pressure (760 torr; 101 kPa).

A prepolymer includes multiple repeating subunits bonded to each other than can be the same or different. The multiple repeating subunits make up the backbone of the prepolymer.

A "curable composition" refers to a composition that comprises at least two reactants capable of reacting to form a cured composition. For example, a curable composition can comprise a isocyanate-terminated chain-extended polythioether prepolymer and a polyamine capable of reacting to form a cured polymer. A curable composition may include a catalyst for the curing reaction and other components such as, for example, fillers, pigments, and adhesion promoters. A curable composition may be curable at room temperature, or may require exposure to elevated temperature such as a temperature above room temperature or other condition(s) to initiate and/or to accelerate the curing reaction. A curable composition may initially be provided as a two-part composition including, for example, a separate base component and an accelerator component. The base composition can contain one of the reactants participating in the curing reaction such as an isocyanate-terminated chain-extended polythioether prepolymer and the accelerator component can contain the other reactant such as a polyamine. The two components can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise (0.1 Pa-sec to 50 Pa-sec). A Class B sealant composition, which is suitable for fillet seal applications, can be characterized by a viscosity from 4,500 poise to 20,000 poise (450 Pa-sec to 2,000 Pa-sec). A Class C sealant composition, which is suitable for fay seal applications, can be characterized by a viscosity from 500 poise to 4,500 poise (50 Pa-sec to 450 Pa-sec). The viscosity of the compositions is measured as described herein. After the two components of a sealant system are combined and mixed, the curing reaction can proceed and the viscosity of the curable composition can increase and at some point, will no longer be workable, as described herein. The duration between when the two components are mixed to form the curable composition and when the curable composition can no longer be reasonably or practically applied to a surface for its intended purpose can be referred to as the working time. As can be appreciated, the working time can depend on a number of factors including, for example, the curing chemistry, the catalyst used, the application method, and the temperature. Once a curable composition is applied to a surface (and during application), the curing reaction can proceed to provide a cured composition. A cured composition develops a tack-free surface, cures, and then fully cures over a period of time. A curable composition can be considered to be cured when the hardness of the surface is at least 30 Shore A for a Class B sealant or a Class C sealant. After a sealant has cured to a hardness of 30 Shore A it can take from several days to several weeks for a curable composition fully cure. A composition is considered fully cured when the hardness no longer increases. Depending on the formulation, a fully cured sealant can exhibit, for example, a hardness from 40 Shore A to 70 Shore A, determined according to ISO 868. For coating applications, a curable composition can have a viscosity, for example, from 200 cps to 800 cps 0.2 Pa-sec to 0.8 Pa-sec). For sprayable coating and sealant compositions, a curable composition can have a viscosity, for example, from 15 cps to 100 cps (0.015 Pa-sec to 0.1 Pa-sec), such as from 20 cps to 80 cps (0.02 Pa-sec to 0.0.8 Pa-sec).

"Substituted" refers to a group in which one or more hydrogen atoms are each independently replaced with the same or different substituent(s). A substituent can comprises halogen, —S(O)$_2$OH, —S(O)$_2$, —SH, —SR where R is C$_{1-6}$ alkyl, —COOH, —NO$_2$, —NR$_2$ where each R independently comprises hydrogen and C$_{1-3}$ alkyl, —CN, =O, C$_{1-6}$ alkyl, —CF$_3$, —OH, phenyl, C$_{2-6}$ heteroalkyl, C$_{5-6}$ heteroaryl, C$_{1-6}$ alkoxy, or —COR where R is C$_{1-6}$ alkyl. A substituent can be —OH, —NH$_2$, or C$_{1-3}$ alkyl.

"Derived from" as in "a moiety derived from a compound" refers to a moiety that is generated upon reaction of a parent compound with a reactant. For example, a bis (alkenyl) compound CH$_2$=CH—R—CH=CH$_2$ can react with another compound such as two compounds having thiol groups to produce the moiety —(CH$_2$)$_2$—R—(CH$_2$)$_2$— derived from the reaction of the alkenyl groups with the thiol groups. For example, for a parent diisocyanate having the structure O=C=N—R—N=C=O, a moiety derived from the diisocyanate has the structure —C(O)—NH—R—NH—C(O)—. As another example, for a parent non-linear short chain diol having the structure HO—R—OH, a moiety derived from the non-linear short-chain diol has the structure —O—R—O—.

"Derived from the reaction of -V with a thiol" refers to a moiety -V$^1$- that results from the reaction of a thiol group with a moiety comprising a terminal group reactive with a thiol group. For example, a group V- can comprise CH$_2$=CH—CH$_2$—O—, where the terminal alkenyl group CH$_2$=CH— is reactive with a thiol group —SH. Upon reaction with a thiol group, the moiety -V$^1$- is —CH$_2$—CH$_2$—CH$_2$—O—.

"Dark cure" refers to curing mechanisms that do not require exposure to actinic radiation such as UV radiation to initiate the reaction. Actinic radiation may be applied to a dark cure system to accelerate curing of all or a part of a composition, but exposing the composition to actinic radiation is not necessary to cure the sample. A dark cure composition can fully cure under dark conditions without exposure to actinic radiation.

Glass transition temperature T$_g$ is determined by dynamic mechanical analysis (DMA) using a TA Instruments Q800 apparatus with a frequency of 1 Hz, an amplitude of 20 microns, and a temperature ramp of −80° C. to 25° C., with the T$_g$ identified as the peak of the tan δ curve.

When reference is made to a chemical group defined, for example, by a number of carbon atoms, the chemical group is intended to include all sub-ranges of carbon atoms as well as a specific number of carbon atoms. For example, a C$_{2-10}$ alkanediyl includes a C$_{2-4}$ alkanediyl, C$_{5-7}$ alkanediyl, and other sub-ranges, a C$_2$ alkanediyl, a C$_6$ alkanediyl, and alkanediyls having other specific number(s) of carbon atoms from 2 to 10.

A polyfunctionalizing agent can have the structure of Formula (1):

$$B^1(\text{-V})_z \quad (1)$$

where B$^1$ is the core of the polyfunctionalizing agent, each V is a moiety terminated in a reactive functional group such as a thiol group, an alkenyl group, an epoxy group, an isocyanate group, or a Michael acceptor group, and z is an integer from 3 to 6, such as 3, 4, 5, or 6. In polyfunctionalizing agents of Formula (1), each -V can have the structure, for example, —R—SH or —R—CH=CH$_2$, where R can be, for example, C$_{2-10}$ alkanediyl, C$_{2-10}$ heteroalkanediyl, substituted C$_{2-10}$ alkanediyl, or substituted C$_{2-10}$ heteroalkanediyl.

When the moiety V is reacted with another compound the moiety -V$^1$- results and is said to be derived from the reaction with the other compound. For example, when V is —R—CH═CH$_2$ and is reacted, for example, with a thiol group, the moiety V$^1$ is —R—CH$_2$—CH$_2$— is derived from the reaction.

In polyfunctionalizing agents of Formula (1), B$^1$ can be, for example C$_{2-8}$ alkane-triyl, C$_{2-8}$ heteroalkane-triyl, C$_{5-8}$ cycloalkane-triyl, C$_{5-8}$ heterocycloalkane-triyl, substituted C$_{5-8}$ cycloalkene-triyl, C$_{5-8}$ heterocycloalkane-triyl, C$_6$ arene-triyl, C$_{4-5}$ heteroarene-triyl, substituted C$_6$ arene-triyl, or substituted C$_{4-5}$ heteroarene-triyl.

In polyfunctionalizing agents of Formula (1), B$^1$ can be, for example, C$_{2-8}$ alkane-tetrayl, C$_{2-8}$ heteroalkane-tetrayl, C$_{5-10}$ cycloalkane-tetrayl, C$_{5-10}$ heterocycloalkane-tetrayl, C$_{6-10}$ arene-tetrayl, C$_4$ heteroarene-tetrayl, substituted C$_{2-8}$ alkane-tetrayl, substituted C$_{2-8}$ heteroalkane-tetrayl, substituted C$_{5-10}$ cycloalkane-tetrayl, substituted C$_{5-10}$ heterocycloalkane-tetrayl, substituted C$_{6-10}$ arene-tetrayl, and substituted C$_{4-10}$ heteroarene-tetrayl.

Examples of suitable alkenyl-terminated polyfunctionalizing agents include triallyl cyanurate (TAC), triallylisocyanurate (TAIC), 1,3,5-triallyl-1,3,5-triazinane-2,4,6-trione, 1,3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, and combinations of any of the foregoing.

A polyfunctionalizing agent of Formula (1) can be thiol terminated.

Examples of suitable trifunctional thiol-terminated polyfunctionalizing agents include, for example, 1,2,3-propanetrithiol, 1,2,3-benzenetrithiol, 1,1,1-butanetrithiol, heptane-1,3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations of polyfunctionalizing agents may also be used.

Examples of suitable polythiol polyfunctionalizing agents include pentaerythritol tetra(3-mercapto-propionate) (PETMP), trimethylol-propane tri(3-mercaptopropionate) (TMPMP), glycol di(3-mercaptopropionate) (GDMP), tris[2-(3-mercapto-propionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

Examples of suitable mercapto-acetate polythiol polyfunctionalizing agents include pentaerythritol tetramercaptoacetate (PRTMA), trimethylolpropane trimercaptoacetate (TMPMA), glycol dimercaptoacetate (GDMA), ethyleneglycol dimercaptoacetate, di-trimethylolpropane tetramercaptoacetate, and combinations of any of the foregoing.

Examples of suitable polythiol polyfunctionalizing agents include pentaerythritol tetra-acrylate, tris[2-(3-mercaptopropionyloxy)ethyl]isocyanurate, 2,3-di(2-mercaptoethylthio)-1-propane-thiol, dimercaptodiethylsulfide (2,2'-thiodiethanethiol), dimercaptodioxaoctane (2,2'-(ethylenedioxy) diethanethiol, 1,8-dimercapto-3,6-dioxaoctane, and combinations of any of the foregoing.

Other examples of polythiol polyfunctionalizing agents and polythiol monomers include pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra(3-mercaptopropionate), ditrimethylolpropane tetramercaptoacetate, and also alkoxylated, for example, ethoxylated and/or propoxylated, such as ethoxylated, products of these compounds. Examples include, pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra (3-mercaptopropionate), ditrimethylolpropane tetramercaptoacetate, particularly pentaerythritol tetra(3-mercaptopropionate) (PETMP), pentaerythritol tetramercaptoacetate (PETMA), dipentaerythritol hexa(3-mercaptopropionate), dipentaerythritol hexamercaptoacetate, ditrimethylolpropane tetra(3-mercaptopropionate), and ditrimethylolpropane tetramercaptoacetate.

Suitable polythiol polyfunctionalizing agents are commercially available, for example, from Bruno Bock Thiochemicals under the Thiocure® tradename.

"Derived from a polyfunctionalizing agent" refers to a moiety that results from the reaction of a polyfunctionalizing agent with a reactive functional group. For example, a moiety derived from the polyfunctionalizing agent triallyl cyanurate:

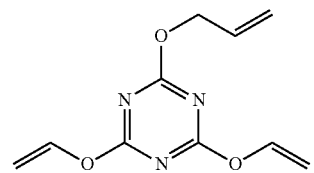 [SMILES: C=CCOc1nc(OC=C)nc(OC=C)n1]

results in a moiety having the structure:

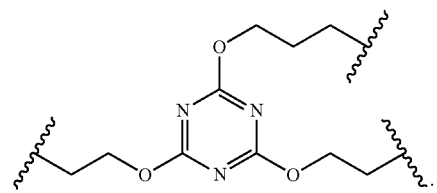 [SMILES: *CCCOc1nc(OCC*)nc(OCC*)n1]

where the segments are bonded to the other reactants.

"Polyol polyfunctionalizing agent" refers to a polyol having, for example, from 3 to 6 terminal hydroxyl groups. A polyol polyfunctionalizing agent can have a molecular weight, for example, less than 1,400 Daltons, less than 1,200 Daltons, less than 1,000 Daltons, less than 800 Daltons, less than 700 Daltons, less than 600 Daltons, less than 500 Daltons, less than 400 Daltons, less than 300 Daltons, less than 200 Daltons, or less than 100 Daltons. Polyol polyfunctionalizing agents can be represented by the formula B$^4$(-V)$_z$, where B$^4$ represents a core of a z-valent polyfunctionalizing agent B$^4$(-V)$_z$, z is an integer from 3 to 6; and each -V is a moiety comprising a terminal hydroxyl (—OH) group.

"Polythiol polyfunctionalizing agent" refers to a polythiol having, for example, from 3 to 6 terminal thiol groups. A polythiol polyfunctionalizing agent can have a molecular weight, for example, less than 1,400 Daltons, less than 1,200 Daltons, less than 1,000 Daltons, less than 800 Daltons, less than 700 Daltons, less than 600 Daltons, less than 500 Daltons, less than 400 Daltons, less than 300 Daltons, less than 200 Daltons, or less than 100 Daltons. Polythiol polyfunctionalizing agents can be represented by the formula $B^4(-V)_z$, where $B^4$ represents a core of a z-valent polyfunctionalizing agent $B^4(-V)_z$, z is an integer from 3 to 6; and each -V is a moiety comprising a terminal thiol (—SH) group.

A polythiol or a polyalkenyl can be a polythiol polyfunctionalizing agent or a polyalkenyl polyfunctionalizing agent, respectively.

"Composition" is intended to encompass a product comprising the specified components in the specified amounts, as well as any product which results, directly or indirectly, from the combination of the specified ingredients in the specified amounts.

"Molecular weight" refers to a theoretical molecular weight estimated from the chemical structure of a compound such as a monomeric compound, or a number average molecular weight as appropriate for a prepolymer determined, for example, using gel permeation chromatography using polystyrene standards.

"Application time" refers to the duration during which a curable composition can be applied to a surface. The application time can be for example, at least 2 hours, at least 4 hours, at least 6 hours, at least 12 hours, at least 16 hours, at least 20 hours, or at least 24 hours. The application time can depend on the method of application such as, for example, by extrusion, rolling, brushing, or spreading. The application time of a curable composition can be determined by measuring the extrusion rate of a composition as described in the Examples. For example, the application time of a curable composition provided by the present disclosure can be defined as the duration until the curable composition exhibits an extrusion rate, as determined by extrusion through a No. 440 nozzle (Semco, 0.125-inch internal diameter and 4-inch length, available from PPG Aerospace) at a pressure of 90 psi (620 KPa) is greater than 15 g/min, greater than 30 g/min, or greater than 50 g/min. An appropriate application time can depend, for example, on the specific application method, temperature, humidity, thickness, surface area. and volume.

"Tack free time" refers to the duration from the time when co-reactive components are first combined and mixed to form a curable sealant until a coating prepared from the curable sealant exhibits is tack free as determined by applying a polyethylene sheet to the surface of the sealant with hand pressure and observing whether sealant adheres to the surface of the polyethylene sheet.

"Full cure" refers to the duration from the time when co-reactive components are first combined and mixed to form a curable sealant until a coating prepared from the curable sealant exhibits a hardness of at least Shore 40A at 25° C. and 50% RH. A time to full cure can be, for example, from 1 week to 2 weeks, from 1 week to 6 weeks, from 2 weeks to 5 weeks, or from 3 weeks to 5 weeks.

"Cure time" refers to the duration from the time when the co-reactive components are first combined and mixed to form a curable sealant until a coating prepared from the curable sealant exhibits a hardness of Shore 30A at conditions of 25° C. and 50% RH.

Specific gravity is determined according to ASTM D 1475.

Shore A hardness is measured using a Type A durometer in accordance with ASTM D2240.

Tensile strength and elongation are measured according to AMS 3279.

Reference is now made to certain compounds, compositions, and methods of the present invention. The disclosed compounds, compositions, and methods are not intended to be limiting of the claims. To the contrary, the claims are intended to cover all alternatives, modifications, and equivalents.

Combinations of metal complexes and organic peroxides can be used as free radical catalysts for curing compositions such as sealants. Combinations of metal complexes and organic peroxides can also impart useful dual cure properties to radiation curable sealants such as UV curable sealants. The cure dynamics can depend on the combination of metal complexes and organic peroxides. Using different solvent mixtures to disperse the metal complexes it is also possible to control the gel time of the sealant and control the time to fully cure the sealant under dark conditions. Physical properties and adhesion of sealants cured using a dark cure redox radial initiated reaction are comparable to those of sealants cured using actinic radiation only (in the absence of the dark cure catalyst system) such as UV-radiation. Such dual cure sealants have several advantages. For example, the surface of a sealant can be rapidly cured by exposure to the radiation enabling the part to be manipulated and handled while the unexposed portion of the sealant fully cures. Using a dual cure mechanism the surface of a sealant can be rapidly cured without exposing the full depth of the sealant to the radiation and thereafter the unexposed sealant can fully cure. Also, in geometries and configurations where it is not possible to directly expose a curable sealant to radiation, a portion of the sealant can be exposed to the radiation thereby initiating dark cure redox curing mechanisms that can propagate through unexposed areas of the sealant. Dual cure mechanisms can further provide opportunities to control the cure rate of a sealant, which can lead to improved properties such as improved tensile strength, % elongation, solvent resistance, and adhesion.

As illustrated in FIG. 1, unmodified UV-curable compositions based on thiol-ene chemistry react by generation of free radicals when exposed to actinic radiation such as UV radiation in the presence of a photoinitiator (I). An unmodified UV-curable composition refers to a UV-curable composition that does not include a metal complex/organic peroxide free radical initiator. The free radical generated by the photoinitiator abstracts a hydrogen from a thiol group creating a thienyl radical that can add to an alkylene group, creating a sulfur-carbon bond and a 3-carbon radical, which initiates chain propagation.

Figure 2:
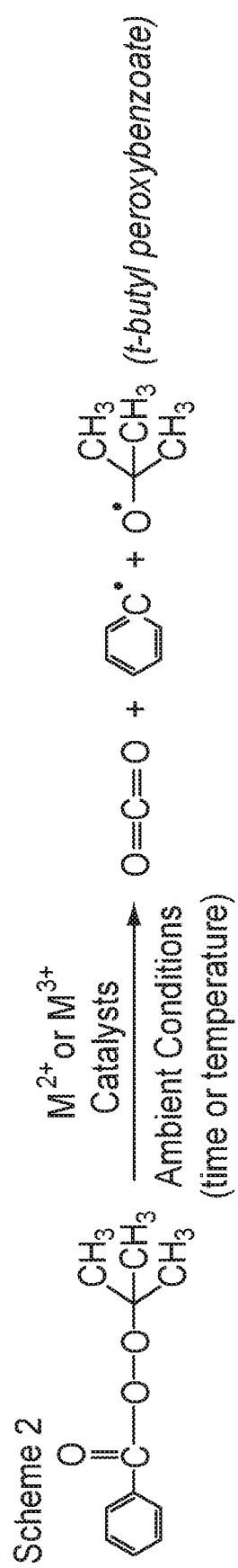
FIG. 2 shows a reaction scheme for the generation of free radicals using the reaction between an organic peroxide and a metal complex.

In dark cure mode, i.e., when actinic radiation such as UV radiation is not used to generate free radicals, the disclosure provides an alternate radical initiation mechanism that takes place in absence of actinic radiation. In the disclosed dark cure mechanism, the thiol-ene polymerization proceeds through a controlled generation of free radicals using a combination of an organic peroxide and a metal complex in the absence of actinic radiation. FIG. 2 illustrates the decomposition of an organic peroxide, tert-butyl peroxybenzoate, in the presence of a metal complex to generate free radicals.

After the free radicals are generated as shown in FIG. 2, the polymerization of the polythiol and polyalkenyl components can continue in the manner as shown in FIG. 1. The use of organic peroxides and metal complexes as dark cure free radical catalysts can provide cured compositions with properties similar to those of UV-cured compositions (without a dark cure catalyst).

Compositions provided by the present disclosure comprise a polythiol, a polyalkenyl, a metal complex, and an organic peroxide. Compositions provided by the present disclosure comprise a thiol-terminated sulfur-containing prepolymer, a polyalkenyl, a metal complex, and an organic peroxide.

Compositions and sealant formulations provided by the present disclosure can comprise a thiol-terminated sulfur-containing prepolymer such as a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing. A sulfur-containing prepolymer refers to a prepolymer that has one or more thioether —S— and/or sulfide —S—S— groups in the backbone of the prepolymer. Prepolymers that contain only thiol or other sulfur-containing groups, either as terminal groups or as pendent groups of the prepolymer backbone are not encompassed by sulfur-containing prepolymers. Thus, a prepolymer having the structure HS—R—R(—CH$_2$—SH)—R—(CH$_2$)$_2$—S(O)$_2$—(CH$_2$)$_2$—S(O)$_2$—CH═CH$_2$ where each R is a moiety that does not contain a sulfur atom, is not encompassed by a sulfur-containing prepolymer; however, the prepolymer comprises two terminal thiol groups A prepolymer having the structure HS—R—R(—CH$_2$—SH)—R—(CH$_2$)$_2$—S(O)$_2$—(CH$_2$)$_2$—S(O)$_2$—CH═CH$_2$ where at least one R is a moiety that contains a sulfur atom, such as a thioether or sulfide group, is encompassed by a sulfur-containing prepolymer. The prepolymer described in the preceding paragraph comprises a terminal thiol group and at least one sulfur atom in the prepolymer backbone. In sulfur-containing prepolymers provided by the present disclosure the sulfur content of the prepolymer backbone (and not including terminal thiol groups) can be, for example, from 0.1 wt % to 20 wt %, from 0.1 wt % to 10 wt %, form 0.1 wt % to 5 wt %, or from 0.1 wt % to 2 wt %, where wt % refers to the total weight of the sulfur-containing prepolymer.

A thiol-terminated sulfur-containing prepolymer can comprise a thiol-terminated polythioether or a thiol-terminated sulfur-containing prepolymer can comprise a thiol-terminated polysulfide prepolymer. A thiol-terminated sulfur-containing prepolymer may comprise a combination of different thiol-terminated polythioether prepolymers and/or thiol-terminated polysulfide prepolymers, and the thiol-terminated polythioether prepolymers and/or thiol-terminated polysulfide prepolymers may have the same or different functionality. A thiol-terminated sulfur-containing prepolymer can have an average thiol functionality from 2 to 6, from 2 to 4, from 2 to 3, from 2.3 to 2.8, or from 2.05 to 2.5. For example, a thiol-terminated sulfur-containing prepolymer can comprise a difunctional thiol-terminated sulfur-containing prepolymer, a trifunctional thiol-terminated sulfur-containing prepolymer, or a combination thereof. A sulfur-containing prepolymer can comprise a thiol-terminated sulfur-containing polyformal prepolymer. A sulfur-containing prepolymer can comprise a thiol-terminated monosulfide prepolymer.

Compositions and sealants provided by the present disclosure can comprise, for example, from 30 wt % to 70 wt %, from 40 wt % to 60 wt %, from 43 wt % to 57 wt %, from 46 wt % to 54 wt %, or from 48 wt % to 52 wt % of a thiol-terminated sulfur-containing prepolymer or combination of thiol-terminated sulfur-containing prepolymers, such as a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing, where wt % is based on the total weight of the curable composition.

A sulfur-containing prepolymer can comprise a thiol-terminated polythioether prepolymer. Examples of suitable thiol-terminated polythioether prepolymers are disclosed, for example, in U.S. Pat. No. 6,172,179, which is incorporated by reference in its entirety. A thiol-terminated polythioether prepolymer can comprise Permapol® P3.1E, Permapol® P3.1E-2.8, Permapol® L56086, or a combination of any of the foregoing, each of which is available from PRC-DeSoto International Inc. Permapol® P3.1E, Permapol® P3.1E-2.8, Permapol® L56086 are encompassed by the disclosure of U.S. Pat. No. 6,172,179.

A thiol-terminated polythioether prepolymer can comprise a thiol-terminated polythioether prepolymer comprising at least one moiety having the structure of Formula (2):

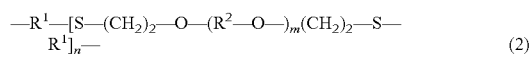

(2)

where,
each R$^1$ can be independently selected from a C$_{2-10}$ n-alkanediyl group, a C$_{3-6}$ branched alkanediyl group, a C$_{6-8}$ cycloalkanediyl group, a C$_{6-10}$ alkanecycloalkanediyl group, a divalent heterocyclic group, and a —[(CHR$^3$)$_p$—X—]$_q$(CHR$^3$)$_r$— group, wherein each R$^3$ comprises hydrogen or methyl;
each R$^2$ can be independently selected from a C$_{2-10}$ n-alkanediyl group, a C$_{3-6}$ branched alkanediyl group, a C$_{6-8}$ cycloalkanediyl group, a C$_{6-14}$ alkanecycloalkanediyl group, a divalent heterocyclic group, and a —[(CH$_2$)$_p$—X—]$_q$(CH$_2$)$_r$— group;
each X can independently be selected from O, S, S—S, and NR, wherein R can be selected from hydrogen and methyl;
m ranges from 0 to 50;
n is an integer ranging from 1 to 60;
p is an integer ranging from 2 to 6;
q is an integer ranging from 1 to 5; and
r is an integer ranging from 2 to 10.

In moieties of Formula (2), R$^1$ can be —[(CHR$^3$)$_p$—X—]$_q$(CHR$^3$)$_r$—, wherein each X can independently be selected from O and S. In moieties of Formula (2), R$^1$ can be —[(CHR$^3$)$_p$—X—]$_q$(CHR$^3$)$_r$—, each X can be O or each X can be S.

In moieties of Formula (2), R$^1$ can be —[(CH$_2$)$_p$—X—]$_q$(CH$_2$)$_r$—, wherein each X can independently be selected from O and S. In moieties of Formula (2), R$^1$ can be —[(CH$_2$)$_p$—X—]$_q$(CH$_2$)$_r$—, each X can be O or each X can be S.

In moieties of Formula (2), R$^1$ can be —[(CH$_2$)$_p$—X—]$_q$(CH$_2$)$_r$—, where p can be 2, X can be O, q can be 2, r can be 2, R$^2$ can be ethanediyl, m can be 2, and n can be 9.

In moieties of Formula (2), each R$^1$ can be derived from 1,8-dimercapto-3,6-dioxaoctane (DMDO), each R$^1$ can be derived from dimercaptodiethylsulfide (DMDS), or a combination thereof.

In moieties of Formula (2), each m can independently be an integer from 1 to 3. Each m can be the same and can be 1, 2, or 3.

In moieties of Formula (2), n can be an integer from 1 to 30, an integer from 1 to 20, an integer from 1 to 10, or an integer from 1 to 5. In addition, n may be any integer from 1 to 60.

In moieties of Formula (2), each p can independently be 2, 3, 4, 5, and 6. Each p can be the same and can be 2, 3, 4, 5, or 6.

In moieties of Formula (2), each q can independently be 1, 2, 3, 4, or 5. Each q can be the same and can be 1, 2, 3, 4, or 5.

In moieties of Formula (2), each r can independently be 2, 3, 4, 5, 6, 7, 8, 9, or 10.

In moieties of Formula (2), each r can be the same and can be 2, 3, 4, 5, 6, 7, 8, 9, or 10.

In moieties of Formula (2), each r can independently be an integer from 2 to 4, from 2 to 6, or from 2 to 8.

In moieties of Formula (2), each $R^2$ can independently be a $C_{2-10}$ n-alkanediyl group, a $C_{3-6}$ branched alkanediyl group, or a $-[(CH_2)_p-X-]_q(CH_2)_r-$ group.

In moieties of Formula (2), each $R^2$ can independently comprise a $C_{2-10}$ n-alkanediyl group.

In moieties of Formula (2), each $R^2$ can independently be a $-[(CH_2)_p-X-]_q(CH_2)_r-$ group, where each X can be O or S.

A thiol-terminated polythioether prepolymer can comprise a thiol-terminated polythioether prepolymer of Formula (2a), a thiol-terminated polythioether prepolymer of Formula (2b), or a combination thereof:

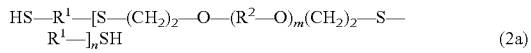

$$HS-R^1-[S-(CH_2)_2-O-(R^2-O)_m(CH_2)_2-S-R^1-]_nSH \quad (2a)$$

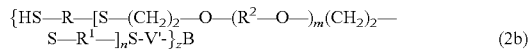

$$\{HS-R-[S-(CH_2)_2-O-(R^2-O-)_m(CH_2)_2-S-R^1-]_nS-V'-\}_zB \quad (2b)$$

wherein,
each $R^1$ can independently be selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$, wherein,
p is an integer from 2 to 6;
q is an integer from 1 to 5;
r is an integer from 2 to 10;
each $R^3$ independently be selected from hydrogen and methyl; and
each X can independently be selected from O, S, S—S, and NR, wherein R can be selected from hydrogen and methyl;
each $R^2$ can independently be selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$;
m is an integer from 0 to 50;
n is an integer from 1 to 60;
B represents a core of a z-valent, polyfunctionalizing agent $B(-V)_z$ wherein,
z is an integer from 3 to 6; and
each V is a moiety comprising a terminal group reactive with a thiol; and
each -V'- is derived from the reaction of -V with a thiol.

In prepolymers of Formula (2a) and Formula (2b), $R^1$ can be $-[(CH_2)_p-X-]_q(CH_2)_r-$, where p can be 2, X can be O, q can be 2, r can be 2, $R^2$ can be ethanediyl, m can be 2, and n can be 9.

In prepolymers of Formula (2a) and Formula (2b), $R^1$ can comprise $C_{2-6}$ alkanediyl or $-[(CHR^3)_p-X-]_q(CHR^3)_r-$.

In prepolymers of Formula (2a) and Formula (2b), $R^1$ can be $-[(CHR^3)_p-X-]_q(CHR^3)_r-$, X can be O or X can be S.

In prepolymers of Formula (2a) and Formula (2b), where $R^1$ can be $-[(CHR^3)_p-X-]_q(CHR^3)_r-$, p can be 2, r can be 2, q can be 1, and X can be S; or wherein p can be 2, q can be 2, r can be 2, and X can be O; or p can be 2, r can be 2, q can be 1, and X can be O.

In prepolymers of Formula (2a) and Formula (2b), $R^1$ can be $-[(CHR^3)_p-X-]_q(CHR^3)_r-$, and each $R^3$ can be hydrogen or at least one $R^3$ can be methyl.

In prepolymers of Formula (2a) and Formula (2b), each $R^1$ can be the same, or at least one R1 can be different.

In prepolymers of Formula (2a) and Formula (2b), each m can be independently an integer from 1 to 3. Each m can be the same and is can be 1, 2, or 3.

In prepolymers of Formula (2a) and Formula (2b), n can be an integer from 1 to 30, an integer from 1 to 20, an integer from 1 to 10, or an integer from 1 to 5. The variable n may be any integer from 1 to 60.

In prepolymers of Formula (2a) and Formula (2b), each p can independently be 2, 3, 4, 5, and 6. Each p can be the same and can be 2, 3, 4, 5, or 6.

In prepolymers of Formula (2a) and Formula (2b), each q can independently be 1, 2, 3, 4, or 5. Each q can be the same and can be 1, 2, 3, 4, or 5.

In prepolymers of Formula (2a) and Formula (2b), each r can independently be 2, 3, 4, 5, 6, 7, 8, 9, or 10.

In prepolymers of Formula (2a) and Formula (2b), each r can be the same and can be 2, 3, 4, 5, 6, 7, 8, 9, or 10.

In prepolymers of Formula (2a) and Formula (2b), each r can independently be an integer from 2 to 4, from 2 to 6, or from 2 to 8.

A thiol-terminated polythioether prepolymer can comprise a moiety having the structure of Formula (2c):

$$-S-R^1-[S-A-S-R^1-]_n-S- \quad (2c)$$

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$, wherein,
p is an integer from 2 to 6;
q is an integer from 1 to 5;
r is an integer from 2 to 10;
each $R^3$ is independently selected from hydrogen and methyl; and
each X is independently selected from O, S, and NR, wherein R is selected from hydrogen and methyl; and
each A is independently a moiety derived from a polyvinyl ether of Formula (3) and a polyalkenyl polyfunctionalizing agent of Formula (4):

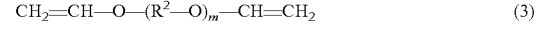

$$CH_2=CH-O-(R^2-O)_m-CH=CH_2 \quad (3)$$

$$B(-R^{70}-CH=CH_2)_z \quad (4)$$

wherein,
m is an integer from 0 to 50;
each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$;
B represents a core of a z-valent, polyalkenyl polyfunctionalizing agent $B(-R^{70}-CH=CH_2)_z$ wherein,
z is an integer from 3 to 6; and
each $R^{70}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

In moieties of Formula (2c), $R^1$ can be $C_{2-10}$ alkanediyl.

In moieties of Formula (2c), $R^1$ can be $-[(CHR^3)_p-X-]_q(CHR^3)_r-$.

In moieties of Formula (2c), X can be selected from O and S, and thus $-[(CHR^3)_p-X-]_q(CHR^3)_r-$ in Formula (2c) can be $-[(CHR^3)_p-O-]_q(CHR^3)_r-$ or $-[(CHR^3)_p-S-]_q(CHR^3)_r-$. P and r can be equal, such as where p and r can be both two.

In moieties of Formula (2c), $R^1$ can be selected from $C_{2-6}$ alkanediyl and $-[(CHR^3)_p-X-]_q(CHR^3)_r-$.

In moieties of Formula (2c), $R^1$ can be $-[(CHR^3)_p-X-]_q(CHR^3)_r-$, and X can be O, or X can be S.

In moieties of Formula (2c) where $R^1$ can be $-[(CHR^3)_p-X-]_q(CHR^3)_r-$, p can be 2, r can be 2, q can be 1, and X can be S; or p can be 2, q can be 2, r can be 2, and X can be O; or p can be 2, r can be 2, q can be 1, and X can be O.

In moieties of Formula (2c) where $R^1$ can be $-[(CHR^3)_p-X-]_q(CHR^3)_r-$, each $R^3$ can be hydrogen, or at least one $R^3$ can be methyl.

In moieties of Formula (2c), $R^1$ can be $-[(CH_2)_p-X-]_q(CH_2)_r-$ wherein each X can independently be selected from O and S. In moieties of Formula (2c), $R^1$ can be $-[(CH_2)_p-X-]_q(CH_2)_r-$ each X can be O or each X can be S.

In moieties of Formula (2c), $R^1$ can be $-[(CH_2)_p-X-]_q(CH_2)_r-$, where p can be 2, X can be O, q can be 2, r can be 2, $R^2$ can be ethanediyl, m can be 2, and n can be 9.

In moieties of Formula (2c), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis (ethan-1-thiol)), and combinations thereof.

In moieties of Formula (2c), each p can independently be selected from 2, 3, 4, 5, and 6. Each p can be the same and can be 2, 3, 4, 5, or 6.

In moieties of Formula (2c) each q can independently be 1, 2, 3, 4, or 5. Each q can be the same and can be 1, 2, 3, 4, or 5.

In moieties of Formula (2c), each r can independently be 2, 3, 4, 5, 6, 7, 8, 9, or 10. Each r can be the same and can be 2, 3, 4, 5, 6, 7, 8, 9, or 10.

In moieties of Formula (2c), each r can independently be an integer from 2 to 4, from 2 to 6, or from 2 to 8.

In moieties of Formula (2c), each A can be derived from a polyvinyl ether such as a divinyl ether. A divinyl ether can comprise a divinyl ether having the structure of Formula (3). Divinyl ethers are also referred to as bis(alkenyl)ethers.

In divinyl ethers of Formula (3), m can be an integer from 0 to 50, such as from 0 to 40, from 0 to 20, from 0 to 10, from 1 to 50, from 1 to 40, from 1 to 20, from 1 to 10, from 2 to 50, from 2 to 40, from 2 to 20, or from 2 to 10.

In divinyl ethers of Formula (3), each $R^2$ can independently be selected from a $C_{2-10}$ n-alkanediyl group, a $C_{3-6}$ branched alkanediyl group, and a $-[(CH_2)_p-X-]_q(CH_2)_r-$ group.

In divinyl ethers of Formula (3), each $R^2$ can independently be a $C_{2-10}$ n-alkanediyl group, such as methanediyl, ethanediyl, n-propanediyl, or n-butanediyl.

In divinyl ethers of Formula (3), each $R^2$ can independently comprise a $-[(CH_2)_p-X-]_q(CH_2)_r-$ group, where each X can be O or S.

In divinyl ethers of Formula (3), each $R^2$ can independently comprise a $-[(CH_2)_p-X-]_q(CH_2)_r-$ group.

In divinyl ethers of Formula (3), each m can be independently an integer from 1 to 3. Each m can be the same and is can be 1, 2, or 3.

In divinyl ethers of Formula (3), each $R^2$ can independently be selected from a $C_{2-10}$ n-alkanediyl group, a $C_{3-6}$ branched alkanediyl group, and a $-[(CH_2)_p-X-]_q(CH_2)_r-$ group.

In divinyl ethers of Formula (3), each $R^2$ can independently be a $C_{2-10}$ n-alkanediyl group.

In divinyl ethers of Formula (3), each $R^2$ can independently be a $-[(CH_2)_p-X-]_q(CH_2)_r-$ group, where each X can be O or S.

In divinyl ethers of Formula (3), each $R^2$ can independently be a $-[(CH_2)_p-X-]_q(CH_2)_r-$ group, where each X can be O or S, and each p can independently be 2, 3, 4, 5, and 6.

In divinyl ethers of Formula (3), each p can be the same and can be 2, 3, 4, 5, or 6.

In divinyl ethers of Formula (3), each $R^2$ can independently be a $-[(CH_2)_p-X-]_q(CH_2)_r-$ group, where each X can be O or S, and each q can independently be 1, 2, 3, 4, or 5.

In divinyl ethers of Formula (3), each q can be the same and can be 1, 2, 3, 4, or 5.

In divinyl ethers of Formula (3), each $R^2$ can independently be a $-[(CH_2)_p-X-]_q(CH_2)_r-$ group, where each X can be O or S, and each r can independently be 2, 3, 4, 5, 6, 7, 8, 9, or 10. In divinyl ethers of Formula (3), each r can be the same and can be 2, 3, 4, 5, 6, 7, 8, 9, or 10. In divinyl ethers of Formula (3), each r can independently be an integer from 2 to 4, from 2 to 6, or from 2 to 8.

In divinyl ethers of Formula (3), each $R^2$ can independently be a $-[(CH_2)_p-X-]_q(CH_2)_r-$ group, where each X can be O or S, and each r can independently be 2, 3, 4, 5, 6, 7, 8, 9, or 10. In divinyl ethers of Formula (3), each r can be the same and can be 2, 3, 4, 5, 6, 7, 8, 9, or 10. In divinyl ethers of Formula (3), each r can independently be an integer from 2 to 4, from 2 to 6, or from 2 to 8.

Examples of suitable divinyl ethers include ethylene glycol divinyl ether (EG-DVE butanediol divinyl ether (BD-DVE) hexanediol divinyl ether (HD-DVE), diethylene glycol divinyl ether (DEG-DVE), triethylene glycol divinyl ether tetraethylene glycol divinyl ether cyclohexanedimethanol divinyl ether, polytetrahydrofuryl divinyl ether; and combinations of any of the foregoing.

A divinyl ether can comprise a sulfur-containing divinyl ether. Examples of suitable sulfur-containing divinyl ethers are disclosed, for example, in PCT International Publication No. WO 2018/085650, which is incorporated by reference in its entirety.

In moieties of Formula (2c) each A can independently be derived from a polyalkenyl polyfunctionalizing agent. A polalkenyl polyfunctionalizing agent can have the structure of Formula (4), where z can be 3, 4, 5, or 6.

In polyalkenyl polyfunctionalizing agents of Formula (4), each $R^{70}$ can independently be elected from $C_{1-10}$ alkanediyl, each A can independently be selected from $C_{1-10}$ heteroalkanediyl, each A can independently be selected from substituted $C_{1-10}$ alkanediyl, or each A can independently be selected from substituted $C_{1-10}$ heteroalkanediyl. The one or more substituent groups can be selected from, for example, $-OH$, $=O$, $C_{1-4}$ alkyl, and $C_{1-4}$ alkoxy. The one or more heteroatoms can be selected from, for example, O, S, and a combination thereof.

Examples of suitable polyalkenyl polyfunctionalizing agents include triallyl cyanurate (TAC), triallylisocyanurate (TAIC), 1,3,5-triallyl-1,3,5-triazinane-2,4,6-trione), 1,3-bis (2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, and combinations of any of the foregoing.

In moieties of Formula (2c) the molar ratio of moieties derived from a divinyl ether to moieties derived from a polyalkenyl polyfunctionalizing agent can be, for example, from 0.9 mol % to 0.999 mol %, from 0.95 mol % to 0.99 mol %, or from 0.96 mol % to 0.99 mol %.

In moieties of Formula (2c), each $R^1$ can be —$(CH_2)_2$—O—$(CH_2)_2$—O—$(CH_2)_2$—; each $R^2$ can be —$(CH_2)_2$—; and m can be an integer from 1 to 4.

In moieties of Formula (2c), $R^2$ can be derived from a divinyl ether such a diethylene glycol divinyl ether, a polyalkenyl polyfunctionalizing agent such as triallyl cyanurate, or a combination thereof.

In polythioether prepolymers of Formula (2c), each A can independently be selected from a moiety of Formula (3a) and a moiety of Formula (4a):

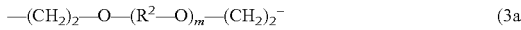

—$(CH_2)_2$—O—$(R^2$—O$)_m$—$(CH_2)_2$— (3a)

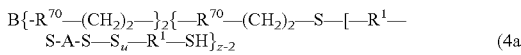

B{-$R^{70}$—$(CH_2)_2$—$\}_2${—$R^{70}$—$(CH_2)_2$—S—[—$R^1$—S-A-S—$S_u$—$R^1$—SH$\}_{z-2}$ (4a)

where m, $R^1$, $R^2$, $R^{70}$, A, n, and z are defined as in Formula (2c), Formula (3) and Formula (4).

In moieties of Formula (2c),
each $R^1$ can be —$(CH_2)_2$—O—$(CH_2)_2$—O—$(CH_2)_2$—;
each $R^2$ can be —$(CH_2)_2$—;
m can be an integer from 1 to 4; and
the polyfunctionalizing agent B(—$R^{70}$—CH=$CH_2)_z$ comprises triallyl cyanurate where z is 3 and each $R^{70}$ is —O—$CH_2$—CH=$CH_2$.

Polythioether prepolymers comprising a moiety of Formula (2c) can be thiol-terminated.

A thiol-terminated polythioether prepolymer can comprise a thiol-terminated polythioether prepolymer of Formula (2d):

HS—$R^1$—[S-A-S—$R^1$—$]_n$—SH (2d)

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and —[(CHR$^3$)$_p$—X—]$_q$(CHR$^3$)$_r$—, wherein,
p is an integer from 2 to 6;
q is an integer from 1 to 5;
r is an integer from 2 to 10;
each $R^3$ is independently selected from hydrogen and methyl; and
each X is independently selected from O, S, and NR, wherein R is selected from hydrogen and methyl; and
each A is independently selected from a moiety derived from a polyvinyl ether of Formula (3) and a moiety derived from a polyalkenyl polyfunctionalizing agent of Formula (4):

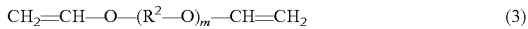

$CH_2$=CH—O—$(R^2$—O$)_m$—CH=$CH_2$ (3)

B(—$R^{70}$—CH=$CH_2)_z$ (4)

wherein,
each $R^2$ is independently selected from $C_{1-10}$ alkanediyl, $C_{6-8}$ cycloalkanediyl, $C_{6-14}$ alkanecycloalkanediyl, and —[(CHR$^3$)$_p$—X—]$_q$(CHR$^3$)$_r$—, wherein p, q, r, $R^3$, and X are as defined as for $R^1$;
m is an integer from 0 to 50;

B represents a core of a z-valent, polyalkenyl polyfunctionalizing agent B(—$R^{70}$—CH=$CH_2)_z$ wherein,
z is an integer from 3 to 6; and
each $R^{70}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

In thiol-terminated polythioether prepolymers of Formula (2d), $R^1$ can be $C_{2-10}$ alkanediyl.

In thiol-terminated polythioether prepolymers of Formula (2d), $R^1$ can be —[(CHR$^3$)$_p$—X—]$_q$(CHR$^3$)$_r$—.

In thiol-terminated polythioether prepolymers of Formula (2d), X can be selected from O and S, and thus —[(CHR$^3$)$_p$—X—]$_q$(CHR$^3$)$_r$— in Formula (2d) can be —[(CHR$^3$)$_p$—O—]$_q$(CHR$^3$)$_r$— or —[(CHR$^3$)$_p$—S—]$_q$(CHR$^3$)$_r$—. P and r can be equal, such as where p and r can be both two.

In thiol-terminated polythioether prepolymers of Formula (2d), $R^1$ can be selected from $C_{2-6}$ alkanediyl and —[(CHR$^3$)$_p$—X—]$_q$(CHR$^3$)$_r$—.

In thiol-terminated polythioether prepolymers of Formula (2d), $R^1$ can be —[(CHR$^3$)$_p$—X—]$_q$(CHR$^3$)$_r$—, and X can be O, or X can be S.

In thiol-terminated polythioether prepolymers of Formula (2d), where $R^1$ can be —[(CHR$^3$)$_p$—X—]$_q$(CHR$^3$)$_r$—, p can be 2, r can be 2, q can be 1, and X can be S; or p can be 2, q can be 2, r can be 2, and X can be O; or p can be 2, r can be 2, q can be 1, and X can be O.

In thiol-terminated polythioether prepolymers of Formula (2d), where $R^1$ can be —[(CHR$^3$)$_p$—X—]$_q$(CHR$^3$)$_r$—, each $R^3$ can be hydrogen, or at least one $R^3$ can be methyl.

In thiol-terminated polythioether prepolymers of Formula (2d), $R^1$ can be —[(CH$_2$)$_p$—X—]$_q$(CH$_2$)$_r$— wherein each X can independently be selected from O and S. In thiol-terminated polythioether prepolymers of Formula (2d), $R^1$ can be —[(CH$_2$)$_p$—X—]$_q$(CH$_2$)$_r$— each X can be O or each X can be S.

In thiol-terminated polythioether prepolymers of Formula (2d), $R^1$ can be —[(CH$_2$)$_p$—X—]$_q$(CH$_2$)$_r$—, where p can be 2, X can be O, q can be 2, r can be 2, $R^2$ can be ethanediyl, m can be 2, and n can be 9.

In thiol-terminated polythioether prepolymers of Formula (2d), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis(ethan-1-thiol)), and combinations thereof.

In thiol-terminated polythioether prepolymers of Formula (2d), each p can independently be selected from 2, 3, 4, 5, and 6. Each p can be the same and can be 2, 3, 4, 5, or 6.

In thiol-terminated polythioether prepolymers of Formula (2d), each q can independently be 1, 2, 3, 4, or 5. Each q can be the same and can be 1, 2, 3, 4, or 5.

In thiol-terminated polythioether prepolymers of Formula (2d), each r can independently be 2, 3, 4, 5, 6, 7, 8, 9, or 10. Each r can be the same and can be 2, 3, 4, 5, 6, 7, 8, 9, or 10.

In thiol-terminated polythioether prepolymers of Formula (2d), each r can independently be an integer from 2 to 4, from 2 to 6, or from 2 to 8.

In thiol-terminated polythioether prepolymers of Formula (2d), each A can independently be selected from a moiety of Formula (3a) and a moiety of Formula (4a):

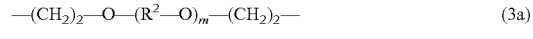

—$(CH_2)_2$—O—$(R^2$—O$)_m$—$(CH_2)_2$— (3a)

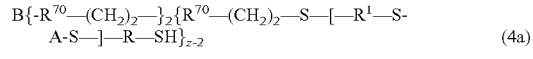

B{-$R^{70}$—$(CH_2)_2$—$\}_2${$R^{70}$—$(CH_2)_2$—S—[—$R^1$—S-A-S—]—R—SH$\}_{z-2}$ (4a)

where m, $R^1$, $R^2$, $R^{70}$, A, n1, and z are defined as in Formula (3) and Formula (4).

In thiol-terminated polythioether prepolymers of Formula (2d) the molar ratio of moieties derived from a divinyl ether to moieties derived from a polyalkenyl polyfunctionalizing agent can be, for example, of 200:1, 150:1, 100:1, 50:1, or 25:1.

Polythioethers comprising a moiety of Formula (2) or Formula (2c) can be alkenyl-terminated.

A thiol-terminated polythioether prepolymer can comprise, for example, a thiol-terminated polythioether prepolymer of Formula (2e):

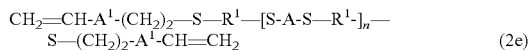

(2e)

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(CHR^3)_p-X-]_q(CHR^3)_r-$, wherein,
p is an integer from 2 to 6;
q is an integer from 1 to 5;
r is an integer from 2 to 10;
each $R^3$ is independently selected from hydrogen and methyl; and
each X is independently selected from O, S, and NR, wherein R is selected from hydrogen and methyl; and
each A is independently selected from a moiety derived from a polyvinyl ether of Formula (3) and a moiety derived from a polyalkenyl polyfunctionalizing agent of Formula (4):

$$CH_2=CH-O-(R^2-O)_m-CH=CH_2 \quad (3)$$

$$B(-R^{70}-CH=CH_2)_z \quad (4)$$

wherein,
each $R^2$ is independently selected from $C_{1-10}$ alkanediyl, $C_{6-8}$ cycloalkanediyl, $C_{6-14}$ alkanecycloalkanediyl, and $-[(CHR^3)_p-X-]_q(CHR^3)_r-$, wherein p, q, r, $R^3$, and X are as defined as for $R^1$;
m is an integer from 0 to 50;
each $A^1$ is independently a moiety of Formula (3d):

$$-O-(R^2-O)_m- \quad (3d)$$

where m and each $R^2$ are defined as in Formula (3);
B represents a core of a z-valent, polyalkenyl polyfunctionalizing agent $B(-R^{70}-CH=CH_2)_z$ wherein,
z is an integer from 3 to 6; and
each $R^{70}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

In alkenyl-terminated polythioether prepolymers of Formula (2e), $R^1$ can be $C_{2-10}$ alkanediyl.

In alkenyl-terminated polythioether prepolymers of Formula (2e), $R^1$ can be $-[(CHR^3)_p-X-]_q(CHR^3)_r-$.

In alkenyl-terminated polythioether prepolymers of Formula (2e), X can be selected from O and S, and thus $-[(CHR^3)_p-X-]_q(CHR^3)_r-$ in Formula (2e) can be $-[(CHR^3)_p-O-]_q(CHR^3)_r-$ or $-[(CHR^3)_p-S-]_q(CHR^3)_r-$. P and r can be equal, such as where p and r can be both two.

In alkenyl-terminated polythioether prepolymers of Formula (2e), $R^1$ can be selected from $C_{2-6}$ alkanediyl and $-[(CHR^3)_p-X-]_q(CHR^3)_r-$.

In alkenyl-terminated polythioether prepolymers of Formula (2e), $R^1$ can be $-[(CHR^3)_p-X-]_q(CHR^3)_r-$, and X can be O, or X can be S.

In alkenyl-terminated polythioether prepolymers of Formula (2e), where $R^1$ can be $-[(CHR^3)_p-X-]_q(CHR^3)_r-$, p can be 2, r can be 2, q can be 1, and X can be S; or p can be 2, q can be 2, r can be 2, and X can be O; or p can be 2, r can be 2, q can be 1, and X can be O.

In alkenyl-terminated polythioether prepolymers of Formula (2e), where $R^1$ can be $-[(CHR^3)_p-X-]_q(CHR^3)_r-$, each $R^3$ can be hydrogen, or at least one $R^3$ can be methyl.

In alkenyl-terminated polythioether prepolymers of Formula (2e), $R^1$ can be $-[(CH_2)_p-X-]_q(CH_2)_r-$ wherein each X can independently be selected from O and S. In alkenyl-terminated polythioether prepolymers of Formula (2e), $R^1$ can be $-[(CH_2)_p-X-]_q(CH_2)_r-$ each X can be O or each X can be S.

In alkenyl-terminated polythioether prepolymers of Formula (2e), $R^1$ can be $-[(CH_2)_p-X-]_q(CH_2)_r-$, where p can be 2, X can be O, q can be 2, r can be 2, $R^2$ can be ethanediyl, m can be 2, and n can be 9.

In alkenyl-terminated polythioether prepolymers of Formula (2e), each $R^1$ can be derived from 1,8-dimercapto-3,6-dioxaoctane (DMDO; 2,2-(ethane-1,2-diylbis(sulfanyl)) bis(ethan-1-thiol)), or each $R^1$ can be derived from dimercaptodiethylsulfide (DMDS; 2,2'-thiobis(ethan-1-thiol)), and combinations thereof.

In alkenyl-terminated polythioether prepolymers of Formula (2e), each p can independently be selected from 2, 3, 4, 5, and 6. Each p can be the same and can be 2, 3, 4, 5, or 6.

In alkenyl-terminated polythioether prepolymers of Formula (2e), each q can independently be 1, 2, 3, 4, or 5. Each q can be the same and can be 1, 2, 3, 4, or 5.

In alkenyl-terminated polythioether prepolymers of Formula (2e), each r can independently be 2, 3, 4, 5, 6, 7, 8, 9, or 10. Each r can be the same and can be 2, 3, 4, 5, 6, 7, 8, 9, or 10.

In alkenyl-terminated polythioether prepolymers of Formula (2a), each r can independently be an integer from 2 to 4, from 2 to 6, or from 2 to 8.

In alkenyl-terminated polythioether prepolymers of Formula (2e), each A can independently be selected from a moiety of Formula (3a) and a moiety of Formula (4b):

$$-(CH_2)_2-O-(R^2-O)_m-(CH_2)_2- \quad (3a)$$

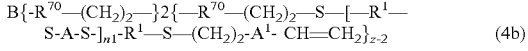

(4b)

where m, $R^1$, $R^2$, $R^{70}$, A, n1, and z are defined as in Formula (3) and Formula (4).

In alkenyl-terminated polythioether prepolymers of Formula (2e) the molar ratio of moieties derived from a divinyl ether to moieties derived from a polyalkenyl polyfunctionalizing agent can be, for example, of 200:1, 150:1, 100:1, 50:1, or 25:1.

Various methods can be used to prepare thiol-terminated polythioether prepolymers of Formula (2a) and Formula (2b). Examples of suitable thiol-terminated polythioether prepolymers, and methods for their production, are described in U.S. Pat. No. 6,172,179. Such thiol-terminated polythioether prepolymers may be difunctional, that is, linear prepolymers having two terminal thiol groups, or can be polyfunctional, that is, branched prepolymers having three or more terminal thiol-groups. In practice, thiol-terminated polythioether prepolymers are a combination of prepolymers having complex structures having an average thiol-functionality, for example, from 2.1 to 2.9.

A thiol-terminated polythioether prepolymer may comprise a combination of different thiol-terminated polythioether prepolymers and the thiol-terminated polythioether prepolymers may have the same or different functionality. A thiol-terminated polythioether prepolymer or combination of thiol-terminated polythioether prepolymers can have an average functionality, for example, from 2 to 6, from 2 to 4, from 2 to 3, from 2.05 to 2.8, or from 2.05 to 2.5. For example, a thiol-terminated polythioether prepolymer can comprise a difunctional thiol-terminated polythioether prepolymer, a trifunctional thiol-terminated polythioether prepolymer, or a combination thereof.

A thiol-terminated polythioether prepolymer can be prepared by reacting a polythiol and a diene such as a divinyl ether, and the respective amounts of the reactants used to prepare the polythioether prepolymers can be chosen to yield terminal thiol groups. Thus, in some cases, (n or >n, such as n+1) moles of a polythiol, such as a dithiol or a mixture of at least two different dithiols and 0.05 moles to 1 moles, such as from 0.1 moles to 0.8 moles, of a thiol-terminated polyfunctionalizing agent and/or an alkenyl-terminated polyfunctionalizing agent may be reacted with (n) moles of a diene, such as a divinyl ether, or a combination of at least two different dienes, such as a combination of two different divinyl ethers. A thiol-terminated polyfunctionalizing agent can be present in the reaction mixture in an amount sufficient to provide a thiol-terminated polythioether prepolymer having an average thiol functionality, for example, from 2.05 to 3, such as from 2.1 to 2.8, or from 2.1 to 2.6.

A reaction used to prepare a thiol-terminated polythioether prepolymer may be catalyzed by a free radical catalyst. Suitable free radical catalysts include azo compounds, for example, azobisnitrile compounds such as azo(bis)isobutyronitrile (AIBN); organic peroxides, such as benzoyl peroxide and tert-butyl peroxide; and inorganic peroxides, such as hydrogen peroxide. The reaction can also be effected by irradiation with ultraviolet light either with or without a radical initiator/photosensitizer. Ionic catalysis methods, using either inorganic or organic bases, e.g., triethylamine, may also be used.

Suitable thiol-terminated polythioether prepolymers may be produced by reacting a divinyl ether or combination of divinyl ethers with an excess of dithiol or combination of dithiols.

A thiol-terminated polythioether prepolymer can comprise the reaction product of reactants comprising:

(a) a dithiol of Formula (5):

$$HS-R^1-SH \qquad (5)$$

wherein,
R$^1$ is selected from C$_{2-6}$ alkanediyl, C$_{6-8}$ cycloalkanediyl, C$_{6-10}$ alkanecycloalkanediyl, C$_{5-8}$ heterocycloalkanediyl, and —[(CHR$^3$)$_p$—X—]$_q$(CHR$^3$)$_r$—;

wherein,
each R$^3$ is independently selected from hydrogen and methyl;
each X is independently selected from —O—, —S—, —S—S—, and —NR— wherein R is selected from hydrogen and methyl;
p is an integer from 2 to 6;
q is an integer from 1 to 5; and
r is an integer from 2 to 10; and (b) a bis(alkenyl) ether of Formula (3):

$$CH_2=CH-O-(R^2-O-)_mCH=CH_2 \qquad (3)$$

wherein,
each R$^2$ is independently selected from C$_{1-10}$ alkanediyl, C$_{6-8}$ cycloalkanediyl, C$_{6-14}$ alkanecycloalkanediyl, and —[(CHR$^3$)$_p$—X—]$_q$(CHR$^3$)$_r$—, wherein p, q, r, R$^3$, and X are as defined above; and
m is an integer from 0 to 50.

The reactants can further comprise (c) a polyfunctional compound such as a polyakenyl polyfunctionalizing agent such as a polyfunctional compound B(-V)$_z$, where B, -V, and z are defined as for Formula (2b).

In dithiols of Formula (5), R$^1$ can be —[(CHR$^3$)$_p$—X—]$_q$(CHR$^3$)$_r$—.

In dithiols of Formula (5), R$^1$ can be —[(CHR$^3$)$_p$—X—]$_q$(CHR$^3$)$_r$— and X can be selected from O and S, and thus —[(CHR$^3$)$_p$—X—]$_q$(CHR$^3$)$_r$— in Formula (5) can be —[(CHR$^3$)$_p$—O—]$_q$(CHR$^3$)$_r$— or —[(CHR$^3$)$_p$—S—]$_q$(CHR$^3$)$_r$—. P and r can be equal, such as where p and r can be both two.

In dithiols of Formula (5), R$^1$ can comprise C$_{2-6}$ alkanediyl and —[(CHR$^3$)$_p$—X—]$_q$(CHR$^3$)$_r$—.

In dithiols of Formula (5), R$^1$ can be —[(CHR$^3$)$_p$—X—]$_q$(CHR$^3$)$_r$—, and X can be O, or X can be S.

In dithiols of Formula (5) where R$^1$ can be —[(CHR$^3$)$_p$—X—]$_q$(CHR$^3$)$_r$—, p can be 2, r can be 2, q can be 1, and X can be S; or p can be 2, q can be 2, r can be 2, and X can be O; or p can be 2, r can be 2, q can be 1, and X can be O.

In dithiols of Formula (5) where R$^1$ can be —[(CHR$^3$)$_p$—X—]$_q$(CHR$^3$)$_r$—, each R$^3$ can be hydrogen, or at least one R$^3$ can be methyl.

In dithiols of Formula (5), each R$^1$ can be derived from 1,8-dimercapto-3,6-dioxaoctane (DMDO; 2,2-(ethane-1,2-diylbis(sulfanyl))bis(ethan-1-thiol)), or each R$^1$ can be derived from dimercaptodiethylsulfide (DMDS; 2,2'-thiobis(ethan-1-thiol)), and combinations thereof.

In dithiols of Formula (5), where R$^1$ can be —[(CHR$^3$)$_p$—X—]$_q$(CHR$^3$)$_r$—, each p can independently comprise 2, 3, 4, 5, and 6. Each p can be the same and can be 2, 3, 4, 5, or 6.

In dithiols of Formula (5), where R$^1$ can be —[(CHR$^3$)$_p$—X—]$_q$(CHR$^3$)$_r$—, each q can independently be 1, 2, 3, 4, or 5. Each q can be the same and can be 1, 2, 3, 4, or 5.

In dithiols of Formula (5), where R$^1$ can be —[(CHR$^3$)$_p$—X—]$_q$(CHR$^3$)$_r$—, each r can independently be 2, 3, 4, 5, 6, 7, 8, 9, or 10, Each r can be the same and can be 2, 3, 4, 5, 6, 7, 8, 9, or 10.

In dithiols of Formula (5), where R$^1$ can be —[(CHR$^3$)$_p$—X—]$_q$(CHR$^3$)$_r$—, each r can independently be an integer from 2 to 4, from 2 to 6, or from 2 to 8.

In bis(alkenyl) ethers of Formula (3), each m can be independently an integer from 1 to 3. Each m can be the same and is can be 1, 2, or 3.

In bis(alkenyl) ethers of Formula (3), each R$^2$ can independently comprise a C$_{2-10}$ n-alkanediyl group, a C$_{3-6}$ branched alkanediyl group, or a —[(CH$_2$)$_p$—X—]$_q$(CH$_2$)$_r$— group.

In bis(alkenyl) ethers of Formula (3), each R$^2$ can independently comprise a C$_{2-10}$ n-alkanediyl group.

In bis(alkenyl) ethers of Formula (3), each R$^2$ can independently comprise a —[(CH$_2$)$_p$—X—]$_q$(CH$_2$)$_r$— group, where each X can be O or S.

In bis(alkenyl) ethers of Formula (3), each R$^2$ can independently comprise a —[(CH$_2$)$_p$—X—]$_q$(CH$_2$)$_r$— group, where each X can be O or S, and each p can independently be 2, 3, 4, 5, and 6.

In bis(alkenyl) ethers of Formula (3), each $R^2$ can independently comprise a $—[(CH_2)_p—X—]_q(CH_2)_r—$ group, where each p can be the same and can be 2, 3, 4, 5, or 6.

In bis(alkenyl) ethers of Formula (3), each $R^2$ can independently comprise a $—[(CH_2)_p—X—]_q(CH_2)_r—$ group, where each X can be O or S, and each q can independently be 1, 2, 3, 4, or 5.

In bis(alkenyl) ethers of Formula (3), each $R^2$ can independently comprise a $—[(CH_2)_p—X—]_q(CH_2)_r—$ group, where each q can be the same and can be 1, 2, 3, 4, or 5.

In bis(alkenyl) ethers of Formula (3), each $R^2$ can independently comprise a $—[(CH_2)_p—X—]_q(CH_2)_r—$ group, where each X can be O or S, and each r can independently be 2, 3, 4, 5, 6, 7, 8, 9, or 10, In bis(alkenyl) ethers of Formula (3), each r can be the same and can be 2, 3, 4, 5, 6, 7, 8, 9, or 10. In bis(alkenyl) ethers of Formula (3), each r can independently be an integer from 2 to 4, from 2 to 6, or from 2 to 8.

Dithiols suitable for use in preparing thiol-terminated polythioether prepolymers include those having the structure of Formula (5):

$$HS—R^1—SH \qquad (5)$$

wherein, $R^1$ can be $C_{2-6}$ alkanediyl, $C_{6-8}$ cycloalkanediyl, $C_{6-10}$ alkanecycloalkanediyl, $C_{5-8}$ heterocycloalkanediyl, or ; wherein, each $R^3$ can independently can be hydrogen or methyl; each X can independently be O, S, —S—S—, or NR wherein R can be hydrogen or methyl; p is an integer from 2 to 6; q is an integer from 1 to 5; and r is an integer from 2 to 10.

Examples of suitable dithiols include 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing.

A dithiol may have one or more pendent groups comprising a lower (e.g., $C_{1-6}$) alkyl group, a lower alkoxy group, or a hydroxyl group. Suitable alkyl pendent groups include, for example, $C_{1-6}$ linear alkyl, $C_{3-6}$ branched alkyl, cyclopentyl, and cyclohexyl.

Other examples of suitable dithiols include dimercaptodiethylsulfide (DMDS) (in Formula (5), $R^1$ is $—[(CH_2)_p—X—]_q(CH_2)_r—$, wherein p is 2, r is 2, q is 1, and X is S); dimercaptodioxaoctane (DMDO) (in Formula (5), $R^1$ is $—[(CH_2)_p—X—]_q(CH_2)_r—$, wherein p is 2, q is 2, r is 2, and X is O); and 1,5-dimercapto-3-oxapentane (in Formula (5), $R^1$ is $—[(CH_2)_p—X—]_q(CH_2)_r—$, wherein p is 2, r is 2, q is 1, and X is O). It is also possible to use dithiols that include both heteroatoms in the carbon backbone and pendent alkyl groups, such as methyl groups. Such dithiols include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CH(CH$_3$)CH$_2$—SH and HS—CH(CH$_3$)CH$_2$—S—CH$_2$CH(CH$_3$)—SH.

Suitable bis(alkenyl) ethers for preparing thiol-terminated polythioether prepolymers include, for example, bis(alkenyl) ethers of Formula (3):

$$CH_2=CH—O—(R^2—O—)_mCH=CH_2 \qquad (3)$$

where each $R^2$ can independently be $C_{1-10}$ alkanediyl, $C_{6-8}$ cycloalkanediyl, $C_{6-14}$ alkanecycloalkanediyl, or 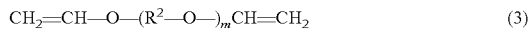, where each $R^3$ can independently comprise hydrogen or methyl; each X can independently comprise O, S, —S—S—, or NR wherein R can be hydrogen or methyl; p can be an integer from 2 to 6; q can be an integer from 1 to 5; and r can be an integer from 2 to 10.

Suitable bis(alkenyl) ethers include, for example, compounds having at least one oxyalkanediyl group $—R^2—O—$, such as from 1 to 4 oxyalkanediyl groups, i.e., compounds in which m in Formula (3) is an integer ranging from 1 to 4. The variable m in Formula (3) can be an integer ranging from 2 to 4. It is also possible to employ commercially available divinyl ether mixtures that are characterized by a non-integral average value for the number of oxyalkanediyl units per molecule. Thus, m in Formula (3) can also take on rational number values ranging from 0 to 10.0, such as from 1.0 to 10.0, from 1.0 to 4.0, or from 2.0 to 4.0.

Examples of suitable bis(alkenyl) ethers include ethylene glycol divinyl ether (EG-DVE) ($R^2$ in Formula (3) is ethanediyl and m is 1), butanediol divinyl ether (BD-DVE) ($R^2$ in Formula (3) is butanediyl and m is 1), hexanediol divinyl ether (HD-DVE) ($R^2$ in Formula (3) is hexanediyl and m is 1), diethylene glycol divinyl ether (DEG-DVE) ($R^2$ in Formula (3) is ethanediyl and m is 2), triethylene glycol divinyl ether ($R^2$ in Formula (3) is ethanediyl and m is 3), tetraethylene glycol divinyl ether ($R^2$ in Formula (3) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendent groups which can comprise alkyl groups, hydroxyl groups, alkoxy groups, or amine groups.

Bis(alkenyl) ethers in which $R^2$ in Formula (3) is $C_{3-6}$ branched alkanediyl may be prepared by reacting a polyhydroxyl compound with acetylene. Examples of divinyl ethers of this type include compounds in which $R^2$ in Formula (3) is an alkyl-substituted methanediyl group such as CH(—CH$_3$), or an alkyl-substituted ethanediyl.

Two or more types of bis(alkenyl) ethers of Formula (3) may be used. Thus, two dithiols of Formula (5) and one divinyl ethers of Formula (3), one dithiol of Formula (5) and two divinyl ethers of Formula (3), two dithiols of Formula (5) and two divinyl ethers of Formula (3), and more than two compounds of one or both Formula (5) and Formula (3), may be used to produce a variety of thiol-terminated polythioethers prepolymers.

The bis(alkenyl) ethers can comprise, for example, from 20 mole percent to less than 50 mole percent of the reactants used to prepare a thiol-terminated polythioether prepolymer, or 30 mole percent to less than 50 mole percent.

Relative amounts of dithiols and bis(alkenyl) ethers can be selected to yield polythioether prepolymers having terminal thiol groups. Thus, a dithiol of Formula (5) or a mixture of at least two different dithiols of Formula (5), can be reacted with of a bis(alkenyl) ethers of Formula (3) or a mixture of at least two different bis(alkenyl) ethers of Formula (3) in relative amounts such that the molar ratio of thiol groups to alkenyl groups is greater than 1:1, such as from 1.1:1.0 to 2.0:1.0.

The reaction between dithiols and bis(alkenyl) ethers and/or polythiols and bis(alkenyl) ethers may be catalyzed by a free radical catalyst, an ionic catalyst, or ultraviolet radiation. Suitable free radical catalysts include, for example, azo compounds, for example azobisnitriles such as azo(bis)isobutyronitrile (AIBN); organic peroxides such as benzoyl peroxide and tert-butyl peroxide; and inorganic peroxides such as hydrogen peroxide. In certain reactions, the catalyst does not comprise acidic or basic compounds, and does not produce acidic or basic compounds upon decomposition. Examples of suitable free-radical catalysts include azo-type catalysts, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other suitable free-radical catalysts include alkyl peroxides, such as tert-butyl peroxide. The reaction may also be effected by irradiation with ultraviolet light either with or without a cationic photo-initiating moiety.

Thiol-terminated polythioether prepolymers provided by the present disclosure may be prepared by combining at least one dithiol of Formula (5) and at least one bis(alkenyl) ether of Formula (3) followed by addition of an appropriate catalyst, and carrying out the reaction at a temperature, for example, within a range from 30° C. to 120° C., such as 70° C. to 90° C., for a duration, for example, within a range from 2 hours to 24 hours, such as from 2 hours to 6 hours.

Thiol-terminated polythioether prepolymers may comprise a polyfunctional polythioether prepolymer, i.e., may have an average thiol functionality greater than 2.0. Suitable polyfunctional thiol-terminated polythioether prepolymers include, for example, those having the structure of Formula (2b):

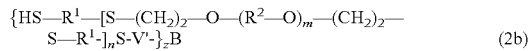

{HS—R$^1$—[S—(CH$_2$)$_2$—O—(R$^2$—O)$_m$—(CH$_2$)$_2$—S—R$^1$-]$_n$S-V'-}$_z$B   (2b)

wherein z has an average value of greater than 2.0, such as a value within a range from 2.1 and 3, a value within a range from 2.1 and 4, a value within a range from 3 and 6, or can be an integer from 3 to 6.

Polyfunctionalizing agents suitable for use in preparing such polyfunctional thiol-terminated polythioether prepolymers include tri-functionalizing agents, that is, compounds where z is 3. Suitable tri-functionalizing agents include, for example, triallyl cyanurate (TAC), 1,2,3-propanetrithiol, isocyanurate-containing trithiols, and combinations thereof, as disclosed in U.S. Application Publication No. 2010/0010133, which is incorporated by reference in its entirety; and isocyanurates as disclosed, for example, in U.S. Pat. No. 7,858,703, which is incorporated by reference in its entirety. Other useful polyfunctionalizing agents include trimethylolpropane trivinyl ether, and the polythiols described in U.S. Pat. Nos. 4,366,307; 4,609,762; and 5,225,472, each of which is incorporated by reference in its entirety. Mixtures of polyfunctionalizing agents may also be used. As a result, polythioether prepolymers provided by the present disclosure may have a wide range of average functionality. For example, tri-functionalizing agents may afford average functionalities of groups capable of reacting with thiol groups from 2.05 to 3.0, such as from 2.1 to 2.6. Wider ranges of average functionality may be achieved by using tetrafunctional or higher functionality polyfunctionalizing agents. Functionality may also be determined by factors such as stoichiometry, as will be understood by those skilled in the art.

Thiol-terminated polythioether prepolymers provided by the present disclosure are liquid at room temperature (20° C.-25° C.) and can have a glass transition temperature T$_g$, for example, less than −20° C., less than −30° C., or less than −40° C. The glass transition temperature T$_g$ is determined by Dynamic Mass Analysis (DMA) using a TA Instruments Q800 apparatus with a frequency of 1 Hz, an amplitude of 20 microns, and a temperature ramp of −80° C. to 25° C., with the T$_g$ identified as the peak of the tan δ curve.

Thiol-terminated polythioether prepolymers can exhibit a viscosity, for example, within a range from 20 poise to 500 poise (2 Pa-sec to 50 Pa-sec), from 20 poise to 200 poise (2 Pa-sec to 20 Pa-sec) or from 40 poise to 120 poise (4 Pa-sec to 12 Pa-sec), measured using a Brookfield CAP 2000 viscometer, with a No. 6 spindle, at speed of 300 rpm, and a temperature of 25° C.

Thiol-terminated polythioether prepolymers provided by the present disclosure can be characterized by a number average molecular weight and/or a molecular weight distribution. Polythioether prepolymers can exhibit a number average molecular weight, for example, from 500 Daltons to 20,000 Daltons, from 2,000 Daltons to 5,000 Daltons, or from 1,000 Daltons to 4,000 Daltons, where the number average molecular weight is determined by iodine titration. Thiol-terminated polythioether prepolymers can exhibit a polydispersity ($M_w/M_n$; weight average molecular weight/number average molecular weight; determined using iodine titration), for example, from 1 to 20, or from 1 to 5.

The backbone of a thiol-terminated polythioether prepolymer provided by the present disclosure can be modified to improve the properties such as adhesion, tensile strength, elongation, UV resistance, hardness, and/or flexibility of sealants and coatings prepared using polythioether prepolymers. For example, adhesion promoting groups, antioxidants, metal ligands, and/or urethane linkages can be incorporated into the backbone of a polythioether prepolymer to improve one or more performance attributes. Examples of backbone-modified polythioether prepolymers are disclosed, for example, in U.S. Pat. No. 8,138,273 (urethane containing), U.S. Pat. No. 9,540,540 (sulfone-containing), U.S. Pat. No. 8,952,124 (bis(sulfonyl)alkanol-containing), U.S. Pat. No. 9,382,642 (metal-ligand containing), and U.S. Application Publication No. 2017/0114208 (antioxidant-containing), PCT Application Publication No. WO 2018/085650 (sulfur-containing divinyl ether), and PCT Application Publication No. WO 2018/031532 (urethane-containing), each of which is incorporated by reference in its entirety.

Permapol® P3.1E, Permapol® P3.1E-2.8, and Permapol® L56086 are thiol-terminated polythioether prepolymers encompassed by the moiety of Formula (2) and the moiety of Formula (2c) and the thiol-terminated polythioether prepolymers of Formula (2a), (2b) and Formula (2d).

Sulfur-containing polythioether prepolymers prepared by the present disclosure can also be prepared using sulfur-containing poly(alkenyl) ethers and/or can contain polyurethane and/or polyurea segments in the prepolymer backbone. Sulfur-containing poly(alkenyl) ethers and sulfur-containing polythioether prepolymers prepared using sulfur-containing poly(alkenyl) ethers are disclosed in PCT International Application No. WO 2018/085650, which is incorporated by reference in its entirety. Urethane/urea-containing bis(alkenyl) ethers and sulfur-containing polythioether prepolymers containing urethane/urea-containing bis(alkenyl) ethers are disclosed in U.S. Application Publication No. 2017/0368737, which is incorporated by reference in its entirety.

Polythioether prepolymers provided by the present disclosure can comprise a backbone of Formula (2c):

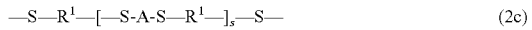

—S—R$^1$—[—S-A-S—R$^1$—]$_s$—S—   (2c)

wherein,
s is an integer from 1 to 60;
each R$^1$ comprises C$_{2-10}$ alkanediyl, C$_{6-8}$ cycloalkanediyl, C$_{6-10}$ alkanecycloalkanediyl, or —[(—CHR—)$_p$—X—]$_q$—(CHR)$_r$—, wherein each R is independently selected from hydrogen and methyl, wherein,
  each X is independently selected from —O— and —S—
  each p is independently an integer from 2 to 6;
  q is an integer from 1 to 5; and
  r is an integer from 2 to 10;
each A comprises a moiety of Formula (7), a moiety of Formula (3a), or a combination thereof:

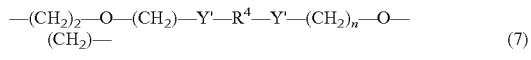  (7)

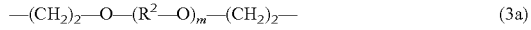  (3a)

wherein,
  each n is independently an integer from 1 to 4;
  each Y' is independently selected from —O— and —S—; and
  m is an integer from 0 to 50; and
  each $R^2$ comprises $C_{2-6}$ n-alkanediyl, $C_{3-6}$ branched alkanediyl, $C_{6-8}$ cycloalkanediyl, $C_{6-10}$ alkanecycloalkanediyl, or —[(—CH$_2$—)$_p$—O—]$_q$(—CH$_2$—)$_r$—, wherein,
    each p is independently an integer ranging from 2 to 6;
    q is an integer from 1 to 5; and
    r is an integer from 2 to 10;
  $R^4$ comprises $C_{2-6}$ n-alkanediyl, $C_{3-6}$ branched alkanediyl, $C_{6-8}$ cycloalkanediyl, $C_{6-10}$ alkanecycloalkanediyl, or —[(—CH$_2$—)$_p$—X—]$_q$(—CH$_2$—)$_r$—, wherein,
    each X is independently selected from —O—, —S— and —S—S—;
    each p is an integer from 2 to 6;
    q is an integer from 1 to 5; and
    r is an integer from 2 to 6; and
    at least one Y' is —S—, or $R^4$ comprises —[(—CH$_2$—)$_p$—X—]$_q$—(—CH$_2$—)$_r$— and at least one X is —S— or —S—S—; and
    at least one A comprises a moiety of Formula (7).

In moieties of Formula (2c), s can be an integer, for example, from 1 to 40, from 1 to 30, from 1 to 20, or from 1 to 10.

In moieties of Formula (2c), $R^1$ can be $C_{2-6}$ n-alkanediyl, such as ethane-diyl, n-propane-diyl, n-butane-diyl, n-pentane-diyl, or n-hexane-diyl.

In moieties of Formula (2c), $R^1$ can be —[(—CHR—)$_p$—X—]$_q$—(—CHR—)$_r$—.

In moieties of Formula (2c), $R^1$ can be —[(—CHR—)$_p$—X—]$_q$—(—CHR—)$_r$—, where at least one R can be —CH$_3$.

In moieties of Formula (2c), $R^1$ can be —[(—CH$_2$—)$_p$—X—]$_q$—(—CH$_2$—)$_r$—.

In moieties of Formula (2c), $R^1$ can be —[(—CH$_2$—)$_p$—X—]$_q$—(—CH$_2$—)$_r$—, and each X can be —O—.

In moieties of Formula (2c), $R^1$ can be —[(—CH$_2$—)$_p$—X—]$_q$—(—CH$_2$—)$_r$—, and each X can be —S— at least one X can be —S—, each X can be —S—S—, or at least one X can be —S—S—.

In moieties of Formula (2c), $R^1$ can be —[(—CH$_2$—)$_p$—X—]$_q$—(—CH$_2$—)$_r$—, and each p can be 2 and r can be 2.

In moieties of Formula (2c), $R^1$ can be —[(—CH$_2$—)$_p$—X—]$_q$—(—CH$_2$—)$_r$—, where p can be 1, 2, 3, 4, or 5.

In moieties of Formula (2c), $R^1$ can be —[(—CH$_2$—)$_p$—X—]$_q$—(—CH$_2$—)$_r$—, where q can be 1, 2, 3, 4, or 5.

In moieties of Formula (2c), $R^1$ can be —[(—CH$_2$—)$_p$—X—]$_q$—(—CH$_2$—)$_r$—, where r can be 1, 2, 3, 4, or 5.

In moieties of Formula (2c), $R^1$ can be —[(—CH$_2$—)$_p$—X—]$_q$—(—CH$_2$—)$_r$—, where each p can be 2 and r can be 2; and q can be 1, 2, 3, 4, or 5.

In moieties of Formula (2c), $R^1$ can be —[(—CH$_2$—)$_p$—X—]$_q$—(—CH$_2$—)$_r$—, where each X can be —S— or at least one X can be —S—; each p can be 2 and r can be 2; and q can be 1, 2, 3, 4, or 5.

In moieties of Formula (2c), $R^1$ can be —[(—CH$_2$—)$_p$—X—]$_q$—(—CH$_2$—)$_r$—, where each X can be —O— or at least one X can be —O—; each p can be 2 and r can be 2; and q can be 1, 2, 3, 4, or 5.

In moieties of Formula (2c), $R^1$ can be —[(—CH$_2$—)$_p$—X—]$_q$—(CH$_2$)$_r$—, where p is 2, r is 2, q is 1, and X is —S—; $R^1$ can be —[(—CH$_2$—)$_p$—X—]$_q$—(CH$_2$)$_r$—, where p is 2, q is 2, r is 2, and X is —O—; or $R^1$ can be —[(—CH$_2$—)$_p$—X—]$_q$—(CH$_2$)$_r$—, where p is 2, r is 2, q is 1, and X is —O—.

In moieties of Formula (7), each n can be 1, 2, 3, or 4.

In moieties of Formula (7), each Y' can be —O— or each Y' can be —S—.

In moieties of Formula (7), $R^4$ can be $C_{2-6}$ n-alkanediyl, such as ethane-diyl, n-propane-diyl, n-butane-diyl, n-pentane-diyl, or n-hexane-diyl.

In moieties of Formula (7), $R^4$ can be $C_{2-6}$ n-alkanediyl; both Y' can be —S— or one Y' can be —S— and the other Y' can be —O—.

In moieties of Formula (7), $R^4$ can be —[(—CH$_2$—)$_p$—X—]$_q$—(—CH$_2$—)$_r$—.

In moieties of Formula (7), $R^4$ can be —[(—CH$_2$—)$_p$—X—]$_q$—(—CH$_2$—)$_r$—, where each X can be —O— or each X can be —S—S— or at least one X can be —O— or at least one X can be —S—S—.

In moieties of Formula (7), $R^4$ can be —[(—CH$_2$—)$_p$—X—]$_q$—(—CH$_2$—)$_r$—, where each X can be —S— or at least one X can be —S—.

In moieties of Formula (7), $R^4$ can be —[(—CH$_2$—)$_p$—X—]$_q$—(—CH$_2$—)$_r$—, where each p can be 2 and r can be 2.

In moieties of Formula (7), $R^4$ can be —[(—CH$_2$—)$_p$—X—]$_q$—(—CH$_2$—)$_r$—, where q can be 1, 2, 3, 4, or 5.

In moieties of Formula (7), $R^4$ can be —[(—CH$_2$—)$_p$—X—]$_q$—(—CH$_2$—)$_r$—, where each p can be 2 and r can be 2; and q can be 1, 2, 3, 4, or 5.

In moieties of Formula (7), $R^4$ can be —[(—CH$_2$—)$_p$—X—]$_q$—(—CH$_2$—)$_r$—, where each X can be —S—; each p can be 2 and r can be 2; and q can be 1, 2, 3, 4, or 5.

In moieties of Formula (7), $R^4$ can be —[(—CH$_2$—)$_p$—X—]$_q$—(—CH$_2$—)$_r$—, where each X can be —O—; each p can be 2 and r can be 2; and q can be 1, 2, 3, 4, or 5.

In moieties of Formula (7), $R^4$ can be —[(—CH$_2$—)$_p$—X—]$_q$—(—CH$_2$—)$_r$—, where each X can be —O—; and each Y' can be —S—.

In moieties of Formula (7), $R^4$ can be —[(—CH$_2$—)$_p$—X—]$_q$—(—CH$_2$—)$_r$—, where each X can be —S—; and each Y' can be —O—.

In moieties of Formula (7), each n can be 2, each Y— can be independently selected from —O— and —S—, and $R^4$ can be —[(—CH$_2$—)$_p$—X—]$_q$—(—CH$_2$—)$_r$—, where each X is independently selected from —O—, —S—, and —S—S—, p is 2, q is selected from 1 and 2, and r is 2.

In moieties of Formula (7), each n can be 2, each Y— can be independently selected from —O— and —S—, and $R^4$ can be $C_{2-4}$ alkanediyl, such as ethanediyl, n-propanediyl, or n-butanediyl.

In moieties of Formula (3a), m can be an integer, for example, from 1 to 20, from 2 to 20, from 2 to 10, from 2 to 6 or from 2 to 4. In moieties of Formula (3a), m can be, for example, 1, 2, 3, 4, 5, or 6.

In moieties of Formula (3a), each $R^2$ can be independently $C_{2-6}$ n alkanediyl such as 1,2-ethane-diyl, 1,3-propane-diyl, 1,4-butane-diyl, 1,5-pentane-diyl or 1,6-hexane-diyl. In moieties of Formula (3a), each $R^2$ can be $C_{2-6}$ n alkanediyl such as 1,2-ethane-diyl, 1,3-propane-diyl, 1,4-butane-diyl, 1,5-pentane-diyl or 1,6-hexane-diyl.

In moieties of Formula (3a), m can be 1, 2, 3, or 4; and $R^2$ can be $C_{2-6}$ n alkanediyl such as 1,2-ethane-diyl, 1,3-propane-diyl, 1,4-butane-diyl, 1,5-pentane-diyl or 1,6-hexane-diyl A moiety of Formula (7) can be derived from a sulfur-containing bis(alkenyl) ether, such as a sulfur-containing bis(alkenyl) ether of Formula (7a):

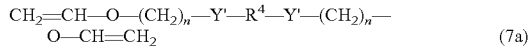

$$CH_2=CH-O-(CH_2)_n-Y'-R^4-Y'-(CH_2)_n-O-CH=CH_2 \quad (7a)$$

where n, Y', and $R^4$ are defined as in Formula (2a).

A moiety of Formula (3a) can be derived from a divinyl ether, such as a divinyl ether of Formula (3):

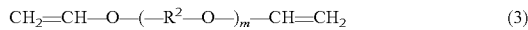

$$CH_2=CH-O-(-R^2-O-)_m-CH=CH_2 \quad (3)$$

where m and $R^2$ are defined as in Formula (7)

In polythioether prepolymers comprising a backbone of Formula (2c), each A can be a moiety of Formula (3a).

In polythioether prepolymers comprising a backbone of Formula (2c), each A can independently be a moiety of Formula (7a) or a moiety of Formula (3a), where at least one A is a moiety of Formula (7a).

In polythioether prepolymers comprising a backbone of Formula (2c), from 20 mol % to 80 mol %, from 30 mol % to 70 mol %, or from 40 mol % to 60 mol % of the A moieties can comprise moieties of Formula (3a) and the remaining A moieties can be moieties of Formula (7). For example, in a polythioether prepolymer of Formula (2c), 50 mol % of the A moieties can comprise a moiety of Formula (3a) and 50 mol % of the A moieties can comprise a moiety of Formula (7).

In polythioether prepolymers comprising a backbone of Formula (2c), s can be, for example, an integer from 1 to 40, from 1 to 20, from 2 to 60, from 2 to 40, from 2 to 20, from 5 to 60, from 5 to 40, from 5 to 20, from 10 to 40, or an integer from 10 to 30. Polythioether prepolymers having a backbone of Formula (2c) can also comprise a combination of polythioether prepolymers having an average value of s from 1 to 40, from 1 to 20, from 2 to 60, from 2 to 40, from 2 to 20, from 5 to 60, from 5 to 40, from 5 to 20, from 10 to 40, or from 10 to 30, including non-integer values.

Polythioether prepolymers provided by the present disclosure can comprise urethane/urea-containing bis(alkenyl) ethers incorporated into the prepolymer backbone. Urethane/urea-containing bis(alkenyl) ethers and polythioether prepolymers containing urethane/urea segments in the prepolymer backbone are disclosed in U.S. Application Publication No. 2017/0368737, which is incorporated by reference in its entirety.

Polythioether prepolymers provided by the present disclosure can be prepared, for example, by reacting a polythiol or combination of polythiols with a urethane/urea-containing bis(alkenyl) ether or combination of urethane/urea-containing bis(alkenyl) ethers.

Polythioether prepolymers provided by the present disclosure can be prepared by reacting a polythiol or combination of polythiols, a urethane/urea-containing bis(alkenyl) ether or combination of urethane/urea-containing bis(alkenyl) ethers, and a divinyl ether or combination of divinyl ethers.

Polythioether prepolymers provided by the present disclosure can comprise a backbone of Formula (2c):

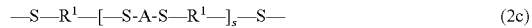

$$-S-R^1-[-S-A-S-R^1-]_s-S- \quad (2c)$$

wherein,
s is an integer from 1 to 60;
each $R^1$ is selected from $C_{2-10}$ alkanediyl, $C_{6-8}$ cycloalkanediyl, $C_{6-10}$ alkanecycloalkanediyl, and $-[(-CHR-)_p-X-]_q-(CHR)_r-$, wherein each R is independently selected from hydrogen and methyl, wherein,
each X is independently selected from $-O-$ and $-S-$
each p is independently an integer from 2 to 6;
q is an integer from 1 to 5; and
r is an integer from 2 to 10;
each A independently comprises a moiety of Formula (8) or a moiety of Formula (3a):

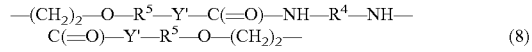

$$-(CH_2)_2-O-R^5-Y'-C(=O)-NH-R^4-NH-C(=O)-Y'-R^5-O-(CH_2)_2- \quad (8)$$

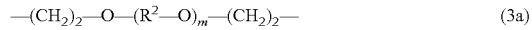

$$-(CH_2)_2-O-(R^2-O)_m-(CH_2)_2- \quad (3a)$$

wherein,
m is an integer from 0 to 50;
each Y' is independently selected from $-NH-$ and $-O-$; and
each $R^2$ is independently selected from $C_{2-6}$ n-alkanediyl, $C_{3-6}$ branched alkanediyl, $C_{6-8}$ cycloalkanediyl, $C_{6-10}$ alkanecycloalkanediyl, and $-[(-CH_2-)_p-O-]_q-(-CH_2-)_r-$,
wherein,
each p is independently an integer ranging from 2 to 6;
q is an integer from 1 to 5; and
r is an integer from 2 to 10;
$R^4$ comprises a core of a diisocyanate;
each $R^5$ is independently selected from $C_{1-10}$ alkanediyl; and
at least one A comprises a moiety of Formula (8).

In moieties of Formula (2c), each $R^1$ can be $-[-(CHR)_p-X-]_q-(CHR)_r-$.

In moieties of Formula (2c), X can be selected from $-O-$ and $-S-$, and thus $-[-(CHR)_p-X-]_q-(CHR)_r-$ can be $-[(-CHR-)_p-O-]_q-(CHR)_r-$, $-[(-CHR)_2-]_p-S-]_q-(CHR)_r-$, $-[(-CH_2-)_2-O-]_q-(CH_2)_2-$, or $-[(-CH_2)_2-S-]_q-(CH_2)_2-$. P and r can be equal, such as both p and r can be 2, 3, or 4.

In moieties of Formula (2c), each $R^1$ can be selected from $C_{2-6}$ alkanediyl and $-[-(CHR)_p-X-]_q-(CHR)_r-$.

In moieties of Formula (2c), each $R^1$ can be $-[-(CHR)_p-X-]_q-(CHR)_r-$, and X can be $-O-$, or X can be $-S-$.

In moieties of Formula (2c), each $R^1$ can be $-[-(CHR)_p-X-]_q-(CHR)_r-$, p can be 2, r can be 2, q can be 1, and X can be $-S-$; or p can be 2, q can be 2, r can be 2, and X can be $-O-$; or p can be 2, r can be 2, q can be 1, and X can be $-O-$.

In moieties of Formula (2c), each $R^1$ can be $-[-(CHR)_p-X-]_q-(CHR)_r-$, each R can be hydrogen, or at least one R can be methyl.

In moieties of Formula (2c), each $R^1$ can be derived from dimercaptodioxaoctane (DMDO) or each $R^1$ is derived from dimercaptodiethylsulfide (DMDS).

In moieties of Formula (2c), each $R^1$ can be $-[(CH_2)_2-O-]_2-(CH_2)_2-$.

In moieties of Formula (2c), each $R^1$ can be $-[-(CHR)_p-X-]_q-(CHR)_r-$, each p can independently be selected from 2, 3, 4, 5, and 6; or each p can be the same and can be 2, 3, 4, 5, or 6.

In moieties of Formula (2c), each $R^1$ can be $-[-(CHR)_p-X-]_q-(CHR)_r-$, each r can be selected from 2, 3, 4, 5, 6, 7, and 8.

In moieties of Formula (2c), each $R^1$ can be $-[-(CHR)_p-X-]_q-(CHR)_r-$, each q can be selected from 1, 2, 3, 4, and 5.

In moieties of Formula (2c), each $R^1$ can be $-[-(CHR)_p-X-]_q-(CHR)_r-$, each m can independently be an integer from 1 to 3. Each m can be the same such as 0, 1, 2, or 3.

In polythioether prepolymers of Formula (2c), s can be an integer from 0 to 30, an integer from 0 to 20, an integer from 0 to 10, or an integer from 0 to 5.

In polythioether prepolymers of Formula (2c), s can be 0, 1, 2, 3, 4, 5, 6, 7, 8, 9, or 10.

In polythioether prepolymers of Formula (2c), $R^1$ is $-[(-CH_2-)_p-X-]_q-(CH_2)_r-$, where p is 2, X is $-O-$, q is 2, r is 2, $R^2$ is ethanediyl, m is 2, and n is 9.

In polythioether prepolymers of Formula (2c), $R^1$ is selected from $C_{2-6}$ alkanediyl and $-[-(CHR)_p-X-]_q-(CHR)_r-$.

In moieties of Formula (2c), $R^1$ is $-[-(CHR)_p-X-]_q-(CHR)_r-$, and X is $-O-$ or X is $-S-$.

In moieties of Formula (2c), where $R^1$ is $-[-(CHR)_p-X-]_q-(CHR)_r-$, p is 2, r is 2, q is 1, and X is $-S-$; or where p is 2, q is 2, r is 2, and X is $-O-$; or p is 2, r is 2, q is 1, and X is $-O-$.

In moieties of Formula (2c), where $R^1$ is $-[-(CHR)_p-X-]_q-(CHR)_r-$, each R is hydrogen, or at least one R is methyl.

In moieties of Formula (2c), each $R^1$ is the same, or at least one $R^1$ is different.

In moieties of Formula (2c), s can be an integer from 1 to 20, or an integer from 1 to 10, such as 1, 2, 3, 4, 5, 6, 7, 8, 9, or 10.

In moieties of Formula (2c), each $R^1$ can be $C_{2-4}$ alkanediyl, n-ethane-diyl, n-propane-diyl, n-butane-diyl, n-pentane-diyl, or n-hexane-diyl.

A moiety of Formula (2c) can be derived from a urethane/urea-containing bis(alkenyl) ether, such as a urethane/urea-containing bis(alkenyl) ether of Formula (8a):

$$CH_2=CH-O-R^5-Y'-C(=O)-NH-R^4-NH-C(=O)-Y'-R-O-CH=CH_2 \quad (8a)$$

where Y', $R^4$, and $R^5$ are defined as in Formula (8).

A moiety of Formula (3a) can be derived from a divinyl ether, such as a divinyl ether of Formula (3):

$$CH_2=CH-O-(-R^2-O-)_m-CH=CH_2 \quad (3)$$

where m and $R^2$ are defined as in Formula (3a).

In polythioether prepolymers comprising a backbone of Formula (2c), each A can be a moiety of Formula (8).

In polythioether prepolymers comprising a backbone of Formula (2c), each A can independently be a moiety of Formula (8) or a moiety of Formula (3a), where at least one A is a moiety of Formula (8).

In polythioether prepolymers comprising a backbone of Formula (2c), from 1 mol % to 20 mol %, from 1 mol % to 15 mol %, from 1 mol % to 10 mol %, or from 2 mol % to 8 mol % of the A moieties can comprise moieties of Formula (8) and the remaining A moieties can be moieties of Formula (3a), where mol % is based on the total moles of -A- in the backbone of Formula (2c). For example, in a polythioether prepolymer of Formula (2c), 5 mol % of the A moieties can comprise a moiety of Formula (8) and 95 mol % of the A moieties can comprise a moiety of Formula (3a), where mol % is based on the total moles of moieties of Formula (8) and moieties of Formula (3a) forming the polythioether prepolymer comprising a backbone of Formula (2c).

In polythioether prepolymers comprising a backbone of Formula (2c), m can be, for example, an integer from 1 to 40, from 1 to 20, from 2 to 60, from 2 to 40, from 2 to 20, from 5 to 60, from 5 to 40, from 5 to 20, from 10 to 40, or an integer from 10 to 30.

In polythioether prepolymers of Formula (2c) the polythioether prepolymer can comprise a thiol-terminated polythioether prepolymer of Formula (2d), a thiol-terminated polythioether prepolymer of Formula (2e), or a combination thereof:

$$HS-R^1-[-S-A-S-R^1-]_s-SH \quad (2d)$$

$$\{HS-R^1-[-S-A-S-R^1-]_s-S-V'-\}_zB \quad (2e)$$

where s, $R^1$, A, B, z, and V' are defined as for Formula (2c) and Formula (8); and at least one A comprises a moiety of Formula (3a).

A thiol-terminated sulfur-containing prepolymer can comprise a thiol-terminated sulfur-containing polyformal.

Sulfur-containing polyformal prepolymers useful in sealant applications are disclosed, for example, in U.S. Pat. No. 8,729,216 and in U.S. Pat. No. 8,541,513, each of which is incorporated by reference in its entirety.

A thiol-terminated sulfur-containing polyformal prepolymer can have the structure of Formula (9):

$$R^3-R^1-(S)_p-R^1-[O-C(R^2)_2-O-R^1-(S)_p-R^1-]_n-R^3 \quad (9)$$

where n is an integer selected from 1 to 50; each p is independently selected from 1 and 2; each $R^1$ comprises $C_{2-6}$ alkanediyl; each $R^2$ independently comprises hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; and each $R^3$ is $-OR^{3'}$ wherein $R^{3'}$ comprises a thiol-terminated group.

In sulfur-containing polyformal prepolymers of Formula (9), each $R^1$ can independently be $C_{2-6}$ alkanediyl, $C_{2-4}$ alkanediyl, $C_{2-3}$ alkanediyl, or ethane-1,2-diyl. In sulfur-containing polyformal prepolymers of Formula (9), each $R^1$ can be ethane-1,2-diyl.

In sulfur-containing polyformal prepolymers of Formula (9), each $R^2$ can independently be hydrogen, $C_{1-6}$ alkyl, $C_{1-4}$ alkyl, $C_{1-3}$ alkyl, or $C_{1-2}$ alkyl. In sulfur-containing polyformal prepolymers of Formula (9), each $R^2$ can be hydrogen, methyl, or ethyl.

In sulfur-containing polyformal prepolymers of Formula (9), each $R^1$ can be the same and can be $C_{2-3}$ alkanediyl such as ethane-1,2-diyl or propane-1,3-diyl; and each $R^2$ can be the same and can be hydrogen or $C_{1-3}$ alkyl such as methyl, ethyl, or propyl. In sulfur-containing polyformal prepolymers of Formula (9), each $R^1$ can be ethane-1,2-diyl. In sulfur-containing polyformal prepolymers of Formula (9), each $R^2$ can be hydrogen. In sulfur-containing polyformal prepolymers of Formula (9), each $R^1$ can be ethane-1,2-diyl and each $R^2$ can be hydrogen.

In sulfur-containing polyformal prepolymers of Formula (9), n can be an integer selected from 1 to 50, an integer from 2 to 40, an integer from 4 to 30, or n can be an integer from 7 to 30.

In sulfur-containing polyformal prepolymers of Formula (9), each p is the same and can be 1, and each p is the same and can be 2.

In sulfur-containing polyformal prepolymers of Formula (9) can have a number average molecular weight from 200 Daltons to 6,000 Daltons, from 500 Daltons to 5,000 Daltons, from 1,000 Daltons to 5,000 Daltons, from 1,500 Daltons to 4000 Daltons, or from 2,000 Daltons to 3,600 Daltons, where the number average molecular weight is determined by gel permeation chromatography using a polystyrene standard.

In sulfur-containing polyformal prepolymers of Formula (9), each $R^3$ can be a thiol-terminated group and can comprise a group of Formula (a), Formula (b), Formula (c), Formula (d), Formula (e), Formula (f), Formula (g), or Formula (h):

$$HS-R^7-R^6-O- \qquad (a)$$

$$HS-R^7-O- \qquad (b)$$

$$HS-R^7-S- \qquad (c)$$

$$HS- \qquad (d)$$

$$HS-R^7-NH-C(=O)-O- \qquad (e)$$

$$HS-R^7-C(=O)-O-R^9-NH-C(=O)-O- \qquad (f)$$

$$HS-R^7-C(=O)-NH-R^9-NH-C(=O)-O- \qquad (g)$$

$$HS-R^7-C(=O)-O- \qquad (h)$$

where each $R^6$ can be a moiety derived from a diisocyanate or a moiety derived from an ethylenically unsaturated monoisocyanate; each $R^7$ can be $C_{2-14}$ alkanediyl or $C_{2-14}$ heteroalkanediyl; and each $R^9$ can be $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, or substituted $C_{4-18}$ alkanecycloalkanediyl.

Sulfur-containing polyformal prepolymers provided by the present disclosure can have the structure of Formula (10):

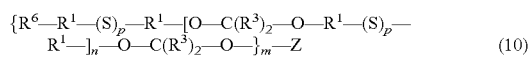

where each n is an integer selected from 1 to 50; m is an integer selected from 3 to 6; p is independently comprises 1 or 2; each $R^1$ independently comprises $C_{2-6}$ alkanediyl; each $R^3$ independently comprises hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, or substituted $C_{6-12}$ aryl; each $R^5$ is $-OR^{5'}$ wherein $R^{5'}$ can be a thiol-terminated group; and Z represents the core of an m-valent parent polyol $Z(OH)_m$.

In sulfur-containing polyformal prepolymers of Formula (10), each $R^1$ can independently be $C_{2-6}$ alkanediyl, $C_{2-4}$ alkanediyl, $C_{2-3}$ alkanediyl, or ethane-1,2-diyl. In sulfur-containing polyformal prepolymers of Formula (10), each $R^1$ can be ethane-1,2-diyl.

In sulfur-containing polyformal prepolymers of Formula (10), each $R^3$ can independently be hydrogen, $C_{1-6}$ alkyl, $C_{1-4}$ alkyl, $C_{1-3}$ alkyl, or $C_{1-2}$ alkyl. In sulfur-containing polyformal prepolymers of Formula (10), each $R^3$ can be hydrogen, methyl, or ethyl.

In sulfur-containing polyformal prepolymers of Formula (10), each $R^1$ can be the same and can be $C_{2-3}$ alkanediyl such as ethane-1,2-diyl or propane-1,3-diyl; and each $R^3$ is the same and can be hydrogen or $C_{1-3}$ alkyl such as methyl, ethyl, or propyl. In sulfur-containing polyformal prepolymers of Formula (10), each $R^1$ can be ethane-1,2-diyl. In sulfur-containing polyformal prepolymers of Formula (10), each $R^3$ can be hydrogen. In sulfur-containing polyformal prepolymers of Formula (10), each $R^1$ can be ethane-1,2-diyl and each $R^3$ can be hydrogen.

In sulfur-containing polyformal prepolymers of Formula (10), m can be 1, m can be 2, m can be 3, m can be 4, m can be 5, or m can be 6.

In sulfur-containing polyformal prepolymers of Formula (10) where m is 3, the parent polyol $Z(OH)_m$ can be a triol of Formula (11):

where each $R^2$ is independently $C_{1-6}$ alkanediyl, or a triol of Formula (12):

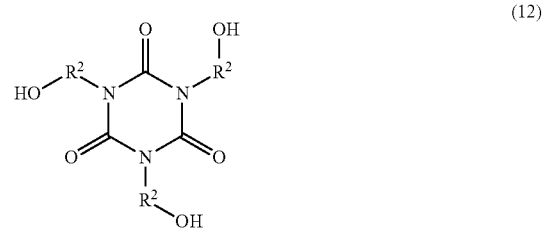

where each $R^2$ is independently $C_{1-6}$ alkanediyl. Accordingly, in these embodiments Z can have the structure:

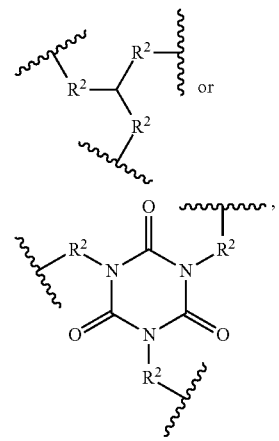

respectively, where each $R^2$ is independently $C_{1-6}$ alkanediyl.

In sulfur-containing polyformal prepolymers of Formula (10), each n can be an integer selected from 1 to 50, an integer selected from 2 to 40, an integer selected from 4 to 30, or an integer selected from 7 to 30.

In sulfur-containing polyformal prepolymers of Formula (10), each p can be the same and is 1, and each p is the same and is 2.

In sulfur-containing polyformal prepolymers of Formula (10) has a number average molecular weight from 200 Daltons to 6,000 Daltons, from 500 Daltons to 5,000 Daltons, from 1,000 Daltons to 5,000 Daltons, from 1,500 Daltons to 4000 Daltons, or from 2,000 Daltons to 3,600 Daltons, where the weight average molecular weight is determined by gel permeation chromatography using a polystyrene standard.

In sulfur-containing polyformal prepolymers of Formula (10), $R^6$ is $-OR^{5'}$, wherein each $R^5$ can be the same.

In sulfur-containing polyformal prepolymers of Formula (10), each $R^5$ can be a thiol-terminated group of Formula (a), Formula (b), Formula (c), Formula (d), Formula (e), Formula (f), Formula (g), or Formula (h):

$$HS-R^7-R^6-O- \quad (a)$$

$$HS-R^7-O- \quad (b)$$

$$HS-R^7-S- \quad (c)$$

$$HS- \quad (d)$$

$$HS-R^7-NH-C(=O)-O- \quad (e)$$

$$HS-R^7-C(=O)-O-R^9-NH-C(=O)-O- \quad (f)$$

$$HS-R^7-C(=O)-NH-R^9-NH-C(=O)-O- \quad (g)$$

$$HS-R^7-C(=O)-O- \quad (h)$$

where each $R^6$ can be a moiety derived from a diisocyanate or a moiety derived from an ethylenically unsaturated monoisocyanate; each $R^7$ can be $C_{2-14}$ alkanediyl or $C_{2-14}$ heteroalkanediyl; and each $R^9$ can be $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, or substituted $C_{4-18}$ alkanecycloalkanediyl.

A thiol-terminated sulfur-containing prepolymer can comprise a thiol-terminated polysulfide prepolymer.

A polysulfide prepolymer refers to a prepolymer that contains one or more polysulfide linkages, i.e., $-S_x-$ linkages, where x is from 2 to 4, in the prepolymer backbone and/or in pendant positions on the prepolymer chain. A polysulfide prepolymer can have two or more sulfur-sulfur linkages. Suitable polysulfides are commercially available, for example, from AkzoNobel and Toray Industries, Inc. under the names Thioplast® and Thiokol-LP®, respectively.

Examples of suitable polysulfide prepolymers are disclosed, for example, in U.S. Pat. Nos. 4,623,711; 6,172,179; 6,509,418; 7,009,032; and 7,879,955, each of which is incorporated by reference in its entirety.

Examples of suitable thiol-terminated polysulfides include Thioplast™ G polysulfides such as Thioplast™ G1, Thioplast™ G4, Thioplast™ G10, Thioplast™ G12, Thioplast™ G21, Thioplast™ G22, Thioplast™ G44, Thioplast™ G122, and Thioplast™ G131, which are commercially available from AkzoNobel. Thioplast™ G resins are liquid polysulfide polymers that are blends of di- and tri-functional molecules where the difunctional polysulfide polymers have the structure of Formula (13):

$$SH-(-R-S-S-)_n-R-SH \quad (13)$$

and the trifunctional polysulfide polymers have the structure of Formula (14):

$$HS-(-R-S-S-)_a-CH_2-CH\{-CH_2-(-S-S-R-)_b-SH\}\{-(-S-S-R-)_c-SH\} \quad (14)$$

where each R is $-(CH_2)_2-O-CH_2-O-(CH_2)_2-$, and n=a+b+c, where the value for n may be from 7 to 38 depending on the amount of the trifunctional cross-linking agent (1,2,3,-trichloropropane; TCP) used during synthesis of the polysulfide polymer. Thioplast™ G polysulfides can have a molecular weight from less than 1,000 Daltons to 6,500 Daltons, a SH content from 1% to greater than 5.5%, and a cross-linking density from 0% to 2.0%.

Examples of suitable thiol-terminated polysulfide prepolymers also include Thiokol™ LP polysulfides available from Toray Industries, Inc. such as Thiokol™ LP2, Thiokol™ LP3, Thiokol™ LP12, Thiokol™ LP23, Thiokol™ LP33, and Thiokol™ LP55. Thiokol™ LP polysulfides have an average molecular weight from 1,000 Daltons to 7,500 Daltons, a SH content from 0.8% to 7.7%, and a cross-linking density from 0% to 2%.

A thiol-terminated sulfur-containing prepolymer can comprise a Thiokol-LP® polysulfide, a Thioplast® G polysulfide, or a combination thereof.

A thiol-terminated sulfur-containing prepolymer can comprise a thiol-terminated monosulfide.

A thiol-terminated monosulfide can comprise a thiol-terminated monosulfide of Formula (15a), a thiol-terminated monosulfide of Formula (15b), or a combination thereof:

$$HS-R^2-[-S-(R-X)_p-(R^1-X)R^2-]_n-SH \quad (15a)$$

$$\{HS-R^2-[-S-(R-X)_p(R^1-X)_q-R^2-]_n-S-V'-\}_zB \quad (15b)$$

where,
each X independently can be S, O, or $NR^3$, where $R^3$ can be $C^{1-4}$ alkyl;
p is an integer from 1 to 5;
q is an integer from 0 to 5;
n is an integer from 1 t0 60;
each R can independently be $C_{2-10}$ alkanediyl, $C_{6-8}$ cycloalkanediyl, $C_{1-4}$ alkylcycloalkanediyl, or $C_{8-10}$ alkylarenediyl;
each $R^1$ can independently be $C_{1-10}$ alkanediyl, $C_{6-8}$ cycloalkanediyl, $C_{1-4}$ alkylcycloalkanediyl, or $C_{8-10}$ alkylarenediyl;
each $R^2$ can independently be $C_{2-10}$ alkanediyl, $C_{6-8}$ cycloalkanediyl, $C_{1-4}$ alkylcycloalkanediyl, or $C_{8-10}$ alkylarenediyl;
B represents a core of a z-valent polyfunctionalizing agent $B(-V)_z$ wherein:
z is an integer from 3 to 6; and
each V is a moiety comprising a terminal group reactive with a thiol group; and
each -V'- is derived from the reaction of -V with a thiol.

In thiol-terminated monosulfides of Formula (15a) and (15b), each X can independently be S or O, each X can be S, or each X can be O.

In thiol-terminated monosulfides of Formula (15a) and (15b), p can be an integer from 2 to 6, or p can be 1, 2, 3, 4, 5, or 6.

In thiol-terminated monosulfides of Formula (15a) and (15b), q can be an integer from 1 to 5, q can be an integer from 2 to 5, or q can be 0, 1, 2, 3, 4, or 5.

In thiol-terminated monosulfides of Formula (15a) and (15b), n can be an integer from 2 to 60, from 3 to 60, or from 25 to 35.

In thiol-terminated monosulfides of Formula (15a) and (15b), each R can independently be $C_{2-10}$ alkanediyl or $C_{6-8}$ cycloalkanediyl, each R can be $C_{2-10}$ alkanediyl, or each R can be $C_{6-8}$ cycloalkanediyl.

In thiol-terminated monosulfides of Formula (15a) and (15b), each R can be $C_{2-6}$ alkanediyl, $C_{2-4}$ alkanediyl, $C_{3-10}$ alkanediyl, or $C_{3-6}$ alkanediyl.

In thiol-terminated monosulfides of Formula (15a) and (15b), each R can be ethanediyl, 1,3-propanediyl, 1,2-propanediyl, 1,4-butanediyl, or 1,3-butanediyl.

In thiol-terminated monosulfides of Formula (15a) and (15b), each $R^1$ can independently be $C_{1-10}$ alkanediyl or $C_{6-8}$ cycloalkanediyl, each R can comprise $C_{1-10}$ alkanediyl, or each $R^1$ can comprise $C_{6-8}$ cycloalkanediyl.

In thiol-terminated monosulfides of Formula (15a) and (15b), each $R^1$ can be $C_{1-6}$ alkanediyl, $C_{1-4}$ alkanediyl, $C_{2-10}$ alkanediyl, or $C_{2-6}$ alkanediyl.

In thiol-terminated monosulfides of Formula (15a) and (15b), each $R^1$ can be methanediyl, ethanediyl, 1,3-propanediyl, 1,2-propanediyl, 1,4-butanediyl, or 1,3-butanediyl.

In thiol-terminated monosulfides of Formula (15a) and (15b), each $R^2$ can independently be $C_{2-10}$ alkanediyl or $C_{6-8}$ cycloalkanediyl, each $R^2$ can comprise $C_{2-10}$ alkanediyl, or each $R^2$ can be $C_{6-8}$ cycloalkanediyl.

In thiol-terminated monosulfides of Formula (15a) and (15b), each $R^2$ can be $C_{2-6}$ alkanediyl, $C_{2-4}$ alkanediyl, $C_{3-10}$ alkanediyl, or $C_{3-6}$ alkanediyl.

In thiol-terminated monosulfides of Formula (15a) and (15b), each $R^2$ can be ethanediyl, 1,3-propanediyl, 1,2-propanediyl, 1,4-butanediyl, or 1,3-butanediyl.

In thiol-terminated monosulfides of Formula (15a) and (15b), p can be 1 or 2, q can be 1 or 2, n can be an integer from 1 to 60 or an integer from 25 to 35, each X can be O or S, each R can be $C_{2-4}$ alkanediyl, each $R^1$ can be $C_{1-4}$ alkanediyl, and each $R^2$ can be $C_{2-4}$ alkanediyl.

In thiol-terminated monosulfides of Formula (15a) and (15b), p can be 1 or 2, q can be 1 or 2, n can be an integer from 1 to 60 or an integer from 25 to 35, each X can be O or S, each R can be $C_2$ alkanediyl, each $R^1$ can be $C_1$ alkanediyl, and each $R^2$ can be $C_2$ alkanediyl.

In thiol-terminated monosulfides of Formula (15a) and (15b), p can be 1 or 2, q can be 1 or 2, n can be an integer from 1 to 60 or an integer from 25 to 35, each X can be O, each R can be $C_2$ alkanediyl, each $R^1$ can be $C_{1-4}$ alkanediyl, and each $R^2$ can be $C_2$ alkanediyl.

In thiol-terminated monosulfides of Formula (15a) and (15b), B represents a core of a z-valent polyfunctionalizing agent $B(-V)_z$ and $B(-V)_z$ can be 1,2,3-trichloropropane, 1,1,1-tris(chloromethyl)propane, 1,1,1-tris(chloromethyl)ethane, and 1,3,5-tris(chloromethyl)benzene, or a combination of any of the foregoing.

Thiol-terminated monosulfides of Formula (15a) and (15b) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl) formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfides of Formula (15a) and (15b) are disclosed, for example, in U.S. Pat. No. 7,875,666, which is incorporated by reference in its entirety.

A thiol-terminated monosulfide can comprise a thiol-terminated monosulfide of Formula (16a), a thiol-terminated monosulfide of Formula (16b), or a combination thereof:

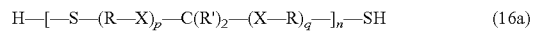

$$H-[-S-(R-X)_p-C(R')_2-(X-R)_q-]_n-SH \quad (16a)$$

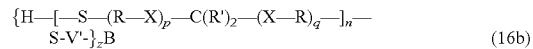

$$\{H-[-S-(R-X)_p-C(R')_2-(X-R)_q-]_n-S-V'-\}_zB \quad (16b)$$

where,
each X can independently be S or O;
p is an integer from 1 to 5;
q is an integer from 1 to 5;
n is an integer from 1 to 60;
each R can independently be $C_{2-10}$ alkanediyl;
each $R^1$ can independently be hydrogen or $C_{1-10}$ alkanediyl;
B represents a core of a z-valent polyfunctionalizing agent $B(-V)_z$ wherein:
z is an integer from 3 to 6; and
each V is a moiety comprising a terminal group reactive with a thiol group; and
each -V'- is derived from the reaction of -V with a thiol.

In thiol-terminated monosulfides of Formula (16a) and (16b), each X can be S, or each X can be O.

In thiol-terminated monosulfides of Formula (16a) and (16b), p can be an integer from 2 to 5, or q can be 1, 2, 3, 4, or 5.

In thiol-terminated monosulfides of Formula (16a) and (16b), n can be an integer from 2 to 60, from 3 to 60, or from 25 to 35.

In thiol-terminated monosulfides of Formula (16a) and (16b), each R can independently be $C_{2-6}$ alkanediyl or $C_{2-4}$ alkanediyl.

In thiol-terminated monosulfides of Formula (16a) and (16b), each R can be ethanediyl, 1,3-propanediyl, 1,2-propanediyl, 1,4-butanediyl, or 1,3-butanediyl.

In thiol-terminated monosulfides of Formula (16a) and (16b), each R can be $C_{2-10}$ n-alkanediyl, $C_{2-10}$ branched alkanediyl, or a combination thereof.

In thiol-terminated monosulfides of Formula (16a) and (16b), each $R^1$ can independently be hydrogen or $C_{2-6}$ alkanediyl.

In thiol-terminated monosulfides of Formula (16a) and (16b), each $R^1$ can independently be hydrogen, ethanediyl, 1,3-propanediyl, 1,2-propanediyl, 1,4-butanediyl, or 1,3-butanediyl.

In thiol-terminated monosulfides of Formula (16a) and (16b), each $R^1$ can be $C_{1-10}$ n-alkanediyl, $C_{1-10}$ branched alkanediyl, or a combination thereof.

In thiol-terminated monosulfides of Formula (16a) and (16b), each X is O, p is 1 or 2, q is 1 or 2, n is 1 to 60 such as 2 to 60, each R is $C_{2-4}$ alkanediyl such as ethanediyl, and each $R^1$ is hydrogen.

In thiol-terminated monosulfides of Formula (16a) and (16b), each X is O, p is 1, q is 1, n is 1 to 60 such as 2 to 60, each R is $C_{2-4}$ alkanediyl such as ethanediyl, and each $R^1$ is hydrogen.

In thiol-terminated monosulfides of Formula (16a) and (16b), each X is O, p is 2, q is 2, n is 1 to 60 such as 2 to 60, each R is $C_{2-4}$ alkanediyl such as ethanediyl, and each $R^1$ is hydrogen.

In thiol-terminated monosulfides of Formula (16a) and (16b), B represents a core of a z-valent polyfunctionalizing agent $B(-V)_z$ and $B(-V)_z$ can be 1,2,3-trichloropropane, 1,1,1-tris(chloromethyl)propane, 1,1,1-tris(chloromethyl)ethane, and 1,3,5-tris(chloromethyl)benzene, or a combination of any of the foregoing.

Thiol-terminated monosulfides of Formula (16a) and (16b) can be prepared by reacting an α,ω-dihalo organic compounds, a metal hydrosulfide, a metal hydroxide, and an optional polyfunctionalizing agent. Examples of suitable α,ω-dihalo organic compounds include bis(2-chloroethyl) formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene. Methods of synthesizing thiol-terminated monosulfides of Formula (16a) and (16b) are disclosed, for example, in U.S. Pat. No. 8,466,220, which is incorporated by reference in its entirety.

A thiol-terminated monosulfide can comprise a thiol-terminated monosulfide of Formula (17a), a thiol-terminated monosulfide of Formula (17b), or a combination thereof:

$$HS-R-(S_y-R)_t-SH \qquad (17a)$$

$$\{HS-R-(S_y-R)_t-S-V'-\}_zB \qquad (17b)$$

where,
t is an integer from 1 to 60;
y has an average value within a range from 1.0 to 1.5;
each R can independently be branched alkanediyl, branched arenediyl, or a moiety having the structure $-(CH_2)_p-O-(CH_2)_q-O-(CH_2)_r-$; wherein,
q is an integer from 1 to 8;
p is an integer from 1 to 10; and
r is an integer from 1 to 10;
B represents a core of a z-valent polyfunctionalizing agent $B(-V)_z$ wherein:
z is an integer from 3 to 6; and
each V is a moiety comprising a terminal group reactive with a thiol group; and
each -V'- is derived from the reaction of -V with a thiol.

In thiol-terminated monosulfides of Formula (17a) and Formula (17b), t can be, for example, an integer from 2 to 60, from 1 to 40, or from 1 to 20.

In thiol-terminated monosulfides of Formula (17a) and Formula (17b), where R is $-(CH_2)_p-O-(CH_2)_q-O-(CH_2)_r-$, q can be, for example, an integer from 1 to 6, or an integer from 1 to 4. For example, q can be 1, 2, 3, 4, 5 or 6.

In thiol-terminated monosulfides of Formula (17a) and Formula (17b), where R is $-(CH_2)_p-(CH_2)_q-O-(CH_2)_r-$, each p can be, for example, an integer from 1 to 6 or from 1 to 4. For example, each p can be 1, 2, 3, 4, 5, 6, 7, 8, 9, or 10.

In thiol-terminated monosulfides of Formula (17a) and Formula (17b), where R is $-(CH_2)_p-O-(CH_2)_q-O-(CH_2)_r-$, each r can be, for example, an integer from 1 to 6 or from 1 to 4. For example, each p can be 1, 2, 3, 4, 5, 6, 7, 8, 9, or 10.

In thiol-terminated monosulfides of Formula (17a) and Formula (17b), y can have a value of 1.

In thiol-terminated monosulfides of Formula (17a) and Formula (17b), R can be $-(CH_2)_p-O-(CH_2)_q-O-(CH_2)_r-$.

In thiol-terminated monosulfides of Formula (17a) and Formula (17b), R can be $-(CH_2)_p-O-(CH_2)_q-O-(CH_2)_r-$, each q can be 1, 2, 3, or 4, and each p and r can be 1 or 2.

In thiol-terminated monosulfides of Formula (17a) and Formula (17b), 0 mol % to 20 mol % of the R groups can comprise branched alkanediyl or branched arenediyl, and 80 mol % to 100 mol % of the R groups can comprise $-(CH_2)_p-O-(CH_2)_q-O-(CH_2)_r-$, where mol % is based on the total moles of R groups.

In thiol-terminated monosulfides of Formula (17a) and Formula (17b), B represents a core of a z-valent polyfunctionalizing agent $B(-V)_z$ and $B(-V)_z$ can comprise, for example, 1,2,3-trichloropropane, 1,1,1-tris(chloromethyl) propane, 1,1,1-tris(chloromethyl)ethane, and 1,3,5-tris(chloromethyl)benzene, or a combination of any of the foregoing.

Thiol-terminated monosulfides of Formula (17a) and Formula (17b) can be prepared by reacting an α,ω-dihalo organic compound, a metal hydrosulfide, a metal hydroxide, and an optional polyfunctionalizing agent. Examples of suitable α,ω-dihalo organic compounds include bis(2-chloroethyl)formal. Examples of suitable metal hydrosulfides and metal hydroxides include sodium hydrosulfide and sodium hydroxide. Examples of suitable polyfunctionalizing agents include 1,2,3-trichloropropane, 1,1,1-tris(chloromethyl)propane, 1,1,1-tris(chloromethyl)ethane, and 1,3,5-tris(chloromethyl)benzene.

Examples of thiol-terminated monosulfides of Formula (17a) and Formula (17b) are disclosed, for e U.S. Application Publication No. 2016/0152775 and in U.S. Pat. No. 9,079,833.

A thiol-terminated monosulfide can comprise a thiol-terminated monosulfide of Formula (18):

$$HS-(R-O-CH_2-O-R-S_m-)_{n-1}-R-O-CH_2-O-R-SH \qquad (18)$$

where R is $C_{2-4}$ alkanediyl, m is 1-8, and n is an integer from 2 to 370

In thiol-terminated monosulfides of Formula (18), m can be, for example, an integer from 1 to 6, and integer from 1 to 4, or the integer 1, 2, 3, 4, 5, 6, 7, or 8.

In thiol-terminated monosulfides of Formula (18), n can be, for example, an integer from 2 to 200 or an integer from 2 to 100.

In thiol-terminated monosulfides of Formula (18), each R can independently be ethanediyl, 1,3-propanediyl, 1,1-propanediyl, 1,2-propanediyl, 1,4-butanediyl, 1,1-butanediyl, 1,2-butanediyl, or 1,3-butanediyl.

Examples of thiol-terminated monosulfides of Formula (18) are disclosed, for example, in JP 62-53354.

Thiol-terminated monosulfides can be liquid at room temperature. Thiol-terminated monosulfides can have a viscosity, at 100% solids, of no more than 1,500 poise (150 Pa-sec), such as 40 poise to 500 poise (4 Pa-sec to 50 Pa-sec), at a temperature of about 25° C. and a pressure of about 760 mm Hg (101 kPa) determined according to ASTM D-2849 § 79-90 using a Brookfield CAP 2000 viscometer.

Thiol-terminated monosulfides can have a number average molecular weight within a range from 300 Daltons to 10,000 Daltons, such as within a range 1,000 Daltons to 8,000 Daltons, the molecular weight being determined by gel-permeation chromatography using a polystyrene standard. Thiol-terminated monosulfides can have a glass transition temperature $T_g$ less than −40° C., less than −55° C., or less than −60° C.

Thiol-terminated sulfur-containing prepolymers can be modified to include terminal alkenyl groups by reacting the thiol-terminated sulfur-containing prepolymer with a polyalkenyl ether, such as a bis(alkenyl)ether under suitable reaction conditions.

Compositions provided by the present disclosure can comprise a polyalkenyl or combination of polyalkenyls. A polyalkenyl can be difunctional, or can have a alkenyl-functionality greater than two (2) such as from 3 to 6, including an alkenyl functionality of 3, 4, 5, or 6. A polyalkenyl can comprise a polyallyl compound, a bis(alkenyl) ether, a sulfur-containing bis(alkenyl) ether, or a combination of any of the foregoing. A polyalkenyl can react with a thiol-terminated sulfur-containing prepolymer via a free radical reaction, such as a dual cure free radical reaction mechanism, to provide a cured sealant.

Curable compositions provided by the present disclosure can comprise, for example, from 1 wt % to 10 wt % of a polyalkenyl or combination of polyalkenyls, from 2 wt % to 9 wt %, from 3 wt % to 8 wt %, or from 4 wt % to 7 wt % of a polyalkenyl or combination of polyalkenyl, where wt % is based on the total weight of the curable composition.

A polyalkenyl can comprise any suitable compound comprising two or more alkenyl groups. A polyalkenyl can comprise an alkenyl-terminated prepolymer, such as an alkenyl-terminated sulfur-containing prepolymer. A polyalkenyl can comprise a polyalkenyl monomer, having a low molecular weight such as, for example, a molecular weight less than 1,000 Daltons, less than 800 Daltons, less than 600 Daltons, or less than 400 Daltons. A polyalkenyl can comprise a polyalkenyl-terminated prepolymer, a polyalkenyl monomer, or a combination thereof. A polyalkenyl can have, for example, 2, 3, 4, 5, or 6 terminal alkenyl groups. A polyalkenyl can comprise a bis(alkenyl) ether, a poly(alkenyl) ether, a sulfur-containing bis(alkenyl) ether, a sulfur-containing poly(alkenyl) ether, a urethane/urea-containing bis(alkenyl) ether, a urethane/urea containing poly(alkenyl) ether, or a combination of any of the foregoing. A poly(alkenyl) ether refers to an alkenyl the having more than two terminal alkenyl groups such as from 3 to 6 terminal alkenyl groups.

A polyalkenyl can have the structure of Formula (19):

$$CH_2=CH-R-CH=CH_2 \quad (19)$$

where R is selected from $C_{1-10}$ alkanediyl, $C_{5-10}$ cycloalkanediyl, $C_{6-20}$ alkanecycloalkanediyl, $C_{1-10}$ heteroalkanediyl, $C_{5-10}$ heterocycloalkanediyl, $C_{6-20}$ heteroalkanecycloalkanediyl, substituted $C_{1-10}$ alkanediyl, substituted $C_{5-10}$ cycloalkanediyl, substituted $C_{6-20}$ alkanecycloalkanediyl, substituted $C_{1-10}$ heteroalkanediyl, substituted $C_{5-10}$ heterocycloalkanediyl, and substituted $C_{6-20}$ heteroalkanecycloalkanediyl.

A polyalkenyl can have more than two terminal alkenyl groups and can be, for example, any of the alkenyl-terminated polyfunctionalizing agents disclosed herein.

A polyalkenyl can comprise a bis(alkenyl) ether. Compositions provided by the present disclosure can comprise a bis(alkenyl)ether or a combination of bis(alkenyl)ethers.

A bis(alkenyl)ether can have the structure of Formula (3):

$$CH_2=CH-O-(-R^2-O-)_m-CH=CH_2 \quad (3)$$

wherein,
  m is 0 to 50; and
  each $R^2$ can independently be $C_{2-6}$ n-alkanediyl, $C_{3-6}$ branched alkanediyl, $C_{6-8}$ cycloalkanediyl, $C_{6-10}$ alkanecycloalkanediyl, or $-[(-CH_2-)_p-O-]_q-(-CH_2-)_r-$, wherein,
  each p is independently an integer ranging from 2 to 6;
  q is an integer from 1 to 5; and
  r is an integer from 2 to 10.

In bis(alkenyl)ethers of Formula (3), m can be an integer from 0 to 50, such as an integer from 1 to 6, from 1 to 4, or from 1 to 3.

In bis(alkenyl)ethers of Formula (3), m can be 1, 2, 3, 4, 5, or 6.

In bis(alkenyl)ethers of Formula (3), each $R^2$ can independently be $C_{2-6}$ alkanediyl such as 1,2-ethane-diyl, 1,3-propane-diyl, 1,4-butane-diyl, 1,5-pentane-diyl, or 1,6-hexane-diyl.

In bis(alkenyl)ethers of Formula (3), each $R^2$ can be $-[(-CH_2-)_p-O-]_q-(-CH_2-)_r-$.

In bis(alkenyl)ethers of Formula (3), each $R^2$ can be $-[(-CH_2-)_p-O-]_q-(-CH_2-)_r-$, where each p can be 2, each r can be 2, and q can be 1, 2, 3, 4, or 5.

Examples of suitable bis(alkenyl)ethers include divinyl ether, ethylene glycol divinyl ether (EG-DVE), butanediol divinyl ether (BD-DVE), hexanediol divinyl ether (HD-DVE), diethylene glycol divinyl ether (DEG-DVE), triethylene glycol divinyl ether (TEG-DVE), tetraethylene glycol divinyl ether, and cyclohexanedimethanol divinyl ether.

Suitable bis(alkenyl)ethers include, for example, compounds having at least one oxyalkanediyl group, such as from 1 to 4 oxyalkanediyl groups, i.e., compounds in which m in Formula (3) is an integer from 1 to 4. In Formula (3), m can be an integer ranging from 2 to 4. It is also possible to employ commercially available divinyl ether mixtures that are characterized by a non-integer average value for the number of oxyalkanediyl units per molecule. Thus, m in Formula (3) can also take on rational number values, for example, ranging from 0 to 10.0, such as from 1.0 to 10.0, from 1.0 to 4.0, from 2.0 to 4.0 or from 2.1 to 3.9.

Examples of suitable bis(alkenyl)ethers include, divinyl ether, ethylene glycol divinyl ether (EG-DVE) ($R^2$ in Formula (3) is ethanediyl and m is 1), butanediol divinyl ether (BD-DVE) ($R^2$ in Formula (3) is butanediyl and m is 1), hexanediol divinyl ether (HD-DVE) ($R^2$ in Formula (3) is hexanediyl and m is 1), diethylene glycol divinyl ether (DEG-DVE) ($R^2$ in Formula (3) is ethanediyl and m is 2), triethylene glycol divinyl ether ($R^2$ in Formula (3) is ethanediyl and m is 3), tetraethylene glycol divinyl ether (TEG-DVE) ($R^2$ in Formula (3) is ethanediyl and m is 4), cyclohexanedimethanol divinyl ether, cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such divinyl ether monomers. A bis(alkenyl)ether may have one or more pendant groups selected from alkyl groups, hydroxyl groups, alkoxy groups, and amino groups. A bis(alkenyl)ether can comprise an aliphatic bis(alkenyl)ether, a cycloaliphatic bis(alkenyl)ether or a combination thereof.

Bis(alkenyl)ethers in which $R^2$ in Formula (3) is $C_{3-6}$ branched alkanediyl may be prepared by reacting a polyhydroxyl compound with acetylene. Examples of bis(alkenyl) ethers of this type include compounds in which $R^2$ in Formula (3) is an alkyl-substituted methanediyl group such as $-CH(CH_3)-$ (for example Pluriol® blends such as Pluriol®E-200 divinyl ether (BASF Corporation), for which $R^2$ in Formula (3) is ethanediyl and m is 3.8) or an alkyl-substituted ethanediyl (for example $-CH_2CH(CH_3)-$ such as DPE polymeric blends including DPE-2 and DPE-3, International Specialty Products).

Other useful bis(alkenyl)ethers include compounds in which $R^2$ in Formula (3) is polytetrahydrofuryl (poly-THF) or polyoxyalkanediyl, such as those having an average of about 3 monomer units.

A polyalkenyl can comprise a sulfur-containing bis(alkenyl)ether or a combination of sulfur-containing bis(alkenyl) ethers. Sulfur-containing bis(alkenyl) ethers are disclosed in PCT International Application No. WO 2018/085650, which is incorporated by reference in its entirety. A sulfur-containing bis(alkenyl)ether can have the structure of Formula (7a):

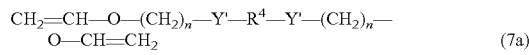
$$CH_2=CH-O-(CH_2)_n-Y'-R^4-Y'-(CH_2)_n-O-CH=CH_2 \quad (7a)$$

wherein,
each n is independently an integer from 1 to 4;
each Y' independently comprises —O— or —S—; and
R⁴ can be $C_{2-6}$ n-alkanediyl, $C_{3-6}$ branched alkanediyl, $C_{6-8}$ cycloalkanediyl, $C_{6-10}$ alkanecycloalkanediyl, or —[(—CH₂—)$_p$—X—]$_q$—(—CH₂—)$_r$—, wherein,
each X independently can be —O—, —S—, or —S—S—;
p is an integer from 2 to 6;
q is an integer from 1 to 5; and
r is an integer from 2 to 6; and
at least one Y' is —S—, or R⁴ is —[(—CH₂—)$_p$—X—]$_q$—(—CH₂—)$_r$— and at least one X is —S— or —S—S—.

In sulfur-containing bis(alkenyl) ethers of Formula (7a), each n can be 1, 2, 3, or 4.

In sulfur-containing bis(alkenyl) ethers of Formula (7a), each Y' can be —O— or each Y' can be —S—.

In sulfur-containing bis(alkenyl) ethers of Formula (7a), R⁴ can be $C_{2-6}$ n-alkanediyl, such as ethane-diyl, n-propane-diyl, n-butane-diyl, n-pentane-diyl, or n-hexane-diyl.

In sulfur-containing bis(alkenyl) ethers of Formula (7a), R⁴ can be $C_{2-6}$ n-alkanediyl; both Y' can be —S— or one Y' can be —S— and the other Y' can be —O—.

In sulfur-containing bis(alkenyl) ethers of Formula (7a), R⁴ can be —[(—CH₂—)$_p$—X—]$_q$—(—CH₂—)$_r$—.

In sulfur-containing bis(alkenyl) ethers of Formula (7a), R⁴ can be —[(—CH₂—)$_p$—X—]$_q$—(—CH₂—)$_r$—, where each X can be —O— or each X can be —S—S— or at least one X can be —O— or at least one X can be —S—S—.

In sulfur-containing bis(alkenyl) ethers of Formula (7a), R⁴ can be —[(—CH₂—)$_p$—X—]$_q$—(—CH₂—)$_r$—, where each X can be —S— or at least one X can be —S—.

In sulfur-containing bis(alkenyl) ethers of Formula (7a), R⁴ can be —[(—CH₂—)$_p$—X—]$_q$—(—CH₂—)$_r$—, where each p can be 2 and r can be 2.

In sulfur-containing bis(alkenyl) ethers of Formula (7a), R⁴ can be —[(—CH₂—)$_p$—X—]$_q$—(—CH₂—)$_r$—, where q can be 1, 2, 3, 4, or 5.

In sulfur-containing bis(alkenyl) ethers of Formula (7a), R⁴ can be —[(—CH₂—)$_p$—X—]$_q$—(—CH₂—)$_r$—, where each p can be 2, r can be 2, and q can be 1, 2, 3, 4, or 5.

In sulfur-containing bis(alkenyl) ethers of Formula (7a), R⁴ can be —[(—CH₂—)$_p$—X—]$_q$—(—CH₂—)$_r$—, where each X can be —S—; each p can be 2, r can be 2, and q can be 1, 2, 3, 4, or 5.

In sulfur-containing bis(alkenyl) ethers of Formula (7a), R⁴ can be —[(—CH₂—)$_p$—X—]$_q$—(—CH₂—)$_r$—, where each X can be —O—; each p can be 2, r can be 2, and q can be 1, 2, 3, 4, or 5.

In sulfur-containing bis(alkenyl) ethers of Formula (7a), R⁴ can be —[(—CH₂—)$_p$—X—]$_q$—(—CH₂—)$_r$—, where each X can be —O—; and each Y' can be —S—.

In sulfur-containing bis(alkenyl) ethers of Formula (7a), R⁴ can be —[(—CH₂—)$_p$—X—]$_q$—(—CH₂—)$_r$—, where each X can be —S—; and each Y' can be —O—.

In sulfur-containing bis(alkenyl) ethers of Formula (7a), each n can be 2, each Y' can be independently selected from —O— and —S—, and R⁴ can be —[(—CH₂—)$_p$—X—]$_q$—(—CH₂—)$_r$—, where each X is independently selected from —O—, —S—, and —S—S—, p can be 2, q can be selected from 1 and 2, and r can be 2.

In sulfur-containing bis(alkenyl) ethers of Formula (7a), each n can be 2, each Y' can be independently selected from —O— and —S—, and R⁴ can be $C_{2-4}$ alkanediyl, such as ethanediyl, n-propanediyl, or n-butanediyl.

Sulfur-containing bis(alkenyl) ethers can comprise sulfur-containing bis(alkenyl) ethers of Formula (7b), Formula (7c), Formula (7d), Formula (7e), Formula (7f), Formula (7g), Formula (7h), Formula (7i), or a combination of any of the foregoing:

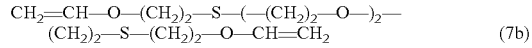  (7b)

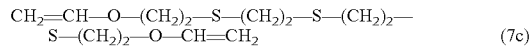  (7c)

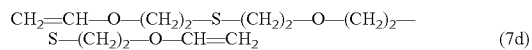  (7d)

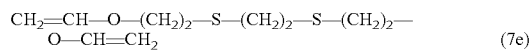  (7e)

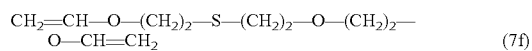  (7f)

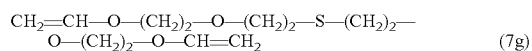  (7g)

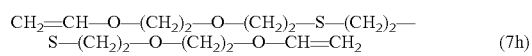  (7h)

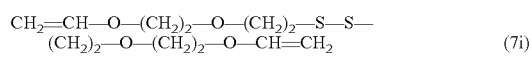  (7i)

Examples of suitable sulfur-containing bis(alkenyl) ethers include 3,9,12,18-tetraoxa-6,15-dithiaicosa-1,19-diene, 3,6,15,18-tetraoxa-9,12-dithiaicosa-1,19-diene, 3,15-dioxa-6,9,12-trithiaheptadeca-1,16-diene, 3,9,15-trioxa-6,12-dithiaheptadeca-1,16-diene, 3,6,12,15-tetraoxa-9-thiaheptadeca-1,16-diene, 3,12-dioxa-6,9-dithiatetradeca-1,13-diene, 3,6,12-trioxa-9-thiatetradeca-1,13-diene, 3,6,13,16-tetraoxa-9,10-dithiaoctadeca-1,17-diene, and combinations of any of the foregoing.

A sulfur-containing bis(alkenyl) ether provided by the present disclosure can be liquid at room temperature. A sulfur-containing bis(alkenyl) ether can have an number average molecular weight from 200 Daltons to 2,000 Daltons, from 200 Daltons to 1,500 Daltons, from 200 Daltons to 1,000 Daltons, from 200 Daltons to 800 Daltons, or from 300 Daltons to 500 Daltons, where the number average molecular weight is based on the molecular structure.

The synthesis of sulfur-containing bis(alkenyl)ethers is disclosed, for example, in PCT Application Publication No. 2018/085650, which is incorporated by reference in its entirety.

Sulfur-containing bis(alkenyl) ethers of Formula (7a) are difunctional. Sulfur-containing alkenyl ethers provided by the present disclosure can also include sulfur-containing polyalkenyl ethers having a functionality greater than two, such as a functionality from 3 to 6. Also, poly(alkenyl) ethers provided by the present disclosure can also include poly(alkenyl) ethers having a functionality greater than two, such as a functionality from 3 to 6.

For example, a sulfur-containing poly(alkenyl) ether or poly(alkenyl) ether can have the structure of Formula (7j):

  (7j)

wherein,
B comprises a core of a z-valent polyfunctionalizing agent B(-V)$_z$;
z is an integer from 3 to 6; and
each -V'- is an organic moiety; and
each R¹⁰ is a moiety comprising a terminal sulfur-containing alkenyl ether group, a terminal alkenyl ether group, or combination thereof.

A multifunctional sulfur-containing alkenyl ether can be derived from a sulfur-containing bis(alkenyl) ether of Formula (7a), by reacting a sulfur-containing bis(alkenyl) ether of Formula (7a) with a polyfunctionalizing agent, where the polyfunctionalizing agent comprises terminal groups reactive with alkenyl groups such as thiol groups. For example, a multifunctional alkenyl ether can be derived from a bis(alkenyl) ether of Formula (3), by reacting a bis(alkenyl) ether of Formula (3) with a polyfunctionalizing agent, where the polyfunctionalizing agent of comprises terminal groups reactive with alkenyl groups such as thiol groups.

For example, a polyfunctional sulfur-containing poly(alkenyl) ether can have the structure of Formula (7k):

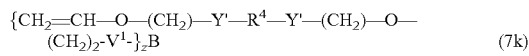

$$\{CH_2=CH-O-(CH_2)-Y'-R^4-Y'-(CH_2)-O-(CH_2)_2-V^1-\}_zB \quad (7k)$$

where n, Y', and $R^4$ are defined as in Formula (7a), z and B are defined as in Formula (2b), and -V'- can be derived from the reaction of -V with an alkenyl group.

In multifunctional sulfur-containing poly(alkenyl) ethers of Formula (7k), $B(-V)_z$ can be a polythiol such as any of those disclosed herein, such as 1,2,3-propanetrithiol or isocyanurate-containing trithiols.

Multifunctional sulfur-containing poly(alkenyl) ethers of Formula (7k) can be prepared by reacting a sulfur-containing bis(alkenyl) ether of Formula (7a) with a thiol-terminated polyfunctionalizing agent $B(-V)_z$ in the presence of a suitable catalyst such as an amine catalyst.

Similarly, multifunctional polyalkenyl ethers can have the structure of Formula (20):

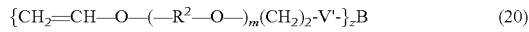

$$\{CH_2=CH-O-(-R^2-O-)_m(CH_2)_2-V'-\}_zB \quad (20)$$

where m, z, $R^2$, V' and B are defined as in Formula (3) and Formula (2b).

A polyalkenyl can have an alkenyl functionality greater than 2, such as an alkenyl functionality of 3, 4, 5, or 6. Examples of suitable polyalkenyls include 1,3,5-triallyl-1,3,5-triazine-2,4,6(1H,3H,5H)-trione, and triallyl cyanurate (2,4,6-triallyloxy-1,3,5-triazine).

Multifunctional sulfur-containing poly(alkenyl) ethers can be used to prepare sulfur-containing bis(alkenyl) ether-containing polythioether prepolymers provided by the present disclosure. For example, the reactants can include multifunctional sulfur-containing poly(alkenyl) ethers as part of the alkenyl component. Multifunctional sulfur-containing poly(alkenyl) ethers can be the only polyfunctional reactant having a functionality greater than 2 or may be used in combination with an alkenyl-terminated polyfunctionalizing agent such as triallyl cyanurate or triallylisocyanurate.

A polyalkenyl can comprise a urethane/urea-containing bis(alkenyl)ether or a combination of urethane/urea-containing bis(alkenyl)ethers. Urethane/urea-containing bis(alkenyl) ethers are disclosed in PCT International Application No. U.S. Application Publication No. 2017/0368737, which is incorporated by reference in its entirety.

A urethane/urea-containing bis(alkenyl) ether can have the structure of Formula (21):

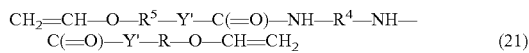

$$CH_2=CH-O-R^5-Y'-C(=O)-NH-R^4-NH-C(=O)-Y'-R-O-CH=CH_2 \quad (21)$$

wherein,
each Y' independently comprises —NH— or —O—;
$R^4$ comprises a core of a diisocyanate; and
each $R^5$ independently comprises $C_{1-10}$ alkanediyl, $C_{5-10}$ cycloalkanediyl, or $C_{6-20}$ cycloalkane-alkanediyl.

In urethane/urea-containing bis(alkenyl) ethers of Formula (21), each Y' can be —O—, each Y' can be —NH—, or one Y' can be —O— and one Y' can be —NH—.

In urethane/urea-containing bis(alkenyl) ethers of Formula (21), $R^5$ can be $C_{2-6}$ n-alkanediyl, such as ethane-diyl, n-propane-diyl, n-butane-diyl, n-pentane-diyl, or n-hexane-diyl.

In urethane/urea-containing bis(alkenyl) ethers of Formula (21), $R^5$ can be $C_{2-6}$ n-alkanediyl; both Y' can be —O—, both Y' can be —NH— or one Y' can be —NH— and the other Y' can be —O—.

A urethane/urea-containing bis(alkenyl) ether provided by the present disclosure can be liquid at room temperature. A urethane/urea-containing bis(alkenyl) ether can have an number average molecular weight from 200 Daltons to 2,000 Daltons, from 200 Daltons to 1,500 Daltons, from 200 Daltons to 1,000 Daltons, from 200 Daltons to 800 Daltons, or from 300 Daltons to 500 Daltons.

Urethane/urea-containing bis(alkenyl) ethers can be prepared by reacting a diisocyanate with a hydroxyl vinyl ether, an amino vinyl ether, or a combination of a hydroxyl vinyl ether and an amino vinyl ether.

For example, a urethane/urea-containing bis(alkenyl) ether can comprise reaction products of reactants comprising:
(a) a diisocyanate having the structure of Formula (22):

$$O=C=N-R^4-N=C=O \quad (22)$$

where $R^4$ comprises a core of a diisocyanate; and
(b) a vinyl ether having the structure of Formula (23):

$$CH_2=CH-O-R^5-Y \quad (23)$$

wherein,
Y is selected from —OH and —NH$_2$; and
$R^5$ comprises $C_{1-10}$ alkanediyl, $C_{5-10}$ cycloalkanediyl, or $C_{6-20}$ cycloalkane-alkanediyl.

In compounds of Formula (23), Y can be —NH$_2$, or Y can be —OH.

In compounds of Formula (23), $R^4$ can comprise the core of an aliphatic isocyanate.

In compounds of Formula (23), $R^5$ can be methane-diyl, ethane-diyl, butane-diyl, or pentane-diyl.

In compounds of Formula (23), $R^5$ can be cyclopentane-diyl or cylcohexane-diyl.

Urethane/urea-containing bis(alkenyl)ethers can be prepared by reacting a diisocyanate with a hydroxyl vinyl ether of Formula (22) where Y is —OH, an amino vinyl ether of Formula (23) where Y is —NH$_2$, or a combination of a hydroxyl vinyl ether of Formula (22) and an amino vinyl ether of Formula (23).

Urethane/urea-containing bis(alkenyl) ethers can be prepared by reacting a diisocyanate with a hydroxyl vinyl ether and/or amino vinyl ether in the presence of a tin catalyst such as dibutyl tin dilaurate.

Urethane/urea-containing bis(alkenyl) ethers of Formula (21) are difunctional. Urethane/urea-containing bis(alkenyl) ethers provided by the present disclosure also include multifunctional urethane/urea-containing bis(alkenyl) ethers having an alkenyl functionality greater than two, such as an alkenyl functionality from 3 to 6.

For example, a urethane/urea-containing bis(alkenyl) ether can have the structure of Formula (26):

$$B(-V^1-R^6)_z \quad (26)$$

wherein,
B comprises a core of a z-valent the polyalkenyl ether;
z is an integer from 3 to 6;
each -V'- is an organic moiety; and
each $R^6$ comprises a terminal urethane/urea-containing bis(alkenyl) ether group.

In a polyalkenyl ether of Formula (26), -V'- can be derived from the reaction of a polyfunctionalizing agent B(-V)$_z$ where V comprises a terminal group reactive with an alkenyl group such as a thiol group.

In polyalkenyl ethers of Formula (26), each $R^6$ can independently comprise a moiety of Formula (27):

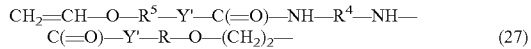

(27)

where Y', $R^4$, and $R^5$, are defined as for Formula (8a).

A multifunctional urethane/urea-containing bis(alkenyl) ether can be derived from a urethane/urea-containing bis (alkenyl) ether of Formula (8), for example, by reacting a urethane/urea-containing bis(alkenyl) ether of Formula (8a) with a polyfunctionalizing agent of Formula (1):

(1)

For example, a polyfunctional urethane/urea-containing bis(alkenyl) ether can have the structure of Formula (28):

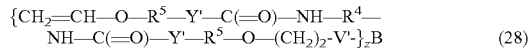

(28)

where Y', $R^4$, and $R^5$ are defined as in Formula (28), z and B are defined as in Formula (1), and V' can be derived from the reaction of V with an alkenyl group —CH=CH$_2$.

In multifunctional urethane/urea-containing bis(alkenyl) ethers of Formula (28), B(-V)$_z$ can be a polythiol such as any of those disclosed herein, such as 1,2,3-propane trithiol and isocyanurate-containing trithiols.

Multifunctional urethane/urea-containing bis(alkenyl) ethers of Formula (28) can be prepared by reacting a urethane/urea-containing bis(alkenyl) ether of Formula (21) with a thiol-terminated polyfunctionalizing agent B(-V)$_z$ in the presence of a suitable catalyst such as an amine catalyst.

A polyfunctional urethane/urea containing bis(alkenyl) ether can also have the structure of Formula (28a), Formula (28b), or a combination thereof:

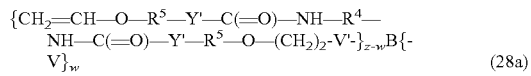

(28a)

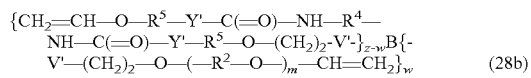

(28b)

wherein Y', $R^4$, $R^5$, V, V', $R^2$, and m are defined as for Formula (21) and Formula (1), and w is an integer from 1 to z–1.

Compositions provided by the present disclosure can comprise a metal complex or combination of metal complexes capable of generating free radicals.

Suitable metal complexes are capable of reacting with organic peroxides at temperatures from 20° C. to 25° C. to generate free radicals.

Suitable metal complexes include metal(II) ($M^{2+}$) and metal(III) ($M^{3+}$) complexes. The anions can be compatible with the other components of a curable composition. For example, suitable anions include organic anions.

In the presence of a suitable organic peroxides, suitable metal complexes can provide a fully cured composition, for example, within 7 days, within 10 days, within 14 days, within 21 days, or within 28 days.

Suitable metal complexes include metal complexes of cobalt, copper, manganese, iron, vanadium, potassium, cerium, and aluminum. Suitable ligands include organic ligands.

Examples of suitable metal(II) complexes include manganese(II) bis(tetramethylcyclopentadienyl), manganese(II) 2,4-pentanedioante, manganese(II) acetylacetonate, iron(II) acetylacetonate, iron(II) trifluoromethanesulfonate, iron(II) fumarate, cobalt(II) acetylacetonate, copper(II) acetylacetonate, and combinations of any of the foregoing.

Examples of suitable metal(III) complexes include manganese(III) 2,4-pentanedionate, manganese(III) acetylacetonate, manganese(III) methanesulfonate, iron(III)acetylacetonate, and combinations of any of the foregoing.

Examples of suitable metal complexes include Mn(III) (acac)$_3$, Mn(III)(2,2'-bipyridyl)$_2$(acac)$_3$, Mn(II)(acac)$_2$, V(acac)$_3$(2,2'-bipyridyl), Fe(III)acac)$_3$, and combinations of any of the foregoing.

Suitable Mn complexes can be formed with ligands including, for example, 2,2'-bipyridine, 1,10-phenanthroline, 1,4,7-trimethyl-4,7-triazacyclononane, 1,2-bis(4,7-dimethyl-1,4,7-triazacyclononan-1-yl)-ethane, N,N,N',N'',N''', N''''-hexamethyltriethylenetetraamine, aceytlacetonate (acac), N,N'-bis(alicylidene)cyclohexylenediamine, 5,10, 15,20-tetrakisphenylporphyrin, 5,10,15,20-tetrakis(4'-methoxyphenyl)porphyrin, porphyrin, 6-amino-1,4,6-trimethyl-1,4-diazacycloheptane, 6-dimethylamino-1,4-bis (pyridine-2-ylmethyl)-6-methyl-1,4-diazacycloheptane, 1,4, 6-trimethyl-6[N-pyridin-2-ylmethyl)-N-methylamino]-1,4-dizazcycloheptane, 4,11-dimethyl-1,4,8,11-tetraazabicyclo [6.6.2]hexadecane, and combinations of any of the foregoing.

Suitable Fe complexes can be formed with ligands including, for example, 1,4-deazacycloheptane-based ligands such as 6-amino-1,4,6-trimethyl-1,4-diazacycloheptane, 6-dimethylamino-1,4-bis(pyridine-2-ylmethyl)-6-methyl-1,4-diazacycloheptane, 1,4,6-trimethyl-6[N-(pyrinin-2-ylmethyl)-N-methylamino]-1,4-diazacycloheptane, bisphendimethyl 3-methyl-9-oxo-2, and 4-dipyridin-2-yl-7-(pyridin-2-ylmethyl)-3,7-diazbicyclo[3.3.1]nonane-1,3-dicarboxylate; and ferrocene based ligands such as ferrocene, acylferrocene, benzeneacycloferrocene, and N,N-bis(pyridin-2-ylmethyl)-1,1-bis(pyridine-2-yl)-1-amino-ethane; and combinations of any of the foregoing.

Suitable metal complexes can be trivalent or tetravalent.

The ligand of the metal complex can be selected to improve the storage stability of a formulation containing the metal complex. Metal complexes with an acetylacetonate ligand are observed to be storage stable.

Curable compositions provided by the present disclosure can comprise, for example, from 0.01 wt % to 3 wt %, metal complex, from 0.05 wt % to 2.5 wt %, from 0.1 wt % to 2 wt %, or from 0.5 wt % to 1.5 wt %, where wt % is based on the total weight of the curable composition.

Curable compositions provided by the present disclosure can comprise an organic peroxide or combination of organic peroxides.

Examples of suitable organic peroxides include ketone peroxides, diacyl peroxides, hydroperoxides, dialkyl peroxides, peroxyketals, alkyl peresters, and percarbonates.

Suitable organic peroxides include tert-butyl peroxide, cumene hydroperoxide, p-menthane hydroperoxide, di-tert-butyl peroxide, tert-butylcumyl peroxide, acetyl peroxide, isobutyryl peroxide, octanoyl peroxide, dibenzoyl peroxide, 3,5,5-trimethylhexanoyl peroxide, and tert-butyl peroxyisobutyrate. Additional examples of suitable organic peroxides include benzoyl peroxide, tert-butyl perbenzoate, o-methylbenzoyl peroxide, p-methylbenzoyl peroxide, di-tert-butyl peroxide, dicumyl peroxide, 1,1-bis(tert-butylperoxy)-3,3,5-trimethyl cyclohexane, 1,1-di(tert-butylperoxy) cyclohexane, 2,5-dimethyl-2,5-di(tert-butylperoxy)hexane, 2,5-dimethyl-2,5-di(tert-butylperoxy)hexane, 1,6-bis(p-toluoylperoxy carbonyloxy)hexane, di(4-methylbenzoyl peroxy)hexamethylene bis-carbonate, tert-butylcumyl peroxide, methyl ethyl ketone peroxide, cumene hydroperoxide, 2,5-dimethyl-2,5-di(tert-butylperoxy)hexane, 2,5-dimethyl-2,5-di(benzoylperoxy)hexane, 2,5-dimethyl-2,5-di(tert-butylperoxy)hexane, 1,3-bis(t-butylperoxypropyl) benzene, di-tert-butylperoxy-diisopropylbenzene, tert-butylperoxybenzene, 2,4-dichlorobenzoyl peroxide, 1,1-dibutylperoxy-3,3,5-trimethylsiloxane, n-butyl-4,4-di-tert-butyl peroxyvalerate, and combinations of any of the foregoing.

Examples of suitable organic peroxides include 3,3,5,7,7-pentamethyl-1,2,4-trioxepane, 2,5-dimethyl-2,5-di(tert-butylperoxy)hexyne-3, di-tert-butyl peroxide, 2,5-dimethyl-2,5-di(tert-butylperoxy)hexane, tert-butyl cumyl peroxide, di(tert-butylperoxyisopropyl)benzene, dicumyl peroxide, butyl 4,4-di(tert-butylperoxy)valerate, tert-butylperoxy 2-ethylhexyl carbonate, 1,1-di(tert-butylperoxy-3,3,5-trimethylcyclohexane, tert-butyl peroxybenzoate, di(4-methylbenzoyl) peroxide, dibenzoyl peroxide, and di(2,4-dichlorobenzoyl) peroxide, which are commercially available, for example, from AkzoNobel.

Compositions provided by the present disclosure can also contain a metal salt, such as, for example, Fe(II) sulfate heptahydrate or Mn(III)-stearate.

Curable compositions provided by the present disclosure can comprise, for example, from 0.2 wt % to 3 wt % of an organic peroxide, from 0.5 wt % to 3 wt %, from 0.7 wt % to 2.5 wt %, from 0.1 wt % to 2 wt %, from 0.2 wt % to 2 wt %, or from 0.2 wt % to 1 wt %, where wt % is based on the total weight of the curable composition.

Metal complexes and organic peroxides can be provided in dilute solutions of a solvent. For example the solutions can comprise from 1 wt % to 15 wt %, or from 5 wt % to 15 wt % of the metal complex or organic peroxide. Examples of solvents include acetylacetone, HB-40® (combination of terphenyls), toluene, water, isopropanol, methyl propyl ketone, hexanes, methanol, and cyclohexane.

The solvent can influence the application/gelation time and the curing time of a curable composition. For example in Fe(III)(acetylacetonate)$_3$ and Mn(III)(acetylacetonate)$_3$ systems, increasing the ratio of toluene to acetylacetonate in the solution can make the metal center more available for reaction by shifting the equilibrium in a direction where the ligand(s) can leave more easily. This mechanism should also be applicable with other ligand and metal-ligand complexes such as 2-ethylhexanoic acid and cobalt(II)bis(2-ethylhexanoate). Thus, by using different metals, organic anions, and solvent compositions, the cure time and the application time can be selected for dual cure systems.

Suitable solvents can have, for example, a polarity similar to that of toluene. Suitable solvents include, for example, toluene, o-xylene, cyclohexane, diethyl ether, methyl-tert-butyl ether, hexane, and ethyl acetate.

Suitable organic peroxides include those commercially available under the tradename Trigonox®, Butanox®, and Perkodox® from AkzoNobel, and, under the tradename Cadox® from Summit Composites Pty, Ltd.

Curable compositions provided by the present disclosure may not include an amine catalyst. An amine catalyst can reduce the tack free time. An amine catalyst can be selected to reduce the tack free time without compromising or negatively modifying the dark cure profile. An amine cure modifier can include a primary amine, a secondary amine, a tertiary amine or a combination of any of the foregoing.

Examples of suitable amine cure modifiers include diethyltoluenediamene, p-toluidine, N-(2-hydroxyethyl)-N-methyl-p-toluidine (MHPT), p-tolyldiethanolamine (TDEA), Ethacure® 300 (dimethylthiotoluenediamine and monomethylthiotoluenediamine), Ethacure® 100 (3,5-dimethylthio-2,4-toluenediamine. 3,5-dimethylthio-2,6-toluenediamine, and dialkylated m-phenylenediamines), p-tolyldiethanol amine, triethanolamine, 4,N,N'-trimethylaniline, N,N-dimethyl-para-p-toluidine, N,N-diisopropylethylamine, N,N,N',N'',N'''-pentamethyl-diethylenetriamine, tris(2-pyridylmethyl)amine, N-(2-hydroxyethyl)-N-methyl-p-toluidine, dihydroxyethyl, N,N-diethyltoluene-2,5-diamine, and combinations of any of the foregoing.

Examples of suitable primary amines include, for example, $C_{3-10}$ aliphatic primary amines.

Examples of suitable secondary amines include, for example, cycloaliphatic diamines such as Jefflink® 754 and aliphatic diamines such as Clearlink® 1000

Examples of suitable tertiary amines include aromatic tertiary amines such as toluene-based tertiary amines. Examples of suitable tertiary amines include for example, N,N-dimethylethanolamine (DMEA), diaminobicyclooctane (DABCO), triethylene diamine (TEDA), bis(2-dimethylaminoethyl)ether (BDMAEE), N-ethylmorpholine, N',N'-dimethylpiperazine, N,N,N',N',N''-pentamethyl-diethylenetriamine (PMDETA), N,N'-dimethylcyclohexylamine (DMCHA), N,N-dimehtylbenzylamine (DMBA), N,N-dimethylcethylamine, N,N,N',N'',N'''-pentamethyl-dipropylenetriamine (PMDPTA), triethylamine, and 1-(2-hydroxypropyl) imidazole.

Examples of other amine cure modifiers include triethylamine (TEA), dimethylcyclohexylamine (DMCHA), tetramethylethylenediamine, tetramethylpropanediamine, tetramethylhexamethylenediamine, pentamethyldiethylentriamine, pentamethyldipropylenetriamine, triethylendiamine (TEDA, DABCO), dimethylpiperazine, dimethylaminoethylmethylpiperazine, 1,2-dimethylimidiazole, N-ethylmorpholine, tris(dimethylaminopropyl)hexahydro-1,3-5-triazine, diazabicyclo octane (DABCO), N-alkyl morpholines (NAMs), amidines such as tetramethylguanidine (TMG), diazabicyclononene (DBN), diazabicyclo undecene (DBU) and imidazoles; and bicyclic guanidines such as 1,5,7,-triazabicyclo[4.4.0]dec-5-ene (TBD) and 1,5,7,-triazabicyclo[4.4.0]dec-5-ene, 7-methyl (MTBD).

An example of an amine synergist includes $Ce(NH_4)(NO_3)_6$.

Other cure modifiers can be used. For example, suitable cure modifiers include Butonox® P-50, ammonium persulfate, Borchi® OXY-coat 1310, potassium Hex-cem®, Polycure® 503 and FirstCure® MHPT. Examples of suitable cure modifiers are available from Borchers.

Fillers such as silica gel can also affect the curing profile of a sealant. Other fillers that are sensitive to actinic radiation and that can affect the curing profile include silica and alumina.

Curable compositions provided by the present disclosure can include one or more materials to modify the application time, the tack free time and/or the surface tackiness of the composition. The application time, the tack free time and/or the surface tackiness of the composition can be controlled or modified by incorporating, for example, a dark cure synergist, a dark cure co-catalyst, a singlet oxygen scavenger, a hydrogen (abstraction) donor, filler, or a combination of any of the foregoing. Compositions provided by the present disclosure can include, for example, from 0.01 wt % to 5 wt %, from 0.01 wt % to 3 wt %, from 0.01 wt % to 2 wt %, from 0.01 wt % to 1 wt %, or from 0.05 wt % to 1 wt % of such cure profile modifiers.

Examples of suitable dark cure synergists include hydrogen donors such as primary amines and secondary amines.

Examples of compounds that can modify the tack free time include stearic acid and -vinyl-2-norbornene, and combinations thereof.

Examples of suitable free radical scavengers include 2,5-diphenylfuran.

Examples of suitable singlet oxygen scavengers include ascorbic acid and Fe(II).

Examples of suitable hydrogen donors include primary amines, secondary amines, alcohols, hydroxyl-containing compounds, and combinations of any of the foregoing.

Curable compositions can comprise a solvent. The selection and amount of solvent in a dual cure sealant composition provided by the present disclosure can influence the tack free time. As solvent evaporates for the surface of a layer of sealant, the evaporating solvent can deplete the oxygen at the surface and therefore decrease the tack free time. In general, the use of volatile solvents can reduce the tack free time.

Curable compositions provided by the present disclosure can comprise a hydroxyl-functional vinyl ether or combination of hydroxyl-functional vinyl ethers.

A hydroxyl-functional vinyl ether can have the structure of Formula (29):

$$CH_2=CH-O-(CH_2)_t-OH \quad (29)$$

where t is an integer from 2 to 10. In hydroxyl-functional vinyl ethers of Formula (29), t can be 1, 2, 3, 4, 5, or t can be 6. Examples of suitable hydroxyl-functional vinyl ethers include 1-methyl-3-hydroxypropyl vinyl ether, 4-hydroxybutyl vinyl ether, and a combination thereof. A hydroxyl-functional vinyl ether can be 4-hydroxybutyl vinyl ether.

Curable compositions provided by the present disclosure can comprise, for example, from 0.1 wt % to 10 wt % of a hydroxyl-functional vinyl ether, from 0.2 wt % to 9 wt %, from 0.3 wt % to 0.7 wt % and from 0.4 wt % to 0.7 wt %, where wt % is based on the total weight of the curable composition.

Curable compositions provided by the present disclosure can comprise an amino-functional vinyl ether or combination of amino-functional vinyl ethers.

A amino-functional vinyl ether can have the structure of Formula (30):

$$CH_2=CH-O-(CH_2)_t-NH_2 \quad (30)$$

where t is an integer from 2 to 10. In amino-functional vinyl ethers of Formula (30), t can be 1, 2, 3, 4, 5, or t can be 6. Examples of suitable amino-functional vinyl ethers include 1-methyl-3-aminopropyl vinyl ether, 4-aminobutyl vinyl ether, and a combination of any of the foregoing. A amino-functional vinyl ether can be 4-aminobutyl vinyl ether.

Curable compositions provided by the present disclosure can comprise, for example, from 0.1 wt % to 10 wt % of an amino-functional vinyl ether, from 0.2 wt % to 9 wt %, from 0.3 wt % to 0.7 wt % and from 0.4 wt % to 0.7 wt %, where wt % is based on the total weight of the curable composition.

A curable composition can include a hydroxyl-functional vinyl ether and an amino-functional vinyl ether Compositions provided by the present disclosure can comprise a monomeric polythiol. A monomeric dithiol can have, for example, the structure of Formula (5).

A polythiol can comprise a polythiol having a thiol functionality greater than 2 such as a thiol functionality from 3 to 6, or a combination of any of the forgoing. A polythiol can comprise a combination of polythiols having an average thiol functionality greater than 2 such as a thiol functionality from 2.1 to 5.9, or from 2.1 to 2.9.

For example, a polythiol can be trifunctional, tetrafunctional, pentafunctional, hexafunctional, or a combination of any of the foregoing. A monomeric polythiol can comprise a trithiol.

Suitable thiol-terminated monomers include, for example, mercapto-propionates, mercapto-acetates, mercapto-acrylates, and other polythiols.

Examples of suitable mercapto-propionates include pentaerythritol tetra(3-mercapto-propionate) (PETMP), trimethylol-propane tri(3-mercaptopropionate) (TMPMP), glycol di(3-mercaptopropionate) (GDMP), tris[2-(3-mercaptopropionyloxy)ethyl]isocyanurate (TEMPIC), di-pentaerythritol hexa(3-mercaptopropionate) (di-PETMP), tri(3-mercaptopropionate) pentaerythritol, and tri-ethylolethane tri-(3-mercaptopropionate).

Examples of suitable thiol-terminated prepolymers include ethoxylated trimethylolpropane tri(3-mercaptopropionate) and polycaprolactone tetra-3-mercaptopropionate.

Examples of suitable mercapto-acetates include pentaerythritol tetramercaptoacetate (PRTMA), trimethylolpropane trimercaptoacetate (TMPMA), glycol dimercaptoacetate (GDMA), ethyleneglycol dimercaptoacetate, and di-trimethylolpropane tetramercaptoacetate.

Examples of suitable mercapto-acrylates include pentaerythritol tetra-acrylate, tris[2-(3-mercaptopropionyloxy)ethyl]isocyanurate, 2,3-di(2-mercaptoethylthio)-1-propanethiol, dimercaptodiethylsulfide (2,2'-thiodiethanethiol), dimercaptodioxaoctane (2,2'-(ethylenedioxy)diethanethiol, and 1,8-dimercapto-3,6-dioxaoctane.

Suitable thiol-terminated monomers are commercially available from Bruno Bock Thiochemicals under the Thiocure® tradename.

A polythiol can comprise a polythiol of Formula (31):

$$B(-V)_z \quad (31)$$

wherein,
B comprises a core of a z-valent polyfunctionalizing agent $B(-V)_z$;
z is an integer from 3 to 6; and
each -V is independently a moiety comprising a terminal thiol group.

In polythiols of Formula (31), z can be, for example, 3, 4, 5, or 6.

In polythiols of Formula (31), z can be 3. Suitable trifunctional polythiols include, for example, 1,2,3-propanetrithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations polythiols of Formula (31) may also be used.

Other examples of suitable polythiol monomers include 1,2,3-propanetrithiol, isocyanurate-containing trithiols, and combinations thereof, as disclosed, for example, in U.S. Application Publication No. 2010/0010133, which is incorporated by reference in its entirety, and isocyanurates as disclosed, for example, in U.S. Application Publication No. 2011/0319559, which is incorporated by reference in its entirety.

Suitable thiol-terminated monomers can be characterized, for example, by a molecular weight less than 2,000 Daltons, less than 1,500 Daltons, less than 1,000 Daltons, less than 500 Daltons, or less than 250 Daltons. Suitable thiol-terminated monomers can be characterized, for example, by a weight average molecular weight from 200 Daltons to 2,000 Daltons, from 200 Daltons to 1,500 Daltons, from 200 Daltons to 1000, Daltons, from 500 Daltons to 2,000 Daltons, or from 500, Daltons to 1,500 Daltons. Compositions provided by the present disclosure can comprise, for example, from 0.1 wt % to 5 wt % of a polythiol, from 0.2 wt % to 3.5 wt %, from 0.5 wt % to 3 wt %, or from 1 wt % to 3 wt %, of a polythiol, where wt % is based on the total weight of the composition.

Compositions provided by the present disclosure can comprise a plasticizer or combination of plasticizers.

Compositions can comprise a polybutadiene plasticizer. Other examples of suitable plasticizers include Jayflex™ DINP, Jayflex™ DIDP, Jayflex™ DIUP, and Jayflex™ DTDP available from Exxon Mobil.

Compositions provided by the present disclosure can include a photoinitiator or combination of photoinitiators. The radiation can be actinic radiation that can apply energy that can generate an initiating species from a photopolymerization initiator upon irradiation therewith, and widely includes α.-rays, γ-rays, X-rays, ultraviolet (UV) light including UVA, UVA, and UVC spectra), visible light, blue light, infrared, near-infrared, or an electron beam. For example, the photoinitiator can be a UV photoinitiator.

Examples of suitable UV photoinitiators include α-hydroxyketones, benzophenone, α,α.-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl O-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, bisacyclophosphine oxide.

Examples of suitable benzophenone photoinitiators include 2-hydroxy-2-methyl-1-phenyl-1-propanone, 2-hydroxy-1,4,4-(2-hydroxyethoxy)phenyl]-2-methyl-1-propanone, α-dimethoxy-α-phenylacetophenone, 2-benzyl-2-(dimethylamino)-1-[4-(4-morpholinyl) phenyl]-1-butanone, and 2-methyl-1-[4-(methylthio)phenyl]-2-(4-morpholinyl)-1-propanone.

Examples of suitable oxime photoinitiators include (hydroxyimino)cyclohexane, 1-[4-(phenylthio)phenyl]-octane-1,2-dione-2-(O-benzoyloxime), 1-[9-ethyl-6-(2-methylbenzoyl)-9H-carbazol-3-yl]-ethanone-1-(O-acetyloxime), trichloromethyl-triazine derivatives), 4-(4-methoxystyryl)-2,6-trichloromethyl-1,3,5-triazine), 4-(4-methoxyphenyl)-2,6-trichloromethyl-1,3,5-triazine, and α-aminoketone (1-(4-morpholinophenyl)-2-dimethylamino-2-benzyl-butan-1-one).

Examples of suitable phosphine oxide photoinitiators include diphenyl (2,4,6-trimethylbenzoyl)-phosphine oxide (TPO) and phenylbis(2,4,6-trimethyl benzoyl) phosphine oxide (BAPO).

Other examples of suitable UV photoinitiators include the Irgacure™ products from BASF, for example the products Irgacure™ 184, Irgacure™ 500, Irgacure™ 1173, Irgacure™ 2959, Irgacure™ 745, Irgacure™ 651, Irgacure™ 369, Irgacure™ 907, Irgacure™ 1000, Irgacure™ 1300, Irgacure™ 819, Irgacure™ 819DW, Irgacure™ 2022, Irgacure™ 2100, Irgacure™ 784, Irgacure™ 250; in addition, the Irgacure™ products from BASF are used, for example the products Irgacure™ MBF, Darocur™ 1173, Darocur™ TPO, Darocur™ 4265.

A UV photoinitiator can comprise, for example, 2,2-dimethoxy-1,2-diphenylethan-1-one (Irgacure® 651, Ciba Specialty Chemicals), 2,4,6-trimethylbenzoyl-diphenyl-phosphineoxide (Darocur® TPO, Ciba Specialty Chemicals), or a combination thereof.

Other examples of suitable photoinitiators include Darocur® TPO (available from Ciba Specialty Chemicals), Lucirin® TPO (available from BASF), Speedcure® TPO (available from Lambson), Irgacure® TPO (available from Ciba Specialty Chemicals, and Omnirad® (available from IGM Resins), and combinations of any of the foregoing.

Compositions provided by the present disclosure can comprise from 1 wt % to 5 wt %, from 1.5 wt % to 4.5 wt %, from 2 wt % to 4 wt %, from 2.5 wt % to 3.5 wt % of a UV photoinitiator or combination of UV photoinitiators, where wt % is based on the total weight of the curable composition.

Compositions provided by the present disclosure can comprise a filler or combination of fillers. Suitable fillers can comprise, inorganic fillers, organic fillers, lightweight fillers, and combinations of any of the foregoing.

Curable compositions can comprise, for example, from 15 wt % to 35 wt % filler, from 17 wt % tp 33 wt %, from 20 wt % to 30 wt % filler, or from 22 wt % to 28 wt %, where wt % is based on the total weight of the curable composition. Compositions provide by the present disclosure can comprise, for example, silica gel, fumed silica, calcium carbonate, micronized oxidized polyethylene homopolymer, lightweight microcapsules, or a combination of any of the foregoing.

Compositions and sealants provided by the present disclosure can comprise an organic filler or a combination of organic fillers. Organic fillers can be selected to have a low specific gravity and to be resistant to solvents such as JRF Type I. Suitable organic fillers can also have acceptable adhesion to the sulfur-containing polymer matrix. An organic filler can include solid powders or particles, hollow powders or particles, or a combination thereof.

An organic filler can have a specific gravity, for example, less than 1.15, less than 1.1, less than 1.05, less than 1, less than 0.95, less than 0.9, less than 0.8, or less than 0.7. Organic fillers can have a specific gravity, for example, within a range from 0.85 to 1.15, within a range from 0.9 to 1.1, within a range from 0.9 to 1.05, or from 0.85 to 1.05.

Organic fillers can comprise thermoplastics, thermosets, or a combination thereof. Examples of suitable thermoplastics and thermosets include epoxies, epoxy-amides, ETFE copolymers, nylons, polyethylenes, polypropylenes, polyethylene oxides, polypropylene oxides, polyvinylidene chlorides, polyvinylfluorides, TFE, polyamides, polyimides, ethylene propylenes, perfluorohydrocarbons, fluoroethylenes, polycarbonates, polyetheretherketones, polyetherketones, polyphenylene oxides, polyphenylene sulfides, polystyrenes, polyvinyl chlorides, melamines, polyesters, phenolics, epichlorohydrins, fluorinated hydrocarbons, polycyclics, polybutadienes, polychloroprenes, polyisoprenes, polysulfides, polyurethanes, isobutylene isoprenes, silicones, styrene butadienes, liquid crystal polymers, and combinations of any of the foregoing.

Examples of suitable organic fillers include polyamides, polyimides, polyethylene, polyphenylene sulfides, and combinations of any of the foregoing.

Examples of suitable polyamide 6 and polyamide 12 particles are available from Toray Plastics as grades SP-500, SP-10, TR-1, and TR-2. Suitable polyamide powders are also available from the Arkema Group under the tradename Orgasol®, and from Evonik Industries under the tradename Vestosin®.

Examples of suitable polyimide powders are available from Evonik Industries under the tradename P84®.

An organic filler can include a polyethylene powder, such as an oxidized polyethylene powder. Suitable polyethylene powders are available from Honeywell International, Inc. under the tradename ACumist®, from INEOS under the tradename Eltrex®, and Mitsui Chemicals America, Inc. under the tradename Mipelon™.

The use of organic fillers such as polyphenylene sulfide in aerospace sealants is disclosed in U.S. Pat. No. 9,422,451, which is incorporated by reference in its entirety. Polyphenylene sulfide is a thermoplastic engineering resin that exhibits dimensional stability, chemical resistance, and resistance to corrosive and high temperature environments. Polyphenylene sulfide engineering resins are commercially available, for example, under the tradenames Ryton® (Chevron), Techtron® (Quadrant), Fortron® (Celanese), and Torelina® (Toray). Polyphenylene sulfide resins are generally characterized by a specific gravity from about 1.3 to about 1.4.

An organic filler can have any suitable shape. For example, an organic filler can comprise fractions of crushed polymer that has been filtered to selected a desired size range. An organic filler can comprise substantially spherical particles. Particles can be solid or can be porous.

An organic filler can have an average particle size, for example, within a range from 1 µm to 100 µm, 2 µm to 40 µm, from 2 µm to 30 µm, from 4 µm to 25 um, from 4 µm to 20 µm, from 2 m to 12 µm, or from 5 µm to 15 µm. An organic filler can have an average particle size, for example, less than 100 µm, less than 75 µm, less than 50 µm, less than 40 µm, or less than 20 µm. Particle size distribution can be determined using a Fischer Sub-Sieve Sizer or by optical inspection.

An organic filler can include a low density such as a modified expanded thermoplastic microcapsules. Suitable modified expanded thermoplastic microcapsules can include an exterior coating of a melamine or urea/formaldehyde resin.

Compositions and sealants provided by the present disclosure can comprise an inorganic filler or combination of inorganic fillers. An inorganic filler can be included to provide mechanical reinforcement and to control the rheological properties of the composition. Inorganic fillers may be added to compositions to impart desirable physical properties such as, for example, to increase the impact strength, to control the viscosity, or to modify the electrical properties of a cured composition. Inorganic fillers useful in compositions provided by the present disclosure and useful for aviation and aerospace applications include carbon black, calcium carbonate, precipitated calcium carbonate, calcium hydroxide, hydrated alumina (aluminum hydroxide), fumed silica, silica, precipitated silica, silica gel, and combinations of any of the foregoing. For example, an inorganic filler can include a combination calcium carbonate and fumed silica, and the calcium carbonate and fumed silica can be treated and/or untreated.

An inorganic filler can be coated or uncoated. For example, an inorganic filler can be coated with a hydrophobic coating, such as a coating of polydimethylsiloxane.

Compositions provided by the present disclosure can comprise, for example, from 5 wt % to 25 wt % of an inorganic filler or combination of inorganic fillers, from 7 wt % to 23 wt %, from 10 wt % to 20 wt %, or from 12 wt % to 18 wt %, where wt % is based on the total weight of the composition.

Compositions provided by the present disclosure can comprise silica gel or combination of silica gel. Suitable silica gel include Gasil® silica gel available from PQ Corporation, and Sylysia®, CariAct® and Sylomask® silica gel available from Fuji Silysia Chemical Ltd. Compositions provided by the present disclosure can comprise, for example, from 5 wt % to 25 wt %, from 10 wt % to 20 wt %, or from 12 wt % to 18, of silica gel, where wt % is based on the total weight of the curable composition.

Compositions provided by the present disclosure can comprise low density microcapsules. A low density microcapsule can comprise a thermally expandable microcapsule.

A thermally expandable microcapsule refers to a hollow shell comprising a volatile material that expands at a predetermined temperature. Thermally expandable thermoplastic microcapsules can have an average initial particle size of 5 µm to 70 µm, in some cases 10 µm to 24 µm, or from 10 µm to 17 µm. The term "average initial particle size" refers to the average particle size (numerical weighted average of the particle size distribution) of the microcapsules prior to any expansion. The particle size distribution can be determined using a Fischer Sub-Sieve Sizer or by optical inspection.

A thermally expandable thermoplastic microcapsule can comprise a volatile hydrocarbon within a wall of a thermoplastic resin. Examples of hydrocarbons suitable for use in such microcapsules are include methyl chloride, methyl bromide, trichloroethane, dichloroethane, n-butane, n-heptane, n-propane, n-hexane, n-pentane, isobutane, isopentane, iso-octane, neopentane, petroleum ether, and aliphatic hydrocarbons containing fluorine, such as Freon™, and combinations of any of the foregoing.

Examples of materials suitable for forming the wall of a thermally expandable microcapsule include polymers of vinylidene chloride, acrylonitrile, styrene, polycarbonate, methyl methacrylate, ethyl acrylate, and vinyl acetate, copolymers of these monomers, and combinations of the polymers and copolymers. A crosslinking agent may be included with the materials forming the wall of a thermally expandable microcapsule.

Examples of suitable thermoplastic microcapsules include Expancel™ microcapsules such as Expancel™ DE microspheres available from AkzoNobel. Examples of suitable Expancel™ DE microspheres include Expancel™ 920 DE 40 and Expancel™ 920 DE 80. Suitable low density microcapsules are also available from Kureha Corporation.

Suitable low density filler such as low density microcapsules can have a mean diameter (d0.5), for example, from 1 µm to 100 µm, from 10 µm to 80 µm, or from 10 µm to 50 µm, as determined according to ASTM D1475.

Low density filler such as low density microcapsules can be characterized by a specific gravity within a range from 0.01 to 0.09, from 0.04 to 0.09, within a range from 0.04 to 0.08, within a range from 0.01 to 0.07, within a range from 0.02 to 0.06, within a range from 0.03 to 0.05, within a range from 0.05 to 0.09, from 0.06 to 0.09, or within a range from 0.07 to 0.09, wherein the specific gravity is determined according to ASTM D1475. Low density filler such as low density microcapsules can be characterized by a specific gravity less than 0.1, less than 0.09, less than 0.08, less than 0.07, less than 0.06, less than 0.05, less than 0.04, less than 0.03, or less than 0.02, wherein the specific gravity is determined according to ASTM D1475.

Low density filler such as low microcapsules can be characterized by a mean particle diameter from 1 µm to 100 µm and can have a substantially spherical shape. Low density filler such as low density microcapsules can be characterized, for example, by a mean particle diameter from 10 m to 100 µm, from 10 µm to 60 µm, from 10 µm to 40 µm, or from 10 µm to 30 µm, as determined according to ASTM D1475.

Low density filler can comprise uncoated microcapsules, coated microcapsules, or combinations thereof.

Low density filler such as low density microcapsules can comprise expanded microcapsules or microballoons having a coating of an aminoplast resin such as a melamine resin. Aminoplast resin-coated particles are described, for example, in U.S. Pat. No. 8,993,691, which is incorporated by reference in its entirety. Such microcapsules can be formed by heating a microcapsule comprising a blowing agent surrounded by a thermoplastic shell. Uncoated low density microcapsules can be reacted with an aminoplast resin such as a urea/formaldehyde resin to provide a coating of a thermoset resin on the outer surface of the particle.

Low density filler such as low density microcapsules can comprise thermally expandable thermoplastic microcapsules having an exterior coating of an aminoplast resin, such as a melamine resin. The coated low density microcapsules can have an exterior coating of a melamine resin, where the coating can have a thickness, for example, less than 2 μm, less than 1 μm, or less than 0.5 μm. The melamine coating on the light weight microcapsules is believed to render the microcapsules reactive with the thiol-terminated polythioether prepolymer and/or the polyepoxide curing agent, which enhances the fuel resistance, and renders the microcapsules resistant to pressure.

The thin coating of an aminoplast resin can have a film thickness of less than 25 μm, less than 20 μm, less than 15 μm, or less than 5 μm. The thin coating of an aminoplast resin can have a film thickness of at least 0.1 nanometers, such as at least 10 nanometers, or at least 100 nanometers, or, in some cases, at least 500 nanometers.

Aminoplast resins can be based on the condensation products of formaldehyde, with an amino- or amido-group carrying substance. Condensation products can be obtained from the reaction of alcohols and formaldehyde with melamine, urea or benzoguanamine. Condensation products of other amines and amides can also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Examples of such compounds include N,N'-dimethyl urea, benzourea, dicyandiamide, formaguanamine, acetoguanamine, glycoluril, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine and 3,4,6-tris(ethylamino)-1,3,5 triazine. Suitable aminoplast resins can also be based on the condensation products of other aldehydes such as acetaldehyde, crotonaldehyde, acrolein, benzaldehyde, furfural, and glyoxal.

An aminoplast resin can comprise a highly alkylated, low-imino aminoplast resin which has a degree of polymerization less than 3.75, such as less than 3.0, or less than 2.0. The number average degree of polymerization can be defined as the average number of structural units per polymer chain. For example, a degree of polymerization of 1.0 indicates a completely monomeric triazine structure, while a degree of polymerization of 2.0 indicates two triazine rings joined by a methylene or methylene-oxy bridge. Degree of polymerization represents an average degree of polymerization value as determined by gel permeation chromatography using polystyrene standards.

An aminoplast resin can contain methylol or other alkylol groups, and at least a portion of the alkylol groups can be etherified by reaction with an alcohol. Examples of suitable monohydric alcohols include alcohols such as methanol, ethanol, propanol, butanol, pentanol, hexanol, heptanol, benzyl alcohol, other aromatic alcohols, cyclic alcohols such as cyclohexanol, monoethers of glycols, and halogen-substituted or other substituted alcohols, such as 3-chloropropanol and butoxyethanol. Aminoplast resins can be substantially alkylated with methanol or butanol.

An aminoplast resin can comprise a melamine resin. Examples of suitable melamine resins include methylated melamine resins (hexamethoxymethylmelamine), mixed ether melamine resins, butylated melamine resins, urea resins, butylated urea resins, benzoguanamine and glycoluril resins, and formaldehyde free resins. Such resins are available, for example, from Allnex Group and Hexion. Examples of suitable melamine resins include methylated melamine resins such as Cymel™ 300, Cymel™ 301, Cymel™ 303LF, Cymel™ 303ULF, Cymel™ 304, Cymel™ 350, Cymel 3745, Cymel™ XW-3106, Cymel™ MM-100, Cymel™ 370, Cymel™ 373, Cymel™ 380, ASTRO MEL™601, ASTRO MEL™ 601ULF, ASTRO MEL™400, ASTRO MEL™ NVV-3A, Aricel PC-6A, ASTRO MEL™ CR-1, and ASTRO SET™ 90.

A suitable aminoplast resin can comprise a urea-formaldehyde resin.

Aminoplast resin-coated particles are distinct from uncoated particles that are merely incorporated into a polymer network, such as is the case when uncoated low density particles are dispersed in a film-forming binder. For aminoplast resin-coated particles, a thin film is deposited on the exterior surface of individual discrete particles such as thermally expanded microcapsules. These aminoplast resin-coated particles may then be dispersed in a film-forming binder, thereby resulting in dispersion of the coated particles throughout a polymer network. The thin coating of an aminoplast resin can cover, for example from 70% to 100%, from 80% to 100%, or from 90% to 100% of the exterior surface of a low density particle such as a thermally expanded microcapsule. The coating of an aminoplast resin can form a substantially continuous covering on the exterior surface of a low density particle.

Low density microcapsules can be prepared by any suitable technique, including, for example, as described U.S. Pat. Nos. 8,816,023 and 8,993,691, each of which is incorporated by reference in its entirety. Coated low density microcapsules can be obtained, for example, by preparing an aqueous dispersion of microcapsules in water with a melamine resin, under stirring. A catalyst may then be added and the dispersion heated to, for example, a temperature from 50° C. to 80° C. Low density microcapsules such as thermally expanded microcapsules having a polyacrylonitrile shell, de-ionized water and an aminoplast resin such as a melamine resin can be combined and mixed. A 10% w/w solution of para-toluene sulfuric acid in distilled water can then be added and the mixture reacted at 60° C. for about 2 hours. Saturated sodium bicarbonate can then be added and the mixture stirred for 10 minutes. The solids can be filtered, rinsed with distilled water, and dried overnight at room temperature. The resulting powder of aminoplast resin-coated microcapsules can then be sifted through a 250 μm sieve to remove and separate agglomerates.

Prior to application of an aminoplast resin coating, a thermally-expanded thermoplastic microcapsule can be characterized by a specific gravity, for example, within a range from 0.01 to 0.05, within a range from 0.015 to 0.045, within a range from 0.02 to 0.04, or within a range from 0.025 to 0.035, wherein the specific gravity is determined according to ASTM D1475. For example, Expancel™ 920 DE 40 and Expancel™ 920 DE 80 can be characterized by a specific gravity of about 0.03, wherein the specific gravity is determined according to ASTM D1475.

Following coating with an aminoplast resin, an aminoplast-coated microcapsule can be characterized by a specific gravity, for example, within a range from 0.02 to 0.08, within a range from 0.02 to 0.07, within a range from 0.02 to 0.06, within a range from 0.03 to 0.07, within a range from 0.03 to 0.065, within a range from 0.04 to 0.065, within a range from 0.045 to 0.06, or within a range from 0.05 to 0.06, wherein the specific gravity is determined according to ASTM D1475.

Compositions and sealants provided by the present disclosure can include an adhesion promoter or combination of adhesion promoters.

Curable compositions provided by the present disclosure can comprise, for example, less than 0.1 wt % of an adhesion promoter, less than 0.2 wt %, less than 0.3 wt % or less than 0.4 wt % of an adhesion promoter, where wt % is based on the total weight of the curable composition. A curable composition provided by the present disclosure can comprise, for example from 0.05 wt % to 0.4 wt %, from 0.05 wt % to 0.3 wt %, from 0.05 wt % to 0.2 wt % of an adhesion promoter.

Low density compositions provided by the present disclosure can comprise an adhesion promoter or combination of adhesion promoters. An adhesion promoter can include a phenolic adhesion promoter, a combination of phenolic adhesion promoters, an organo-functional silane, a combination of organo-functional silanes, or a combination of any of the foregoing. An organosilane can be an amine-functional silane.

Compositions and sealants provided by the present disclosure can comprise a phenolic adhesion promoter, an organosilane, or a combination thereof. A phenolic adhesion promoter can comprise a cooked phenolic resin, an uncooked phenolic resin, or a combination thereof. Examples of suitable adhesion promoters include phenolic resins such as Methylon® phenolic resin, and organosilanes, such as epoxy-, mercapto- or amine-functional silanes, such as Silquest® organosilanes.

Phenolic adhesion promoters can comprise the reaction product of a condensation reaction of a phenolic resin with one or more thiol-terminated polysulfides. Phenolic adhesion promoters can be thiol-terminated.

Examples of suitable phenolic resins include 2-(hydroxymethyl)phenol, (4-hydroxy-1,3-phenylene)dimethanol, (2-hydroxybenzene-1,3,4-triyl) trimethanol, 2-benzyl-6-(hydroxymethyl)phenol, (4-hydroxy-5-((2-hydroxy-5-(hydroxymethyl)cyclohexa-2,4-dien-1-yl)methyl)-1,3-phenylene)dimethanol, (4-hydroxy-5-((2-hydroxy-3,5-bis(hydroxymethyl)cyclohexa-2,4-dien-1-yl)methyl)-1,3-phenylene)dimethanol, and a combination of any of the foregoing.

Suitable phenolic resins can be synthesized by the base-catalyzed reaction of phenol with formaldehyde.

Phenolic adhesion promoters can comprise the reaction product of a condensation reaction of a Methylon® resin, a Varcum® resin, or a Durez® resin available from Durez Corporation with a thiol-terminated polysulfide such as a Thioplast® resin.

Examples of Methylon® resins include Methylon® 75108 (allyl ether of methylol phenol, see U.S. Pat. No. 3,517,082) and Methylon® 75202.

Examples of Varcum® resins include Varcum® 29101, Varcum® 29108, Varcum® 29112, Varcum® 29116, Varcum® 29008, Varcum® 29202, Varcum® 29401, Varcum® 29159, Varcum® 29181, Varcum® 92600, Varcum® 94635, Varcum® 94879, and Varcum® 94917.

An example of a Durez® resin is Durez® 34071.

Compositions provided by the present disclosure can comprise an organo-functional adhesion promoter such as an organo-functional silane. An organo-functional silane can comprise hydrolysable groups bonded to a silicon atom and at least one organofunctional group. An organo-functional silane can have the structure $R^a\text{—}(CH_2)_n\text{—}Si(\text{—}OR)_{3-n}R^b{}_n$, where $R^a$ is an organofunctional group, n is 0, 1, or 2, and R and $R^b$ is alkyl such as methyl or ethyl. Examples of organofunctional groups include epoxy, amino, methacryloxy, or sulfide groups. An organofunctional silane can be a dipodal silane having two or more silane groups, a functional dipodal silane, a non-functional dipodal silane or a combination of any of the foregoing. An organofunctional silane can be a combination of a monosilane and a dipodal silane.

An amine-functional silane can comprise a primary amine-functional silane, a secondary amine-functional silane, or a combination thereof. A primary amine-functional silane refers to a silane having primary amino group. A secondary amine-functional silane refers to a silane having a secondary amine group. An amine-functional silane can comprise, for example, from 40 wt % to 60 wt % of a primary amine-functional silane; and from 40 wt % to 60 wt % of a secondary amine-functional silane; from 45 wt % to 55 wt % of a primary amine-functional silane and from 45 wt % to 55 wt % of a secondary amine-functional silane; or from 47 wt % to 53 wt % of a primary amine-functional silane and from 47 wt % to 53 wt % of a secondary amine-functional silane; where wt % is based on the total weight of the amine-functional silane in a composition.

A secondary amine-functional silane can be a sterically hindered amine-functional silane. In a sterically hindered amine-functional silane the secondary amine can be proximate a large group or moiety that limits or restricts the degrees of freedom of the secondary amine compared to the degrees of freedom for a non-sterically hindered secondary amine. For example, in a sterically hindered secondary amine, the secondary amine can be proximate a phenyl group, a cyclohexyl group, or a branched alkyl group.

Amine-functional silanes can be monomeric amine-functional silanes having a molecular weight, for example, from 100 Daltons to 1000 Daltons, from 100 Daltons to 800 Daltons, from 100 Daltons to 600 Daltons, or from 200 Daltons to 500 Daltons.

Examples of suitable primary amine-functional silanes include 4-aminobutyltriethoxysilane, 4-amino-3,3-dimethylbutyltrimethoxysilane, N-(2-aminoethyl)-3-aminopropyltriethoxysilane, 3(m-aminophenoxy)propyltrimethoxysilane, m-aminophenyltrimethoxysilane, p-aminophenyltrimethoxysilane, 3-aminopropyltriethoxysilane, 3-aminopropyltrimethoxysilane, 3-aminopropyltris(methoxyethoxyethoxy)silane, 11-aminoundecyltriethoxysilane, 2-(4-pyridylethyl)triethoxysilane, 2-(2-pyridylethyltrimethoxysilane, N-(3-trimethoxysilylpropyl)pyrrole, 3-aminopropylsilanetriol, 4-amino-3,3-dimethylbutylmethyldimethoxysilane, 3-aminopropylmethyldiethoxysilane, 1-amino-2-(dimethylethoxysilyl)propane, 3-aminopropyldiisopropylene ethoxysilane, and 3-aminopropyldimethylethoxysilane.

Examples of suitable diamine-functional silanes include aminoethylaminomethyl)phenethyltrimethoxysilane and N-(2-aminoethyl)-3-aminopropyltrimethoxysilane.

Examples of suitable secondary amine-functional silanes include 3-(N-allylamino)propyltrimethoxysilane, n-butylaminopropyltrimethoxysilane, tert-butylaminopropyltrimethoxysilane, (N,N-cylohexylaminomethyl)methyldiethoxysilane, (N-cyclohexylaminomethyl)triethoxysilane, (N-cyclohexylaminopropyl)trimethoxysilane, (3-(n-ethylamino)isobutyl)methyldiethoxysilane, (3-(N-ethylamino)isobutyl)trimethoxysilane, N-methylaminopropylmethyldimethoxysilane, N-methylaminopropyltrimethoxysilane, (phenylaminomethyl)methyldimethoxysilane, N-phenylaminomethyltriethoxysilane, and N-phenylaminopropyltrimethoxysilane.

Suitable amine-functional silanes are commercially available, for example, from Gelest Inc. and from Dow Corning Corporation.

Curable compositions provided by the present disclosure can comprise less than 3 wt % of an adhesion promoter, less than 2 wt %, less than 1 wt % or less than 0.5 wt %, where wt % is based on the total weight of the curable composition.

Curable compositions provided by the present disclosure can comprise a pigment, a dye, a photochromic agent, or a combination of any of the foregoing. Because a curable composition can fully cure under dark conditions, a dye, pigment, and/or photochromic agent can be used. For curing with actinic radiation, the surface of an applied sealant can cure and the non-exposed regions of the applied sealant can cure.

Any suitable dye, pigment, and/or photochromic agent can be used.

In certain applications it can be desirable that a photochromic agent that is sensitive to the degree of cure be used. Such agents can provide a visual indication that the sealant has been exposed to a desired amount of actinic radiation, or example, to cure the sealant. Certain photochromic agents can be used as cure indicators. A cure indicator can facilitate the ability to assess the extent of cure of a sealant by visual inspection.

A photochromic material can be a compound that is activated by absorbing radiation energy having a particular wavelength, such as UV radiation, which causes a feature change such as a color change. A feature change can be an identifiable change in a feature of the photochromic material which can be detected using an instrument or visually. Examples of feature changes include a change of color or color intensity and a change in structure or other interactions with energy in the visible UV, infrared (IR), near IR or far IR portions of the electromagnetic spectrum such as absorption and/or reflectance. A color change at visible wavelengths refers to a color change at wavelengths within a range from 400 nm to 800 nm.

A sealant composition provided by the present disclosure can include at least one photochromic material. A photochromic material can be activated by absorbing radiation energy (visible and non-visible light) having a particular wavelength, such as UV light, to undergo a feature change such as a color change. The feature change can be a change of feature of the photochromic material alone or it can be a change of feature of the sealant composition. Examples of suitable photochromic materials include spiropyrans, spiropyrimidines, spirooxazines, diarylethenes, photochromic quinones, azobenzenes, other photochromic dyes and combinations thereof. These photochromic materials undergo a reversible color change when exposed to radiation where the first and second colored states are different colors or different intensities of the same color.

Spiropyrans are photochromic molecules that change color and/or fluoresce under different wavelength light sources. Spiropyrans typically have a 2H-pyran isomer in which the hydrogen atom at position two is replaced by a second ring system linked to the carbon atom at position two of the pyran molecule in a spiro way resulting in a carbon atom that is common on both rings. The second ring is often but not exclusively heterocyclic. Examples of suitable spiropyrans include 1',3'-dihydro-8-methoxy-1',3',3'-trimethyl-6-nitrospiro[2H-1-benzopyran-2-,2'-(2H)-indole]; 1',3'-dihydro-1',3',3'-trimethyl-6-nitrospiro[2H-1-benzopyran-2,2'-(2H)-indole]; 1,3-dihydro-1,3,3-trimethylspiro[2H-indole-2,3'-[3H]naphth[2,1-b][-1,4]oxazine]; 6,8-dibromo-1',3'-dihydro-1',3',3'-trimethylspiro[2H-1-benzopyran-2,2'-(2H)-indole]; 5-chloro-1,3-dihydro-1,3,3-trimethylspiro[2H-indole-2,3'-[3H]phenanthr[9,-10-b][1,4]oxazine]; 6-bromo-1',3'-dihydro-1',3',3'-trimethyl-8-nitrospiro[2H-1-benzopyran-2,2'-(2H)-indole]; 5-chloro-1,3-dihydro-1,3,3-trimethylspiro[2H-indole-2,3'-[3H]naphth[2,1-b-][1,4]oxazine]; 1',3'-dihydro-5'-methoxy-1',3,3-trimethyl-6-nitrospiro[2H-1-benzopyran-2,-2'(2H)-indole]; 1,3-dihydro-1,3,3-trimethylspiro[2H-indole-2,3'-[3H]phenanthr[9,10-b][1,4-]oxazine]; 5-methoxy-1,3,3-trimethylspiro[indoline-2,3'-[3H]naphtha[2,1-b]-pyran]; 8'-methacryloxymethyl-3-methyl-6'-nitro-1-selenaspiro-[2H-1'-benzopyran-2,2'-benzoselenenazoline]; 3-isopropyl-8'-methacryloxymethyl-5-methoxy-6'-nitro-1-selenaspiro[2H-1'-benzopyran-2,2'-benzoselenazoline]; 3-isopropyl-8'-methacryloxymethyl-5-methoxy-6'-nitro-1-selenaspiro[2H-1'-benzopyran-2,2'-benzoselenazoline]; 8'-methacryloxymethyl-5-methoxy-2-methyl-6'-nitro-1-selenaspiro[2H-1'-ben-zopyran-2,2'-benzoselenazoline]; 2,5-dimethyl-8'-methacryloxymethyl-6'-nitro-1-selenaspiro[2H-1'-benzopyran-2,2'-benzoselenazoline]; 8'-methacryloxymethyl-5-methoxy-3-methyl-6'-nitrospiro[benzoselenazoline-2,2'(2'H)-1'-benzothiopyran]; 8-methacryloxymethyl-6-nitro-1',3',3'-trimethylspiro[2H-1-benzothiopyran-2,2'-indoline]; 3,3-dimethyl-1-isopropyl-8'-methacryloxymethyl-6'-nitrospiro-[indoline-2,-2'(2'H)-1'-benzothiopyran]; 3,3-dimethyl-8'-methacryloxymethyl-6'-nitro-1-octadecylspiro[indoline-2,2-'(2'H)-1'-benzothiopyran] and combinations thereof.

Azobenzenes are capable of photoisomerization between trans- and cis-isomers. Examples of suitable azobenzenes include azobenzene; 4-[bis(9,9-dimethylfluoren-2-yl)amino]azobenzene; 4-(N,N-dimethylamino)azobenzene-4'-isothiocyanate; 2,2'-dihydroxyazobenzene; 1,1'-dibenzyl-4,4'-bipyridinium dichloride; 1,1'-diheptyl-4,4'-bipyridinium dibromide; 2,2',4'-trihydroxy-5-chloroazobenzene-3-sulfonic acid and combinations thereof.

Examples of suitable photochromicspirooxazines include 1,3-dihydro-1,3,3-trimethylspiro[2H-indole-2,3'-[3H]phenanthr[9,10-b](1,4-)oxazine]; 1,3,3-trimethyl spiro(indoline-2,3'-(3H)naphth(2,1-b)(1,4)oxazine); 3-ethyl-9'-methoxy-1,3-dimethylspiro(indoline-2,3'-(3H)naphth(2,1-b)(1,4)-oxazine); 1,3,3-trimethylspiro(indoline-2,3'-(3H)pyrido(3,2-f)-(1,4)benzoxazine); 1,3-dihydrospiro(indoline-2,3'-(3H)pyrido(3,2-f)-(1,4)benzoxazine) and combinations thereof.

Examples of suitable photochromic spiropyrimidines include 2,3-dihydro-2-spiro-4'-[8'-aminonaphthalen-1'(4'H)-one]pyrimidine; 2,3-dihydro-2-spiro-7'-[8'-imino-7',8'-dihydronaphthalen-1'-amine]pyrimidine and combinations thereof.

Examples of suitable photochromic diarylethenes include 2,3-bis(2,4,5-trimethyl-3-thienyl)maleic anhydride; 2,3-bis(2,4,5-trimethyl-3-thienyl)maleimide; cis-1,2-dicyano-1,2-bis(2,4,5-trimethyl-3-thienyl)ethane; 1,2-bis[2-methylbenzo[b]thiophen-3-yl]-3,3,4,4,5,5-hexafluoro-1-cyclopent-ene; 1,2-bis(2,4-dimethyl-5-phenyl-3-thienyl)-3,3,4,4,5,5-hexafluoro-1-cyclopentene; stilbene; dithienylethenes and combinations thereof.

Examples of suitable photochromic quinones include 1-phenoxy-2,4-dioxyanthraquinone; 6-phenoxy-5,12-naphthacenequinone; 6-phenoxy-5,12-pentacenequinone; 1,3-dichloro-6-phenoxy-7,12-phthaloylpyrene and combinations thereof.

Examples of suitable photochromic agents that can be used as cure indicators include ethylviolet and Disperse Red 177.

A photochromic material can produce a reversible color feature change when irradiated. The reversible color change can be caused by a reversible transformation of the photochromic material between two molecular forms having different absorption spectra as a result of the absorption of electromagnetic radiation. When the source of radiation is withdrawn or turned off, the photochromic material normally reverts back to its first color state.

A photochromic material can exhibit an irreversible color change following exposure to radiation. For example, exposing the photochromic material to radiation can cause the photochromic material to change from a first state to a second state. When the radiation exposure is removed, the photochromic material is prevented from reverting back to the initial state as a result of a physical and/or chemical interaction with one or more components of the sealant composition.

A composition provided by the present disclosure can include, for example, from 0.1 wt % to 10 wt % of a photochromic material, such as from 0.1 wt % to 5 wt % or from 0.1 wt % to 2 wt %, where wt % is based on the total weight of the composition.

Compositions provided by the present disclosure may be formulated as sealants. By formulated is meant that in addition to the reactive species forming the cured polymer network, additional material can be added to a composition to impart desired properties to the uncured sealant and/or to the cured sealant. For the uncured sealant these properties can include viscosity, pH, and/or rheology. For cured sealants, these properties can include weight, adhesion, corrosion resistance, color, glass transition temperature, electrical conductivity, cohesion, and/or physical properties such as tensile strength, elongation, and hardness. Compositions provided by the present disclosure may comprise one or more additional components suitable for use in aerospace sealants and the selection can depend at least in part on the desired performance characteristics of the cured sealant under conditions of use.

Curable compositions provided by the present disclosure can be visually clear. A visually clear sealant can enable visual inspection of the quality of the seal. Curable compositions can be transmissive or partially transmissive to actinic radiation such as UV radiation. The materials forming a curable composition can be selected to provide a desired depth of cure following exposure to actinic radiation. For example, the filler used can be selected to be transmissive or partially transmissive to actinic radiation such as UV radiation and/or the size and geometry of the filler can be selected to forward scatter incident actinic radiation.

Curable compositions provided by the present disclosure can comprise, for example, from 3 wt % to 9 wt % of a poly(alkenyl) ether, from 55 wt % to 75 wt % of a thiol-terminated sulfur-containing prepolymer, from 5 wt % to 15 wt % of an inorganic filer such as fumed silica, and from 10 wt % to 20 wt % of silica gel, where wt % is based on the total weight of the curable composition.

Curable compositions provided by the present disclosure can comprise, for example, from 4 wt % to 8 wt % of a polyalkenyl such as a poly(alkenyl) ether, from 60 wt % to 70 wt % of a polythiol such as a thiol-terminated sulfur-containing prepolymer, from 7 wt % to 13 wt % of an inorganic filer such as fumed silica, and from 12 wt % to 18 wt % of silica gel, where wt % is based on the total weight of the curable composition.

Curable compositions provided by the present disclosure can comprise, for example, from 5 wt % to 7 wt % of a poly(alkenyl) ether, from 63 wt % to 67 wt % of a thiol-terminated sulfur-containing prepolymer, from 8 wt % to 11 wt % of an inorganic filer such as fumed silica, and from 14 wt % to 16 wt % of silica gel, where wt % is based on the total weight of the curable composition.

Curable compositions provided by the present disclosure can comprise, for example, from 3 wt % to 9 wt % of a poly(alkenyl) ether, from 55 wt % to 75 wt % of a thiol-terminated sulfur-containing prepolymer, from 1 wt % to 3.5 wt % of a polythiol having a thiol functionality greater than two, from 5 wt % to 15 wt % of an inorganic filer such as fumed silica, and from 10 wt % to 20 wt % of a silica gel, where wt % is based on the total weight of the curable composition.

Curable compositions provided by the present disclosure can comprise, for example, from 4 wt % to 8 wt % of a poly(alkenyl) ether, from 60 wt % to 70 wt % of a thiol-terminated sulfur-containing prepolymer, from 1.3 wt % to 3.1 wt % of a polythiol, from 7 wt % to 13 wt % of an inorganic filer such as fumed silica, and from 12 wt % to 18 wt % of silica gel, where wt % is based on the total weight of the curable composition.

Curable compositions provided by the present disclosure can comprise, for example, from 5 wt % to 7 wt % of a poly(alkenyl) ether, from 63 wt % to 67 wt % of a thiol-terminated sulfur-containing prepolymer, from 1.6 wt % to 2.9 wt % of a polythiol, from 8 wt % to 11 wt % of an inorganic filer such as fumed silica, and from 14 wt % to 16 wt % of silica gel, where wt % is based on the total weight of the curable composition.

Any of the foregoing curable compositions comprises a dark cure metal complex/organic peroxide catalyst. For example, a curable composition can comprise from 0.01 wt % to 3 wt % of a metal complex and from 0.2 wt % to 3 wt % of the organic peroxide, where wt % is based on the total weight of the composition.

Curable compositions provided by the present disclosure can comprise, for example, from 1 wt % to 10 wt % of a polyalkenyl such as a divinyl ether, from 2 wt % to 9 wt %, from 3 wt % to 8 wt %, or from 4 wt % to 7 wt % of a polyalkenyl, where wt % is based on the total weight of the curable composition.

Curable compositions provided by the present disclosure can comprise, for example, from 0.01 wt % to 3 wt % of a hydroxy-vinyl ether, from 0.05 wt % to 2.5 wt %, from 0.1 wt % to 2 wt %, or from 0.2 wt % to 1.5 wt % of a hydroxy-vinyl ether, where wt % is based on the total weight of the curable composition.

Curable compositions provided by the present disclosure can comprise, for example, from 45 wt % to 85 wt % of a polythiol such as a thiol-terminated prepolymer such as a thiol-terminated polythioether prepolymer, from 50 wt % to 80 wt %, or from 60 wt % to 75 wt % of a polythiol such as a thiol-terminated prepolymer, where wt % is based on the total weight of the curable composition.

Curable compositions provided by the present disclosure can comprise, for example, from 0.1 wt % to 10 wt % of a polythiol having a thiol functionality greater than 2, from 0.5 wt % to 8 wt %, from 1 wt % to 6 wt %, or from 1 wt % to 4 wt % of a polythiol having a thiol functionality greater than two, where wt % is based on the total weight of the curable composition.

Curable compositions provided by the present disclosure can comprise, for example, from 0.01 wt % to 2 wt % of a photoinitiator, from 0.05 wt % to 1.5 wt % of a photoinitiator, or from 0.05 wt % to 1 wt % of a photoinitiator, where wt % is based on the total weight of the curable composition.

Curable compositions provided by the present disclosure can comprise, for example, from 0.01 wt % to 4 wt % of a plasticizer, from 0.05 wt % to 3 wt %, or from 0.1 wt % to 2 wt % of a plasticizer, where wt % is based on the total weight of the curable composition.

Curable compositions provided by the present disclosure can comprise, for example, from 1 wt % to 50 wt % of a filler, from 5 wt % to 40 wt %, from 10 wt % to 30 wt %, or from 15 wt % to 25 wt % of a filler, where wt % is based on the total weight of the curable composition.

Curable compositions provided by the present disclosure can comprise, for example, from 0.01 wt % to 3 wt % of an adhesion promoter, from 0.05 wt % to 2.5 wt %, or from 0.05 wt % to 1 wt % of an adhesion promoter, where wt % is based on the total weight of the curable composition.

Curable compositions provided by the present disclosure can comprise, for example, from 0.01 wt % to 4 wt %, from 0.02 wt % to 3 wt %, from 0.05 wt % to 2 wt %, or from 0.1 wt % to 1.5 wt % of an organic peroxide, where wt % is based on the total weight of the curable composition.

Curable compositions provided by the present disclosure can comprise, for example, from 0.001 wt % to 3 wt % of a metal complex, from 0.001 wt %, to 2 wt %, from 0.01 wt %, to 2 wt %, from 0.01 wt % to 1 wt %, or from 0.05 wt % to 0.5 wt % of a metal complex, where wt % is based on the total weight of the curable composition.

Curable compositions provided by the present disclosure can comprise: from 1 wt % to 10 wt % of a divinyl ether; from 45 wt % to 85 wt % of a thiol-terminated polythioether; from 0.1 wt % to 5 wt % of an organic peroxide; and from 0.01 wt % to 2 wt % of a metal complex, where wt % is based on the total weight of the curable composition.

Curable compositions provided by the present disclosure can comprise: from 4 wt % to 6 wt % of a divinyl ether; from 50 wt % to 80 wt % of a thiol-terminated polythioether prepolymer; from 0.2 wt % to 4 wt % of an organic peroxide; and from 0.02 wt % to 1 wt % of a metal complex, where wt % is based on the total weight of the curable composition.

Curable compositions provided by the present disclosure can comprise: from 2 wt % to 8 wt % of a divinyl ether; from 60 wt % to 75 wt % of a thiol-terminated polythioether prepolymer; from 0.5 wt % to 2 wt % of an organic peroxide; and from 0.05 wt % to 0.5 wt % of a metal complex, where wt % is based on the total weight of the curable composition.

Curable compositions provided by the present disclosure can comprise: from 0.01 wt % to 2 wt % of a synergist such as a hydrogen donor such as a primary amine or a secondary amine; from 0.02 wt % to 1.5 wt %, from 0.05 wt % to 1 wt %, or from 0.1 wt % to 0.5 wt %, where wt % is based on the total weight of the curable composition.

Curable compositions provided by the present disclosure can comprise: from 1 wt % to 10 wt % of a polyalkenyl monomer; from 45 wt % to 85 wt % of a thiol-terminated prepolymer; from 0.1 wt % to 5 wt % of an organic peroxide; and from 0.001 wt % to 2 wt % of a metal complex, where wt % is based on the total weight of the curable composition.

Curable compositions provided by the present disclosure can comprise: from 4 wt % to 6 wt % of a polyalkenyl monomer; from 50 wt % to 80 wt % of a thiol-terminated prepolymer; from 0.2 wt % to 4 wt % of an organic peroxide; and from 0.002 wt % to 1 wt % of a metal complex, where wt % is based on the total weight of the curable composition.

Curable compositions provided by the present disclosure can comprise: from 2 wt % to 8 wt % of a polyalkenyl monomer; from 60 wt % to 75 wt % of a thiol-terminated prepolymer; from 0.5 wt % to 2 wt % of an organic peroxide; and from 0.005 wt % to 0.5 wt % of a metal complex, where wt % is based on the total weight of the curable composition.

Curable compositions provided by the present disclosure can comprise: from 1 wt % to 10 wt % of a polythiol monomer; from 45 wt % to 85 wt % of an alkenyl-terminated prepolymer; from 0.1 wt % to 5 wt % of an organic peroxide; and from 0.001 wt % to 2 wt % of a metal complex, where wt % is based on the total weight of the curable composition.

Curable compositions provided by the present disclosure can comprise: from 4 wt % to 6 wt % of a polythiol monomer; from 50 wt % to 80 wt % of an alkenyl-terminated prepolymer; from 0.2 wt % to 4 wt % of an organic peroxide; and from 0.002 wt % to 1 wt % of a metal complex, where wt % is based on the total weight of the curable composition.

Curable compositions provided by the present disclosure can comprise: from 2 wt % to 8 wt % of a polythiol monomer; from 60 wt % to 75 wt % of an alkenyl-terminated prepolymer; from 0.5 wt % to 2 wt % of an organic peroxide; and from 0.005 wt % to 0.5 wt % of a metal complex, where wt % is based on the total weight of the curable composition.

Uncured sealants provided by the present disclosure can be provided as a two-part system comprising a first part and a second part which can be prepared and stored separately, combined, and mixed at the time of use.

Curable sealant systems of the present disclosure can be provided as two-part sealant compositions. The two-parts can be maintained separately and can be combined prior to use. A first part can comprise, for example, polyalkenyls, hydroxyl-functional vinyl ethers, inorganic filler, organic filler, and lightweight filler. A second part can comprise, for example, thiol-terminated sulfur-containing prepolymers, polythiols, organic filler, inorganic filler lightweight filler, and adhesion promoters. Optional additives can include plasticizers, pigments, solvents, reactive diluents, surfactants, thixotropic agents, fire retardants, and a combination of any of the foregoing. A metal complex can be added to the first part and an organic peroxide can be added to the second part. A metal complex can be added to the second part and an organic peroxide can be added to the first part.

The first part and the second part can be formulated to be rendered compatible when combined such that the constituents of the first and second parts can intermix and be homogeneously dispersed to provide a sealant or coating composition for application to a substrate. Factors affecting the compatibility of the first and second parts include, for example, viscosity, pH, density, and temperature.

A first part can comprise, for example, from 70 wt % to 90 wt %, from 72 wt % to 88 wt %, or from 76 wt % to 84 wt %, of a polyalkenyl such as a poly(alkenyl) ether, where wt % is based on the total weight of the first part.

A first part can comprise, for example, from 70 wt % to 90 wt % of a polyalkenyl such as a poly(alkenyl) ether, from 3 wt % to 13 wt % of a plasticizer, and from 6 wt % to 16 wt % of a filler, where wt % is based on the total weight of the first part. A first part can comprise, for example, 72 wt % to 88 wt % of a poly(alkenyl) ether, from 5 wt % to 11 wt % of a plasticizer, and from 8 wt % to 14 wt % of a filler, where wt % is based on the total weight of the first part. A first part can comprise, for example, 76 wt % to 84 wt % of a poly(alkenyl) ether, from 7 wt % to 9 wt % of a plasticizer, and from 10 wt % to 12 wt % of a filler, where wt % is based on the total weight of the first part.

A second part can comprise, for example, from 60 wt % to 80 wt %, from 62 wt % to 78 wt %, or from 66 wt % to 74 wt %, of a thiol-terminated sulfur-containing prepolymer, where wt % is based on the total weight of the second part.

A second part can comprise from 60 wt % to 80 wt % of a thiol-terminated sulfur-containing prepolymer, from 5 wt % to 15 wt % of a filler, and from 11 wt % to 21 wt % of a silica gel, where wt % is based on the total weight of the second part. A second part can comprise from 62 wt % to 78 wt % of a thiol-terminated sulfur-containing prepolymer, from 7 wt % to 13 wt % of a filler, and from 13 wt % to 19 wt % of a silica gel, where wt % is based on the total weight of the second part. A second part can comprise from 66 wt % to 74 wt % of a thiol-terminated sulfur-containing prepolymer, from 9 wt % to 11 wt % of a filler, and from 15 wt % to 17 wt % of a silica gel, where wt % is based on the total weight of the second part.

The pH of each of the parts of a sealant system can be selected to improve the storage stability of each of the parts.

Curable compositions provided by the present disclosure can be used as aerospace sealants or coatings, and in particular, as sealants or coatings where resistance to hydraulic fluid is desired. A sealant refers to a curable composition that has the ability when cured to resist atmospheric conditions such as moisture and temperature and at least partially block the transmission of materials such as water, water vapor, fuel, solvents, and/or liquids and gases.

Compositions provided by the present disclosure may be applied directly onto the surface of a substrate or over an underlayer such as a primer by any suitable coating process.

Furthermore, methods are provided for sealing an aperture utilizing a composition provided by the present disclosure. These methods comprise, for example, applying the curable composition to at least one surface of a part; and curing the applied composition to provide a sealed part.

Compositions, including sealants, provided by the present disclosure may be applied to any of a variety of substrates. Examples of substrates to which a composition may be applied include metals such as titanium, stainless steel, steel alloy, aluminum, and aluminum alloy, any of which may be anodized, primed, organic-coated or chromate-coated; epoxy; urethane; graphite; fiberglass composite; Kevlar®; acrylics; and polycarbonates. Compositions provided by the present disclosure may be applied to a substrate such as aluminum and aluminum alloy.

Sealant compositions provided by the present disclosure may be formulated as Class A, Class B, or Class C sealants. A Class A sealant refers to a brushable sealant having a viscosity of 1 poise to 500 poise and is designed for brush application. A Class B sealant refers to an extrudable sealant having a viscosity from 4,500 poise to 20,000 poise and is designed for application by extrusion via a pneumatic gun. A Class B sealant can be used to form fillets and sealing on vertical surfaces or edges where low slump/slag is required. A Class C sealant has a viscosity from 500 poise to 4,500 poise and is designed for application by a roller or combed tooth spreader. A Class C sealant can be used for fay surface sealing. Viscosity can be measured according to Section 5.3 of SAE Aerospace Standard AS5127/1C published by SAE International Group.

Compositions provided by the present disclosure may be applied directly onto the surface of a substrate or over an underlayer by any suitable coating process known to those of ordinary skill in the art.

Furthermore, methods are provided for sealing an aperture utilizing a composition provided by the present disclosure. These methods comprise, for example, providing the curable composition of the present disclosure; applying the curable composition to at least one surface of a part; and curing the applied composition to provide a sealed part.

Compositions, including sealants, provided by the present disclosure may be applied to any of a variety of substrates. Examples of substrates to which a composition may be applied include metals such as titanium, stainless steel, steel alloy, aluminum, and aluminum alloy, any of which may be anodized, primed, organic-coated or chromate-coated; epoxy; urethane; graphite; fiberglass composite; Kevlar®; acrylics; and polycarbonates. Compositions provided by the present disclosure may be applied to a substrate such as aluminum and aluminum alloy.

A composition provided by the present disclosure may be cured under ambient conditions, where ambient conditions refers to a temperature from 20° C. to 25° C., and atmospheric humidity. A composition may be cured under conditions encompassing a temperature from a 0° C. to 100° C. and humidity from 0% relative humidity to 100% relative humidity. A composition may be cured at a higher temperature such as at least 30° C., at least 40° C., or at least 50° C. A composition may be cured at room temperature, e.g., 25° C. The methods may be used to seal apertures on aerospace vehicles including aircraft and aerospace vehicles.

Apertures, surfaces, joints, fillets, fay surfaces including apertures, surfaces, fillets, joints, and fay surfaces of aerospace vehicles, sealed with compositions provided by the present disclosure are also disclosed. The compositions and sealants can also be used to seat fasteners.

Curable compositions provided by the present disclosure can be to seal fasteners. Curable compositions provided by the present disclosure can be use as seal caps. A seal cap refers to a sealant shaped to cover a fastener. Thus, aspects of the invention include seal caps comprising a curable composition provided by the present disclosure. Seal caps and thiol/ene formulations suitable for use in seal caps are disclosed, for example, in U.S. Pat. Nos. 9,533,798, 8,932, 685, and 7,438,974, each of which is incorporated by reference in its entirety. A seal cap can be provided having cured or partially cured shell and filled with an uncured portion. The seal cap can be stored at low temperature until the time of use. The uncured portion can be at least partially cured using actinic radiation and/or can be cured without exposure to actinic radiation via the dark cure mechanism. As another example, a seal cap comprising a composition provided by the present disclosure can be deposited onto a fastener and at least partially cured by exposure to actinic radiation with full cure developing over time via the dark cure mechanism.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within about 3 days to about 7 days following mixing and application to a surface. In general, full adhesion strength as well as other properties of cured compositions of the present disclosure becomes fully developed within 7 days following mixing and application of a curable composition to a surface.

A cured composition can have a thickness, for example, from 5 mils to 25 mils (127 μm to 635 μm) such as from 10 mils to 20 mils (254 μm to 508 μm).

The free radical photopolymerization reaction can be initiated by exposing a composition provided by the present disclosure to actinic radiation such as UV radiation, for example, for less than 120 seconds, less than 90 seconds, less than 60 seconds, or less than 30 seconds.

The free radical photopolymerization reaction can be initiated by exposing a composition provided by the present disclosure to actinic radiation such as UV radiation, for example, for from 15 seconds to 120 seconds, from 15 seconds to 90 seconds, for rom 15 seconds to 60 seconds.

The UV radiation can include irradiation at a wavelength at 394 nm.

The total power of the UV exposure can be, for example, from 50 mW/cm$^2$ to 500 mW/cm$^2$, from 50 mW/cm$^2$ to 400 mW/cm$^2$, from 50 mW/cm$^2$ to 300 mW/cm$^2$, from 100 mW/cm$^2$ to 300 mW/cm$^2$, or from 150 mW/cm$^2$ to 250 mW/cm$^2$.

Curable compositions provided by the present disclosure can be exposed to a UV dose of 1 J/cm$^2$ to 4 J/cm$^2$ to cure the sealant. The UV source is a 8 W lamp with a UVA spectrum. Other doses and/or other UV sources can be used. A UV dose for curing a sealant can be, for example, from 0.5 J/cm$^2$ to 4 J/cm$^2$, from 0.5 J/cm$^2$ to 3 J/cm$^2$, from 1 J/cm$^2$ to 2 J/cm$^2$, or from 1 J/cm$^2$ to 1.5 J/cm$^2$.

Compositions provided by the present disclosure can also be cured with radiation at blue wavelength ranges such as from an LED.

Compositions provided by the present disclosure are curable without exposure to actinic radiation such as UV radiation. Composition can be at least partly curable upon exposure to actinic radiation and such compositions can include a photoionization. The actinic radiation such as UV radiation can be applied to at least a portion of an applied sealant. The sealant can be accessible to the actinic radiation and the portion of sealant exposed to the UV radiation can be a surface depth. For example, the actinic radiation can initiated the photopolymerization reaction to a depth, for example, of at least 4 mm, at least 6 mm, at least 8 mm, or at least 10 mm. A portion of the sealant may not be accessible to actinic radiation either because of absorption or scattering of the actinic radiation of the sealant which prevents the actinic radiant from interacting with the full thickness of the sealant. A portion of the sealant may be obscured by the geometry of the part being sealed or may be obscured by an overlying structure.

Curable compositions provided by the present disclosure can be exposed to UV radiation to initiate the dual curing reactions. The compositions can be exposed to a UV dose of, for example, from 1 J/cm$^2$ to 4 J/cm$^2$. The UV dose can be selected, for example, to provide a depth of UV cure from 1 mm to 25 mm, from 2 mm to 20 mm, from 5 mm to 18 mm, or from 10 mm to 15 mm. Any suitable UV wavelength can be used that initiates the generation of free radicals. For example, suitable UV wavelengths can be within a range, for example, from 365 nm to 395 nm.

The dark cure reaction can extend beyond the region exposed to the actinic radiation to a distance of, for example, 1 cm or less, 2 cm or less, 4 cm or less, 6 cm or less, 10 cm or less, or 20 cm or less. For example, the dark cure reaction can extend beyond the region exposed to the actinic radiation to a distance from 0.1 cm to 20 cm, from 0.1 cm to 10 cm, from 0.1 cm to 6 cm, from 0.1 cm to 4 cm, from 0.1 cm to 2 cm, or from 0.1 cm to 1 cm. The distance can refer to a depth within the curable composition, a distance within the plane of a coating, or both. In other words, the distance can refer to a distance parallel and/or orthogonal to the direction of the actinic radiation.

Curable compositions provided by the present disclosure can be exposed to actinic radiation, for example, for 120 seconds or less, from 90 seconds or less, for 60 seconds or less, for 30 seconds or less, or 15 seconds or less. Curable compositions provided by the present disclosure can be exposed to actinic radiation, for example, within a range from 10 seconds to 120 seconds, from 15 seconds to 120 seconds, for 30 seconds to 90 seconds, or from 30 seconds to 60 seconds.

A curable composition can be applied to a surface. The curable composition can be exposed to actinic radiation. The actinic radiation can extend to a depth in the thickness of the applied sealant, such as, for example, to a depth of 0.25 inches, 0.5 inches, 0.75 inches, 1 inch, 1.25 inches or 1.5 inches. The portion of the sealant exposed to the actinic radiation can cure by a free radical mechanism. The depth of actinic radiation exposure can depend on a number of factors including, for example, absorption by the materials forming the sealant, scattering or radiation by materials forming the sealant such as by filler, and/or the geometry of the applied sealant.

A portion of the applied composition may not be exposed to actinic radiation. For example, actinic radiation may not extend through the thickness of the applied sealant. The unexposed portion of the sealant underlying the portion exposed to actinic radiation can cure via free radicals generated by the organic peroxide/metal complex. Similarly, portions of the applied sealant adjacent the portion exposed to actinic radiation can cure by the organic peroxide/metal complex mechanism.

Curable compositions provided by the present disclosure, following application to a part, can be exposed to actinic radiation for a sufficient time to fully or partially cure the surface of the sealant. The full depth of the sealant can then cure with time via dark cure mechanisms. Providing a fully or partially cured surface can facilitate handling of the part.

Actinic radiation can be applied to a curable composition at any time during the curing process. For example, actinic radiation can be applied to an applied sealant shortly after application or at any time while the sealant is curing. For example, it can be desirable to coat a large surface area with a sealant an then expose the entire surface to actinic radiation. Actinic radiation can be applied once or several times during the curing process. In general exposing the sealant to actinic radiation will cure the sealant to a certain depth. The depth of cure induced by the actinic radiation can depend on a number of factors such as, for example, the sealant formulation, the filler content and type, and the irradiation conditions. Actinic radiation can be applied to the sealant at any time during the cure.

Sealant compositions provided by the present disclosure can also cure upon exposure to room lighting.

Curable compositions provided by the present disclosure do not require exposure to actinic radiation to cure. Cured compositions can cure under dark conditions via free radicals generated by the organic peroxide/metal complex mechanism. Cured compositions can cure at temperatures within a range from 20° C. to 30° C., such as from 22° C. to 28° C. Thus, the dark cure reaction does not require application of heat or generation of free radicals in an area of the sealant adjacent the dark cure area.

Cured compositions provided by the present disclosure, such as cured sealants, exhibit properties acceptable for use in aerospace sealant applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, which is incorporated by reference in its entirety. It is also desirable that, when cured, compositions of the present disclosure used in aviation and aircraft applications exhibit a percent volume swell not greater than 25% following immersion for one week at 60° C. (140° F.) at 760 torr (101 kPa) in Jet Reference Fluid (JRF) Type 1. Other properties, ranges, and/or thresholds may be appropriate for other sealant applications.

Cured compositions provided by the present disclosure can be fuel-resistant. The term "fuel resistant" means that a composition, when applied to a substrate and cured, can provide a cured product, such as a sealant, that exhibits a percent volume swell of not greater than 40%, in some cases not greater than 25%, in some cases not greater than 20%, and in other cases not more than 10%, after immersion for one week at 140° F. (60° C.) and 760 torr (101 kPa) in JRF Type I according to methods similar to those described in ASTM D792 (American Society for Testing and Materials) or AMS 3269 (Aerospace Material Specification). JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, § 3.1.1., available from SAE (Society of Automotive Engineers)).

Compositions provided by the present disclosure provide a cured product, such as a sealant, exhibiting a tensile elongation of at least 200% and a tensile strength of at least 200 psi when measured in accordance with the procedure described in AMS 3279, § 3.3.17.1, test procedure AS5127/1, § 7.7. In general, for a Class A sealant there is no tensile and elongation requirement. For a Class B sealant, as a general requirement, tensile strength is equal to or greater than 200 psi (1.38 MPa) and elongation is equal to or greater than 200%. Acceptable elongation and tensile strength can be different depending on the application.

Compositions provide a cured product, such as a sealant, that exhibits a lap shear strength of greater than 200 psi (1.38 MPa), such as at least 220 psi (1.52 MPa), at least 250 psi (1.72 MPa), and, in some cases, at least 400 psi (2.76 MPa), when measured according to the procedure described in SAE AS5127/1 paragraph 7.8.

A cured sealant prepared from a composition provided by the present disclosure meets or exceeds the requirements for aerospace sealants as set forth in AMS 3277.

Curable compositions provided by the present disclosure can be formulated to exhibit a desired cure profile. A cure profile can be characterized by an application time, a tack free time, a cure time, and a full cure time. Definitions of these durations are provided herein. For example, a curable composition provided by the present disclosure can be formulated to exhibit an application time of 0.5 hours, a tack free time of less than 2 hours, and a cure time of 3 hours at conditions of 25° C. and 50% RH. Other formulations can exhibit, for example, an application time of 2 hours, a tack free time less than 8 hours, and a cure time of 9 hours; or an application time of 4 hours, a tack free time of less than 24 hours, and a cure time of less than 24 hours. Other cure profiles can be designed for a particular application and based on considerations such as volume of material, surface area, application method, thickness of coating, temperature, and humidity.

Depending on the application an acceptable extrusion rate can be at least 15 g/min, at least 20 g/min, at least 30 g/min, at least 40 g/min, at least 50 g/min, or at least 60 g/min when extruded through a No. 404 nozzle at a pressure of 90 psi (620 kPa).

For certain applications it can be desirable that the application time be, for example, at least 2 hours, hat least 5 hours, at least 10 hours, at least 15 hours, at least 20 hours, or at least 25 hours.

The cure time is defined as the duration after the time when the components of the sealant composition are first combined until the time when the surface hardness of the sealant is Shore 30A. Shore A hardness can be measured using Type A durometer according to ASTM D2240.

Sealants provided by the present disclosure are intended to be cured at 25° C., however, the sealants can be cured at higher temperatures, which will decrease the tack free time and the cure time. Unless otherwise clear from the context, the application, tack free time, and cure time refer to the characteristic times of a curing profile for a sealant cured at 25° C.

After the cure time, the hardness of the sealant will continue to increase until the sealant is fully cured. A fully cured sealant can have a hardness, for example from Shore 40A to Shore 80A, from Shore 45A to Shore 70A, or from Shore 50A to Shore 60A. Following curing to a hardness of Shore 30A, the sealant can fully curing within, for example, from 1 day to 6 weeks, from 3 days to 5 weeks, from 4 days to 4 weeks, or from 1 week to 3 weeks.

Short cure, dual cure sealants provided by the present disclosure can be characterized, for example, of a tack free time of less than 1 day, less than 16 hours, or less than 8 hours. Short cure, dual cure sealants provided by the present disclosure can be characterized, for example, of a tack free time from 2 hours to 24 hours, from 4 hours to 20 hours, or from 8 hours to 16 hours.

Long cure, dual cure sealants provided by the present disclosure can be characterized, for example, of a tack free time of greater than 1 day, greater than 3 days, greater than 6 days or greater than 9 days. Long cure, dual cure sealants provided by the present disclosure can be characterized, for example, of a tack free time from 1 day to 10 days, from 2 days to 8 days, or from 4 days to 6 days.

A long cure sealant can have, for example, an open time from 1 hour to 5 hours and a cure time from 2 weeks to 4 weeks.

For example, using Mn(acac)$_3$ ad the metal complex, a sealant provided by the present disclosure can exhibit an application time from 15 minutes to 2 hours, a tack free time from 14 hours to 3 days, and a cure time from 1 day to 3 days.

In general, the metal complex can provide a coarse control of a sealant curing profile and an amine catalyst can provide a fine control of the sealant curing profile.

In general, for certain applications it can be desirable that the application time be from 15 minutes to 2 hours and the cure time be from 3 hours to 36 hours. In general, for certain applications, it can be desirable that the application time be long, and that the tack free time and the cure time be short.

Compositions provided by the present disclosure can be cured using radiation within the blue region of the electromagnetic spectrum. For example, compositions can be curable using radiation within a range, for example, from 365 nm to 395 nm.

Apertures, surfaces, joints, fillets, fay surfaces including apertures, surfaces, fillets, joints, and fay surfaces of aerospace vehicles, sealed with compositions provided by the present disclosure are also disclosed. A composition provided by the present disclosure can be used to seal a part. A part can include multiple surfaces and joints. A part can include a portion of a larger part, assembly, or apparatus. A portion of a part can be sealed with a composition provided by the present disclosure or the entire part can be sealed.

Compositions provided by the present disclosure can be used to seal parts exposed or potentially exposed to fluids such as solvents, hydraulic fluids, and/or fuel.

Compositions provided by the present disclosure can be used to seal a part including a surface of a vehicle.

The term "vehicle" is used in its broadest sense and includes all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. A vehicle can include a ground vehicle such as, for example, trailers, cars, trucks, buses, vans, construction vehicles, golf carts, motorcycles, bicycles, trains, and railroad cars. A vehicle can also include watercraft such as, for example, ships, boats, and hovercraft.

A composition provided by the present disclosure can be used in a F/A-18 jet or related aircraft such as the F/A-18E Super Hornet and F/A-18F (produced by McDonnell Douglas/Boeing and Northrop); in the Boeing 787 Dreamliner, 737, 747, 717 passenger jet aircraft, an related aircraft (produced by Boeing Commercial Airplanes); in the V-22 Osprey; VH-92, S-92, and related aircraft (produced by NAVAIR and Sikorsky); in the G650, G600, G550, G500, G450, and related aircraft (produced by Gulfstream); and in the A350, A320, A330, and related aircraft (produced by Airbus). Compositions provided by the present disclosure can be used in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

Compositions provided by the present disclosure can be used to seal parts and surfaces of vehicles such as fuel tank surfaces and other surfaces exposed to or potentially exposed to aerospace solvents, aerospace hydraulic fluids, and aerospace fuels.

The present invention includes parts sealed with a composition provided by the present disclosure, and assemblies and apparatus comprising a part sealed with a composition provided by the present disclosure.

The present invention includes vehicles comprising a part such as a surface sealed with a composition provided by the present disclosure. For example, an aircraft comprising a fuel tank or portion of a fuel tank sealed with a sealant provided by the present disclosure is included within the scope of the invention.

Compositions can be as coatings or sealants, and in particular sprayable coatings and sealants having a high filler content such as, for example, a filler content from 1 wt % to 90 wt % and/or a filler content from 1 vol % to 80 vol %. The coatings and sealants can be applied to any suitable surface including for example, surfaces of vehicles, architectural surfaces, consumer products, electronic products, marine equipment, and industrial equipment.

Aspects of the Invention

Aspect 1. A composition comprising: a thiol-terminated sulfur-containing prepolymer; a polyalkenyl; a metal complex; and an organic peroxide.

Aspect 2. The composition of aspect 1, wherein the thiol-terminated sulfur-containing prepolymer comprises a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing.

Aspect 3. The composition of any one of aspects 1 to 2, wherein the thiol-terminated sulfur-containing prepolymer comprises a thiol-terminated polythioether prepolymer.

Aspect 4. The composition of any one of aspects 1 to 3, wherein the thiol-terminated sulfur-containing prepolymer comprises a thiol-terminated polythioether prepolymer of Formula (2a), a thiol-terminated polythioether prepolymer of Formula (2b), or a combination thereof:

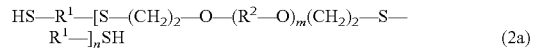

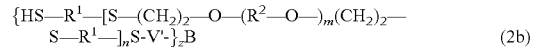

wherein,
each $R^1$ independently comprises $C_{2-10}$ alkanediyl, $C_{6-8}$ cycloalkanediyl, $C_{6-14}$ alkanecycloalkanediyl, $C_{5-8}$ heterocycloalkanediyl, or $-[(CHR^3)_p-X-]_q(CHR^3)_r-$, wherein,
p is an integer from 2 to 6;
q is an integer from 1 to 5;
r is an integer from 2 to 10;
each $R^3$ independently comprises hydrogen or methyl; and
each X independently comprises O, S, or NR, wherein R comprises hydrogen or methyl;
each $R^2$ is independently comprises $C_{1-10}$ alkanediyl, $C_{6-8}$ cycloalkanediyl, $C_{6-14}$ alkanecycloalkanediyl, or $-[(CHR^3)_p-X-]_q(CHR^3)_r-$, wherein p, q, r, $R^3$, and X are as defined as for $R^1$;
m is an integer from 0 to 50;
n is an integer from 1 to 60;
B represents a core of a z-valent, polyfunctionalizing agent B(-V)$_z$ wherein,
z is an integer from 3 to 6; and
each V is a moiety comprising a terminal group reactive with a thiol; and
each -V'- is derived from the reaction of -V with a thiol.

Aspect 5. The composition of any one of aspects 1 to 4, wherein the polyalkenyl comprises a bis(alkenyl) ether.

Aspect 6. The composition of any one of aspects 1 to 5, wherein the polyalkenyl comprises cyclohexanedimethanol divinyl ether.

Aspect 7. The composition of any one of aspects 1 to 6, wherein the metal complex comprises cobalt(II)bis(2-ethyl hexanoate), manganese(III)(acetylacetonate)$_3$, iron(III)(acetylacetonate)$_3$, or a combination of any of the foregoing.

Aspect 8. The composition of any one of aspects 1 to 7, wherein the organic peroxide comprises tert-butyl peroxybenzoate, Aspect 9. The composition of any one of aspects 1 to 8, wherein the metal complex comprises a metal complex of Co(II), Co(III), Mn(II), Mn(III), Fe(II), Fe(III), Cu(II), or a combination of any of the foregoing.

Aspect 10. The composition of any one of aspects 1 to 9, further comprising a hydroxyl-functional vinyl ether.

Aspect 11. The composition of any one of aspects 1 to 10, further comprising 4-hydroxybutyl vinyl ether.

Aspect 12. The composition of any one of aspects 1 to 11, wherein the composition comprises from 55 wt % to 75 wt % of the thiol-terminated sulfur-containing prepolymer, wherein wt % is based on the total weight of the composition.

Aspect 13. The composition of any one of aspects 1 to 12, wherein the composition comprises from 2 wt % to 10 wt % of the polyalkenyl, wherein wt % is based on the total weight of the composition.

Aspect 14. The composition of any one of aspects 1 to 13, wherein the composition comprises from 0.01 wt % to 3 wt % of the metal complex, wherein wt % is based on the total weight of the composition.

Aspect 15. The composition of any one of aspects 1 to 14, wherein the composition comprises from 0.2 wt % to 3 wt % of the organic peroxide, wherein wt % is based on the total weight of the composition.

Aspect 16. The composition of any one of aspects 1 to 15, wherein the composition comprises from 0.1 wt % to 2 wt % of a hydroxyl-functional vinyl ether, wherein wt % is based on the total weight of the composition.

Aspect 17. The composition of any one of aspects 1 to 16, wherein the composition comprises: from 55 wt % to 75 wt % of the thiol-terminated sulfur-containing prepolymer; from 2 wt % to 10 wt % of the polyalkenyl; from 0.01 wt % to 3 wt % of the metal complex; from 0.2 wt % to 3 wt % of the organic peroxide, from 0.1 wt % to 2 wt % of a hydroxyl-functional vinyl ether, wherein wt % is based on the total weight of the composition.

Aspect 18. The composition of any one of aspects 1 to 17, wherein, the thiol-terminated sulfur-containing prepolymer comprises a thiol-terminated polythioether prepolymer; the polyalkenyl comprises cyclohexanedimethanol divinyl ether; the metal complex comprises cobalt(II)bis(2-ethyl hexanoate), manganese(III)(acetylacetonate)$_3$, iron(III)(acetylacetonate)$_3$, or a combination of any of the foregoing; the organic peroxide comprises tert-butyl peroxybenzoate; and further comprising a hydroxyl-functional vinyl ether, a plasticizer, and a polythiol; wherein, the hydroxyl-functional vinyl ether comprises 4-hydroxybutyl vinyl ether; the plasticizer comprises a polybutadiene; and the polythiol has thiol functionality of three, a thiol functionality of four, or a combination thereof.

Aspect 19. The composition of aspect 18, further comprising an organic filler, an inorganic filler, a lightweight filler or a combination of any of the foregoing.

Aspect 20. The composition of any one of aspects 1 to 19, wherein, the metal complex comprises a metal cation and an anion; the metal cation has an oxidation number of 2, 3, or a combination thereof; and the anion comprises an organic anion.

Aspect 21. The composition of aspect 20, wherein the metal cation comprises a metal cation of Co, Mn, Fe, Cu, V, Cu, Al, or a combination of any of the foregoing.

Aspect 22. The composition of any one of aspects 20 to 21, wherein the organic anion comprises acetylacetonate.

Aspect 23. The composition of any one of aspects 1 to 22, wherein the composition further comprises a polythiol, a photoinitiator, a plasticizer, a silica gel, a filler, or a combination of any of the foregoing.

Aspect 24. The composition of any one of aspects 1 to 23, wherein the composition further comprises from 0.1 wt % to 3 wt % of a plasticizer, wherein wt % is based on the total weight of the composition.

Aspect 25. The composition of any one of aspects 1 to 24, wherein the composition further comprises from 15 wt % to 25 wt % of a filler, wherein wt % is based on the total weight of the composition.

Aspect 26. The composition of any one of aspects 1 to 25, wherein the composition further comprises a filler, wherein the filler comprises an organic filler, fumed silica, silica gel, a lightweight filler, or a combination of any of the foregoing.

Aspect 27. The composition of any one of aspects 1 to 26, wherein the composition comprises from 10 wt % to 20 wt % of silica gel, wherein wt % is based on the total weight of the composition.

Aspect 28. The composition of any one of aspects 1 to 27, wherein the composition comprises from 5 wt % to 15 wt % silica gel, wherein wt % is based on the total weight of the composition.

Aspect 29. The composition of any one of aspects 1 to 28, wherein the composition is curable under dark conditions.

Aspect 30. The composition of any one of aspects 1 to 29, wherein the composition has an application time equal to or greater than 30 minutes.

Aspect 31. The composition of any one of aspects 1 to 30, wherein the composition fully cures under dark conditions within twelve (12) days.

Aspect 32. A cured sealant comprising the composition of any one of aspects 1 to 31.

Aspect 33. The cured sealant of aspect 32, wherein the cured sealant exhibits a tensile strength greater than 200 psi (1.3 MPa) and an elongation greater than 200% following exposure to Jet Reference Fluid Type I according to AMS 3269, where tensile strength and elongation are determined according to AMS 3279.

Aspect 34. A part sealed with the cured sealant of any one of aspects 32 to 33.

Aspect 35. A method of sealing a part comprising: applying the composition of any one of aspects 1 to 31 to a part; and allowing the applied composition to cure, to seal the part.

Aspect 36. The method of aspect 35, further comprising, after applying the composition, exposing at least a portion of the applied composition to actinic radiation.

Aspect 37. A sealant system, comprising: a first part, wherein the first part comprises a polyalkenyl; and a second part, wherein the second part comprises a thiol-terminated sulfur-containing prepolymer, wherein the first part, the second, or both the first and second parts comprise a metal complex and an organic peroxide.

Aspect 38. The sealant system of aspect 37, wherein the first part, the second, or both the first and second parts comprise a UV-sensitive photoinitiator.

Aspect 39. A sealant comprising the sealant system of any one of aspects 37 to 38, wherein the first part and the second part are combined.

Aspect 40. A part sealed with the sealant system of any one of aspects 37 to 39.

Aspect 41. A method of sealant a part, comprising combining the first part and the second part of the sealant system of any one of aspects 37 to 40 to provide a sealant; applying the sealant to a part; and allowing the applied sealant to cure, to seal the part.

Aspect 42. The method of aspect 41, further comprising, after applying the sealant, exposing at least a portion of the applied sealant to actinic radiation.

Aspect 1A. A composition comprising: a polythiol, wherein the polythiol comprises a thiol-terminated prepolymer; a polyalkenyl, wherein the polyalkenyl comprises an alkenyl-terminated prepolymer, a polyalkenyl monomer, or a combination thereof; a metal complex; and an organic peroxide.

Aspect 1Aa. The composition of aspect 1A, wherein the polythiol comprises a thiol-terminated prepolymer.

Aspect 2A. The composition of aspect 1A, wherein the thiol-terminated prepolymer comprises a thiol-terminated sulfur-containing prepolymer.

Aspect 3A. The composition of aspect 2A, wherein the thiol-terminated sulfur-containing prepolymer comprises a thiol-terminated polythioether prepolymer, a thiol-terminated polysulfide prepolymer, a thiol-terminated sulfur-containing polyformal prepolymer, a thiol-terminated monosulfide prepolymer, or a combination of any of the foregoing.

Aspect 4A. The composition of aspect 3A, wherein the thiol-terminated sulfur-containing prepolymer comprises a thiol-terminated polythioether prepolymer.

Aspect 5A. The composition of aspect 4A, wherein the thiol-terminated sulfur-containing prepolymer comprises a moiety having the structure of Formula (2c):

$$—S—R^1—[S-A-S—R^1—]_n—S— \quad (2c)$$

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(CHR^3)_p—X—]_q(CHR^3)_r—$, wherein,
p is an integer from 2 to 6;
q is an integer from 1 to 5;
r is an integer from 2 to 10;
each $R^3$ is independently selected from hydrogen and methyl; and
each X is independently selected from O, S, and NR, wherein R is selected from hydrogen and methyl; and
each A is independently a moiety derived from a polyvinyl ether of Formula (3) and a polyalkenyl polyfunctionalizing agent of Formula (4):

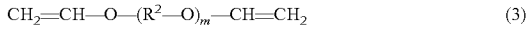

$$CH_2=CH—O—(R^2—O)_m—CH=CH_2 \quad (3)$$

$$B(—R^{70}—CH=CH_2)_z \quad (4)$$

wherein,
m is an integer from 0 to 50;
each $R^2$ is independently selected from $C_{1-10}$ alkanediyl, $C_{6-8}$ cycloalkanediyl, $C_{6-14}$ alkanecycloalkanediyl, and $—[(CHR^3)_p—X—]_q(CHR^3)_r—$, wherein p, q, r, $R^3$, and X are as defined as for $R^1$;
B represents a core of a z-valent, polyalkenyl polyfunctionalizing agent $B(-R^{70}—CH=CH_2)_z$ wherein,
z is an integer from 3 to 6; and
each $R^{70}$ is independently selected from $C_{1-10}$ alkanediyl, $C_{1-10}$ heteroalkanediyl, substituted $C_{1-10}$ alkanediyl, and substituted $C_{1-10}$ heteroalkanediyl.

Aspect 6A. The composition of aspect 4A, wherein the thiol-terminated sulfur-containing polythioether comprises a thiol-terminated polythioether prepolymer of Formula (2a), a thiol-terminated polythioether prepolymer of Formula (2b), or a combination thereof:

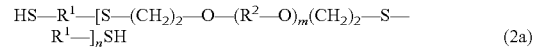

$$HS—R^1—[S—(CH_2)_2—O—(R^2—O)_m(CH_2)_2—S—R^1—]_nSH \quad (2a)$$

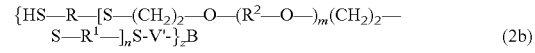

$$\{HS—R—[S—(CH_2)_2—O—(R^2—O—)_m(CH_2)_2—S—R^1—]_nS\text{-}V'\text{-}\}_zB \quad (2b)$$

wherein,
each $R^1$ independently comprises $C_{2-10}$ alkanediyl, $C_{6-8}$ cycloalkanediyl, $C_{6-14}$ alkanecycloalkanediyl, $C_{5-8}$ heterocycloalkanediyl, or $—[(CHR^3)_p—X—]_q(CHR^3)_r—$, wherein,
p is an integer from 2 to 6;
q is an integer from 1 to 5;
r is an integer from 2 to 10;
each $R^3$ independently comprises hydrogen or methyl; and
each X independently comprises O, S, or NR, wherein R comprises hydrogen or methyl;
each $R^2$ is independently comprises $C_{2-10}$ alkanediyl, $C_{6-8}$ cycloalkanediyl, $C_{6-14}$ alkanecycloalkanediyl, or $—[(CHR^3)_p—X—]_q(CHR^3)_r—$, wherein p, q, r, $R^3$, and X are as defined as for $R^1$;
m is an integer from 0 to 50;
n is an integer from 1 to 60;
B represents a core of a z-valent, polyfunctionalizing agent $B(-V)_z$ wherein,
z is an integer from 3 to 6; and
each V is a moiety comprising a terminal group reactive with a thiol; and
each -V'- is derived from the reaction of -V with a thiol.

Aspect 7A. The composition of any one of aspects 1A to 6A, wherein the alkenyl-terminated prepolymer comprises an alkenyl-terminated sulfur-containing prepolymer.

Aspect 7Aa. The composition of any one of aspects 1A to 67A, wherein the polythiol comprises a polythiol monomer.

Aspect 8A. The composition of aspect 7Aa, wherein the polythiol monomer comprises a dithiol monomer, a polythiol monomer having a thiol functionality greater than two, or a combination thereof.

Aspect 9A. The composition of any one of aspects 7A to 8A, wherein the polythiol monomer comprises a sulfur-containing dithiol monomer, a sulfur-containing polythiol monomer having a thiol functionality greater than two, or a combination thereof.

Aspect 10A. The composition of any one of aspects 1A to 9A, wherein the polyalkenyl monomer comprises a dialkenyl monomer, a polyalkenyl monomer having an alkenyl functionality greater than two, or a combination thereof.

Aspect 11A. The composition of any one of aspects 1A to 10A, wherein the polyalkenyl monomer comprises a sulfur-containing dialkenyl monomer, a sulfur-containing polyalkenyl monomer having a alkenyl functionality greater than two, or a combination thereof.

Aspect 12A. The composition of any one of aspects 1A to 11A, wherein the polyalkenyl monomer comprises a bis (alkenyl) ether.

Aspect 13A. The composition of any one of aspects 1A to 12A, wherein the polythiol comprises a thiol-terminated polythioether prepolymer; and the polyalkenyl comprises a bis(alkenyl) ether.

Aspect 14A. The composition of any one of aspects 1A to 13A, wherein the polyalkenyl monomer comprises ethylene glycol divinyl ether (EG-DVE), butanediol divinyl ether (BD-DVE), hexanediol divinyl ether (HD-DVE), diethylene glycol divinyl ether (DEG-DVE), triethylene glycol divinyl ether (TEG-DVE), tetraethylene glycol divinyl ether, cyclohexanedimethanol divinyl ether, or a combination of any of the foregoing.

Aspect 15A. The composition of any one of aspects 1A to 14A, wherein the metal complex comprises cobalt(II)bis(2-ethyl hexanoate), manganese(III)(acetylacetonate)$_3$, iron (III)(acetylacetonate)$_3$, or a combination of any of the foregoing.

Aspect 16A. The composition of any one of aspects 1A to 15A, wherein the organic peroxide comprises tert-butyl peroxybenzoate.

Aspect 17A. The composition of any one of aspects 1A to 16A, wherein the metal complex comprises a metal complex of Co(II), Co(III), Mn(II), Mn(III), Fe(II), Fe(III), Cu(II), V(III), or a combination of any of the foregoing.

Aspect 17Aa. The composition of any one of aspects 1A to 17A, wherein the metal complex comprises an organic ligand, wherein the organic ligand is acetylacetonate.

Aspect 18A. The composition of any one of aspects 1A to 17Aa, further comprising a hydroxyl-functional vinyl ether.

Aspect 19A. The composition of aspect 18A, comprising 4-hydroxybutyl vinyl ether.

Aspect 20A. The composition of any one of aspects 1A to 19A, wherein the curable composition comprises a free radical photoinitiator.

Aspect 21A. The composition of any one of aspects 1A to 20A, wherein the curable composition comprises a hydrogen donor.

Aspect 22A. The composition of aspect 21A, wherein the hydrogen donor comprises a primary amine, a secondary amine or a combination thereof.

Aspect 23A. The composition of any one of aspects 21A to 22A, wherein the composition comprises from 45 wt % to 85 wt % of the thiol-terminated sulfur-containing prepolymer, wherein wt % is based on the total weight of the composition.

Aspect 24A. The composition of any one of aspects 1A to 23A, wherein the composition comprises from 1 wt % to 10 wt % of the polyalkenyl, wherein wt % is based on the total weight of the composition.

Aspect 25A. The composition of any one of aspects 1A to 24A, wherein the composition comprises from 0.001 wt % to 2 wt % of the metal complex, wherein wt % is based on the total weight of the composition.

Aspect 26A. The composition of any one of aspects 1A to 25A, wherein the composition comprises from 0.1 wt % to 5 wt % of the organic peroxide, wherein wt % is based on the total weight of the composition.

Aspect 27A. The composition of any one of aspects 1A to 26A, wherein the composition further comprises from 0.01 wt % to 3 wt % of a hydroxyl-functional vinyl ether, wherein wt % is based on the total weight of the composition.

Aspect 28A. The composition of any one of aspects 1A to 27A, wherein the composition further comprises from 0.01 wt % to 2 wt % of a photoinitiator, wherein wt % is based on the total weight of the composition.

Aspect 29A. The composition of any one of aspects 1A to 28A, wherein the composition further comprises from 0.01 wt % to 2 wt % of a primary amine, a secondary amine, a tertiary amine, or a combination thereof, wherein wt % is based on the total weight of the composition.

Aspect 30A. The composition of any one of aspects 1A to 29A, wherein the composition comprises from 45 wt % to 85 wt % of the thiol-terminated sulfur-containing prepolymer; from 1 wt % to 10 wt % of the polyalkenyl; from 0.01 wt % to 2 wt % of the metal complex; and from 0.1 wt % to 5 wt % of the organic peroxide, wherein wt % is based on the total weight of the composition.

Aspect 31A. The composition of any one of aspects 1A to 30A, wherein, the thiol-terminated sulfur-containing prepolymer comprises a thiol-terminated polythioether prepolymer; the polyalkenyl comprises cyclohexanedimethanol divinyl ether, triethylene glycol divinyl ether or a combination thereof; the metal complex comprises cobalt(II)bis(2-ethyl hexanoate), manganese(III)(acetylacetonate)$_3$, iron (III)(acetylacetonate)$_3$, or a combination of any of the foregoing; the organic peroxide comprises tert-butyl peroxybenzoate; and further comprising a hydroxyl-functional vinyl ether, a photoinitiator, and a polythiol; wherein, the hydroxyl-functional vinyl ether comprises 4-hydroxybutyl vinyl ether; and the polythiol has thiol functionality of three, a thiol functionality of four, or a combination thereof.

Aspect 32A. The composition of aspect 31A, further comprising an organic filler, an inorganic filler, a lightweight filler, or a combination of any of the foregoing.

Aspect 33A. The composition of any one of aspects 1A to 32A, wherein, the metal complex comprises a metal cation and an anion; the metal cation has an oxidation number of 2, 3, or a combination thereof; and the anion comprises an organic anion.

Aspect 34A. The composition of aspect 33A, wherein the metal cation comprises a metal cation of Co, Mn, Fe, Cu, V, Cu, Al, or a combination of any of the foregoing.

Aspect 35A. The composition of any one of aspects 33A to 34A, wherein the organic anion comprises acetylacetonate.

Aspect 36A. The composition of any one of aspects 1A to 35A, wherein the composition further comprises a polythiol, a photoinitiator, a plasticizer, a silica gel, a filler, or a combination of any of the foregoing.

Aspect 37A. The composition of any one of aspects 1 to 36A, wherein the composition further comprises from 0.01 wt % to 4 wt % of the plasticizer, wherein wt % is based on the total weight of the composition.

Aspect 38A. The composition of any one of aspects 36A to 37A, wherein the composition comprises from 1 wt % to 50 wt % of the filler, wherein wt % is based on the total weight of the composition.

Aspect 39A. The composition of any one of aspects 36A to 38A, wherein the filler comprises an organic filler, fumed silica, silica gel, a lightweight filler, or a combination of any of the foregoing.

Aspect 40A. The composition of any one of aspects 36A to 39A, wherein the composition comprises from 10 wt % to 20 wt % of the silica gel, wherein wt % is based on the total weight of the composition.

Aspect 41A. The composition of any one of aspects 36A to 39A, wherein the composition comprises from 5 wt % to 15 wt % the silica gel, wherein wt % is based on the total weight of the composition.

Aspect 42A. The composition of any one of aspects 1A to 41A, wherein the composition is curable under dark conditions.

Aspect 43A. The composition of any one of aspects 1A to 42A, wherein the composition has an application time equal to or greater than 30 minutes.

Aspect 44A. The composition of any one of aspects 1A to 43A, wherein the composition fully cures to a hardness of Shore 30A under dark conditions within 4 weeks.

Aspect 45A. The composition of any one of aspects 1A to 44A, wherein, the composition is both curable upon exposure to actinic radiation; and the composition is curable without exposure to actinic radiation.

Aspect 46A. The composition of any one of aspects 1A to 45A, wherein the composition is curable at a temperature from 20° C. to 30° C.

Aspect 47A. The composition of any one of aspects 1A to 46A, wherein the composition is curable upon exposure to a 1 J/cm$^2$ to 4 J/cm$^2$ from a UVA source.

Aspect 48A. The composition of any one of aspects 1A to 47A, wherein the composition is curable under dark conditions at a temperature of 25° C.

Aspect 49A. A cured sealant prepared from the composition of any one of aspects 1A to 48A.

Aspect 50A. The cured sealant of aspect 49A, wherein the cured sealant exhibits a tensile strength greater than 200 psi (1.3 MPa) and an elongation greater than 200% following exposure to Jet Reference Fluid Type I according to AMS 3269, where tensile strength and elongation are determined according to AMS 3279.

Aspect 51A. A part sealed with the cured sealant of any one of aspects 49A to 50A.

Aspect 52A. A vehicle comprising the cured sealant of any one of aspects 49A to 50A.

Aspect 53A. An aerospace vehicle comprising the cured sealant of any one of aspects 49A to 50A.

Aspect 54A. A method of sealing a part comprising: applying the composition of any one of aspects 1A to 48A to a part; and allowing the applied composition to cure, to seal the part.

Aspect 55A. The method of aspect 54A, further comprising, after applying the composition, exposing at least a portion of the applied composition to actinic radiation.

Aspect 56A. A sealant system, comprising: a first part, wherein the first part comprises a polyalkenyl; and a second part, wherein the second part comprises a polythiol; wherein the first part comprises a metal complex and the second part comprises an organic peroxide; or wherein the first part comprises an organic peroxide and the second part comprises a metal complex.

Aspect 56Aa. The sealant system of aspect 56A, wherein the polyalkenyl, the polythiol, the metal complex, and the organic peroxide are defined as in any of aspects 1A to 19A, 31A, and 33A to 35A.

Aspect 56Ab. The sealant system of any one of aspects 56A or 56Aa, wherein the sealant system comprises any one of aspects 21A, 22A, 32A, 36A to 48A, or a combination of any of the foregoing.

Aspect 57A. The sealant system of aspect 56A, wherein the first part, the second, or both the first and second parts comprise a UV-sensitive photoinitiator.

Aspect 58A. A sealant prepared from the sealant system of aspect 56A, wherein the first part and the second part are combined.

Aspect 59A. A part sealed with the sealant system of aspect 56A.

Aspect 60A. A vehicle comprising the cured sealant of aspect 56A.

Aspect 61A. An aerospace vehicle comprising the cured sealant of aspect 56A.

Aspect 62A. A method of sealing a part, comprising: combining the first part and the second part of the sealant system of aspect 56A to provide a sealant; applying the sealant to a part; and allowing the applied sealant to cure, to seal the part.

Aspect 63A. The method of aspect 62A, further comprising, after applying the sealant, exposing at least a portion of the applied sealant to actinic radiation.

Aspect 64A. A seal cap comprising the cured sealant of aspect 56A.

Aspect 65A. A method of sealing a fastener comprising applying a composition of any one of aspects 1A to 48A to a fastener and curing the applied composition.

EXAMPLES

Embodiments provided by the present disclosure are further illustrated by reference to the following examples, which describe the compositions provided by the present disclosure and uses of such compositions. It will be apparent to those skilled in the art that many modifications, both to materials, and methods, may be practiced without departing from the scope of the disclosure.

Example 1

UV Curable-Unmodified Composition

A curable composition was prepared by combining Part A and Part B.

The constituents of Part A and Part B are provided in Table 1 and Table 2, respectively.

Preparation of Part A: In a Black Max 200 JAR (Flack Tek Inc.; Landrum, S.C.) cup, the Part A composition was prepared by sequentially adding vinyl ethers, initiators, plasticizers, and fillers (Table 1) followed by gentle mixing first using a spatula and then by using a Speed Mixer (Hauschild, Model No. DAC 600FVZ) at 2,000 rpm for 30 s. After adding the fumed silica, the resulting mixture was mixed at 2,000 rpm for 60 s to produce a well-dispersed mixture having a viscosity of ca. 280 poise (28 Pa-s) (Brookfield Viscometer CAP 2000; Spindle #7, 10 rpm, 25° C.). In addition, before adding Part A to a formulation, the cup was mixed at 2,000 rpm for 30 s to ensure homogeneity before transferring the material to a formulating cup.

Preparation of Part B: In a Hauschild Max 200 JAR, 57.34 g of Permapol® P-3.1 E prepolymer (PPG Aerospace, Sylmar, Calif.) (Thiol EW: 1625) was added followed by 13.53 g of a higher functionality Permapol® P3.1 E-2.8 (PPG Aerospace, Sylmar, Calif.) (Thiol EW: 1531) and 2.49 g of a polythiol (Table 2). The resulting mixture was first hand-mixed using a spatula followed by mixing at 1,200 rpm for 1 min using a Hauschild Speed Mixer. To this mixture, 5.39 g of Acumist® A6, a micronized oxidized polyethylene homopolymer (Honeywell International, Morris Plains, N.J.) was added, followed by Hauschild mixing at 2,000 rpm for 1 min. To this mixture, fumed silicas were added followed by mixing at 2,350 rpm for 2 min. This was followed by the addition of 16.37 g of silica gel (Gasil® IJ35, PQ Corporation, Valley Forge, Pa.) and mixing at 2,300 rpm for 2 min (twice) with an intermittent hand mixing to ensure all filler in the cup had been incorporated. This was followed by the addition of lightweight filler (Expancel® 920; AkzoNobel Inc.) and mixing at 1800 rpm for 1 min. This was followed by the addition of adhesion promoter (mercaptopropyl trimethoxy silane) and mixed at 2,000 rpm for 1 min (twice) with an intermittent hand mix. The final formulation had a viscosity of ca. 20,000 poise (2,000 Pa-s) (Brookfield Viscometer CAP2000; Spindle #7, 10 rpm 25° C.).

TABLE 1

Composition of UV Curable Components: Part A.

| Component | Product | Amount wt % |
|---|---|---|
| Divinyl ether | Cyclohexanedimethanol divinyl ether | 69.41 |
| Hydroxyl-functional vinyl ether | 4-hydroxybutyl vinyl ether | 9.49 |
| Photoinitiator | Darocure ® TPO Lucirin ® TPO Speedcure TPO | 0.31 |
| Photoinitiator | Irgacure ® TPO Omnirad ® 551 | 1.25 |
| Plasticizer | Polybutadiene | 8.45 |
| Inorganic filler | Precipitated calcium carbonate | 0.91 |
| Inorganic filler | Fumed silica | 10.18 |

TABLE 2

Composition of UV Curable Components: Part B.

| Component | Product | Amount wt % |
|---|---|---|
| Thiol-terminated polythioether (thiol EW 1625) | Permapol ® 3.1E | 57.34 |
| Thiol-terminated polythioether (thiol EW 1531) | Permapol ® 3.1E-2.8 | 13.53 |
| Polythiol | — | 2.49 |
| Micronized oxidized polyethylene homopolymer | Acumist ® A6 | 5.39 |
| Inorganic filler | Fumed Silica | 1.94 |
| Inorganic filler | Fumed Silica | 2.56 |
| Silica gel | Gasil ® IJ35 | 16.37 |
| Lightweight Filler | Expancel ® 920 DE 40 D30 | 0.25 |
| Adhesion Promoter | Mercaptopropyl trimethoxy silane | 0.13 |

Part A and Part B were mixed in a weight ratio of 100 g Part B to 8 g Part A to provide UV-curable compositions. The basic UV-curable composition was modified to impart dual-cure capabilities as disclosed in the following examples.

Example 2

Dual Cure Formulation

In a Black 200 JAR Hauschild cup, 46.3 g of Part A was combined with 3.7 g of Part B (100:8 weight ratio). The mixture was mixed at 2,000 rpm for 1 min after hand mixing with a spatula. To this mixture, using a dropper, 0.945 g of Trigonox® C (AkzoNobel Polymer Chemicals LLC; tert-butyl peroxybenzoate) was added dropwise. (Note: Organic peroxides are highly reactive species and all safety, handling and storage instructions from the manufacturer must be strictly adhered to). The resulting mixture was carefully hand mixed with a stainless steel spatula followed by Hauschild mixing at 1,600 rpm for 30 s. Care should be taken not to generate too much heat by excessive mixing (longer time or higher spin rate) to avoid reducing the peroxide activity through premature decomposition.

To prepare the Fe(III)(acac)₃ solution, separately, in a 20 mL glass vial a 10 wt % solution of Fe(III)(acetylacetonate)₃ was made in acetylacetone. The resulting solution was deeply colored. Both chemicals are commercially available from Sigma-Aldrich (St. Louis, Mo.).

To make the final composition of Example 2, 0.07 g of the Fe(III)(acac)₃ solution was added to the mixture of Part A, Part B, and Trigonox® C. The resulting sample was hand mixed, followed by Hauschild mixing at 1,800 rpm for 30 s. The resulting composition was poured into a small ⅜-inch deep (1.9 inch diameter) aluminum cup for hardness measurements. A flow-out sample was also made for testing tensile and elongation by pouring 20 g to 30 g of the composition between two polyethylene sheets separated by 0.125-inch thick spacers and pressing the layers between two steel plates to create a disc-shaped sample to be further cured. The resulting samples were (a) immediately UV cured; or (b) kept in a dark (light free) closet, to generate light cure (a) and dark cure (b) samples, respectively, for further testing.

For hardness testing the thickness of the test samples was 0.25 inches and the sealant thickness for the flow-out samples was 0.125-inches.

Example 3

Dual Cure Formulation

In a black 200 JAR Hauschild cup, 46.3 g of Part A, 3.7 g of Part B, and 0.945 g of Trigonox® C were mixed sequentially and prepared as described in Example 2.

To prepare the Mn(III)(acetylacetonate)₃ solution, in a 20 mL glass vial a 10% solution of Mn(III)(acetylacetonate)₃ was made by combining 90 parts toluene and 10 parts acetylacetonate and Mn(III)(acetylacetonate)₃. The resulting solution was deeply colored. All reagents used are commercially available from Sigma-Aldrich (St. Louis, Mo.).

To make a curable composition of Example 3 0.5 g of the Mn(III(acetylacetonate)₃ solution was added to the mixture of Part A, Part B, and Trigonox® C, followed by hand mixing and Hauschild mixing at 1,800 rpm for 30 s. Hardness and flow-out samples for both light and dark cure were prepared using the methods described in Example 2.

Example 4

Dual Cure Formulation

In a black 200 JAR Hauschild cup, 46.3 g of Part A and 3.7 g of Part B were mixed and prepared as described in Example 2. To this mixture, 0.47 g of a 50/50 solution of Trigonox® C in Jayflex™ DINP Plasticizer (Care should be taken in diluting and handling organic peroxides!) was added dropwise followed by hand mixing using a stainless steel spatula. The mixture was further mixed in a Hauschild Mixer at 1,600 rpm for 30 s. To this mixture 0.23 g of Duroct® Cobalt 12% (Dura Chemicals; Emeryville, Calif.) was added, followed by hand mixing and Hauschild mixing at 1,800 rpm for 30 s to prepare the final sealant composition. Hardness and flow out samples for both light and dark cure were prepared according to the methods described in Example 2.

To prepare the cobalt catalysts, Duroct® Cobalt 12% was used as a commercially available source for cobalt(II)bis(2-ethylhexanoate) and is provided as an 80% solution (w/w) in Stoddard Solvent and 2-ethylhexanoic acid.

To understand the cure characteristics and transparency (at 395 nm) of cured compositions when modified with catalysts for dark/dual cure, depth of cure measurements were performed. These measurements were done by applying the sealant formulations in a groove of a 0.4-inch (length×width is 0.5 in×0.5 in) sample. The sample was exposed for 30 s at a flux of 224 mW/cm² at 395 nm. The depth of cure was obtained by determining the depth at which the sample was fully cured by the exposure. Flow-out and peel samples were exposed to a dose for 60 s at a flux of 224 mW/cm² at 395 nm.

The properties of the samples were tested under various conditions: unmodified, modified (UV Cure) and modified (Dark Cured) referred to Examples 2-4 are summarized in Tables 3A-3C.

TABLE 3A

Dual cure modifications to UV-curable compositions for the sealant of Example 2.

| | UV Curable Composition | | Trigonox ® | Dual Cure Modifications | | |
|---|---|---|---|---|---|---|
| Component | Part A | Part B | C | Metal Type | Metal Activator | Metal Activator Composition |
| Amount, g | 46.3 | 3.7 | 0.945 | Fe(III)(acac)$_3$ | 0.07 | 10 wt % in acetyl acetonate |
| Note | A + B is 50 g. All other concentrations were calculated based on this weight | | Actual peroxide wt % 1.89 | | Actual 0.014% | |

TABLE 3B

Dual cure modifications to UV-curable compositions for the sealant of Example 3.

| | UV Curable Composition | | Trigonox ® | Dual Cure Modifications | | |
|---|---|---|---|---|---|---|
| Component | Part A | Part B | C | Metal Activator Type | Metal Activator | Metal Activator Composition |
| Amount, g | 46.3 | 3.7 | 0.945 | Mn(III)(acac)$_3$ | 0.7 | 10 wt % in a 90/10 solution of acetylacetonate (1)) and toluene (90) |
| Note | A + B is 50 g. All other concentrations were calculated based on this weight | | Actual peroxide wt % 1.89 | | Actual 0.10% | |

TABLE 3C

Dual cure modifications to UV-curable compositions for the sealant of Example 4.

| | UV Curable Composition | | Trigonox ® | Dual Cure Modifications | | |
|---|---|---|---|---|---|---|
| Component | Part A | Part B | C | Metal Activator Type | Metal Activator | Metal Activator Composition |
| Amount g | 46.3 | 3.7 | 0.47 g of 50/50 solution of Trigonox ® C in Jayflex ® DINP Plasticizer | Cobalt(II)bis(2-ehtylhexanoate) | 0.25 | 80 wt % in Stoddard Solvent and 2-ethylhexanoic acid |

TABLE 3C-continued

Dual cure modifications to UV-curable compositions for the sealant of Example 4.

|  | UV Curable Composition | | Trigonox ® | Metal Activator | Metal | Metal Activator |
|---|---|---|---|---|---|---|
| Component | Part A | Part B | C | Type | Activator | Composition |
| Note | A + B is 50 g. All other concentrations were calculated based on this weight | | Actual peroxide wt % 0.47 | | Actual 0.37% | |

Peel strength tests were performed on AMS 27725 panels using standard 180° peel preparation methods. The substrate after typical surface preparation was primed with a silane-based primer.

The results are presented in Tables 4-7.

TABLE 4

UV-cured properties of the composition of Example 1 with no modifications.

|  | UV Cured, 1 day | Dark Cure, 6 day |
|---|---|---|
| Tensile strength, psi | 433 ± 33 | n/a |
| Elongation, % | 312 ± 22 | n/a |
| Depth of Cure | ⅜-inch | n/a |
| Shore A | 48-50 | n/a |
| Peel Adhesion (UV only) | 30 lb/in, 100% cohesive | n/a |

TABLE 5

Cured properties of the modified sealant of Example 4.

|  | UV Cured, 1 day | Dark Cure, 6 day |
|---|---|---|
| Tensile strength, psi | 272 ± 39 | 272 ± 30 |
| Elongation, % | 499 ± 54 | 504 ± 86 |
| Depth of Cure (UV only) | ⅛-inch | n/a |
| Shore A | 40-44 | 38-40 |
| Peel Adhesion | 25 lb/in, 100% cohesive | 23 lb/in, 100% cohesive |

TABLE 6

Cured properties of the modified sealant of Example 3.

|  | UV Cured, 1 day | Dark Cure, 3 day |
|---|---|---|
| Tensile strength, psi | 445 ± 18 | 455 ± 58 |
| Elongation, % | 308 ± 6 | 302 ± 47 |
| Depth of Cure (UV only) | ⅓-inch | n/a |
| Shore A | 43 | 44 |
| Peel Adhesion (Dark only) | n/a | 30 lb/in, 100% cohesive |

TABLE 7

Cured properties of the modified sealant of Example 2.

|  | UV Cured, 1 day | Dark Cure, 14 day |
|---|---|---|
| Tensile strength, psi | 414 ± 20 | 408 ± 24 |
| Elongation, % | 286 ± 27 | 351 ± 20 |
| Depth of Cure (UV only) | ²/₁₁ inch | n/a |
| Hardness, Shore A | 44 | 43 |
| Peel Adhesion (UV only) | n/a | — |

Peel strength was determined according to AS 5127/1C. Peel results show favorable failure modes (100% cohesive failure) and the absolute peel values are similar for UV-cured and dark-cured samples.

Figure 3:
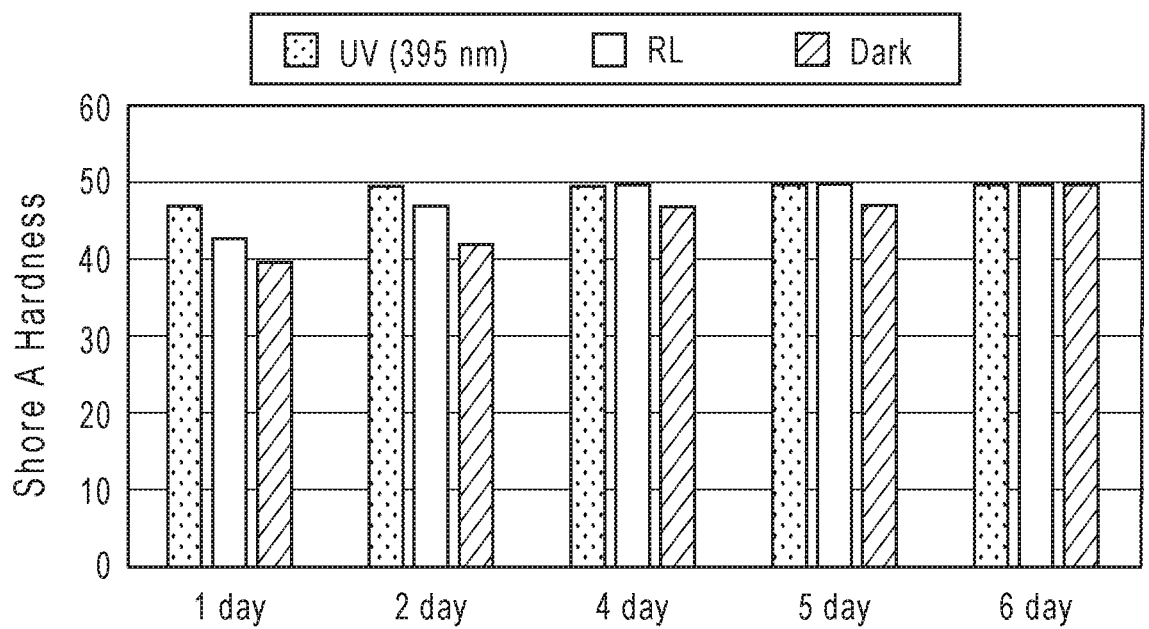
FIG. 3 is a chart showing the hardness of sealants provided by the present disclosure under different curing conditions.

The hardness of a polythioether/polyene-based sealant using a Mn(III)(acetylacetonate)$_3$/tert-butylperoxybenzoate catalyst as the dark cure catalyst is shown in FIG. 3. The applied sealant was exposed to UV radiation at 395 nm for 3 sec (224 mW/cm$^2$). The test sample consisted of a panel to which a 0.25-inch (6.35 mm) thick layer of sealant was applied. FIG. 3 shows the Shore A hardness of sealants exposed to UV, room fluorescent lighting (RL), and without exposure to UV (dark cure conditions).

Figure 4:
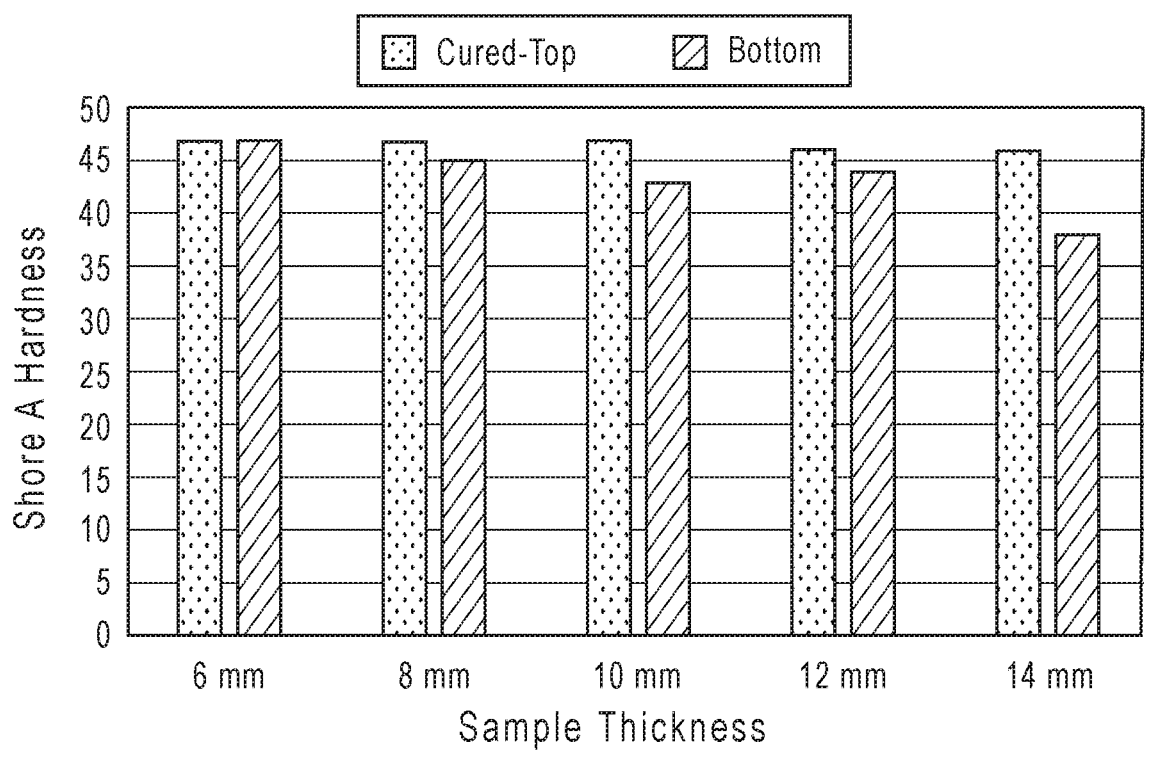
FIG. 4 is a chart showing the depth of cure of sealants provided by the present disclosure following UV irradiation.

The depth of cure for a polythioether/polyalkenyl-based sealant using Mn(III)(acetylacetonate)$_3$/tert-butylperoxybenzoate catalyst is shown in FIG. 4. FIG. 4 shows the hardness of the sealant with depth. The sealant was exposed to UV radiation at 395 nm for 30 sec (224 mW/cm$^2$) and the Shore A hardness was measured at depths from 6 mm to 14 mm. The sealant cured to a depth of 8 mm immediately following exposure to the UV radiation. The sealant cured (hardness greater than Shore 40A) to a depth of 12 mm to 14 mm within 24 hours. At 4 days, the UV-exposed and dark-cure samples had an identical hardness of Shore 48A.

Figure 5:
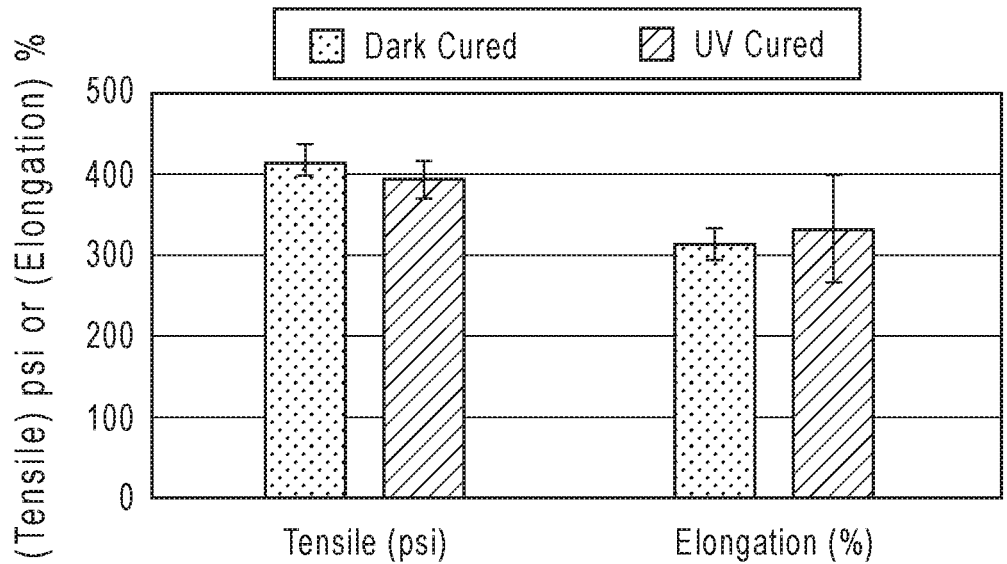
FIG. 5 is a chart showing physical properties of sealants provided by the present disclosure under different curing conditions.

The physical properties (tensile strength and tensile elongation) of a polythioether/polyene-based sealant using a Mn(III)(acetylacetonate)$_3$/tert-butylperoxybenzoate catalyst is shown in FIG. 5. After three (3) days, the tensile strength and the tensile elongation of the UV-cured and the dark-cured sealant was comparable.

The Part A and Part B compositions were stable as determined by there being no change in the viscosity of the compositions when maintained at 120° F. (49° C.) for 14 days (limit of testing) or at 140° F. (60° C.) for 7 days (limit of testing) in dark conditions. In other studies, the concentration of organic peroxide in Part A and the Mn(III) (acetylacetonate)$_3$ concentrations were increased to 3 times and 1.5 times, respectively. Again, after 14 days at 120° F. (49° C.) there was nt change in the viscosity indicating that the compositions were storage stable.

Figure 6:
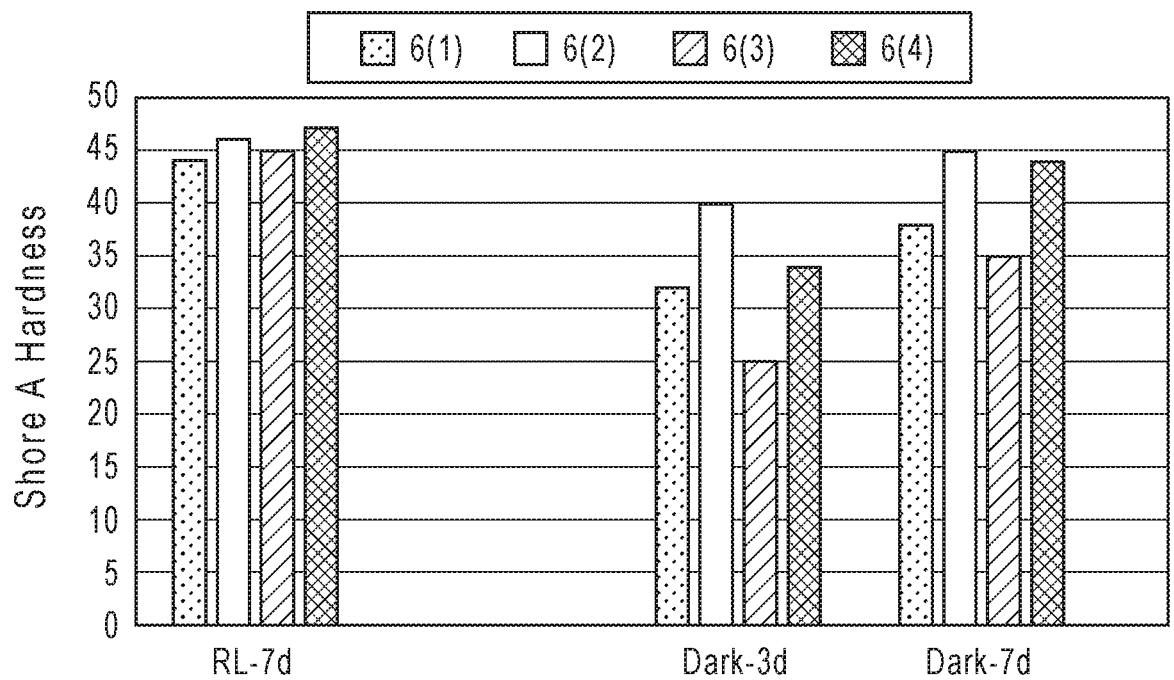
FIG. 6 is a chart showing the hardness of sealants provided by the present disclosure having different amounts of metal complex and organic peroxide.

FIG. 6 shows the effect of the composition of the dark cure catalyst Mn(III)(acetylacetonate)$_3$/tert-butylperoxybenzoate on the curing rate as reflected in the sample hardness with time. Dark cure catalyst systems having different amounts of organic peroxide (tert-butylperoxybenzoate) and metal catalyst (Mn(III)(acetylacetonate)$_3$) were prepared as in Table 8:

TABLE 8

Dark cure catalyst compositions.

| Catalyst | Sample 6(1) | Sample 6(2) | Sample 6(3) | Sample 6(4) |
|---|---|---|---|---|
| tert-Butylperoxybenzoate wt %[1] | 1 | 1 | 0.5 | 0.5 |
| Mn(III)(acetylacetonate)$_3$, wt %[1] | 0.5 | 0.25 | 0.5 | 0.25 |
| Total Catalyst, wt %[1] | 1.5 | 1.25 | 1 | 1 |
| Organic peroxide/Metal Complex Weight Percent Ratio | 2 | 4 | 1 | 2 |

[1]Based on the total weight of the composition

The hardness of sealants containing the various dark cure catalyst concentrations were measured at three (3) days and at seven (7) days following application. The hardness of samples exposed to room fluorescent lighting was also measured. The results are shown in FIG. 6. The depth of cure was also determined and the results are shown in FIG. 7.

Figure 7:
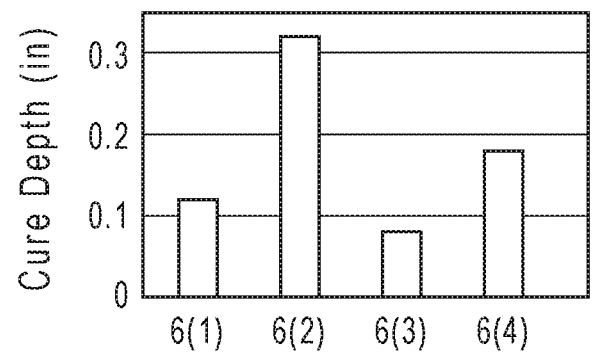
FIG. 7 is a chart showing the cure depth of sealants provided by the present disclosure having different amounts of metal complex and organic peroxide.

The results shown in FIGS. 6 and 7 demonstrate that a concentration of organic peroxide as low as 0.75 wt % and a metal complex as low as 0.5 wt % can be used to provide a full dark cure within three (3) days. The application time of these compositions was 30 min, i.e., B-1/2 (30-min extrusion, workable for 30 min). The physical properties including hardness, tensile/elongation, and peel strength of the dark-cured sealants are comparable to those of the UV-cured sealants.

Figure 8:
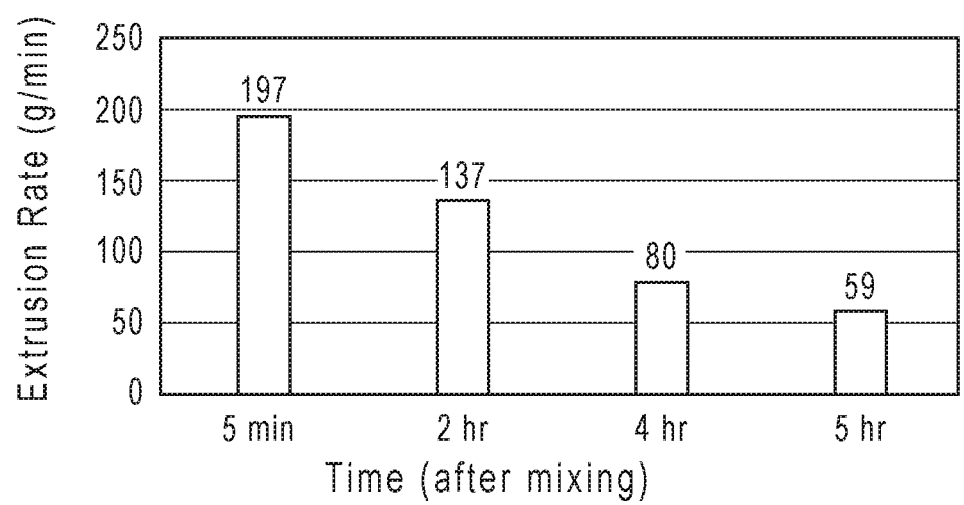
FIG. 8 is a chart showing the extrusion rate of sealants provided by the present disclosure after combining the polythiol component and the polyalkenyl component.

A Fe(III)(acetylacetonate)$_3$/tert-butylperoxybenzoate dark cure catalyst was also evaluated. The application time as reflected in the extrusion rate (B-1/2; greater than 30 min) with time after mixing the polythiol (Part B) and polyalkenyl (Part A) components is shown in FIG. 8. The results show that the practical application time for this system is greater than 2 hours (extrusion rate is greater than 100 g/min).

Figure 9:
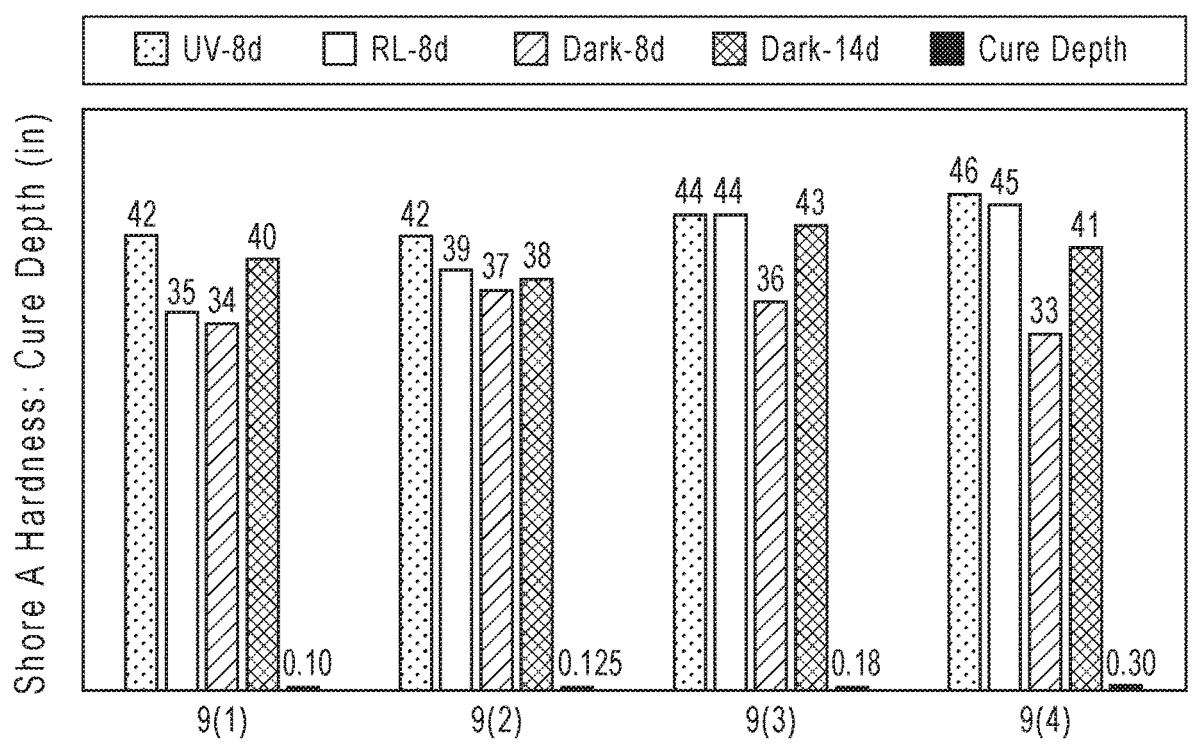
FIG. 9 is a chart showing the hardness and depth of cure of sealants provided by the present disclosure having different amounts of metal complex and organic peroxide.
Figure 10:
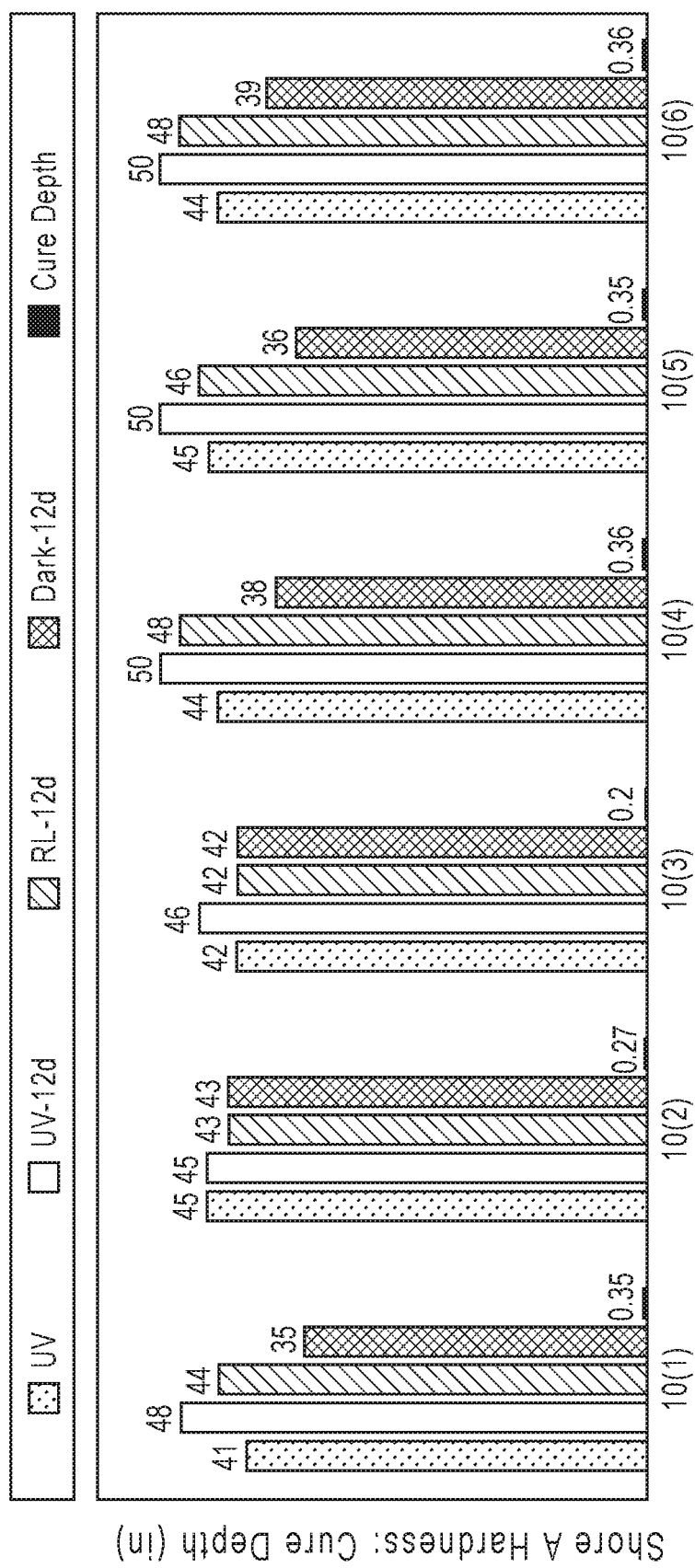
FIG. 10 is a chart showing the hardness and cure depth of sealants provided by the present disclosure having different amounts of organic anion.

FIG. 9 shows the effect of the composition of the dark cure catalyst Fe(III)(acetylacetonate)$_3$/tert-butylperoxybenzoate on the curing rate as reflected in the sample hardness with time. Dark cure catalyst systems having different amounts of organic peroxide (tert-butylperoxybenzoate) and metal catalyst (Fe(III)(acetylacetonate)$_3$) were prepared as in Table 9:

TABLE 9

Dark cure catalyst compositions.

| | Sample 9(1) | Sample 9(2) | Sample 9(3) | Sample 9(4) |
|---|---|---|---|---|
| tert-Butylperoxybenzoate wt % | 1 | 1.89 | 1.89 | 1.89 |
| Fe(III)(acetylacetonate)$_3$, wt % | 0.29 | 0.15 | 0.07 | 0.039 |
| Total Catalyst, wt % | 1.29 | 2.04 | 1.96 | 1.929 |
| Organic Peroxide/Metal Complex Weight Percent Ratio | 3.4 | 12.6 | 27.0 | 48.5 |

The hardness and depth of cure of sealants containing the various dark cure catalyst concentrations were measured (a) eight (8) days after UV exposure, (b) 3 days exposed to room fluorescent lighting (RL), (c) eight (8) days under dark conditions, or (d) twelve (12) days under dark conditions. The results are shown in FIG. 9.

The metal complexes are provided as solutions containing a solvent and anion. For example, Fe(III)(acetylacetonate)$_3$ can be provided as a 10% solution of toluene and acetylacetonate. To evaluate the effects of the metal complex solvent composition on the properties of a dark cured sealant, Fe(III)(acetylacetonate)$_3$ solutions having different solvent compositions were prepared having the solvent compositions shown in Table 10:

TABLE 10

Metal complex solvent composition.

| | 10(1) | 10(2) | 10(3) | 10(4) | 10(5) | 10(6) |
|---|---|---|---|---|---|---|
| Acetylacetonate, wt %[1] | 25 | 50 | 75 | 10 | 5 | 1 |
| Toluene, wt %[1] | 75 | 50 | 25 | 90 | 95 | 99 |

[1]Based on the total weight of the combined solvents.

For these solutions wt % represents the wt % of the total solvent.

Sealants were prepared having 1.89 wt % organic peroxide (tert-butylperoxybenzoate) and 0.10 wt % of the Fe(III)(acetylacetonate)$_3$ solutions shown in Table 10. The hardness and the cure depth of the cured sealants was measured 12 days following application and further exposed to (a) UV, (b) UV after twelve (12) days, (c) room fluorescent lighting (RL) after 12 days, or dark conditions after twelve (12) days. Also, sealants with a Fe(III)(acetylacetonate)$_3$ solution having 100% toluene gelled within 15 min.

Figure 11:
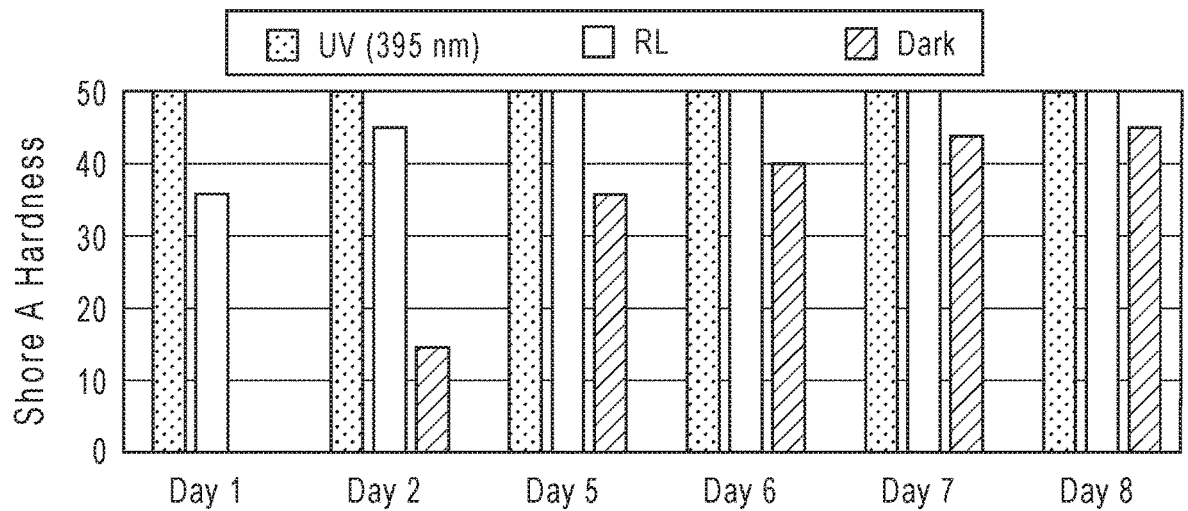
FIG. 11 is a chart showing the hardness of sealants provided by the present disclosure under different curing conditions.
Figure 12:
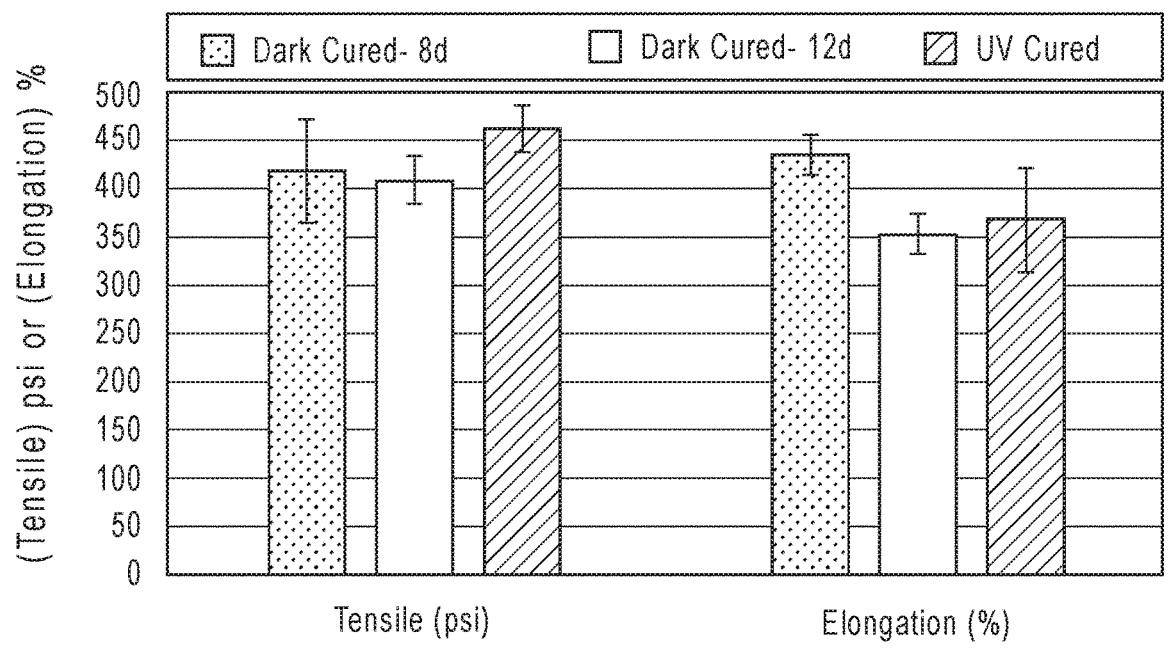
FIG. 12 is a chart showing physical properties of sealants provided by the present disclosure under different curing conditions.

The curing rate as reflected by the hardness of a sealant containing Fe(III)(acac)$_3$ and tert-butyl peroxybenzoate is shown in FIG. 11. The depth of cure for this sealant was 6 mm immediately following exposure to UV (394 nm for 30 sec at 224 mW/cm$^2$) and the depth of cure was 10 mm after one (1) day. The physical properties (tensile/elongation) for the sealant is shown in FIG. 12. The peel strength as determined according to AS 5127/1C, is summarized in Table 11:

TABLE 11

Peel strength of cured sealants.

| Substrate | Dark Cure Peel Strength lb/in | Dark Cure Failure Mode | UV Cured Peel Strength lb/in | UV Cured Failure Mode |
|---|---|---|---|---|
| AMS 2471 (6111-44 primer[1]) | 29 | 100% cohesive | 32 | 100% cohesive |
| AMS 27725 (6111-44 primer) | 28 | 100% cohesive | 30 | 100% cohesive |
| AMS 5513/16 (6111-44 primer) | — | — | 23 | 100% cohesive (thin film) |

[1]Prehydrolyzed organosilane primer available from PPG Aerospace.

Based on these results, for the Fe(III)(acetylacetonate)$_3$/tert-butylperoxybenzoate catalyst, the concentration of the metal complex can be as low as 0.07 wt % and the concentration of the organic peroxide can be as low as 1.5 wt %, where wt % is based on the total weight of the curable composition. Under dark cure conditions the sealant fully cures within 8 days. The application time is greater than 2 h, i.e., 30 min or longer. The physical properties including hardness, tensile/elongation, and peel strength of the dark-cured sealants are comparable to those of the UV-cured sealant. The results suggest the concentration of metal complex can be reduced to within a range from 0.02 wt % to 0.05 wt %; however, at these concentrations the time to fully cure under dark conditions can be longer. Also, the results suggest that adjusting the solvent/anion ratio of the metal complex solution can be used to adjust the dark cure time.

The fuel resistance of compositions provided by the present disclosure was also evaluated. The results are presented in Table 12:

TABLE 12

| | 12(1) Dark Cure | 12(2) UV Cure | 12(3) 1 day/RL | 12(4) Dark Cure |
|---|---|---|---|---|
| | Fuel resistance of cured sealants. | | | |
| Metal complex | Fe(III)(acac)$_3$ 0.1 wt %[1] 10% solution | Fe(III)(acac)$_3$ 0.1 wt % 10% solutions | Fe(III)(acac)$_3$ 0.1 wt % 10% solution | Mn(III)(acac)$_3$ 1.0 wt % 10% solutions |
| Dry Peel Strength, lb/in | 20 (8 day) 30 (11 day) | 25 | 25 | 30 (3 day) |
| Dry Peel Failure Mode | 20% Cohesive (8 day) 20% Cohesive (11 day) | 100% Cohesive | 100% cohesive | 100% cohesive Some surface tack |
| JRF Type I lb/in | >20 | 30 | 30 | 20 |
| JRF Type I Failure Mode | 20% cohesive | 100% Cohesive | 100% Cohesive | 100% Cohesive |

[1]Based on wt % of the curable composition; catalyst in 10 wt % solution of acetyl acetone.

The sealants were applied to an AMS 27725, 6111-44 primed substrate. Peel strength was determined according to AS 5127/1C.

In summary, based on the results for the UV-curable composition (unmodified composition–control) the UV-cured sealant exhibits a tensile/elongation of 450 psi/250%, a hardness of Shore 48A, and a peel strength on several substrates greater than 25 lb/in (0.45 kg/mm). The same dark-cured sealant exhibits comparable physical and adhesive properties at 3 days for the Mn(III)-based sealant and at 8 days for the Fe(III)-based sealant.

It was also observed that standard room fluorescent lighting accelerates curing to a greater extent than dark cure alone. Sealants containing the Fe(III)-based catalyst cure faster under fluorescent lighting than do comparable Mn(III)-based systems and unmodified UV-curable compositions.

Example 5

Short Cure, Dual Cure Formulations

Short-cure sealant formulations having the components as shown in Table 13. Trigonox® C, tert-butyl peroxybenzoate) in the specified wt % was added to the combined Part A and Part B where wt % is based on the total weight of Part A, Part B, and Trigonox® C. The metal catalyst and additive was added to in the specified wt % where wt % is based on the total weight of Part A, Part B, and Trigonox® C. The samples were prepared in a total amount of about 50 g.

TABLE 13

Short-cure sealant formulations.

| Sample | Part A | Part B | Organic Peroxide | Metal Complex | Additive |
|---|---|---|---|---|---|
| 1 | Example 1, Part A Ratio B:A 100:8.2 | Example 1, Part B | Trigonox® C, 1.0 wt % | Mn(acac)$_3$, 0.5 wt %[1] | Ce(NH$_4$)(NO$_3$)$_6$, 0.26 wt %[2] |
| 2 | Example 1, Part A Ratio B:A 100:8.2 | Example 1, Part B | Trigonox® C, 1.0 wt % | Mn(acac)$_3$, 0.25 wt %[1] 2,2'-bipyridyl, 0.25 wt %[3] | |
| 3 | Example 1, Part A Ratio B:A 100:8.2 | Example 1, Part B | Trigonox® C, 1.0 wt % | Mn(acac)$_3$, 0.25 wt %[1] | Silquest® A-1100, 0.25 wt % (amine source) |
| 4 | Example 1, Part A Ratio B:A 100:8.2 | Example 1, Part B | Trigonox® C, 1.0 wt % | Mn(acac)$_3$ 0.5 wt %[1] | Myribond™, 0.5 wt %[5] |
| 5 | Example 1, Part A Ratio B:A 100:8.2 | Example 1, Part B | Trigonox® C, 1.0 wt % | Mn(acac)$_3$, 0.5 wt %[1] | ethyl 4-(dimethylamino) benzoate ; 0.5 wt %[6] (amine synergist) |
| 6 | Example 1, Part A Ratio B:A 100:8.2 | Example 1, Part B | Trigonox® C, 1.0 wt % | Mn(acac)$_2$, 1.0 wt %[7] | |
| 7 | Example 1, Part A Ratio B:A 100:8.2 | Example 1, Part B | Trigonox® C, 1.25 wt % | Mn(acac)$_2$, 1.0 wt %[7] | |

TABLE 13-continued

Short-cure sealant formulations.

| Sample | Part A | Part B | Organic Peroxide | Metal Complex | Additive |
|---|---|---|---|---|---|
| 8 | Example 1, Part A Ratio B:A 100:8.2 | Example 1, Part B | Trigonox ® C, 1.25 wt % | Mn(acac)$_3$ 0.5 wt % [1] | |
| 9 | Example 1, Part A Ratio B:A 100:8.2 | Example 1, Part B | Trigonox ® C, 1.0 wt % | Mn(acac)$_3$, 0.5 wt % [1] Mn(acac)$_2$, 0.3 wt % [7] | |
| 10 | Example 1, Part A Ratio B:A 100:8.2 | Example 1, Part B | Trigonox ® C, 1.0 wt % | Mn(acac)$_3$, 0.5 wt % [1] | Ascorbic acid, 1 wt % [8] |
| 11 | Example 1, Part A Ratio B:A 100:8.2 | Example 1, Part B | Trigonox ® C, 1.0 wt % | Mn(acac)$_3$, 0.5 wt % [1] | p-tolyldiethanol amine, 0.5 wt % [9] |
| 12 | Example 1, Part A Ratio B:A 100:8.2 | Example 1, Part B | Trigonox ® C, 1.0 wt % | Mn(acac)$_3$ | p-tolyldiethanol amine 0.5 wt % [10] |
| 13 | Example 1, Part A Ratio B:A 100:8.2 | Example 1, Part B | Trigonox ® C, 1.0 wt % | Mn(acac)3:2,2'-bipyridyl [11] | |
| 13A | Example 1, Part A Ratio B:A 100:8.2 | Example 1, Part B | Trigonox ® C, 1.0 wt % | Mn(acac)$_3$:2,2'-bipyridyl [11] | |
| 14 | Example 1, Part A Ratio B:A 100:8.2 | Example 1, Part B | Trigonox ® C, 1.0 wt % | Mn(acac)$_3$, 0.25 wt % [1] V(acac)$_3$, 0.25 wt % [12] | |
| 15 | Example 1, Part A Ratio B:A 100:8.2 | Example 1, Part B | Trigonox ® C, 1.0 wt % | V(acac)$_3$: 2,2-bipyridyl, 0.5 wt % [13] | |
| 16 | Example 1, Part A Ratio B:A 100:8.2 | Example 1, Part B | Trigonox ® C, 1.0 wt % | V(acac)3:2,2-bipyridyl , 0.25 wt % [13] | |
| 17 | Example 1, Part A Ratio B:A 100:8.2 | Example 1, Part B | Trigonox ® C, 1.0 wt % | Mn(acac)$_3$:2,2-bipyridyl, 0.5 wt % [14] | |
| 18 | Example 1, Part A Ratio B:A 100:8.2 | Example 1, Part B | Trigonox ® C, 1.0 wt % | Mn(acac)$_3$:2,2-bipyridyl, 1.0 wt % [14] | |
| 19 | Example 1, Part A Ratio B:A 100:8.2 | Example 1, Part B | Trigonox ® C, 1.0 wt % | Mn(acac)$_3$ | p-tolyldiethanol amine 0.75 wt % [10] |
| 20 | Example 1, Part A Ratio B:A 100:8.2 | Example 1, Part B | Trigonox ® C, 1.0 wt % | V(acac)$_3$:2,2-bipyridyl, 0.25 wt % [13] | |
| 21 | Example 1, Part A Ratio B:A 100:8.2 | Example 1, Part B | Trigonox ® C, 1.0 wt % | Mn(acac)$_3$, 0.25 wt % [15] | |
| 22 | Example 1, Part A Ratio B:A 100:8.2 | Example 1, Part B | Trigonox ® C, 1.0 wt % | V(acac)$_3$:2,2-bipyridyl, 0.375 wt % [13] | |
| 23 | Example 1, Part A Ratio B:A 100:8.2 | Example 1, Part B | Trigonox ® C, 1.0 wt % | Mn(acac)$_3$, 0.25 wt % [1] | p-tolyldiethanol amine, 0.5 wt % [9] |
| 24 | Example 1, Part A Ratio B:A 100:8.2 | Example 1, Part B | Trigonox ® C, 1.0 wt % | Mn(acac)$_3$, 0.25 wt % [1] | p-tolyldiethanol amine, 0.25 wt % [9] |

TABLE 13-continued

Short-cure sealant formulations.

| Sample | Part A | Part B | Organic Peroxide | Metal Complex | Additive |
|---|---|---|---|---|---|
| 25 | Example 1, Part A Ratio B:A 100:8.2 | Example 1, Part B | Trigonox ® C, 1.0 wt % | Mn(acac)$_3$, 0.125 wt % [1] | p-tolyldiethanol amine, 0.25 wt % [9] |
| 26 | Example 1, Part A Ratio B:A 100:8.2 | Example 1, Part B | Trigonox ® C, 1.0 wt % | Mn(acac)$_3$, 0.125 wt % [1] | p-tolyldiethanol amine, 0.375 wt % [9] |
| 27 | Example 1, Part A Ratio B:A 100:8.2 | Example 1, Part B | none | Mn(acac)$_3$, 0.125 wt % [1] | Vazo ®-67, 1.0 wt % [16] |
| 28 | Example 1, Part A Ratio B:A 100:8.2 | Example 1, Part B | Trigonox ® C, 1.0 wt % | Mn(acac)$_3$, 0.125 wt % [1] | p-tolyldiethanol amine, 0.5 wt % [9] |
| 28R | Example 1, Part A Ratio B:A 100:8.2 | Example 1, Part B | Trigonox ® C, 1.0 wt % | Mn(acac)$_3$, 0.125 wt % [1] | p-tolyldiethanol amine, 0.5 wt % [9] |
| 29 | Example 1, Part A Ratio B:A 100:8.2 | Example 1, Part B | Trigonox ® C, 1.0 wt % | Mn(acac)$_3$, 0.25 wt % [1] | S-1535 (stearic acid intermediate), 1 wt % [33] |
| 30 | Example 1, Part A Ratio B:A 100:8.2 | Example 1, Part B | none | V(acac)$_3$:2,2-bipyridyl ,0.15 wt % [13] | Vazo ®-67, 1.0 wt % [16] |
| 31 | Example 1, Part A Ratio B:A 100:8.2 | Example 1, Part B | Trigonox ® C, 1.0 wt % | Mn(acac)$_3$, 0.25 wt % [1] | triethanolamine, 0.375 wt % [17] |
| 32 | Example 1, Part A Ratio B:A 100:8.2 | Example 1, Part B | Trigonox ® C, 1.0 wt % | Mn(acac)$_3$, 0.25 wt % [1] | triethanolamine, 0.5 wt % [17] |
| 33 | Example 1, Part A Ratio B:A 100:8.2 | Example 1, Part B | Trigonox ® C, 1.0 wt % | Mn(acac)$_3$, 0.25 wt % [1] | S-1535 (stearic acid intermediate), 1 wt % [33] |
| 33R | Example 1, Part A Ratio B:A 100:8.2 | Example 1, Part B | Trigonox ® C, 1.0 wt % | Mn(acac)$_3$, 0.25 wt % [1] | S-1535 (stearic acid intermediate), 1 wt % |
| 34 | Example 1, Part A Ratio B:A 100:8.2 | Example 1, Part B | Trigonox ® C, 1.0 wt % | Mn(acac)$_3$, 0.25 wt % [1] | 4-N,N-trimethylaniline, 0.5 wt % [18] |
| 35 | Example 1, Part A Ratio B:A 100:8.2 | Example 1, Part B | Trigonox ® C, 1.0 wt % | Mn(acac)$_3$, 0.25 wt % [1] | 5-vinyl-2-norbornene, 0.5 wt % [19] |
| 36 | Example 1, Part A Ratio B:A 100:8.2 | Example 1, Part B | Trigonox ® C, 1.0 wt % | Mn(acac)$_3$, 0.25 wt % [1] | 4-N,N-trimethylaniline, 0.5 wt % [18] |
| 37 | Example 1, Part A Ratio B:A 100:8.2 | Example 1, Part B | Trigonox ® C, 1.0 wt % | Mn(acac)$_3$, 0.25 wt % [1] | Ethacure ® 100, 0.5 wt % [20] |
| 38 | Example 1, Part A Ratio B:A 100:8.2 | Example 1, Part B | Trigonox ® C, 1.0 wt % | Mn(acac)$_3$, 0.5 wt % [1] | |
| 39 | Example 1, Part A Ratio B:A 100:8.2 | Example 1, Part B | Trigonox ® C, 1.0 wt % | Mn acetate dihydrate 0.5 wt % [1] | |
| 40 | Example 1, Part A Ratio B:A 100:8.2 | Example 1, Part B | Trigonox ® C, 1.0 wt % | Mn(acac)$_3$, 0.25 wt % [1] | Ethacure ® 100, 0.25 wt % [20] |

TABLE 13-continued

Short-cure sealant formulations.

| Sample | Part A | Part B | Organic Peroxide | Metal Complex | Additive |
|---|---|---|---|---|---|
| 41 | Example 1, Part A Ratio B:A 100:8.2 | Example 1, Part B | Trigonox ® C, 1.0 wt % | Mn(acac)$_3$, 0.25 wt % [1] | Ethacure ® 100, 0.125 wt % [20] |
| 42 | Example 1, Part A Ratio B:A 100:8.2 | Example 1, Part B | Trigonox ® C, 1.0 wt % | Mn(acac)$_3$, 0.125 wt % [1] | Ethacure ® 100, 0.125 wt % [20] |
| 43 | Example 1, Part A Ratio B:A 100:8.2 | Example 1, Part B | Trigonox ® C, 1.0 wt % | No metal catalyst | Ethacure ® 100, 0.5 wt % [20] |
| 44 | Example 1, Part A Ratio B:A 100:8.2 | Example 1, Part B | Trigonox ® C, 1.0 wt % | Mn(acac)$_3$, 0.25 wt % [1] | Ethacure ® 300, 0.25 wt % [20] |
| 45 | Example 1, Part A Ratio B:A 100:8.2 | Example 1, Part B | Trigonox ® C, 1.0 wt % | Mn(acac)$_3$, 0.25 wt % [1] | Ethacure ® 300, 0.125 wt % [20] |
| 46 | Example 1, Part A Ratio B:A 100:8.2 | Example 1, Part B | Trigonox ® C, 1.0 wt % | Mn(acac)$_3$, 0.25 wt % [1] | Ethacure ® 300, 0.06125 wt % [20] |
| 47 | Example 1, Part A Ratio B:A 100:8.2 | Example 1, Part B | Trigonox ® C, 1.0 wt % | Mn(acac)$_3$, 0.25 wt % [1] | |
| 48 | Example 1, Part A Ratio B:A 100:8.2 | Example 1, Part B | Trigonox ® C, 1.0 wt % | Mn(acac)$_3$, 0.25 wt % [1] | 2,5-diphenylfuran [21] |
| 49 | Example 1, Part A Ratio B:A 100:8.2 | Example 1, Part B | Trigonox ® C, 1.0 wt % | Mn(acac)$_3$, 0.25 wt % [1] | 9,16-dimethylanthracene [22] |
| 50 | Example 1, Part A Ratio B:A 100:8.2 | Example 1, Part B | Trigonox ® C, 1.0 wt % | Mn(acac)$_3$, 0.25 wt % [1] | |
| 51 | Example 1, Part A Ratio B:A 100:8.0 | Example 1, Part B | Trigonox ® C, 1.0 wt % | Mn(acac)$_3$, 0.25 wt % [1] | |
| 52 | Example 1, Part A Ratio B:A 100:7.8 | Example 1, Part B | Trigonox ® C, 1.0 wt % | Mn(acac)$_3$, 0.25 wt % [1] | |
| 53 | Example 1, Part A Ratio B:A 100:8.4 | Example 1, Part B | Trigonox ® C, 1.0 wt % | Mn(acac)$_3$, 0.25 wt % [1] | |
| 54 | Example 1, Part A Ratio B:A 100:8.6 | Example 1, Part B | Trigonox ® C, 1.0 wt % | Mn(acac)$_3$, 0.25 wt % [1] | |
| 55 | Example 1, Part A CHDMDVE replaced with TEGDVE (2.7% higher HBVE) Ratio B:A 100:7.6 | Example 1, Part B | Trigonox ® C, 1.0 wt % | Mn(acac)$_3$, 0.25 wt % [1] | |
| 56 | Example 1, Part A CHDMDVE replaced with TEGDVE (2.7% higher HBVE) Ratio B:A 100:7.6 | Example 1, Part B | Trigonox ® C, 1.0 wt % | Mn(acac)$_3$, 0.25 wt % [1] | p-tolyldiethanol amine, 0.25 wt % [9] |

TABLE 13-continued

Short-cure sealant formulations.

| Sample | Part A | Part B | Organic Peroxide | Metal Complex | Additive |
|---|---|---|---|---|---|
| 37 | Example 1, Part A Replaced CHDMDVE with TEGDVE (2.7% higher HBVE) Ratio B:A 100:7.6 | Example 1, Part B | Trigonox ® C, 1.0 wt % | Mn(acac)$_3$, 0.25 wt % [1] | p-toluidine, 0.25 wt % [23] |
| 58 | Example 1, Part A CHDMDVE replaced with TEGDVE (2.7% higher HBVE) Ratio B:A 100:7.6 | Example 1, Part B | Trigonox ® C, 1.0 wt % | Mn(acac)$_3$, 0.25 wt % [1] | p-toluidine, 0.375 wt % [23] |
| 59 | Example 1, Part A CHDMDVE replaced with TEGDVE (2.7% higher HBVE) Ratio B:A 100:7.6 | Example 1, Part B | Trigonox ® C, 1.0 wt % | Mn(acac)$_3$, 0.25 wt % [1] | p-toluidine, 0.375 wt % [23] |
| 60 | Example 1, Part A CHDMDVE replaced with TEGDVE (2.7% higher HBVE) Ratio B:A 100:7.2 | Example 1, Part B | Trigonox ® C, 1.0 wt % | Mn(acac)$_3$, 0.25 wt % [1] | |
| 61 | Example 1, Part A CHDMDVE replaced with TEGDVE (2.7% higher HBVE) Ratio B:A 100:7.2 | Example 1, Part B | Trigonox ® C, 1.0 wt % | Mn(acac)$_3$, 0.5 wt % [1] | |
| 62 | Example 1, Part A CHDMDVE replaced with TEGDVE (2.7% higher HBVE) Ratio B:A 100:7.2 | Example 1, Part B | Trigonox ® C, 1.0 wt % | Mn(acac)$_3$, 0.25 wt % [1] | p-toluidine, 0.25 wt % [23] |
| 63 | Example 1, Part A CHDMDVE replaced with TEGDVE (2.7% higher HBVE) Ratio B:A 100:7.2 | Example 1, Part B | Trigonox ® C, 1.0 wt % | Mn(acac)$_3$, 0.25 wt % [1] | p-toluidine, 0.125 wt % [23] |

TABLE 13-continued

Short-cure sealant formulations.

| Sample | Part A | Part B | Organic Peroxide | Metal Complex | Additive |
|---|---|---|---|---|---|
| 64 | Example 1, Part A CHDMDVE replaced with TEGDVE (2.7% higher HBVE) Ratio B:A 100:7.2 | Example 1, Part B | Trigonox ® C, 1.0 wt % | Mn(acac)$_3$, 0.25 wt % [1] | p-tolyldiethanol amine, 0.25 wt % [9] |
| 65 | Example 1, Part A CHDMDVE replaced with TEGDVE (2.7% higher HBVE) Ratio B:A 100:7.2 | Example 1, Part B | Trigonox ® C, 1.0 wt % | Mn(acac)$_3$, 0.25 wt % [1] | p-tolyldiethanol amine, 0.125 wt % [9] |
| 66 | Example 1, Part A CHDMDVE replaced with TEGDVE (2.7% higher HBVE) Ratio B:A 100:7.2 | Example 1, Part B | Trigonox ® C, 1.0 wt % | Mn(acac)$_3$, 0.25 wt % [1] | Tetramethylthiuram disulfide, 0.25 wt % [24] |
| 67 | Example 1, Part A CHDMDVE replaced with TEGDVE (2.7% higher HBVE) Ratio B:A 100:7.2 | Example 1, Part B | Trigonox ® C, 1.0 wt % | Mn(acac)$_3$, 0.25 wt % [1] | tris(2-pyridylmethyl)amine, 0.25 wt % [25] |
| 68 | Example 1, Part A CHDMDVE replaced with TEGDVE on weight basis Ratio B:A 100:7.5 | Example 1, Part B | Trigonox ® C, 1.0 wt % | Mn(acac)$_3$, 0.25 wt % [1] Iron(II) sulfate heptahydrate, 0.10 wt % [26] | |
| 69 | Example 1, Part A CHDMDVE replaced with TEGDVE on weight basis Ratio B:A 100:7.5 | Example 1, Part B | Trigonox ® C, 1.0 wt % | Mn(acac)$_3$, 0.25 wt % [1] Iron(II) sulfate heptahydrate, 0.35 wt % [26] | |
| 70 | Example 1, Part A CHDMDVE replaced with TEGDVE on weight basis Ratio B:A 100:7.5 | Example 1, Part B | Trigonox ® C, 1.0 wt % | Mn(acac)$_3$, 0.25 wt % [1] Iron(III)(acac)$_3$, 0.07 wt % [27] | |
| 71 | Example 1, Part A CHDMDVE replaced with TEGDVE on weight basis Ratio B:A 100:7.5 | Example 1, Part B | Trigonox ® C, 1.0 wt % | Mn(acac)$_3$, 0.25 wt % [1] Iron(III)(acac)$_3$, 0.10 wt % [27] | |

TABLE 13-continued

Short-cure sealant formulations.

| Sample | Part A | Part B | Organic Peroxide | Metal Complex | Additive |
|---|---|---|---|---|---|
| 72 | Example 1, Part A CHDMDVE replaced with TEGDVE on weight basis Ratio B:A 100:7.5 | Example 1, Part B | Trigonox ® C, 1.0 wt % | Mn(acac)$_3$, 0.25 wt % [1] Iron(III)(acac)$_3$, 0.07 wt % [27] | |
| 73 | Example 1, Part A CHDMDVE replaced with TEGDVE on weight basis Ratio B:A 100:7.5 | Example 1, Part B | Trigonox ® C, 1.0 wt % | Mn(acac)$_3$, 0.25 wt % [1] Iron(II) sulfate heptahydrate, 0.5 wt % [26, 28] | |
| 74 | Example 1, Part A CHDMDVE replaced with TEGDVE on weight basis Ratio B:A 100:7.5 | Example 1, Part B | Trigonox ® C, 1.0 wt % | Mn(acac)$_3$, 0.25 wt % [1] Iron(II) sulfate heptahydrate, 0.35 wt % [26, 29] | |
| 75 | Example 1, Part A CHDMDVE replaced with TEGDVE on weight basis Ratio B:A 100:7.5 | Example 1, Part B | Trigonox ® C, 1.0 wt % | Mn(acac)$_3$, 0.25 wt % [1] | Methyl propyl ketone, 1 wt % (solvent) |
| 76 | Example 1, Part A CHDMDVE replaced with TEGDVE on weight basis Ratio B:A 100:7.5 | Example 1, Part B | Trigonox ® C, 1.0 wt % | Mn(acac)$_3$, 0.25 wt % [1] | Ethyl acetate, 1 wt % (solvent) |
| 79 | Example 1, Part A | Example 1, Part B | Trigonox ® C, 1.0 wt % | Mn(acac)$_3$, 0.25 wt % [1] | isopropanol, 1 wt % (solvent) |
| 80 | CHDMDVE replaced with | | | Mn(acac)$_3$, 0.25 wt % [1] | hexanes, 1 wt % (solvent) |
| 81 | TEGDVE on weight basis | | | Mn(acac)$_3$, 0.25 wt % [1] | methanol, 1 wt % (solvent) |
| 82 | Ratio B:A 100:7.5 | | | Mn(acac)$_3$, 0.25 wt % [1] | cyclohexane, 1 wt % (solvent) |
| 83 | | | | Mn(acac)$_3$, 0.25 wt % [1] | toluene, 1 wt % (solvent) |
| 84 | | | | Mn(acac)$_3$, 0.25 wt % [1] | Distilled water, 1 wt % (solvent) |
| 85 | Example 1, Part A | Example 1, Part B | Trigonox ® C, 1.0 wt % | Mn(acac)$_3$, 0.25 wt % [1] | Firstcure MHPT, 0.25 wt % [31] |
| 86 | CHDMDVE replaced with | | | Mn(acac)$_3$, 0.25 wt % [1] | Firstcure MHPT, 0.375 wt % [31] |
| 87 | TEGDVE on weight basis | | | Mn(III)-stearate, 0.25 wt % [32] | |

TABLE 13-continued

Short-cure sealant formulations.

| Sample | Part A | Part B | Organic Peroxide | Metal Complex | Additive |
|---|---|---|---|---|---|
| 88 | Ratio B:A 100:7.5 | | | Mn(III)-stearate, 0.5 wt % [32] | |

[1] 10% solution acetylacetone.
[2] 10% solution in water.
[3] 10% solution in acetylacetone.
[4] Used as a source of amine to modulate surface cure.
[5] Myriant, Myr174-6; tack time modifier.
[6] 10% solution in acetylacetone; used as an amine synergist to modulate surface cure
[7] 5% solution in acetylacetone; Mn(II)(acac)$_2$ has much lower solubility in (acac) and was solubilized by heating to 140° F. "for 4 h.
[8] 10% solution in acetylacetone; oxygen scavenger.
[9] 10% solution in acetylacetone.
[10] 0.5 wt % of a 10% solution of 1:1 mole ratio of Mn(acac)$_3$ and p-tolyldiethanol amine in acetylacetone.
[11] 0.5 wt % of a 10% solution of 1:1 mole ratio of Mn(acac)$_3$ and 2,2'-bipyridyl in acetylacetone.
[12] 10% solution in acetylacetone.
[13] 10% solution of 1:2 moles of V(acac)$_3$:2,2'-bipyridyl in HB-40.
[14] 10% solution of 1:2 moles of Mn(acac)$_3$:2,2'-bipyridyl in HB-40.
[15] 10% solution of Mn(acac)$_3$ in toluene.
[16] 50% solution in acetylacetone.
[17] 10% solution in acetylacetone.
[18] Neat.
[19] mixture of endo and exo 95%, contains 80-150 ppm BHT as inhibitor (Aldrich); neat; contains 80-150 ppm BHT (butylated hydroxytoluene) as inhibitor (Aldrich); tack time modifier.
[20] 10% solution in acetylacetone.
[21] 1 mole equivalent of Mn(acac)$_3$, of 2,5-diphenylfuran:7.8 mg in 0.25 g of acetylacetone; free radical scavenger.
[22] 1 mole equivalent of Mn(acac)$_3$, of 9,16-dimethylanthracene:7.3 mg in 0.25 g of acetylacetone; UV sensitizer.
[23] 10% solution in acetylacetone.
[24] 10% solution in HP-40 in acetylacetone; UV sensitizer.
[25] 10% solution in acetylacetone.
[26] 10% solution in distilled water.
[27] 10% solution in acetylacetone.
[28] Both catalysts were added at the same time to Parts A and B.
[29] Iron catalyst was added first to Parts A and B, mixed, and then the Mn catalyst was added.
[30] 10% solution in distilled water.
[31] 10% solution in acetylacetone, Albemarle; amine accelerator.
[32] Mn(III)-stearate complex was prepared by combining 3 eq stearic acid dissolved in ethyl acetate) for 3 h at 25° C. Stearic acid was dissolved in thienyl acetate as 10% solution.
[33] Tack time modifier.

Note that the metal complexes were added to the sealant composition as a dilute solution. For example, Mn(acac)$_3$ was provided as 10 wt % Mn(acac)$_3$ in a solution of acetylacetone. Adding 1 wt % of this 10% Mn(acac)$_3$ solution to a composition effectively adds 0.1 wt % of the Mn(acac)$_3$ complex to the composition.

Example 6

Adhesion of Short Cure. Dual Cure Formulations

The adhesion of UV- and dark-cured samples was determined for the Short-Cure Formulation 1 (see Table 13), which included Mn(acac)$_3$ as the metal complex and Ce(NH$_4$)(NO$_3$)$_6$ as a nitrogen synergist. The adhesion was tested on AMS 27725, AMS 4911, 2024-T3, AMS 2471, and AMS 5516 substrates. Test panels were treated with a RW 6111-44 surface primer (available from PPG Aerospace). A 0.125-inch (3.175-mm) thick layer of the formulation was applied to the primed substrate. The samples were either exposed to 1 J/cm$^2$ to 2 J/cm$^2$ of UVA radiation or cured in the dark at 25° C. for several hours. The peel strength and cohesive failure was determined according to AS 5127/1C. The results are shown in Table 14.

TABLE 14

Adhesion of Short-Cure Formulation 1 cured under UV- and dark cure conditions.

| Peel Panel | Exposure | | Peel (lbs/in) | Cohesive |
|---|---|---|---|---|
| AMS 27725 | UV | 45 sec | 19 | 100% |
| | Dark | 40 hr | 39 | 100% |
| AMS 4911 | UV | 45 sec | 19 | 100% |
| | Dark | 30 hr | 28 | 100% |
| 2024-T3 | UV | 45 sec | 16 | 50% |
| | Dark | 40 hr | 23 | 50% |
| AMS 2471 | UV | 45 sec | 33 | 90% |
| | Dark | 40 hr | 33 | 100% |
| AMS 5516 | UV | 45 sec | 24 | 100% |
| | Dark | 40 hr | 37 | 100% |

The adhesion of UV- and dark-cured samples was determined for the Short-Cure Formulation 1 (see Table 13), which included Mn(acac)$_3$ as the metal complex and Ce(NH$_4$)(NO$_3$)$_6$ as a nitrogen synergist following immersion in Jet Reference Fluid (JRF) Type I or NaCl solution. The adhesion was tested on AMS 27725, AMS 4911, 2024-T3, AMS 2471, and AMS 5516 substrates. Test panels were treated with a RW 6111-44 surface primer (available from PPG Aerospace). A 0.125-inch (3.175-mm) thick layer of the formulation was applied to the primed substrate. The samples were either exposed to 1 J/cm$^2$ to 2 J/cm$^2$ of UVA radiation, or cured in the dark for about 40 hours. The samples were immersed in JRF Type I for 7 days at 60° C. followed by 3 days at 25° C., according to AMS 2620, Rev.

E, or to a 3% NaCl solution for 7 days at 60° C. followed by 3 days at 25° C. The results are shown in Table 15 and in Table 16, respectively.

TABLE 15

Adhesion of Short-Cure Formulation 1 cured under UV- and dark cure conditions and following immersion in Jet Reference Fluid Type I.

| Peel Panel | Exposure | Peel (lbs/in) | Cohesive | Delamination |
|---|---|---|---|---|
| AMS 27725 | UV | 20 | 70% | 30% |
|  | Dark | 35 | 25% | 75% |
| AMS 4911 | UV | 25 | 10% | 90% |
|  | Dark | 40 | 20% | 80% |
| 2024-T3 | UV | 30 | 80% | 20% |
|  | Dark | 30 | 50% | 50% |
| AMS 2471 | UV | 35 | 20% | 80% |
|  | Dark | 25 | 5% | 90% |
| AMS 5516 | UV | 20 | 60% | 0% |
|  | Dark | 35 | 80% | 20% |

TABLE 16

Adhesion of Short-Cure Formulation 1 cured under UV- and dark cure conditions and following immersion in 3% NaCl solution.

| Peel Panel | Exposure | Peel (lbs/in) | Cohesive | Delamination |
|---|---|---|---|---|
| AMS 27725 | UV | 23 | 95% | 5% |
|  | Dark | 30 | 20% | 80% |
| AMS 4911 | UV | 25 | 70% | 30% |
|  | Dark | 40 | 20% | 80% |
| 2024-T3 | UV | 27 | 90% | 10% |
|  | Dark | 28 | 40% | 60% |
| AMS 2471 | UV | 25 | 10% | 90% |
|  | Dark | 30 | 10% | 90% |
| AMS 5516 | UV | 18 | 40% | 0% |
|  | Dark | 28 | 20% | 80% |

Example 7

Heat Resistance of Short Cure, Dual Cure Formulations

The heat resistance properties of UV- and dark-cured samples was determined for the Short-Cure Formulations 3 and 10 (see Table 13) according to AMS 3277J Section 3.6.21 (Heat Cycle Test). These formulations had an application time from 30 min to 45 min. Test panels were treated with a RW 6111-44 surface primer (prehydrolyzed organosilane primer available from PPG Aerospace). A 0.125-inch (3.175-mm) thick layer of either Formula 3 or Formulation 10 was applied to the primed substrate. The samples were either exposed to 1 J/cm² to 2 J/cm² of UVA radiation or cured in the dark for about 72 hours. Following cure, the samples were immersed in JRF Type I for 7 days at 60° C. (AMS 2629) followed by 3 days air dry at 49° C. and 7 days heat aging at 149° C. (300° F.). The results for Formulation 3 and Formulation 10 are shown in Table 17 and in Table 18, respectively.

TABLE 17

Heat Resistance of Short Cure Formulation 3.

| | Initial | | | Following Exposure to AMS 3277J Heat Cycle | | |
|---|---|---|---|---|---|---|
| Cure | Tensile Strength (psi) | Elongation (%) | Hardness Shore A | Tensile strength (psi) | Elongation (%) | Hardness Shore A |
| UV | 374 ± 13 | 276 ± 17 | 47 | 241 ± 27 | 160 ± 19 | 47 |
| Dark | 347 ± 7 | 335 ± 12 | 45 | 253 ± 29 | 154 ± 16 | 45 |

TABLE 18

Heat Resistance of Short Cure Formulation 10.

| | Initial | | | Following Exposure to AMS 3277J Heat Cycle | | |
|---|---|---|---|---|---|---|
| Cure | Tensile Strength (psi) | Elongation (%) | Hardness Shore A | Tensile strength (psi) | Elongation (%) | Hardness Shore A |
| UV | 320 ± 16 | 272 ± 10 | 47 | 251 ± 26 | 187 ± 28 | 46 |
| Dark | 391 ± 3 | 325 ± 13 | 45 | 215 ± 30 | 210 ± 29 | 45 |

Example 8

Application and Tack Free Time of Short Cure, Dual Cure Formulations

The application time (AT) and the tack free time (TFT) for various short-cure formulations containing cure profile modifiers was determined. Test samples were prepared by combining the components for several short cure formulations as shown in Table 13. Application time was determined as the duration from the time the components were combined to the time the sealant exhibited an extrusion rate of 15 g/min when extruded through a No. 440 nozzle (Semco, 0.125-inch internal diameter and 4-inch length, available from PPG Aerospace) at a pressure of 90 psi (620 KPa). The open time was determined by applying a 0.125-inch thick coating of the sealant to a substrate, and at intervals while the sealant cured, applying a polyethylene sheet to the sealant surface with hand pressure, removing the polyethylene sheet and observing whether any sealant adhered to the polyethylene sheet. The tack free time was the duration from the time the sealant components were first combined to the time when no sealant was observed on the polyethylene sheet.

Figure 13:
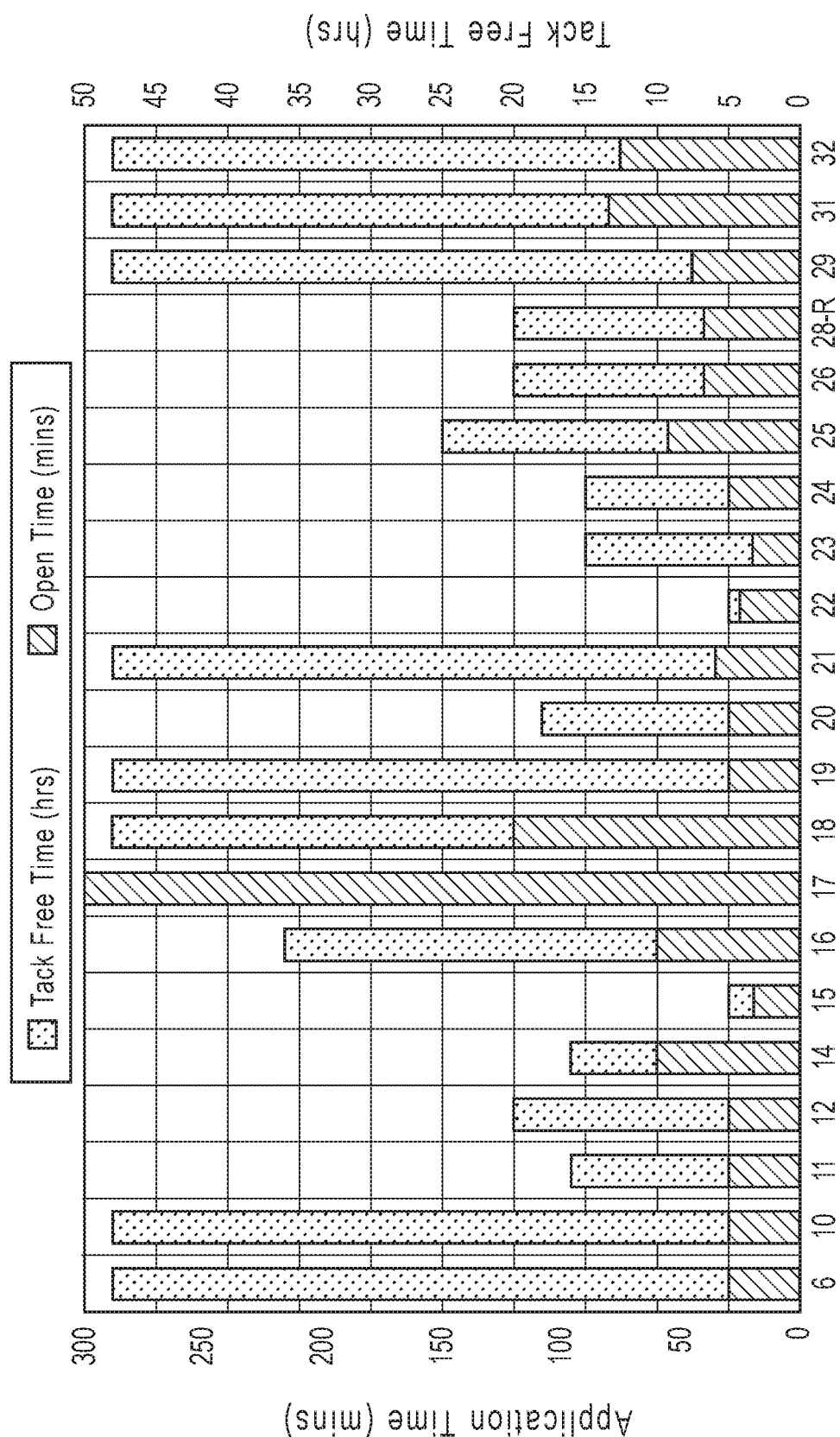
FIG. 13 is a chart showing the application time and tack free time for various short cure sealant formulations.

The results shown in FIG. 13, demonstrate that a wide range of application times and tack free times can be obtained by selecting the metal catalyst(s) and additive(s). The formulation number is referred in the table.

Figure 14:
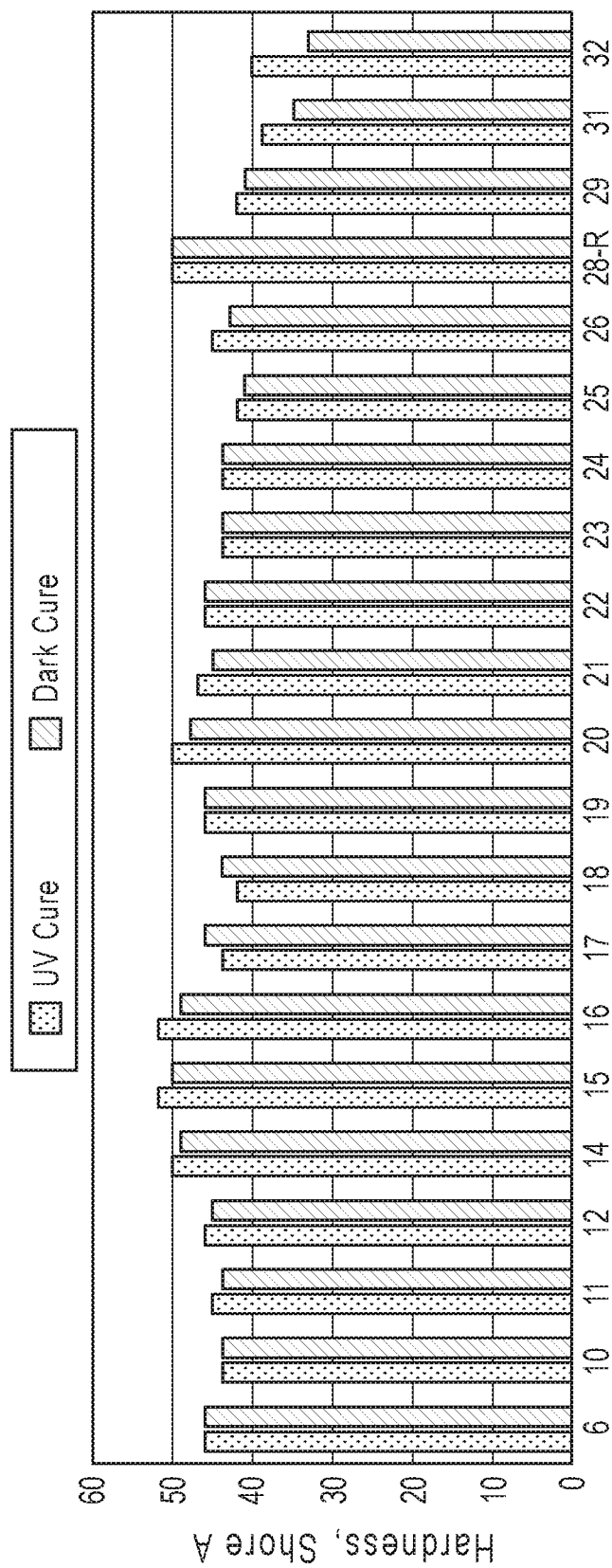
FIG. 14 is a chart showing the Shore A hardness of short cure sealants cured under UV and dark conditions.
Figure 15:
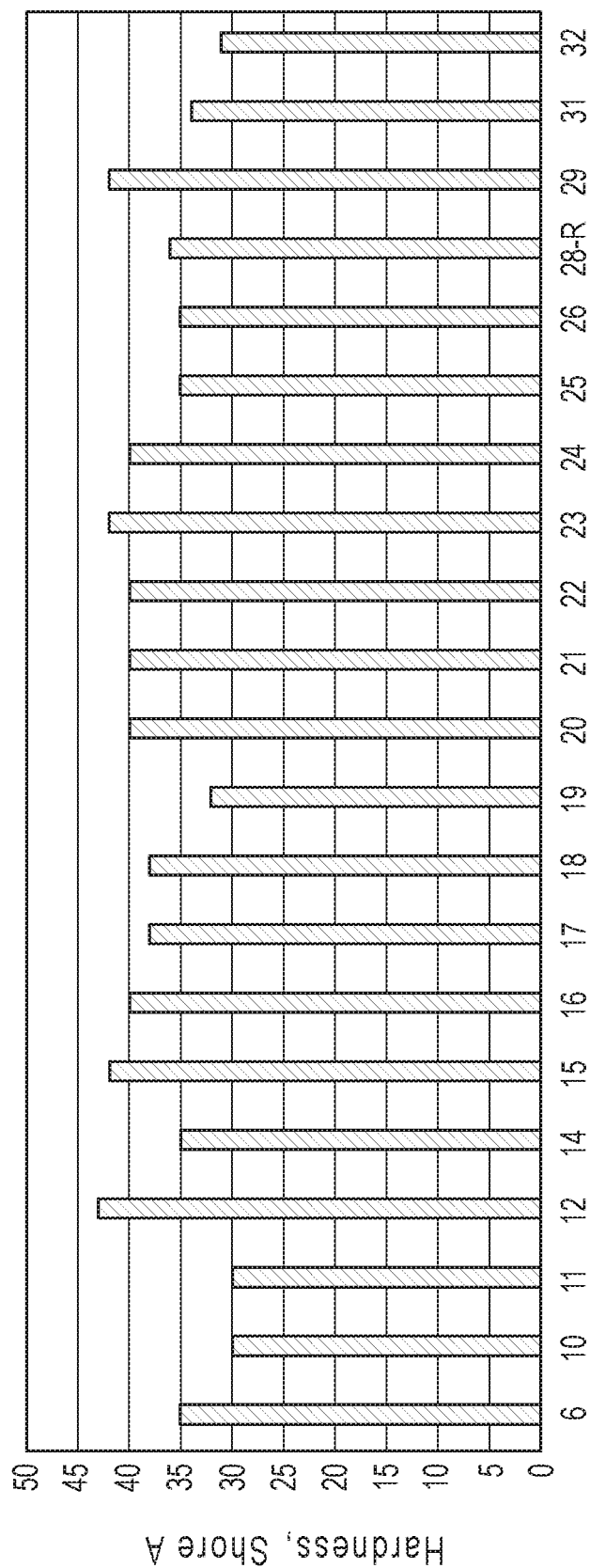
FIG. 15 is a chart showing the Shore A hardness of sealants measured within a few minutes following UV exposure.

FIG. 14 shows the Shore A hardness of fully cured sealants under UV and dark cure conditions. Sealant components were combined according to Table 13, and the sealant formulations applied to a substrate to a thickness of 0.125 inches (3.175 mm). For the UV cured samples, the sealants were exposed to 1 J/cm² to 2 J/cm² of UVA radiation, and maintained at 25° C. for 7 days. The initial Shore A hardness of the sealants within a few minutes following exposure to UV and the results are shown in FIG. 15. For the dark cured samples, the sealants were stored under dark conditions at 25° C. for 7 days. The Shore A hardness was measured according to ASTM D2240 using a Type A durometer.

The application time, tack free time, and initial Shore A hardness of several short cure sealant formulations included in Table 13 are shown in Table 19. The application time was determined by extrusion as described herein. The tack free time by applying a polyethylene sheet to the sealant surface with hand pressure and observing adhesion of the sealant. The initial Shore A hardness was measured within a few minutes following exposure to The UVA radiation. In general, for many applications it can be desirable that the application time be at least 30 minutes, the tack free time be at least 25 hours, and the initial hardness following exposure to UV be at least Shore 35A. Formulations 11, 12, 26, and 28-R included an amine synergist. Sealant formulations 14 and 20 included a co-catalyst. Sealant formulation 73 included an oxygen scavenger.

TABLE 19

Application time, tack free time an initial hardness of short cure sealant formulations.

| Sealant Formulation | Application Time (min) | Tack Free Time(hr) | Shore A Hardness (Initial) |
|---|---|---|---|
| 6 | 30 | 48 | 35 |
| 10 | 30 | 48 | 30 |
| 11 | 30 | 16 | 30 |
| 12 | 30 | 20 | 43 |
| 14 | 60 | 16 | 35 |
| 15 | 20 | 5 | 42 |
| 16 | 60 | 36 | 40 |
| 17 | 300 | 48 | 38 |
| 18 | 120 | 48 | 38 |
| 19 | 30 | 48 | 32 |
| 20 | 30 | 18 | 40 |
| 21 | 35 | 48 | 40 |
| 22 | 25 | 5 | 40 |
| 23 | 20 | 15 | 42 |
| 24 | 30 | 15 | 40 |
| 25 | 55 | 25 | 35 |
| 26 | 40 | 20 | 35 |
| 28R | 40 | 20 | 36 |
| 29 | 45 | 48 | 42 |
| 31 | 80 | 48 | 34 |
| 32 | 75 | 48 | 31 |
| 34 | 50 | 24 | 36 |
| 36 | 20 | 24 | 37 |
| 37 | 10 | 17 | 35 |
| 40 | 15 | 18 | 44 |
| 41 | 15 | 18 | 44 |
| 46 | 20 | 26 | 42 |
| 47 | 30 | 36 | 36 |
| 49 | 30 | 36 | 35 |
| 50 | 40 | 24 | 45 |
| 55 | 60 | 48 | 41 |
| 56 | 30 | 48 | 40 |
| 62 | 40 | 36 | 42 |
| 65 | 30 | 30 | 45 |
| 68 | 50 | 48 | 46 |
| 69 | 40 | 48 | 45 |
| 73 | 30 | 20 | 27 |
| 74 | 40 | 24 | 44 |

Figure 16A:
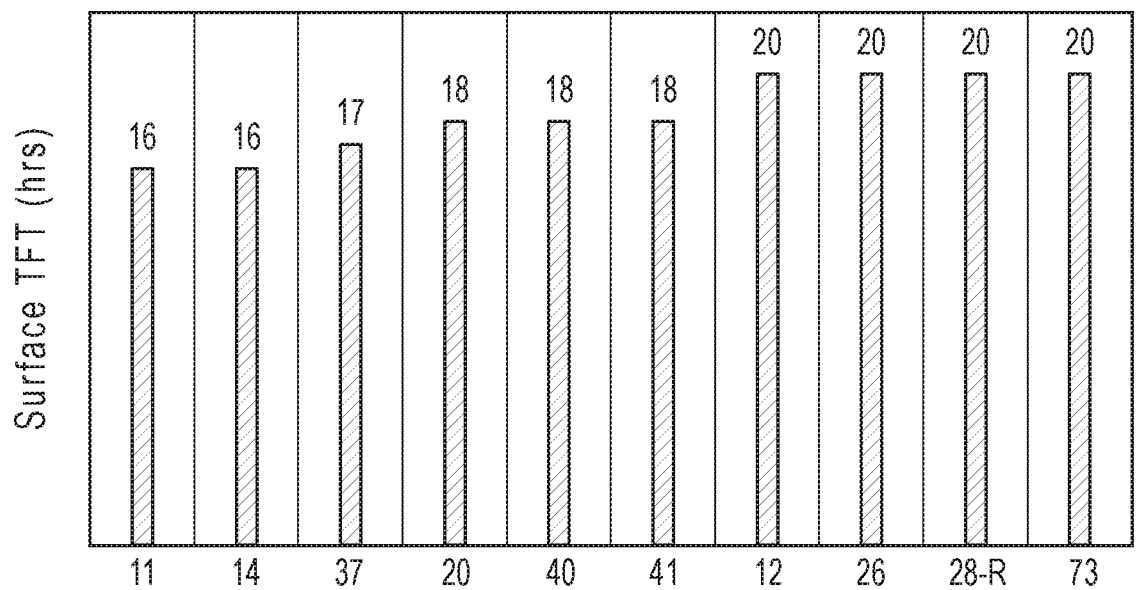
FIG. 16A is a chart showing the application time for certain of the short cure, dual cure sealant formulations presented in Table 13.
Figure 16B:
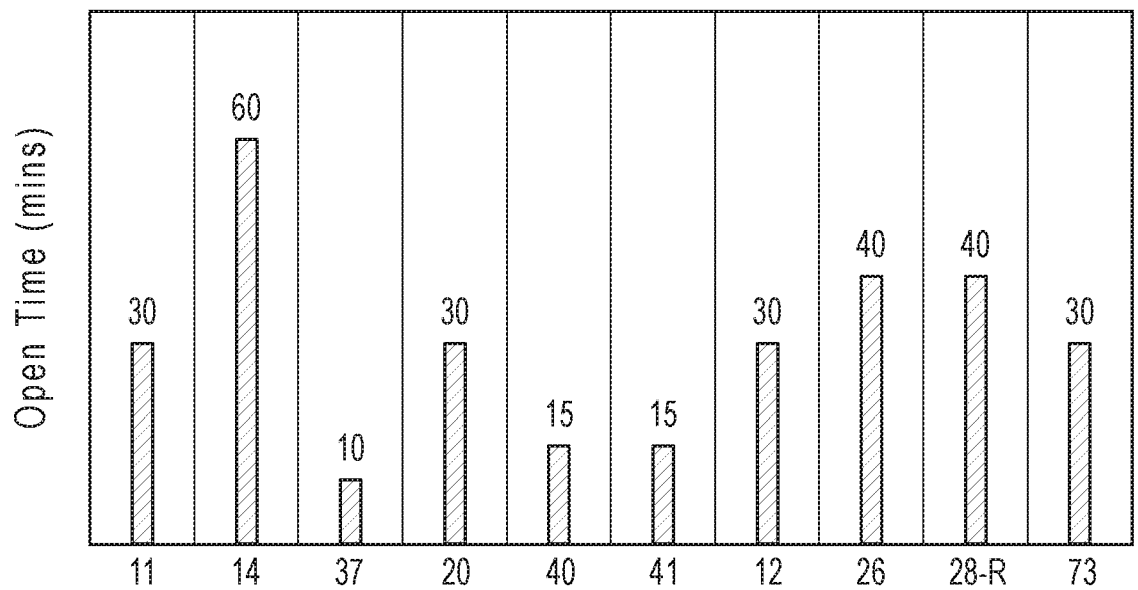
FIG. 16B is a chart showing the open time for certain of the short cure, dual cure sealant formulations presented in Table 13.

FIGS. 16A and 16B show the application time and open time, respectively, for certain of the sealant formulations in Table 13, in a chart format.

Example 9

Physical Properties of Long Cure. Dual Cure Formulations

The physical properties of various long cure sealants shown in Table 20 was determined following UV and dark cure. The results are presented in Table 21 for the dark cured sealants, and in Table 22 for the UV cured sealants. The hardness was measured for the fully cured samples used for the tensile/elongation measurements. In general, for certain applications, it can be desirable that the tensile strength be greater than 200 psi (1.38 MPa) and the % elongation be greater than 300%.

TABLE 20

Long-cure sealant formulations.

| Sample | Part A | Part B | Organic Peroxide | Metal Complex or Compound | Additive |
|---|---|---|---|---|---|
| LC-1 | Example 1, Part A Ratio B:A 100:8.2 | Example 1, Part B | TBPB 2 wt %[1] | Borchi ® OXY-coat 1310[6] 1.1 wt % | NA |
| LC-2 | Example 1, Part A Ratio B:A 100:8.2 | Example 1, Part B | TBPB 2 wt % | 15% Potassium Hex-cem ®[7] 0.2 wt % | NA |
| LC-3 | Example 1, Part A Ratio B:A 100:8.2 | Example 1, Part B | TBPB 0.5 wt % | 10% Fe(III)(acac)$_3$ in acac 0.16 wt % | NA |
| LC-4 | Example 1, Part A Ratio B:A 100:8.2 | Example 1, Part B | TBPB 0.5 wt % | 10% Fe(III)(acac)$_3$ in acac 0.08 wt % | NA |
| LC-5 | Example 1, Part A Ratio B:A 100:8.2 | Example 1, Part B | TBPB 2 wt % | Polycure ® 503[8] 0.12 wt % | NA |
| LC-6 | Example 1, Part A Ratio B:A 100:8.2 | Example 1, Part B | NA | NA | NA |

TABLE 20-continued

Long-cure sealant formulations.

| Sample | Part A | Part B | Organic Peroxide | Metal Complex or Compound | Additive |
|---|---|---|---|---|---|
| LC-7 | Example 1, Part A Ratio B:A 100:8.2 | Example 1, Part B | TBPB 1 wt % | 7.7% Al(acac)$_3$ in 60/40 toluene/acac 0.75 wt % | NA |
| LC-8 | Example 1, Part A Ratio B:A 100:8.2 | Example 1, Part B | TBPB 1 wt % | 15% Potassium Hex-cem ® 0.2 wt % | NA |
| LC-9 | Example 1, Part A Ratio B:A 100:8.2 | Example 1, Part B | TBPB 0.5 wt % | 7.7% Al(acac)$_3$ in 60/40 toluene/acac 0.75 wt % | NA |
| LC-10 | Example 1, Part A Ratio B:A 100:8.2 | Example 1, Part B | TBPB 0.5 wt % | 10% Fe(III)(acac)$_3$ in acac 0.04 wt % | NA |
| LC-11 | Example 1, Part A Ratio B:A 100:8.2 | Example 1, Part B | TBPB 0.25 wt % | 10% Fe(III)(acac)$_3$ in acac 0.04% | NA |
| LC-12 | Example 1, Part A Ratio B:A 100:8.2 | Example 1, Part B | TBPB 1 wt % | 10% Mn(III)(acac)$_3$ in acac 0.25%; S-5135 1 wt % | NA |
| LC-13 | Example 1, Part A Ratio B:A 100:8.2 | Example 1, Part B | TBPB 1 wt % | 10% Ethacure ® 100 in acac 0.5 wt % | NA |
| LC-14 | Example 1, Part A Ratio B:A 100:8.2 | Example 1, Part B | BPO 1 wt %[2] | 10% Mn(III)(acac)$_3$ in acac 0.25 wt % | NA |
| LC-15 | Example 1, Part A Ratio B:A 100:8.2 | Example 1, Part B | Butanox ® P-50 1 wt %[3] | 10% Mn(III)(acac)$_3$ in acac 0.25 wt % | NA |
| LC-16 | Example 1, Part A Ratio B:A 100:8.2 | Example 1, Part B | APS 1 wt %[4] | 10% Mn(III)(acac)3 in acac 0.25 wt % | NA |
| LC-17 | Example 1, Part A Ratio B:A 100:8.2 | Example 1, Part B | TBPB 1 wt % | 10% Ethacure ® 100 in acac 0.75 wt % | NA |
| LC-18 | Example 1, Part A Ratio B:A 100:8.2 | Example 1, Part B | TBPB 1 wt % | NA | 10% MHPT[9] in acac 0.5% |
| LC-19 | Example 1, Part A Ratio B:A 100:8.2 | Example 1, Part B | TBPB 1 wt % | NA | 10% TDEA[10] in acac 0.5% |
| LC-20 | Example 1, Part A Ratio B:A 100:8.2 | Example 1, Part B | TBPB 1 wt % | NA | 10% toluidine in acac 0.5% |
| LC-21 | Example 1, Part A Ratio B:A 100:8.2 | Example 1, Part B | TBPB 2 wt % | Borchi ® OXY-coat 1310 1.1 wt % | NA |
| LC-22 | Example 1, Part A Ratio B:A 100:8.2 | Example 1, Part B | APS 0.1 wt % | NA | 10% MHPT in acac 0.1% |
| LC-23 | Example 1, Part A Ratio B:A 100:8.2 | Example 1, Part B | TBPB 0.25 wt % | 10% Fe(III)(acac)$_3$ in acac 0.02 wt % | NA |
| LC-24 | Example 1, Part A Ratio B:A 100:8.2 | Example 1, Part B | TBPB 0.125 wt % | 10% Fe(III)(acac)$_3$ in acac 0.01 wt % | NA |

TABLE 20-continued

Long-cure sealant formulations.

| Sample | Part A | Part B | Organic Peroxide | Metal Complex or Compound | Additive |
|---|---|---|---|---|---|
| LC-25 | Example 1, Part A Ratio B:A 100:8.2 | Example 1, Part B | APS 0.1 wt % | NA | 10% MHPT in acac 0.5% |
| LC-26 | Example 1, Part A Ratio B:A 100:8.2 | Example 1, Part B | APS 0.2 wt % | NA | 10% MHPT in acac 0.5% |
| LC-27 | Example 1, Part A Ratio B:A 100:8.2 | Example 1, Part B | APS 0.2 wt % | 10% Mn(III)(acac)$_3$ in acac 0.25 wt % | NA |
| LC-28 | Example 1, Part A Ratio B:A 100:8.2 | Example 1, Part B | Butanox ® P-50 1 wt % | NA | 10% MHPT in acac 0.5% |
| LC-29 | Example 1, Part A Ratio B:A 100:8.2 | Example 1, Part B | BPO 0.2% | NA | 10% toluidine in acac 0.5% |
| LC-30 | Example 1, Part A Ratio B:A 100:8.2 | Example 1, Part B | BPO 0.2 wt % | NA | 10% MHPT in acac 0.5 wt % |
| LC-31 | Example 1, Part A Ratio B:A 100:8.2 | Example 1, Part B | TBPB 1 wt % | NA | 10% MHPT in acac 0.75 wt % |
| LC-32 | Example 1, Part A Ratio B:A 100:8.2 | Example 1, Part B | TBPB 1 wt % | NA | 10% TDEA in acac 0.75 wt % |
| LC-33 | Example 1, Part A Ratio B:A 100:8.2 | Example 1, Part B | BPO 0.7 wt % | 10% Fe(III)(acac)$_3$ in acac 0.16 wt % | NA |
| LC-34 | Example 1, Part A Ratio B:A 100:8.2 | Example 1, Part B | TBPB 1 wt % | 10% Fe(III)(acac)$_3$ in acac 0.02% | 10%MHPT in acac 0.5 wt % |
| LC-35 | Example 1, Part A Ratio B:A 100:8.2 | Example 1, Part B | TBPB 1 wt % | 10% Fe(III)(acac)$_3$ in acac 0.02 wt % | 10% TDEA in acac 0.5 wt % |
| LC-36A | Example 1, Part A Ratio B:A 100:8.2 | Example 1, Part B | TBPB 1 wt % | 10% Mn(III)(acac)$_3$ in acac 0.5 wt % | NA |
| LC-36B | Example 1, Part A Ratio B:A 100:8.2 | Example 1, Part B | TBPB 1 wt % in Gasil ® IJ35[5] | 10% Mn(III)(acac)$_3$ in acac 0.5 wt % | NA |
| LC-37 | Example 1, Part A Ratio B:A 100:8.2 | Example 1, Part B | TBPB 0.54 wt % | 10% Fe(III)(acac)$_3$ in acac 0.02 wt % | 10% TDEA in acac 0.5 wt % |
| LC-38 | Example 1, Part A Ratio B:A 100:8.2 | Example 1, Part B | TBPB 0.54 wt % | Borchi ® OXY-coat 1310 0.02 wt % | 10% TDEA in acac 0.5 wt % |
| LC-39 | Example 1, Part A Ratio B:A 100:8.2 | Example 1, Part B | TBPB 0.54 wt % | Borchi ® OXY-coat 1310 0.2 wt % | 10% TDEA in acac 0.5 wt % |
| LC-40 | Example 1, Part A Ratio B:A 100:8.2 | Example 1, Part B | TBPB 0.54 wt % | 10% Fe(III)(acac)$_3$ in acac 0.02 wt % | 10% MHPT in acac 0.5 wt % |
| LC-41 | Example 1, Part A Ratio B:A 100:8.2 | Example 1, Part B | TBPB 0.54 wt % | Borchi ® OXY-coat 1310 0.02 wt % | 10% MHPT in acac 0.5 wt % |

TABLE 20-continued

Long-cure sealant formulations.

| Sample | Part A | Part B | Organic Peroxide | Metal Complex or Compound | Additive |
|---|---|---|---|---|---|
| LC-42 | Example 1, Part A Ratio B:A 100:8.2 | Example 1, Part B | TBPB 0.54 wt % | Borchi ® OXY-coat 1310 0.2 wt % | 10% MHPT in acac 0.5 wt % |
| LC-43 | Example 1, Part A Ratio B:A 100:8.2 | Example 1, Part B | TBPB 0.54 wt % | 15% Potassium Hex-cem ® 0.2 wt % | 10% TDEA in acac 0.5 wt % |
| LC-44 | Example 1, Part A Ratio B:A 100:8.2 | Example 1, Part B | TBPB 0.54 wt % | 10% $FeSO_4$ in $H_2O$ 0.05 wt % | NA |
| LC-45 | Example 1, Part A Ratio B:A 100:8.2 | Example 1, Part B | TBPB 1 wt % | 10% Fe(III)(acac)$_3$ in acac 0.02 wt % | 10% MHPT in acac 1 wt % |
| LC-46 | Example 1, Part A Ratio B:A 100:8.2 | Example 1, Part B | TBPB 1 wt % | 10% Fe(III)(acac)$_3$ in acac 0.02 wt % | 10% TDEA in acac 1 wt % |
| LC-47 | Example 1, Part A Ratio B:A 100:8.2 | Example 1, Part B | TBPB 1 wt % | Borchi ® OXY-coat 1310 0.4 wt % | 10% TDEA in acac 1 wt % |
| LC-48 | Example 1, Part A Ratio B:A 100:8.2 | Example 1, Part B | TBPB 1 wt % | 15% Potassium Hex-cem ® 0.4 wt % | 10%TDEA in acac 1 wt % |
| LC-49 | Example 1, Part A Ratio B:A 100:8.2 | Example 1, Part B | TBPB 1% | Borchi Oxy-coat 1310 0.2 wt % | 10%TDEA in acac 1 wt % |
| LC-50 | Example 1, Part A Ratio B:A 100:8.2 | Example 1, Part B | TBPB 0.5% | 15% Potassium Hex-cem ® 0.2 wt % | 10% TDEA in acac 1 wt % |
| LC-51 | Example 1, Part A Ratio B:A 100:8.2 | Example 1, Part B | TBPB 1% | 15% Potassium Hex-cem ® 0.2 wt % | 10% TDEA in acac 0.5% |
| LC-52 | Example 1, Part A Ratio B:A 100:8.2 | Example 1, Part B | TBPB 0.5 wt % | 15% Potassium Hex-cem ® 0.4 wt % | 10% TDEA in acac 0.5 wt % |

[1] tert-Butyl peroxide benzoate, Trigonox ® C, wt % is acetylacetone (AkzoNobel).
[2] Benzoyl peroxide.
[3] Butonox ® P-50, methyl isopropyl ketone peroxide, solution in dimethyl phthalate (AkzoNobel).
[4] Ammonium persulfate.
[5] Gasil ® IJ35, silica gel, average particle size 4.6-5.8 µm, 1.2 mL/g pore volume (PQ Corporation).
[6] Borchi ® OXY-Coat 1310, 1% solution of an iron complex in dipropylene glycol monomethyl ether and 1,2-propylene glycol (Borchers).
[7] Potassium hex-cem ®, potassium 2-ethylhexanoate dissolved in diethylene diglycol (Borchers).
[8] Poly-cure ® 503, blend of metal salts of 2-ethylhexanoic acid (Borchers).
[9] MHPT, FirstCure ® MHPT, N-(2-hydroxyethyl)-N-methyl-para-toluidine (Albemarle).
[10] TDEA, N,N-diethyltoluene-2,5-diamine.

TABLE 21

Physical properties of long cure sealants cured under dark conditions.

| Sealant Formulation | Cure Time (days) | Tensile Strength (psi) | Elongation (%) | Hardness (Shore A) |
|---|---|---|---|---|
| LC-45 | 22 | 277 | 374 | 36 |
| LC-35 | 27 | 319 | 391 | 40 |
| LC-10 | 42 | 340 | 362 | 40 |
| LC-11 | 42 | 348 | 380 | 40 |
| LC-46 | 22 | 218 | 385 | 36 |
| LC-48 | 22 | 330 | 401 | 39 |

TABLE 22

Physical properties of long cure sealants cured under UV conditions.

| Sealant Formulation | Days After UV Cure | Tensile Strength (psi, SD) | Elongation (%, SD) | Hardness (Shore A) |
|---|---|---|---|---|
| LC-45 | 2 | 449 (22) | 292 (18) | 48 |
| LC-35 | 28 | 412 (25) | 334 (20) | 47 |
| LC-10 | 2 | 435 (36) | 360 (37) | 47 |
| LC-11 | 2 | 439 (24) | 388 (30) | 47 |
| LC-46 | 2 | 451 (22) | 300 (16) | 47 |
| LC-48 | 2 | 436 (10) | 273 (13) | 47 |

Figure 17:
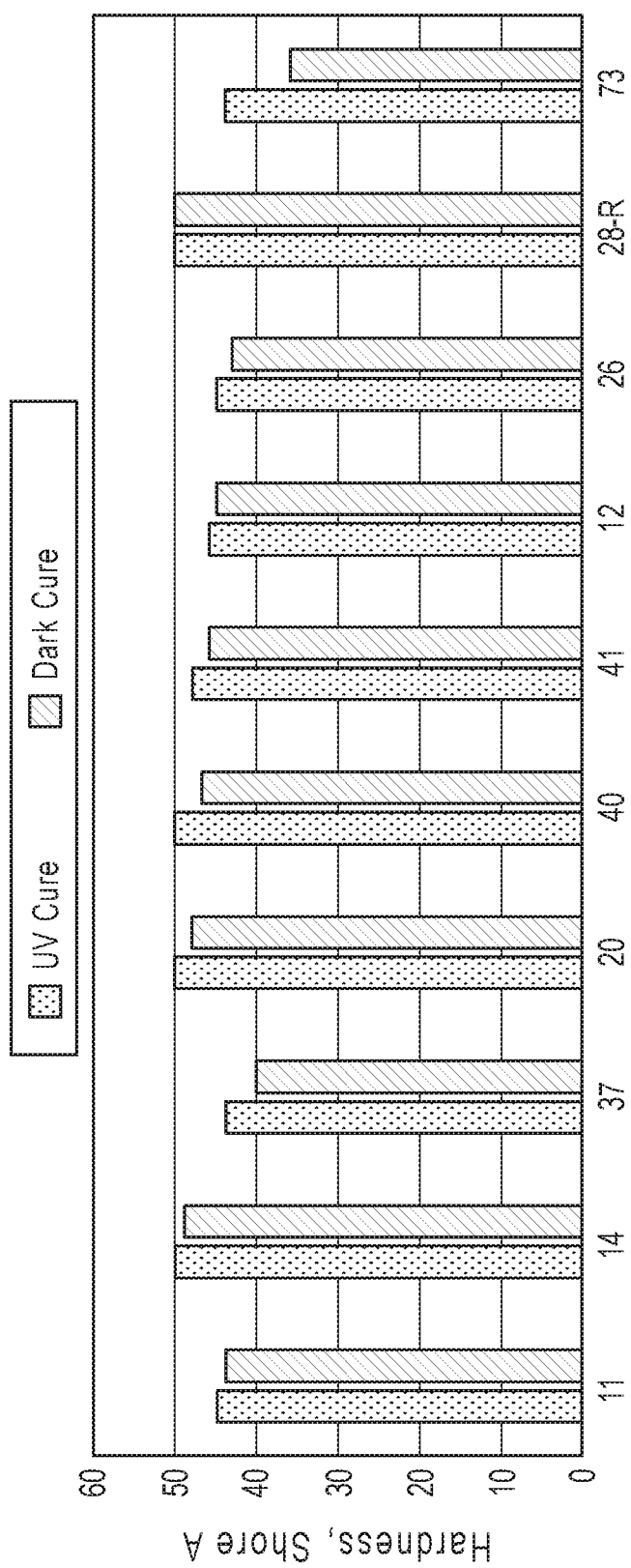
FIG. 17 is a chart showing the Shore A hardness of fully cured sealants cured under UV and dark cure conditions.

The Shore A hardness of certain fully cured short cure sealants shown in Table 13 cured under UV or dark conditions are shown in FIG. 17.

Figure 18:
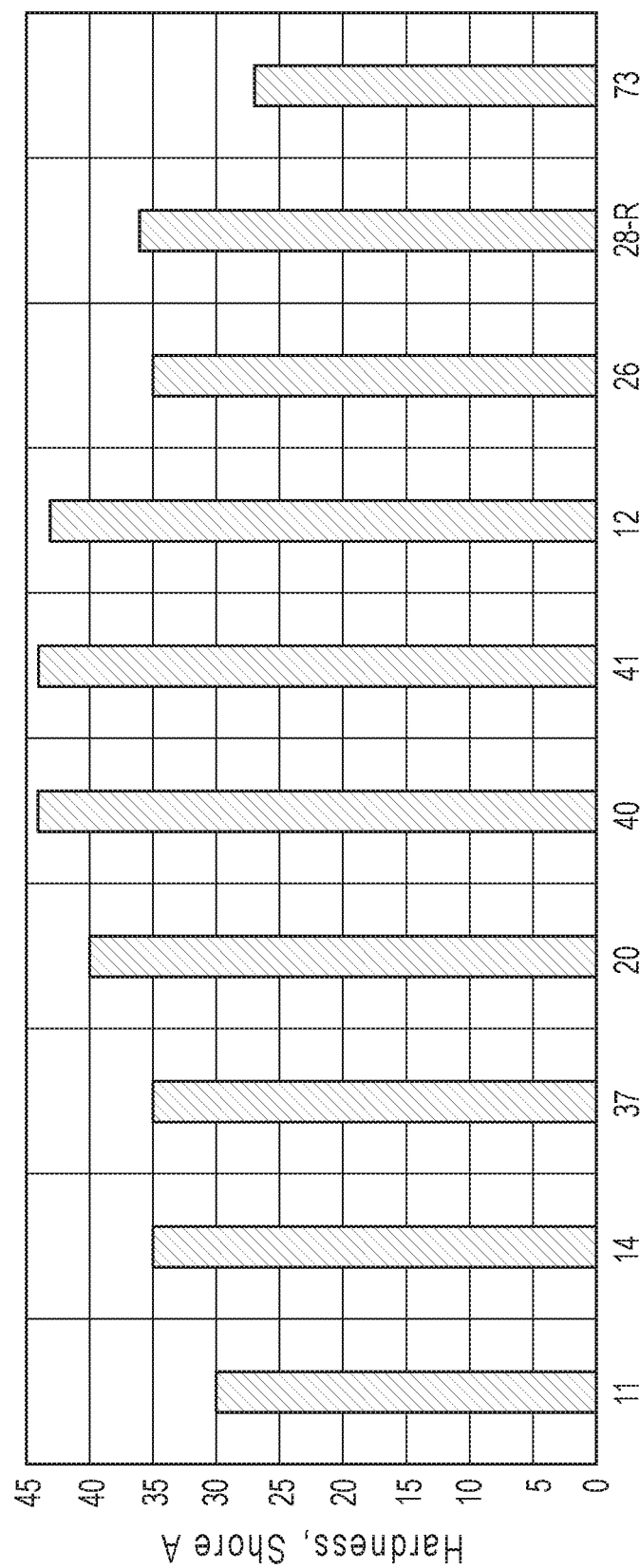
FIG. 18 is a chart showing the Shore A hardness of sealants measured within a few minutes following exposure to UV curing conditions.

The initial Shore A hardness of certain short cure sealants shown in Table 13 measured within a few minutes following exposure to UV is shown in FIG. 18.

The effects of certain solvents on the application time, tack free time, and initial (UV cure) hardness of various sealants presented in Table 13, is shown in Table 23.

TABLE 23

Application time, open time, and hardness of various short cure sealants under UV and dark cure conditions.

| Sealant | Solvent | Open Time (min) | Tack Free (hr) | Initial Following UV Hardness) (Shore A) | Dark Conditions Hardness (Shore A) at 24 hr | Room Lighting Hardness (Shore A) at 24 hr | UV Conditions Hardness (Shore A) at 24 hr |
|---|---|---|---|---|---|---|---|
| 75 | methyl propyl ketone | 90 | 36-48 | 43 | 39-48 | 38-48 | 46-48 |
| 76 | ethyl acetate | 90 | 48 | 43 | 39-48 | 38-48 | 48 |
| 79 | isopropanol | 120 | 24 | 43 | 34 | 34 | 47 |
| 80 | hexanes | 90 | 24 | 43 | 35 | 32 | 47 |
| 81 | methanol | 120-150 | 36 | 43 | 38 | 36 | 47 |
| 82 | cyclohexane | 90 | 36 | 44 | 34 | 33 | 47 |
| 83 | toluene | 90 | 36 | 42 | 33 | 32 | 46 |
| 84 | water | 80 | 36 | 43 | 32 | 28 | 47 |

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled to their full scope and equivalents thereof.

What is claimed is:

1. A composition comprising:
a polythiol, wherein the polythiol comprises a thiol-terminated polythioether prepolymer, wherein the thiol-terminated polythioether prepolymer comprises a moiety having the structure of Formula (2c):

$$—S—R^1—[S-A-S—R^1-]_n—S— \quad (2c)$$

wherein,
n is an integer from 1 to 60;
each $R^1$ is independently selected from $C_{2-10}$ alkanediyl, $C_{6-8}$ cycloalkanediyl, $C_{6-14}$ alkanecycloalkanediyl, $C_{5-8}$ heterocycloalkanediyl, and —[$(CHR^3)_p$—X—]$_q(CHR^3)$—, wherein,
p is an integer from 2 to 6;
q is an integer from 1 to 5;
r is an integer from 2 to 10;
each $R^3$ is independently selected from hydrogen and methyl; and
each X is independently selected from O, S, and NR, wherein R is selected from hydrogen and methyl; and
each A is independently a moiety derived from a polyvinyl ether of Formula (3) and a polyalkenyl polyfunctionalizing agent of Formula (4):

$$CH_2=CH—O—(R^2—O)_m—CH=CH_2 \quad (3)$$

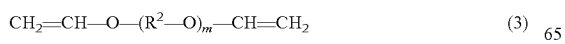

$$B(—R^{70}—CH=CH_2)_z \quad (4)$$

wherein,
m is an integer from 0 to 50;
each $R^2$ is independently selected from $C_{1-10}$ alkanediyl, $C_{6-8}$ cycloalkanediyl, $C_{6-14}$ alkanecycloalkanediyl, and —$RCHR)_p$—X—W$CHR^3$)—, wherein p, q, r, $R^3$, and X are as defined for $R^1$;
B represents a core of a z-valent, polyalkenyl polyfunctionalizing agent $B(—R^{70}—CH=CH_2)_z$ wherein,
z is an integer from 3 to 6; and
each $R^{70}$ is independently selected from $C^{1-10}$ alkanediyl, $C^{1-10}$ heteroalkanediyl, substituted $C^{1-10}$ alkanediyl, and substituted $C^{1-10}$ heteroalkanediyl;
a polyalkenyl, wherein the polyalkenyl comprises an alkenyl-terminated prepolymer, a polyalkenyl monomer, or a combination thereof;
a metal complex; and
an organic peroxide.

2. The composition of claim 1, wherein the polyalkenyl monomer comprises a bis(alkenyl) ether.

3. The composition of claim 1, wherein the metal complex comprises cobalt(II)bis(2-ethyl hexanoate), manganese (III) (acetylacetonate)$_3$, iron(III)(acetylacetonate)3, or a combination of any of the foregoing.

4. The composition of claim 1, wherein the organic peroxide comprises tert-butyl peroxybenzoate.

5. The composition of claim 1, wherein the metal complex comprises a metal complex of Co(II), Co(III), Mn(II), Mn(III), Fe(II), Fe(III), Cu(II), V(III), or a combination of any of the foregoing.

6. The composition of claim 1, wherein the composition comprises a free radical photoinitiator.

7. The composition of claim 1, wherein the composition comprises a hydrogen donor.

8. The composition of claim 7, wherein the hydrogen donor comprises a primary amine, a secondary amine or a combination thereof.

9. The composition of claim 1, wherein the composition comprises from 0.01 wt % to 2 wt % of a primary amine, a secondary amine, a tertiary amine, or a combination thereof, wherein wt % is based on the total weight of the composition.

10. The composition of claim 1, wherein the composition comprises:
from 45 wt % to 85 wt % of the thiol-terminated polythioether prepolymer;
from 1 wt % to 10 wt % of the polyalkenyl;
from 0.001 wt % to 2 wt % of the metal complex; and
from 0.1 wt % to 5 wt % of the organic peroxide, wherein wt % is based on the total weight of the composition.

11. The composition of claim 1, wherein the composition is curable under dark conditions.

12. The composition of claim 1, wherein,
the composition is curable upon exposure to actinic radiation; and
the composition is curable without exposure to actinic radiation.

13. The composition of claim 1, wherein the composition is curable at a temperature from 20° C. to 30° C.

14. A cured sealant prepared from the composition of claim 1.

15. A part sealed with the cured sealant of claim 14.

16. A vehicle comprising the cured sealant of claim 14.

17. An aerospace vehicle comprising the cured sealant of claim 14.

18. A method of sealing a part comprising:
applying the composition of claim 1 to a part; and
allowing the applied composition to cure, to seal the part.

19. The composition of claim 1, wherein the thiol-terminated polythioether prepolymer comprises a moiety of Formula (2):

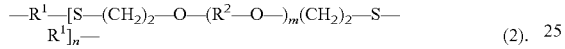
(2).

20. The composition of claim 1, wherein the thiol-terminated polythioether prepolymer comprises a thiol-terminated polythioether prepolymer of Formula (2a), a thiol-terminated polythioether prepolymer of Formula (2b), or a combination thereof:

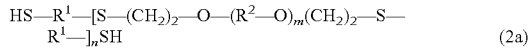 (2a)

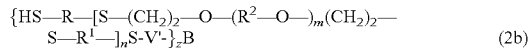 (2b)

wherein,
each $R^1$ can independently be selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(CHR^3)_p—X—]_q(CHR^3)—$, wherein, p is an integer from 2 to 6;

q is an integer from 1 to 5;

r is an integer from 2 to 10;

each $R^3$ independently be selected from hydrogen and methyl; and each X can independently be selected from O, S, and NR, wherein R can be selected from hydrogen and methyl;

each $R^2$ can independently be selected from $C_{1-10}$ alkanediyl, $C_{6-8}$ cycloalkanediyl, $C_{6-14}$ alkanecycloalkanediyl, and $—[(CHR^3)_p—X—]_q(CHR^3)—$, wherein p, q, r, $R^3$, and X are as defined as for $R^1$;

m is an integer from 0 to 50;

n is an integer from 1 to 60;

B represents a core of a z-valent, polyfunctionalizing agent $B(—V)_z$ wherein, z is an integer from 3 to 6; and each V is a moiety comprising a terminal group reactive with a thiol; and each —V'— is derived from the reaction of —V with a thiol.

21. The composition of claim 1, wherein the polythiol further comprises a polythiol monomer.

* * * * *